(12) United States Patent
Woolliscroft et al.

(10) Patent No.: US 11,897,456 B2
(45) Date of Patent: *Feb. 13, 2024

(54) APPARATUS AND METHOD FOR CONTROLLING VEHICLE MOVEMENT

(71) Applicant: JAGUAR LAND ROVER LIMITED, Coventry (GB)

(72) Inventors: Daniel Woolliscroft, Birmingham (GB); Edward Pither, Wolvey (GB); Helio Cardoso, Coventry (GB); David Pettinger, Coventry (GB)

(73) Assignee: Jaguar Land Rover Limited, Coventry (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/829,305

(22) Filed: May 31, 2022

(65) Prior Publication Data

US 2022/0297679 A1  Sep. 22, 2022

Related U.S. Application Data

(63) Continuation of application No. 15/733,877, filed as application No. PCT/EP2019/064074 on May 29, 2019, now Pat. No. 11,345,336.

(51) Int. Cl.
*B60W 30/06* (2006.01)
*B60W 60/00* (2020.01)
(Continued)

(52) U.S. Cl.
CPC .......... *B60W 30/06* (2013.01); *B60W 60/001* (2020.02); *G06F 9/3838* (2013.01); *G06V 20/56* (2022.01); *G08G 1/148* (2013.01)

(58) Field of Classification Search
CPC ... B60W 30/06; B60W 60/001; G06F 9/3838; G06V 20/56; G08G 1/148; G08G 1/168; B62D 15/0285
See application file for complete search history.

(56) References Cited

U.S. PATENT DOCUMENTS

| 5,570,087 A * | 10/1996 | Lemelson | G07C 5/085 |
| | | | 340/936 |
| 2005/0131597 A1* | 6/2005 | Raz | G09B 19/167 |
| | | | 701/29.1 |

(Continued)

FOREIGN PATENT DOCUMENTS

| DE | 102010011591 A1 | 9/2011 |
| DE | 102014013692 A1 | 3/2016 |

(Continued)

OTHER PUBLICATIONS

International Search Report corresponding to International Application No. PCT/EP2019/064074, dated Oct. 24, 2019, 4 pages.

(Continued)

*Primary Examiner* — Daryl C Pope
(74) *Attorney, Agent, or Firm* — Reising Ethington P.C.

(57) ABSTRACT

Embodiments of the present invention provide a controller (200), comprising input means (230) for receiving an environment signal indicative of a feature in a vicinity of a vehicle, output means (240) for outputting a manoeuvre signal to cause a vehicle to perform a defined manoeuvre, and control means (210) arranged to provide at least one mode for performing at least a portion of the defined manoeuvre, the mode being selectable from a plurality of modes including at least one mode corresponding to an occupant-in-vehicle mode and at least one mode corresponding to an occupant-out-of-vehicle mode, the mode being selectable in dependence upon the environment signal being indicative of a vehicle envelope suitable for the mode.

20 Claims, 69 Drawing Sheets

(51) Int. Cl.
　　　*G06V 20/56* (2022.01)
　　　*G06F 9/38* (2018.01)
　　　*G08G 1/14* (2006.01)

(56) References Cited

U.S. PATENT DOCUMENTS

| | | |
|---|---|---|
| 2012/0101654 A1 | 4/2012 | Samples |
| 2015/0203111 A1 | 7/2015 | Bonnet et al. |
| 2020/0346639 A1* | 11/2020 | Tashiro .................. G01C 21/34 |
| 2021/0031831 A1* | 2/2021 | Yoshizaki ............ B62D 15/025 |

FOREIGN PATENT DOCUMENTS

| | | |
|---|---|---|
| EP | 1533181 A2 | 5/2005 |
| EP | 3081731 A1 | 10/2016 |
| EP | 3124327 A1 | 2/2017 |
| GB | 2552020 A | 1/2018 |
| GB | 2555177 A | 4/2018 |

OTHER PUBLICATIONS

Written Opinion corresponding to International Application No. PCT/EP2019/064074, dated Oct. 24, 2019, 9 pages.
Combined Search and Examination Report corresponding to Great Britain Application No. GB18088955, dated Nov. 12, 2018, 7 pages.

* cited by examiner

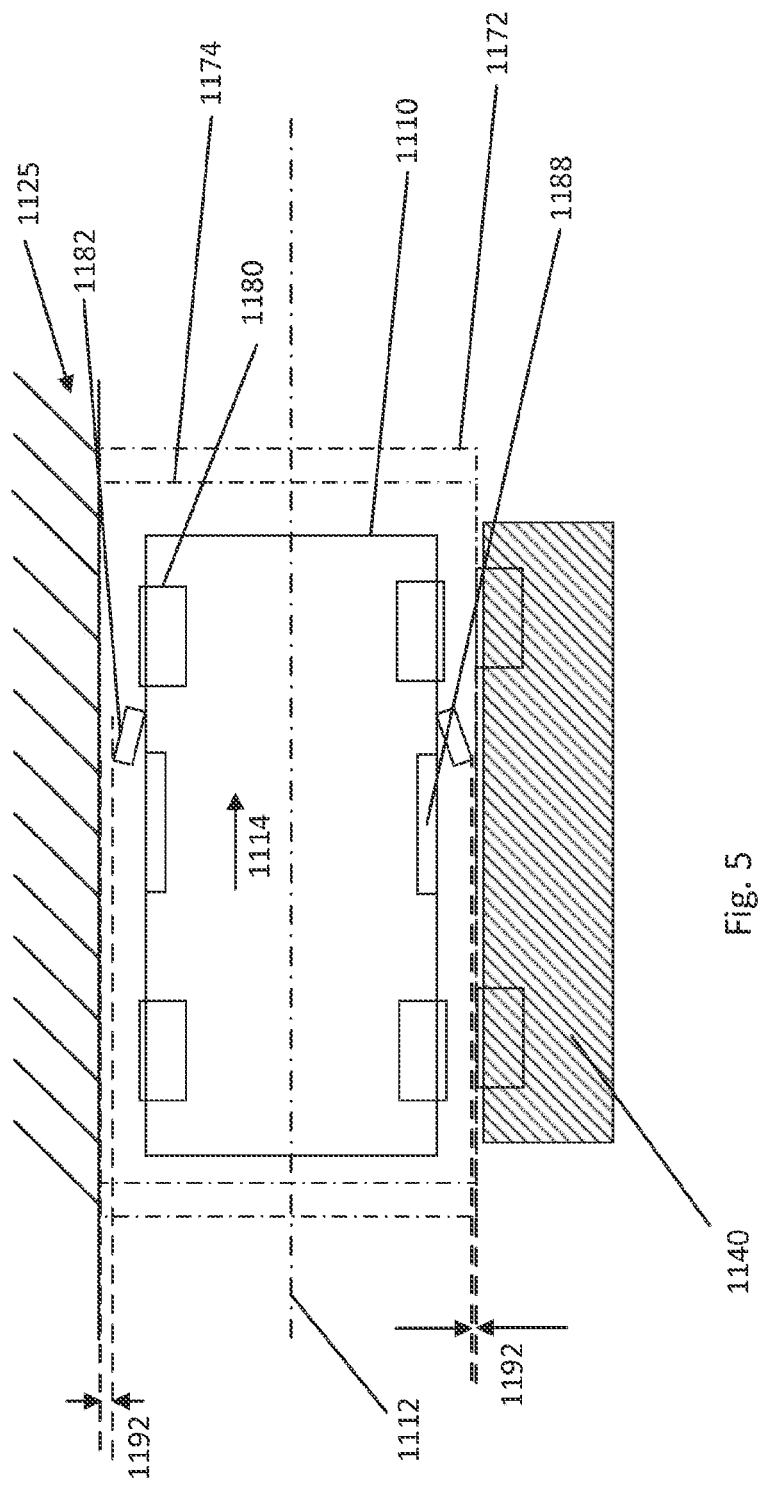

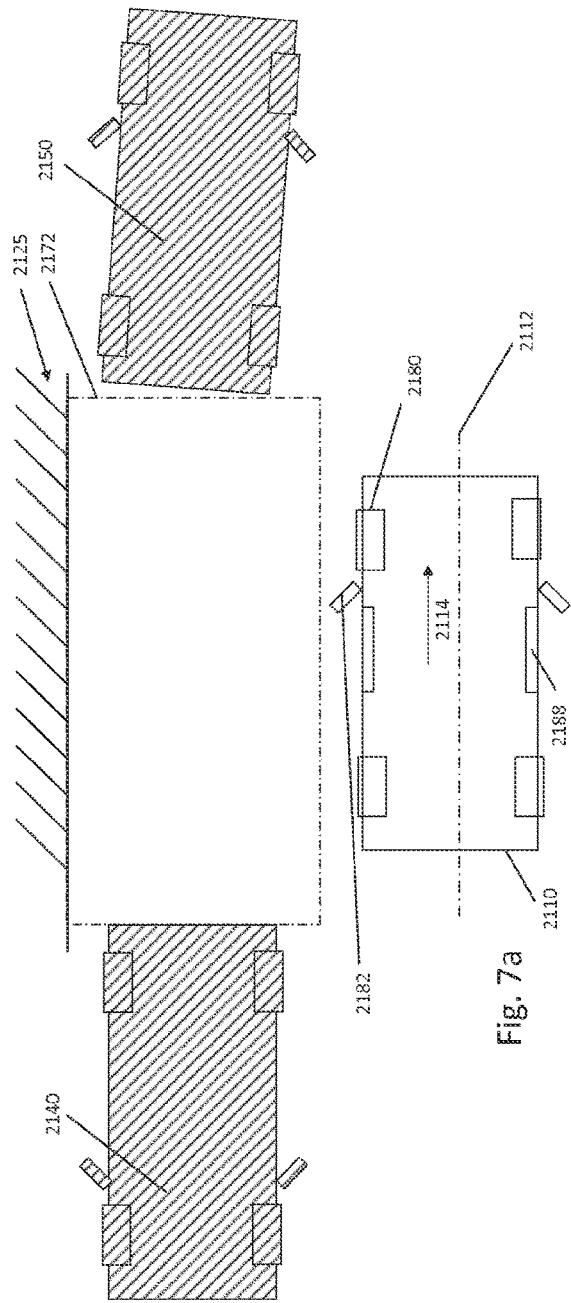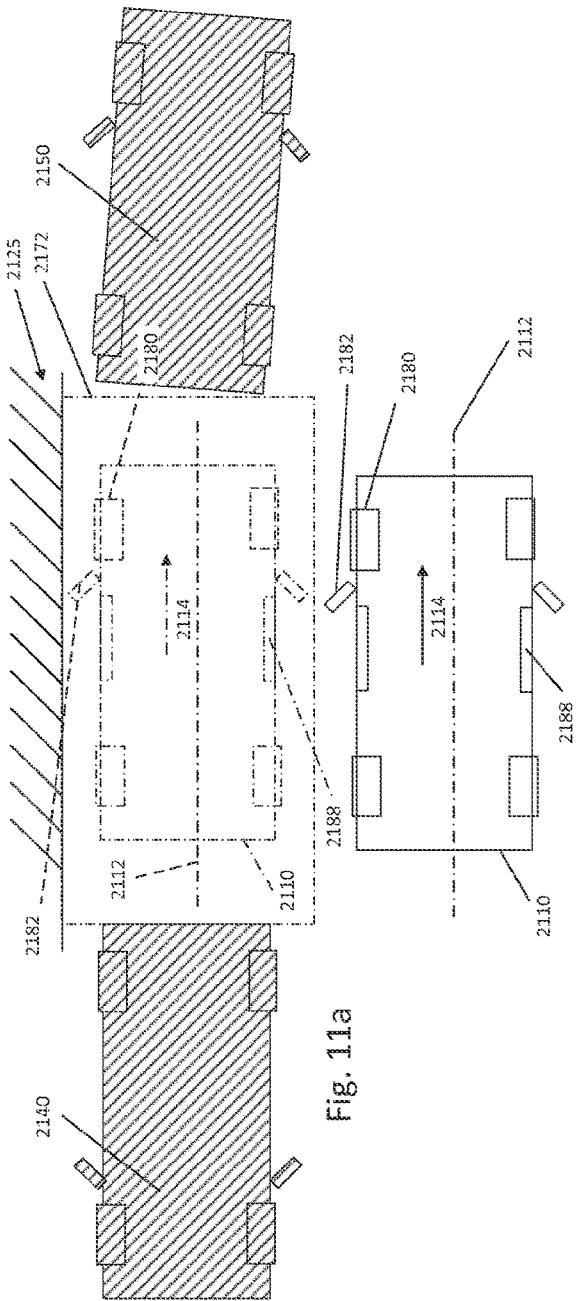

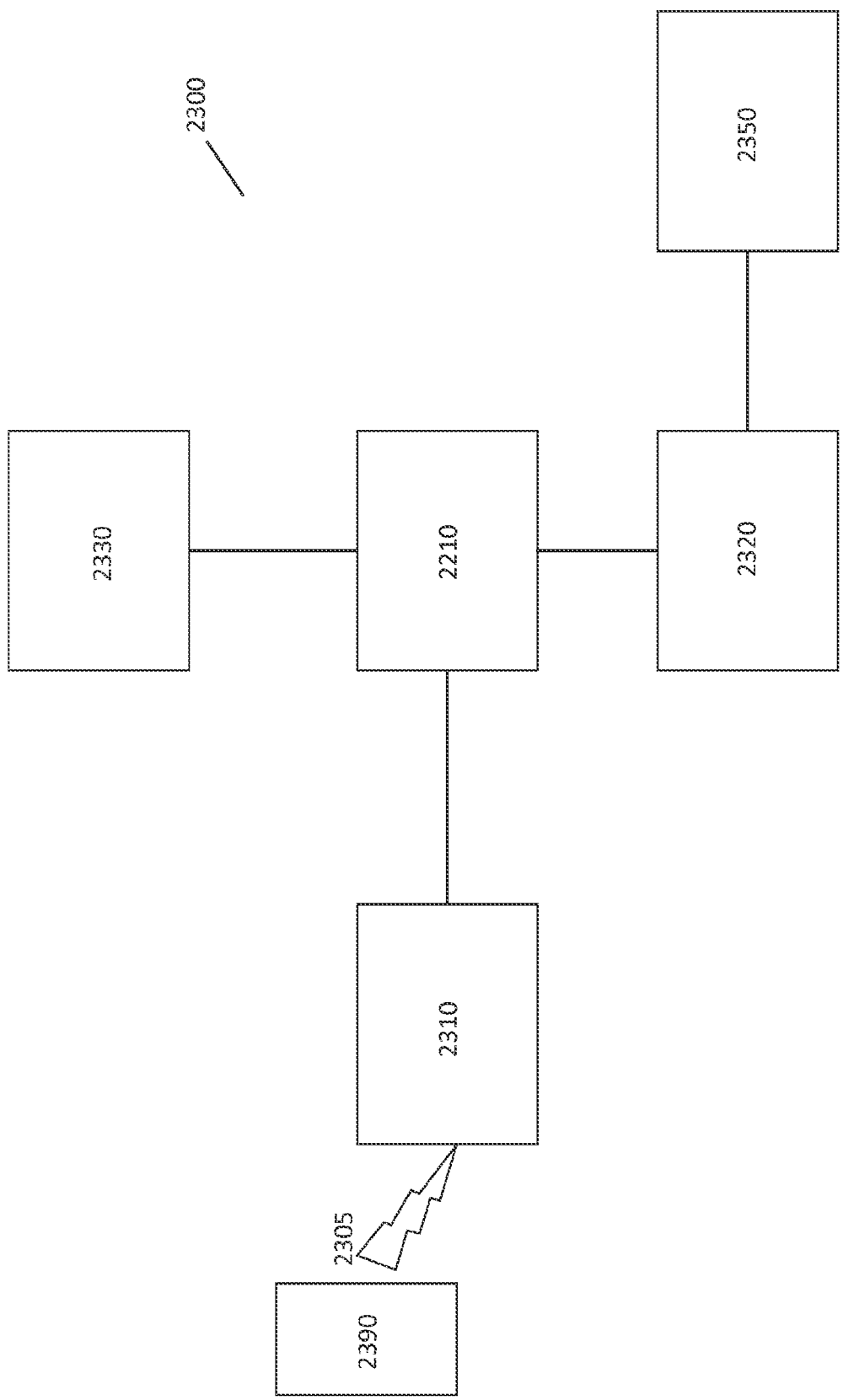

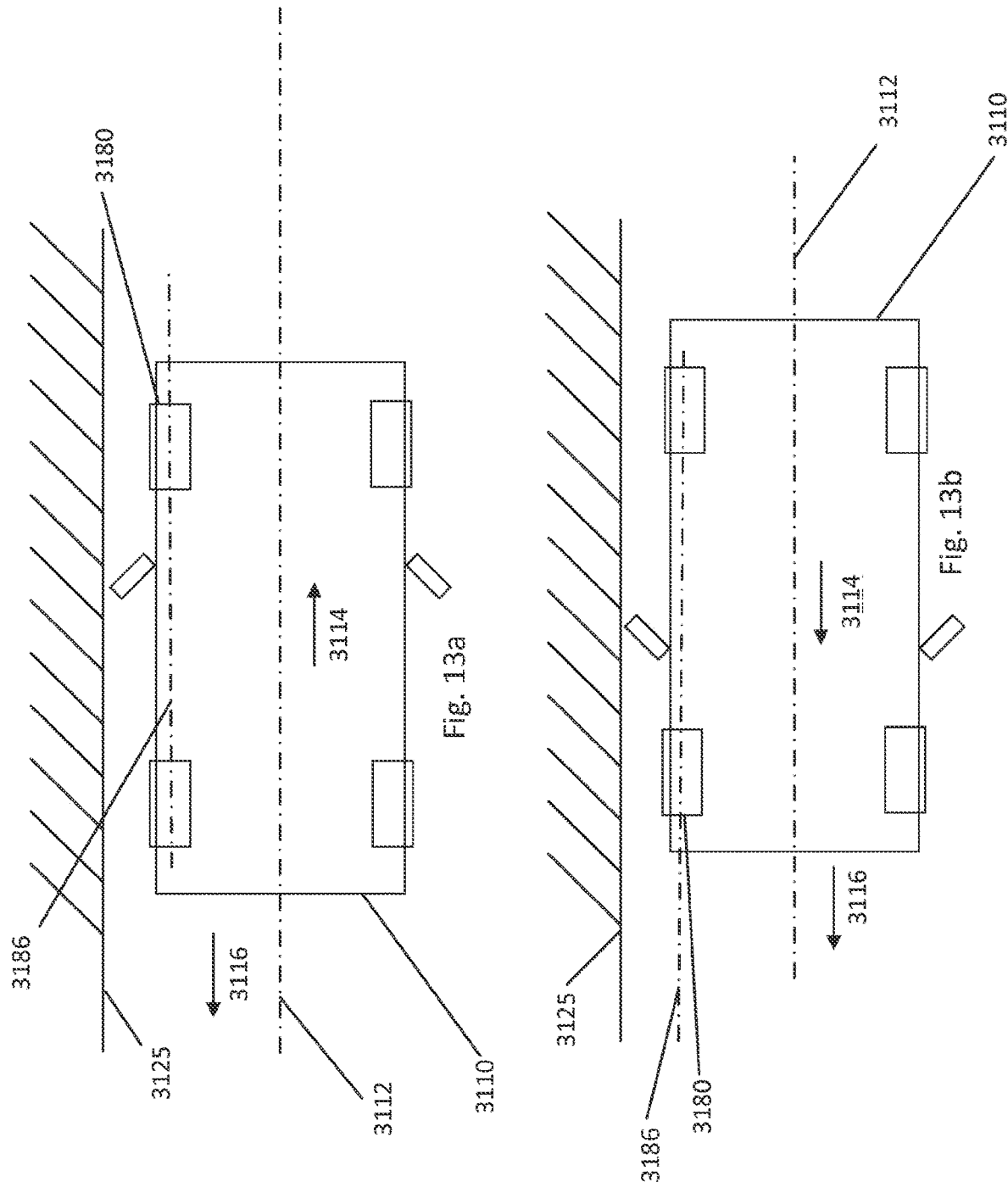

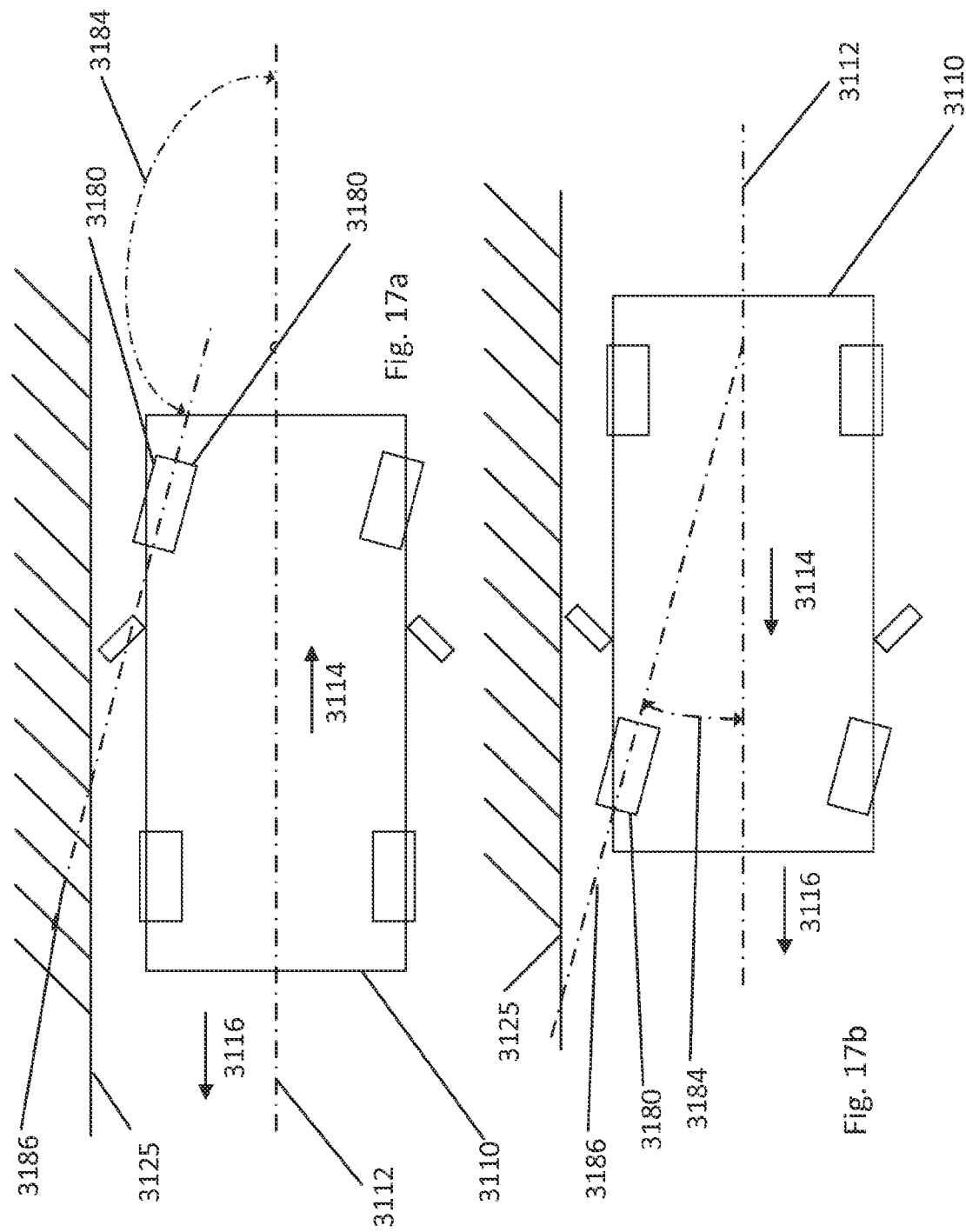

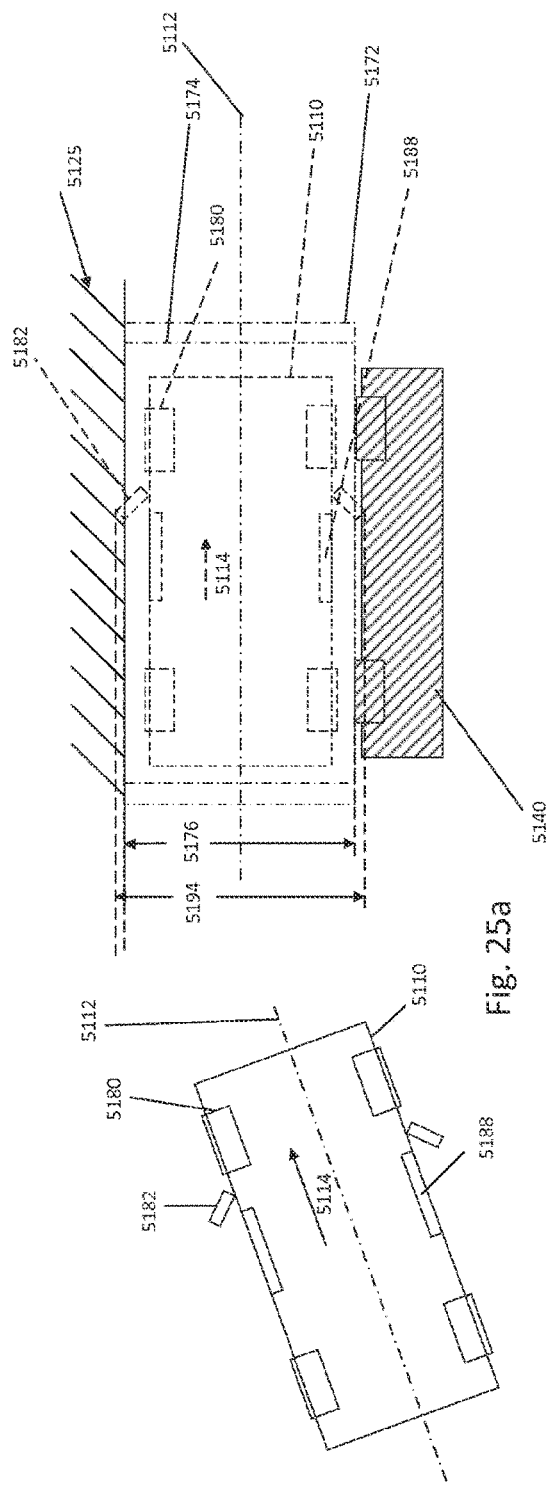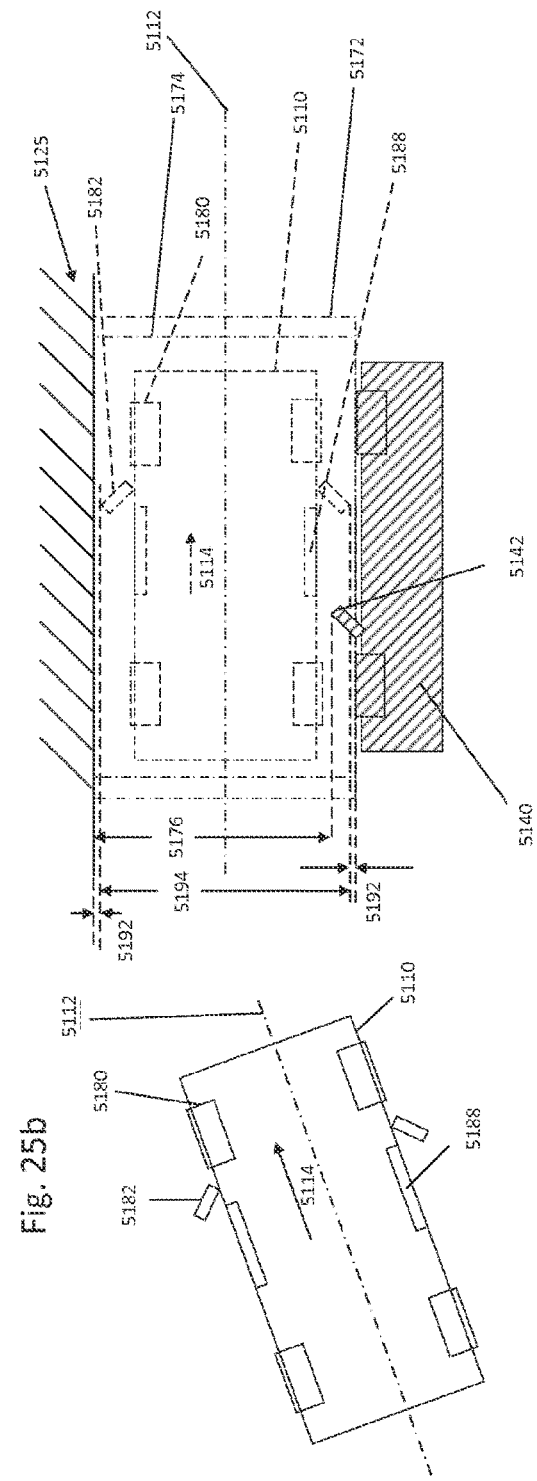

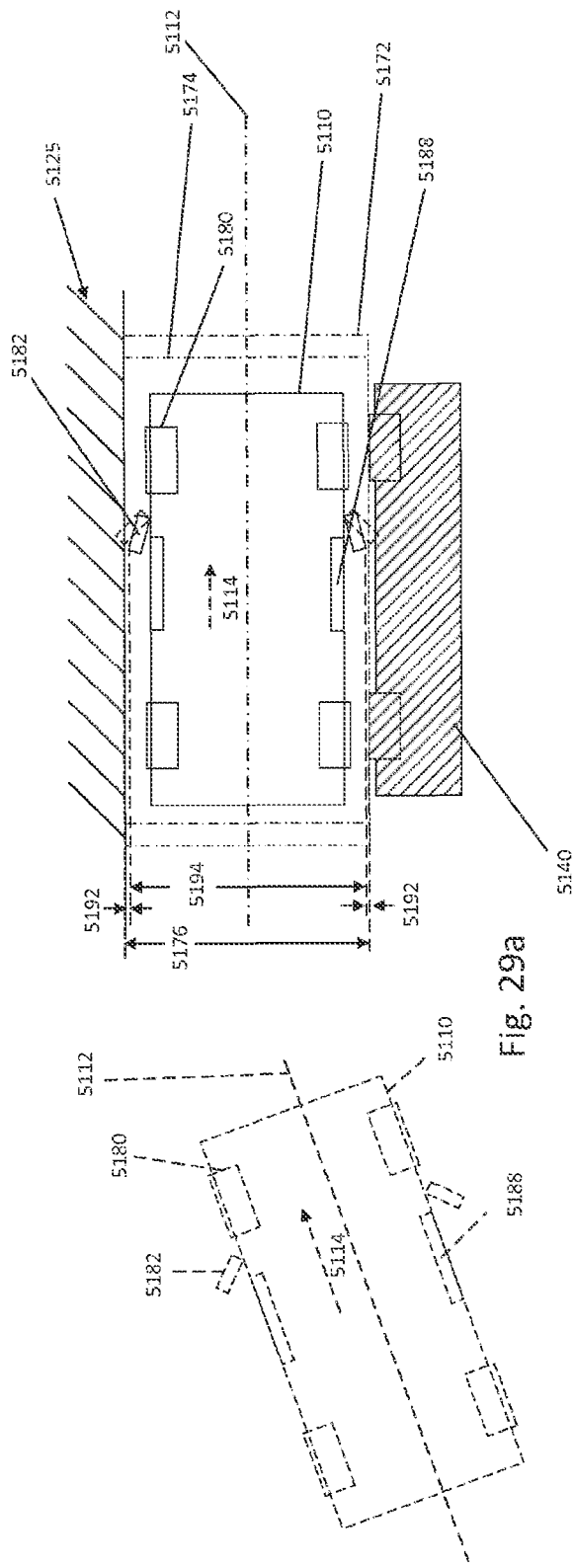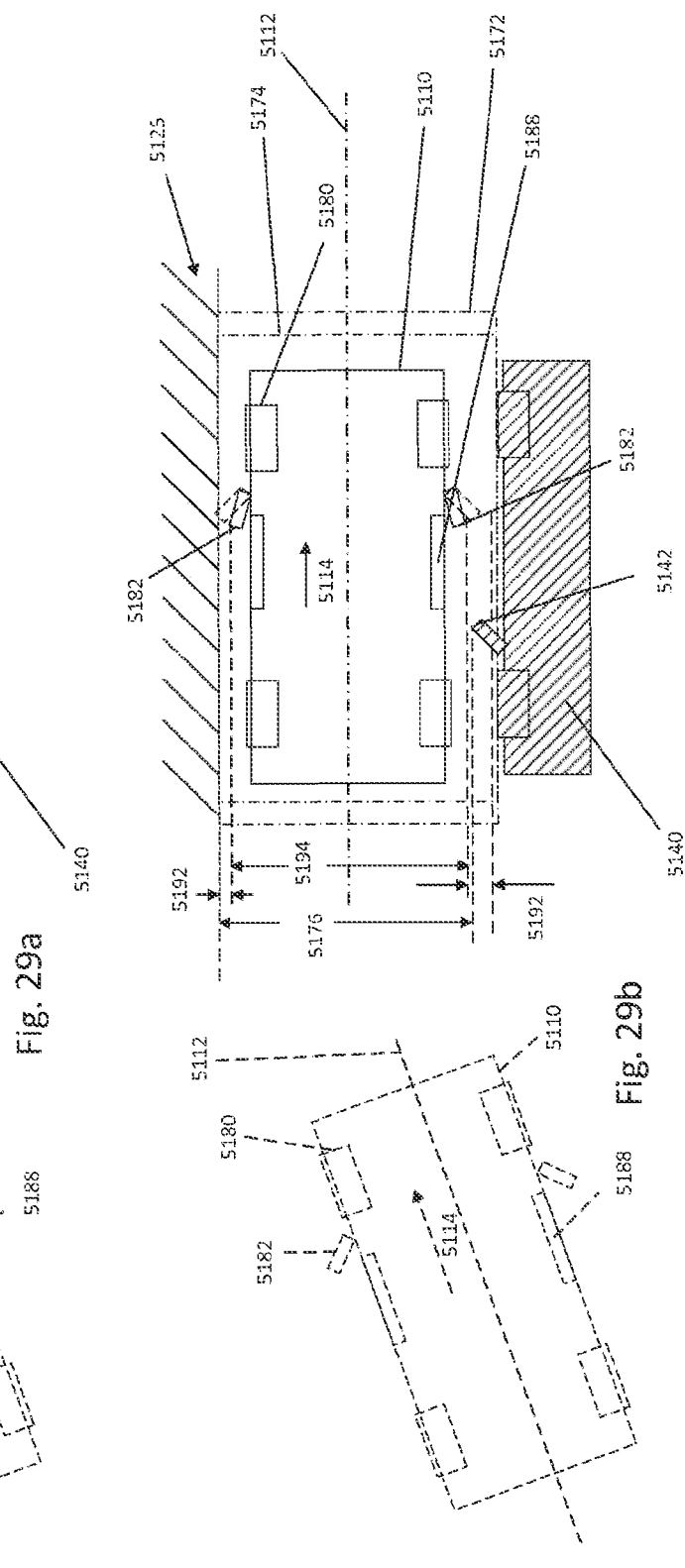

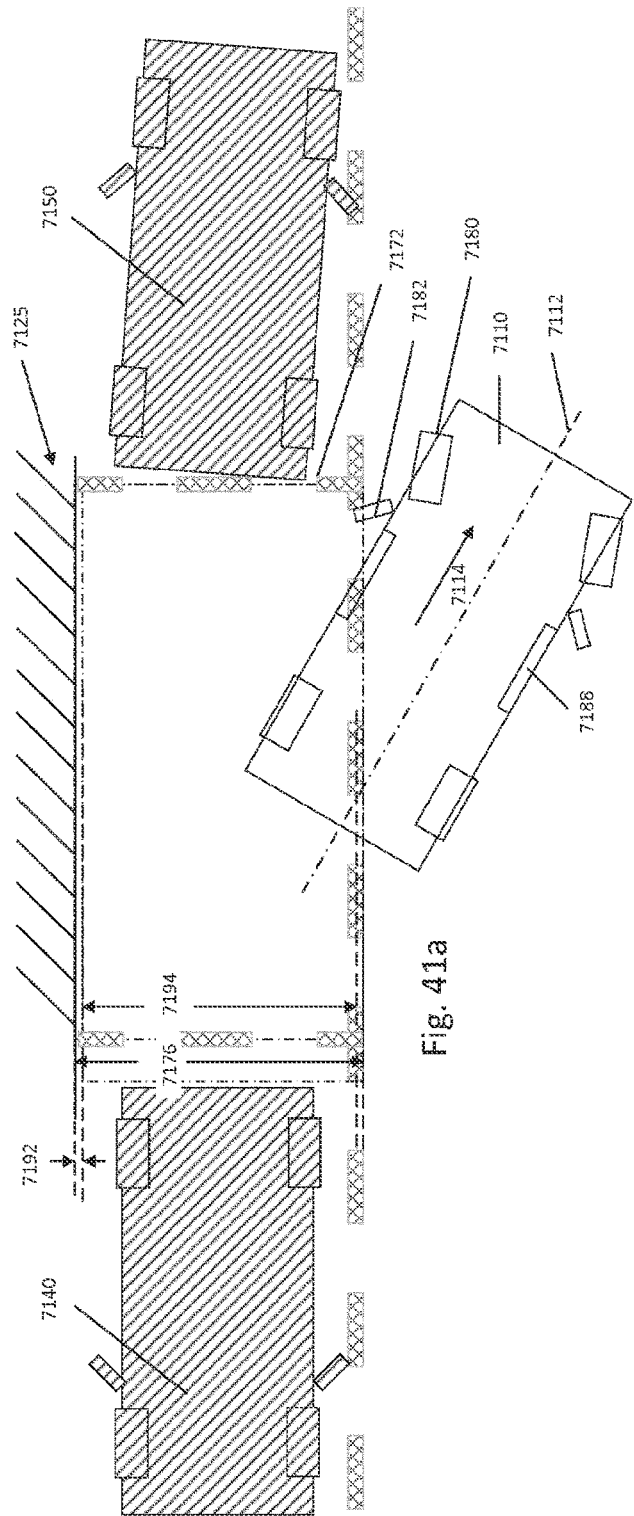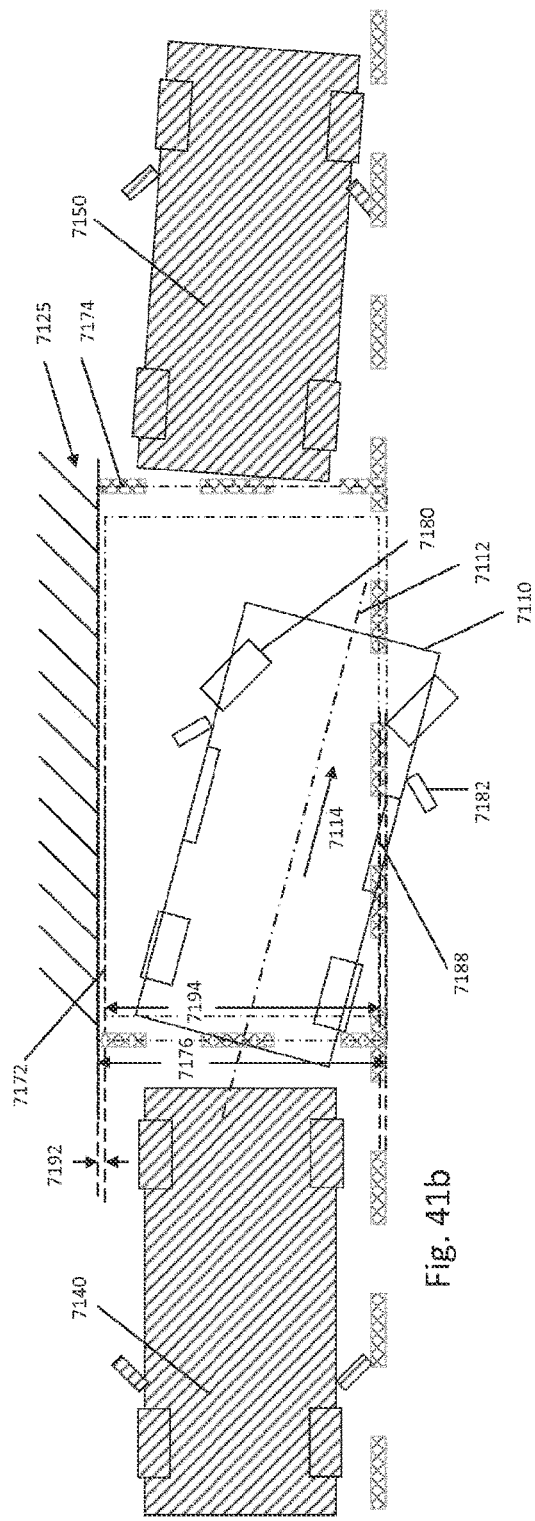
Fig. 41a
Fig. 41b

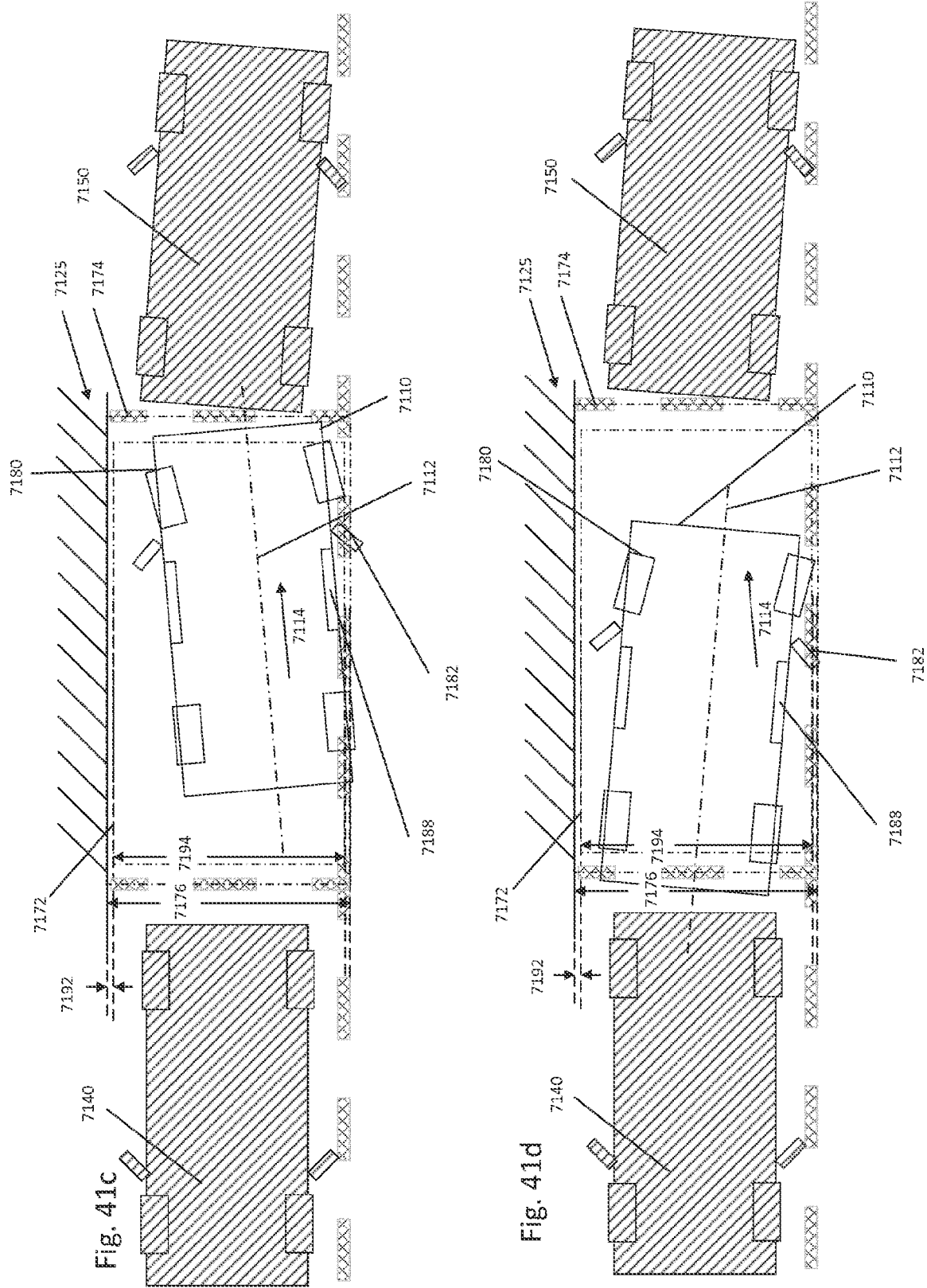

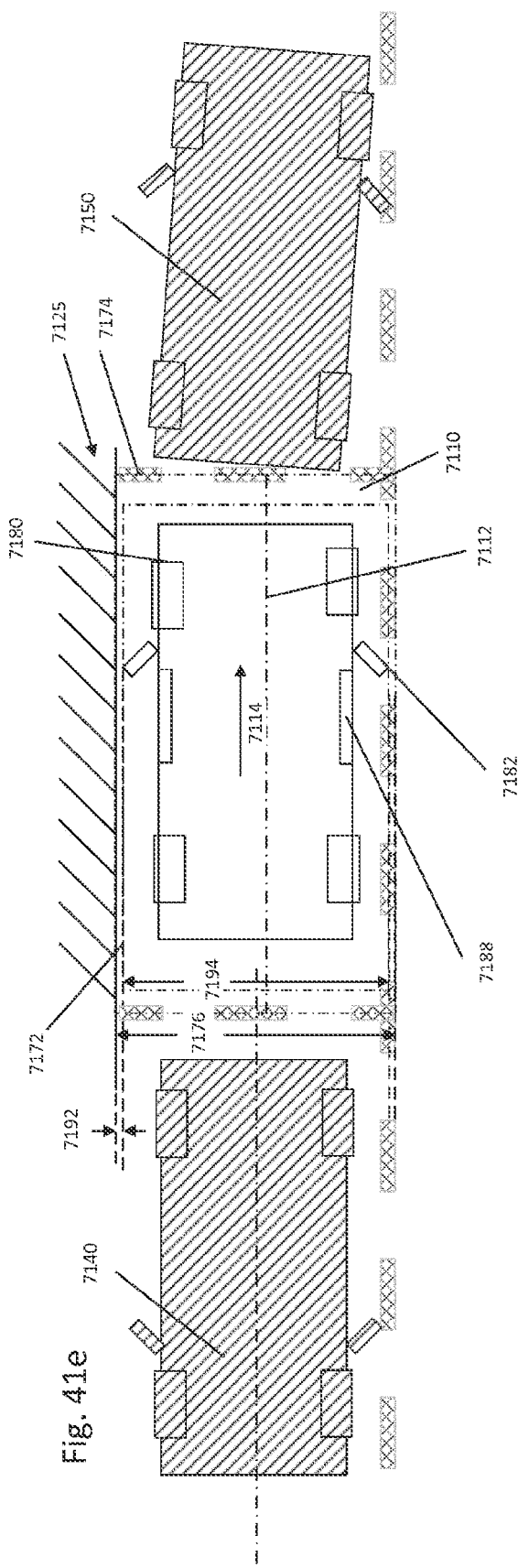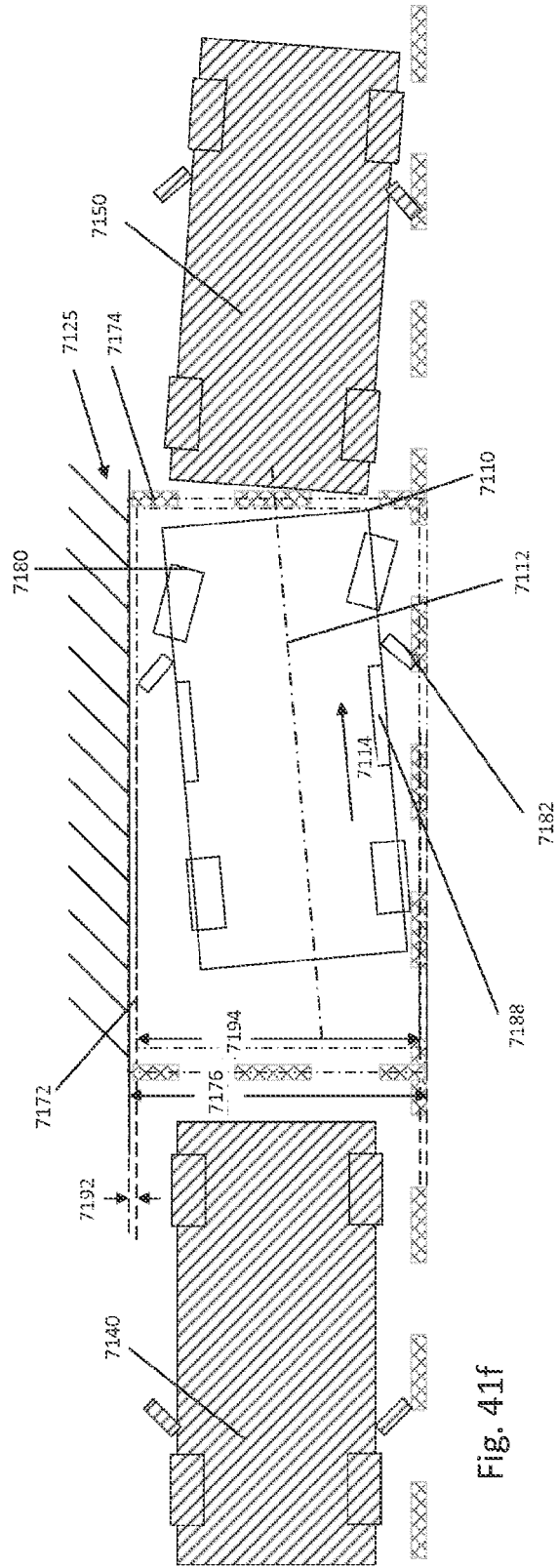

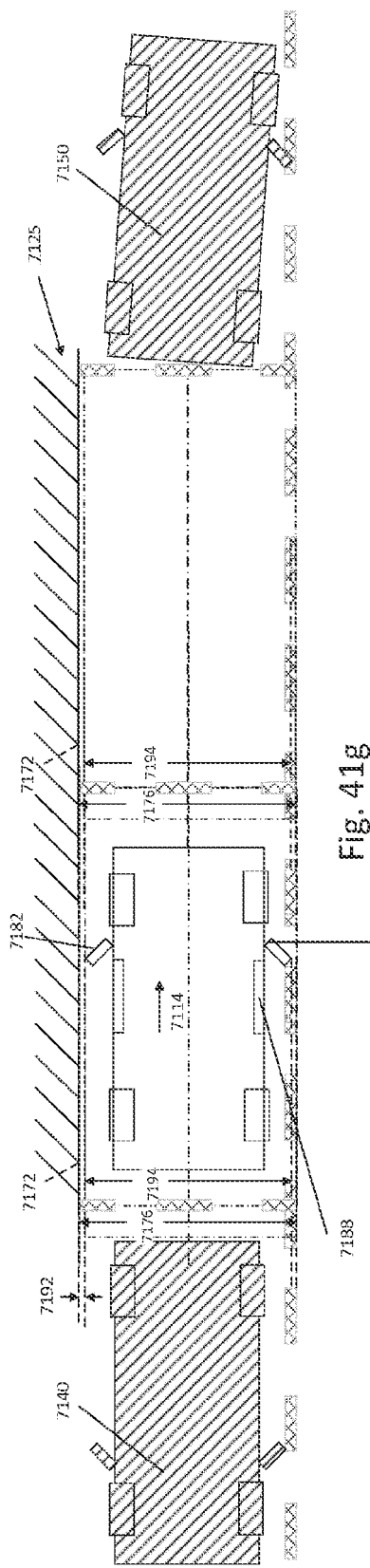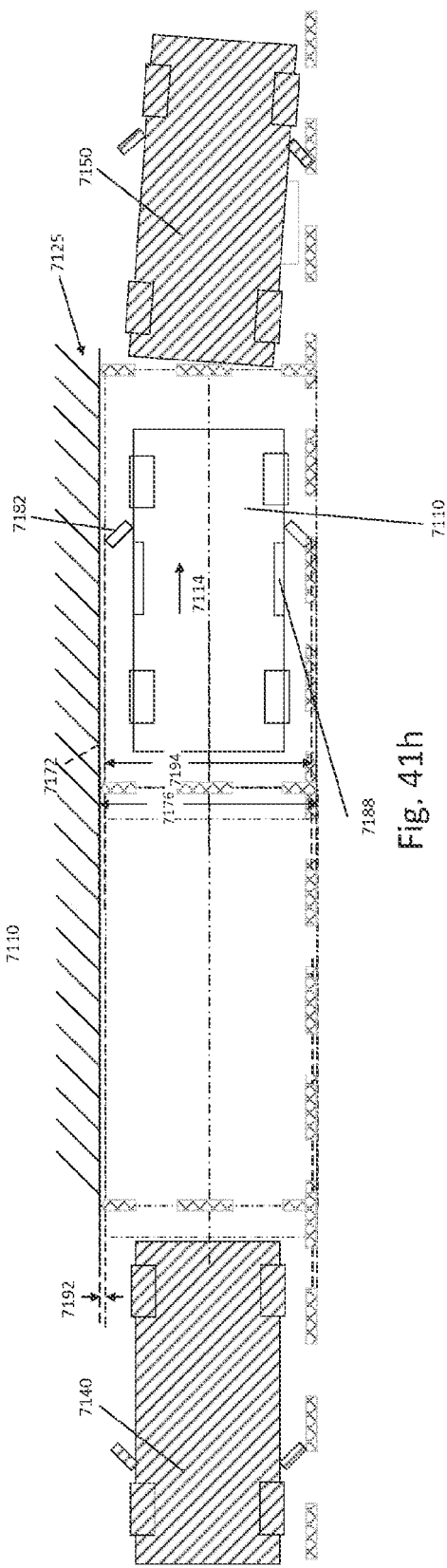

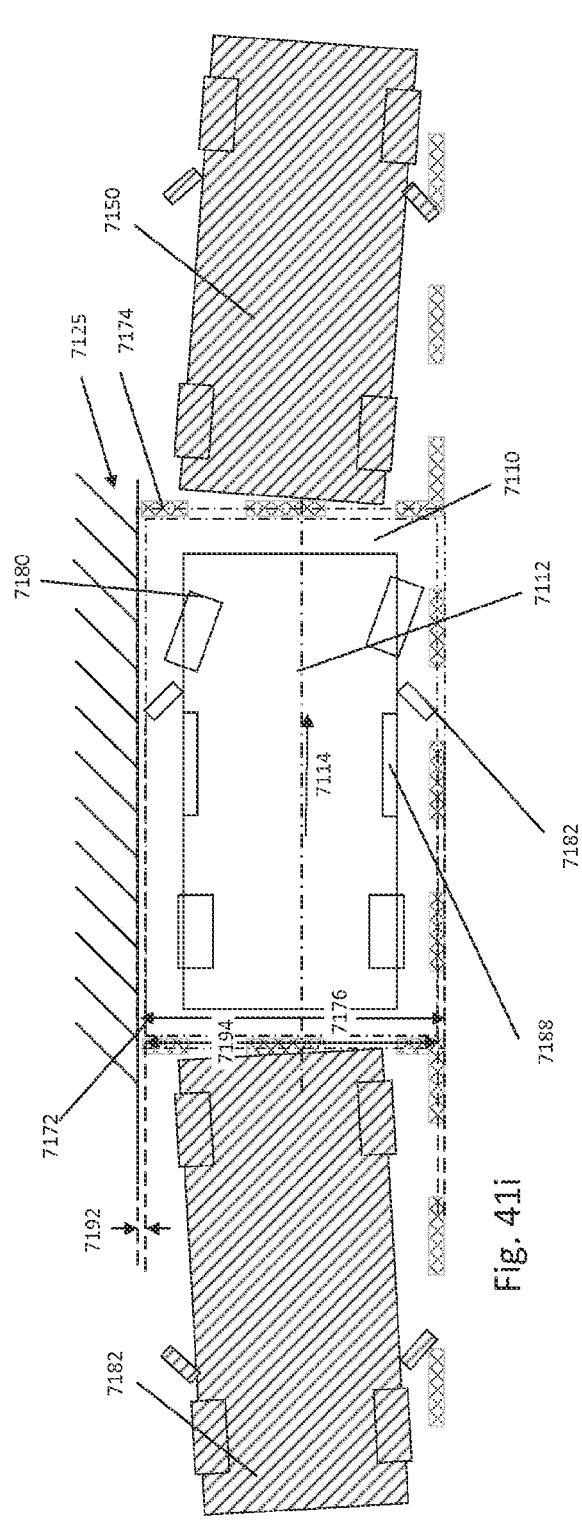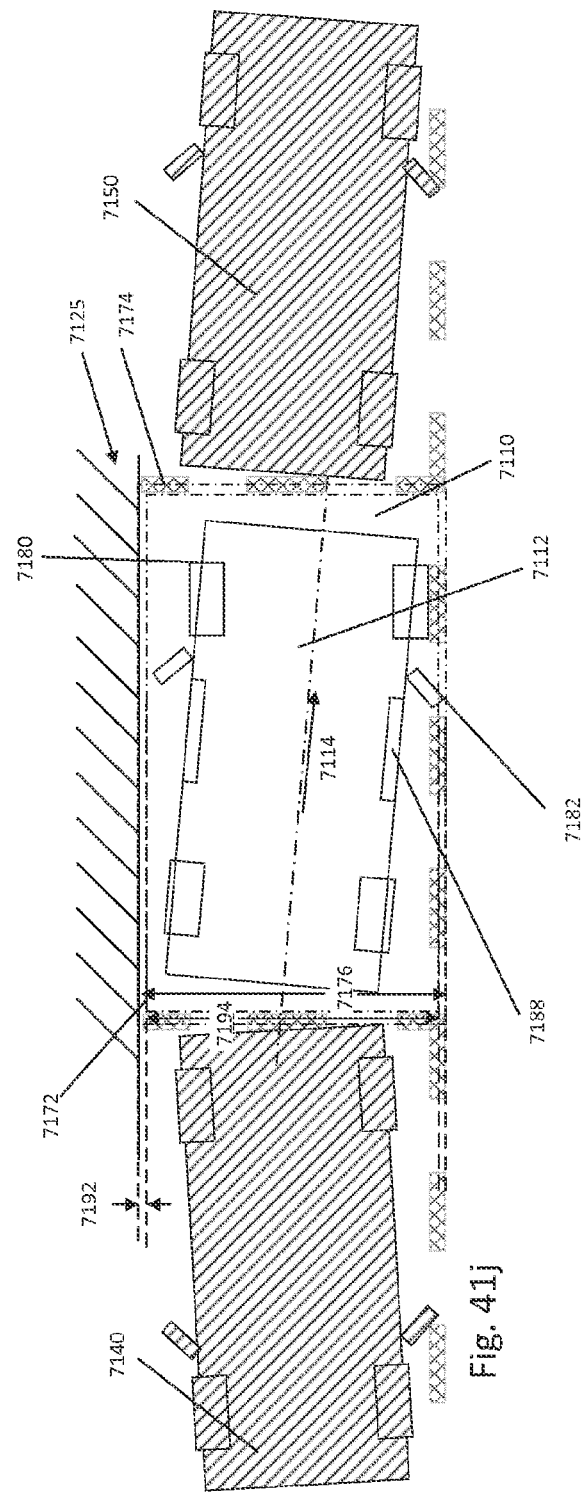

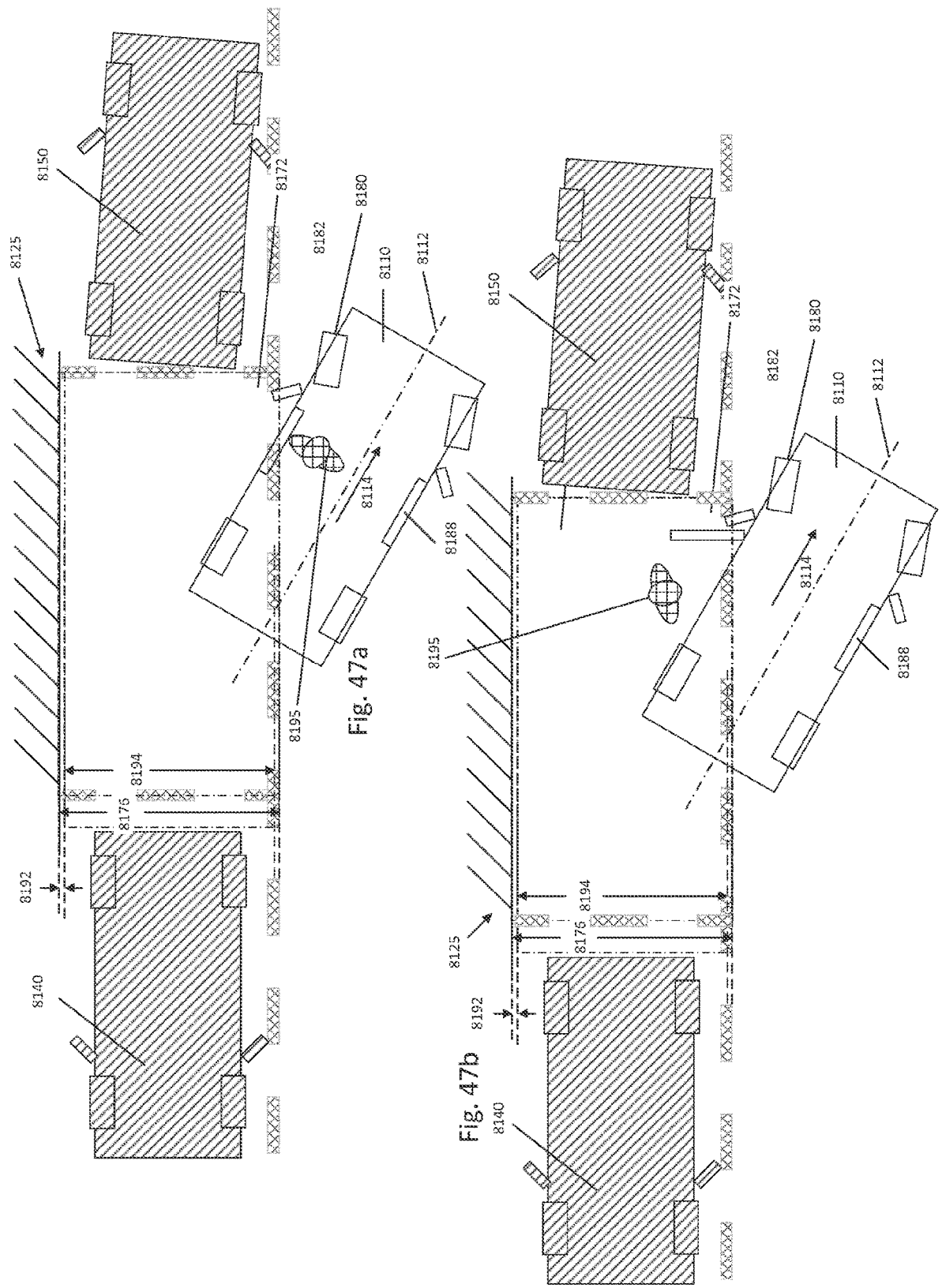

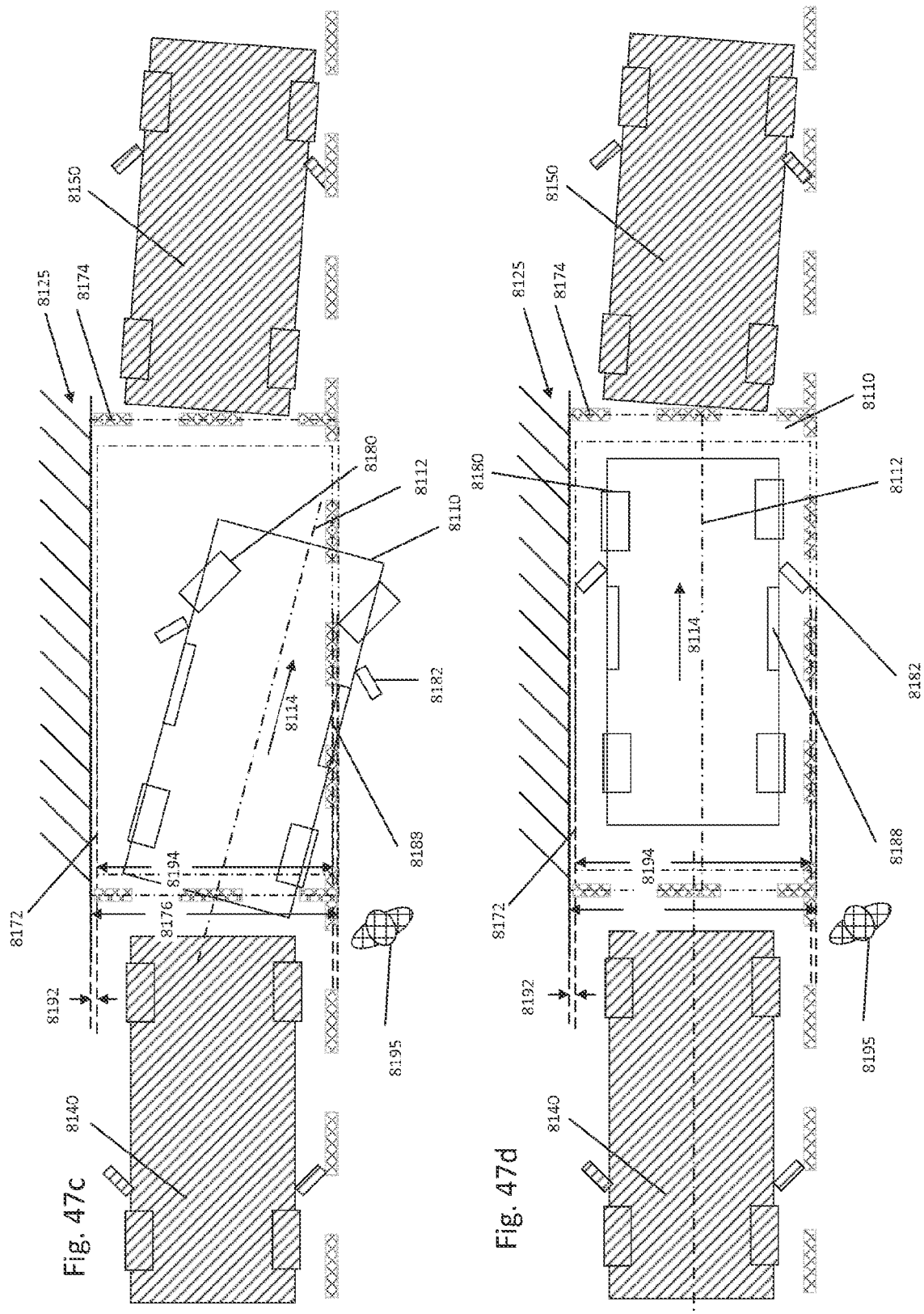

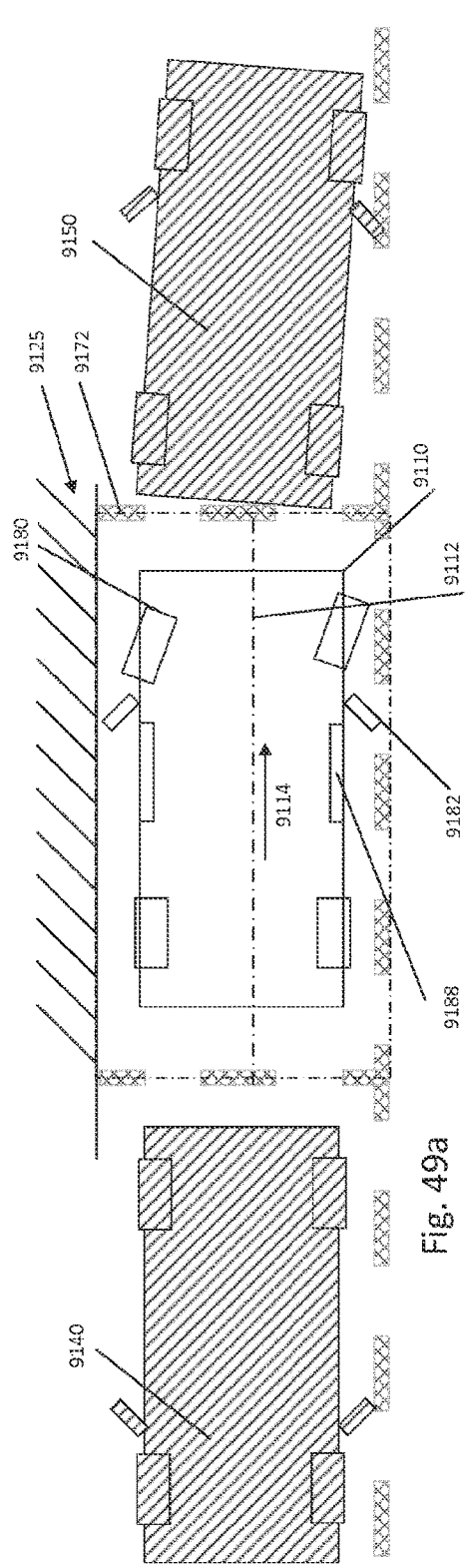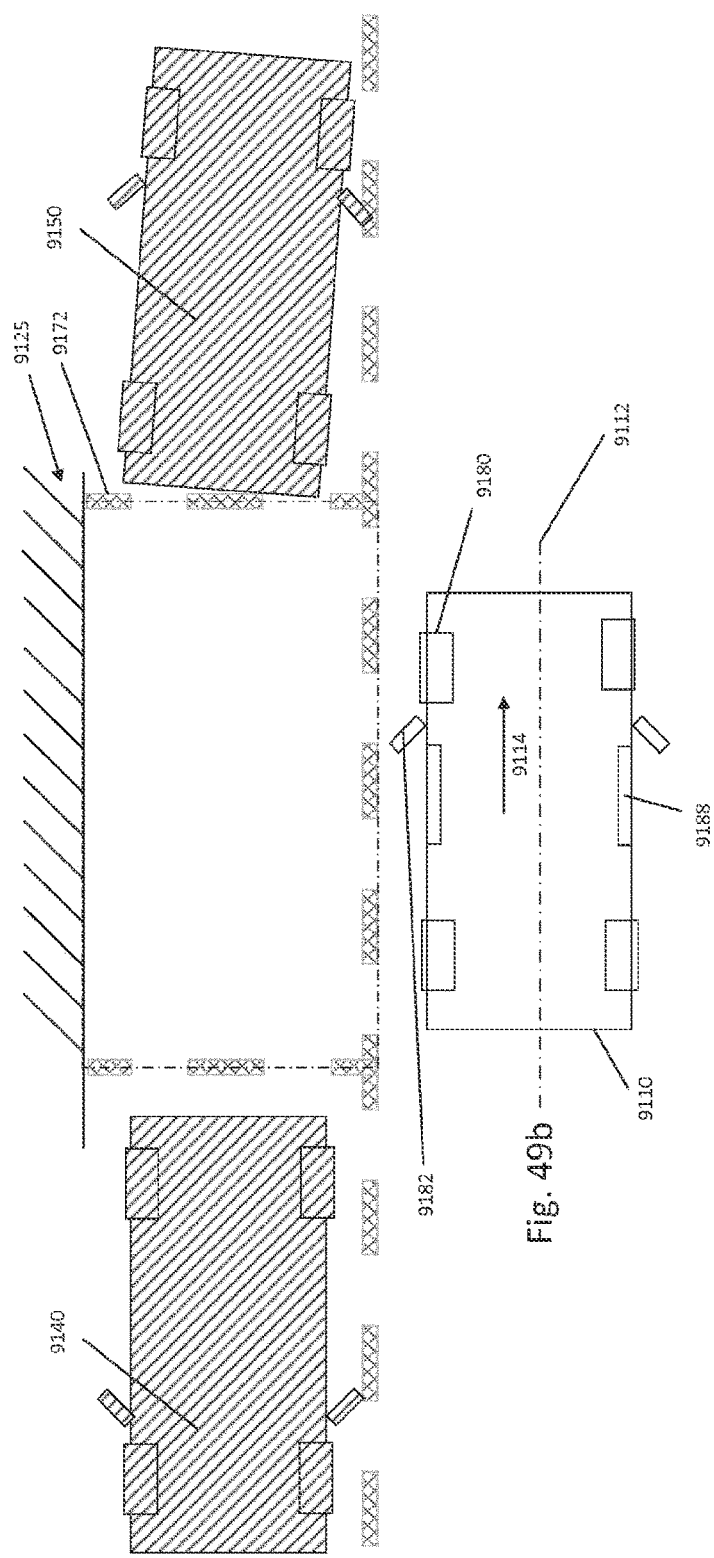

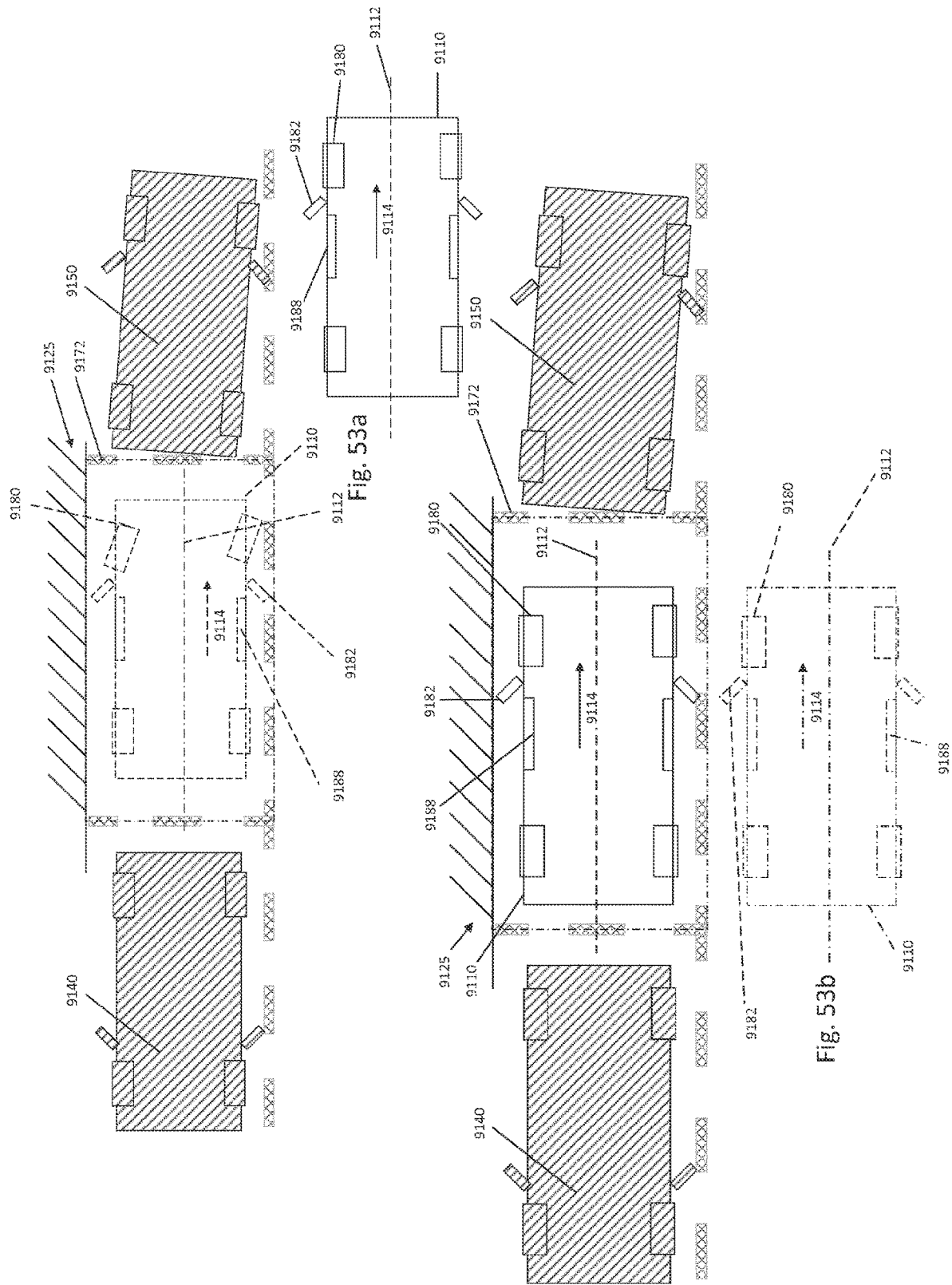

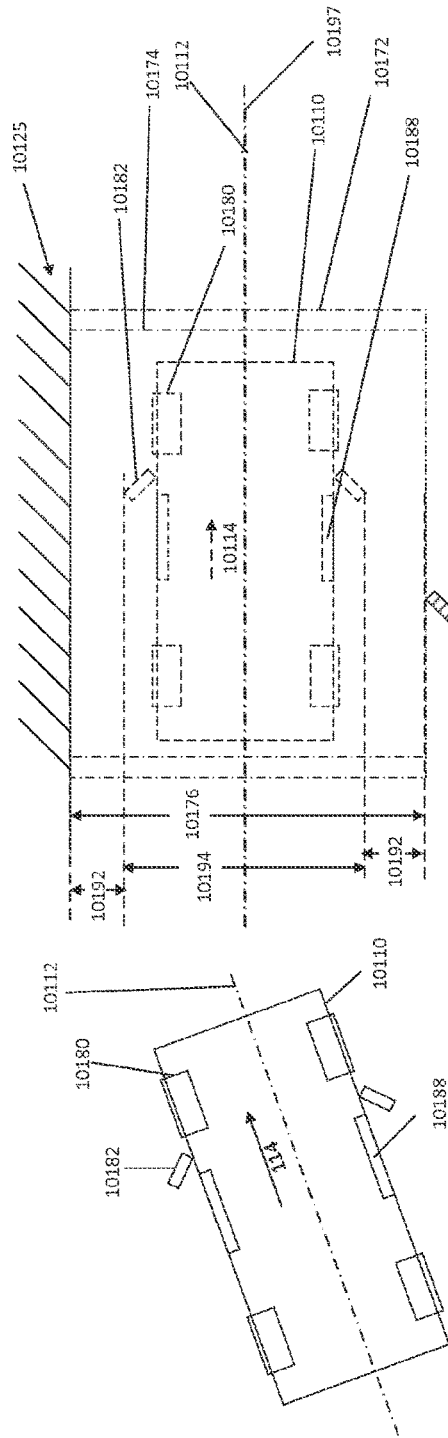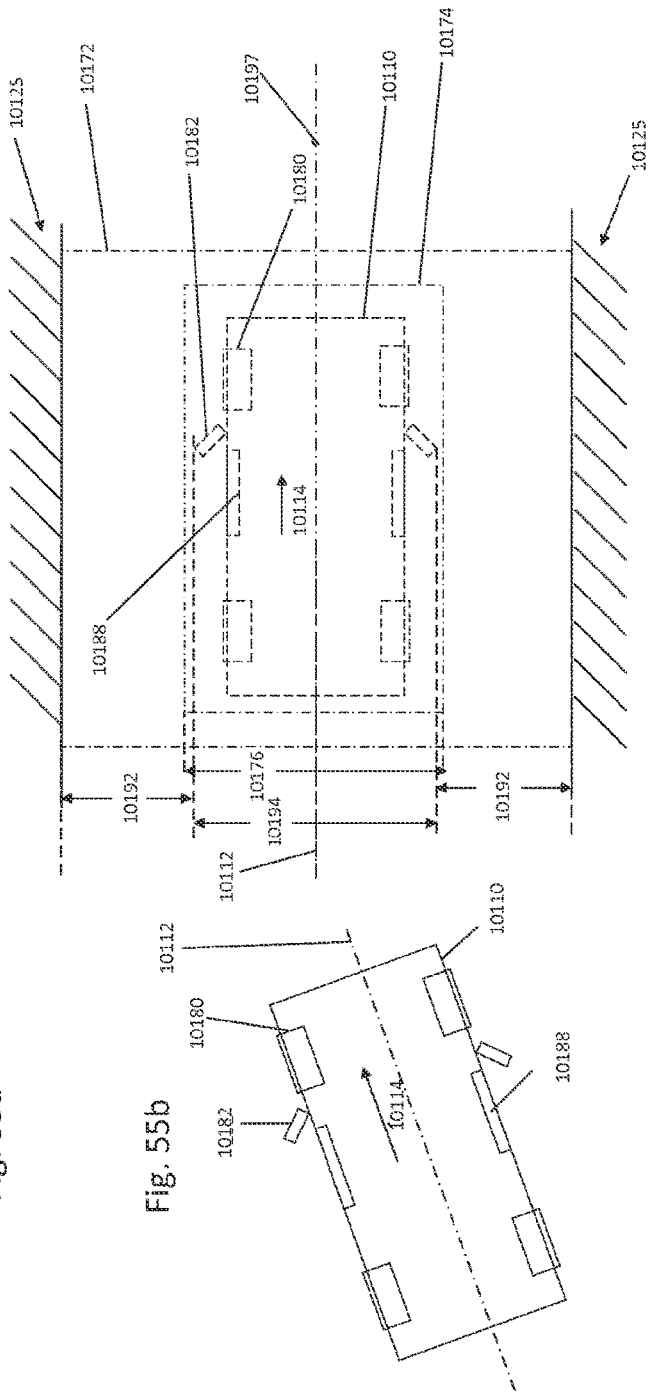
Fig. 55a
Fig. 55b

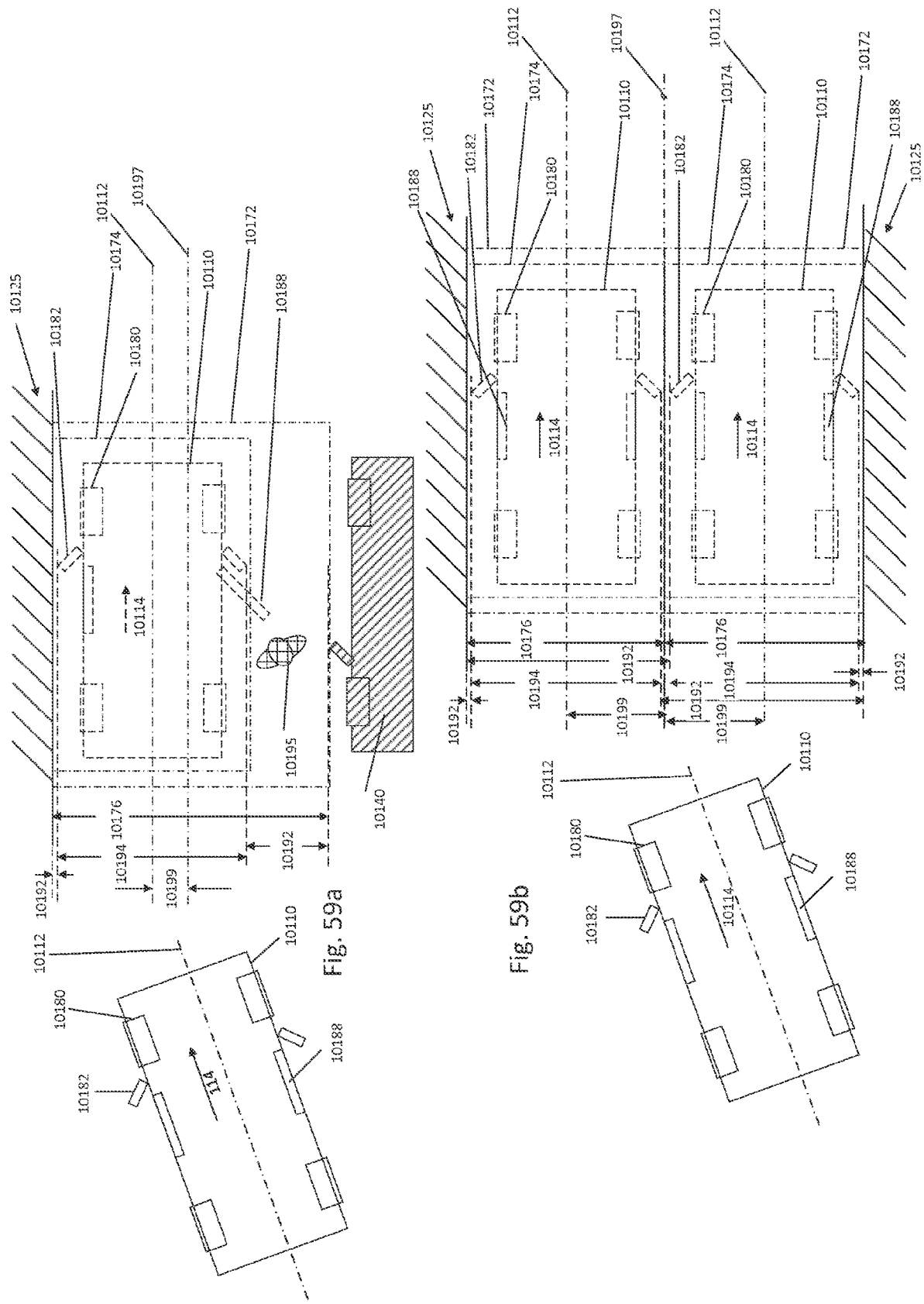

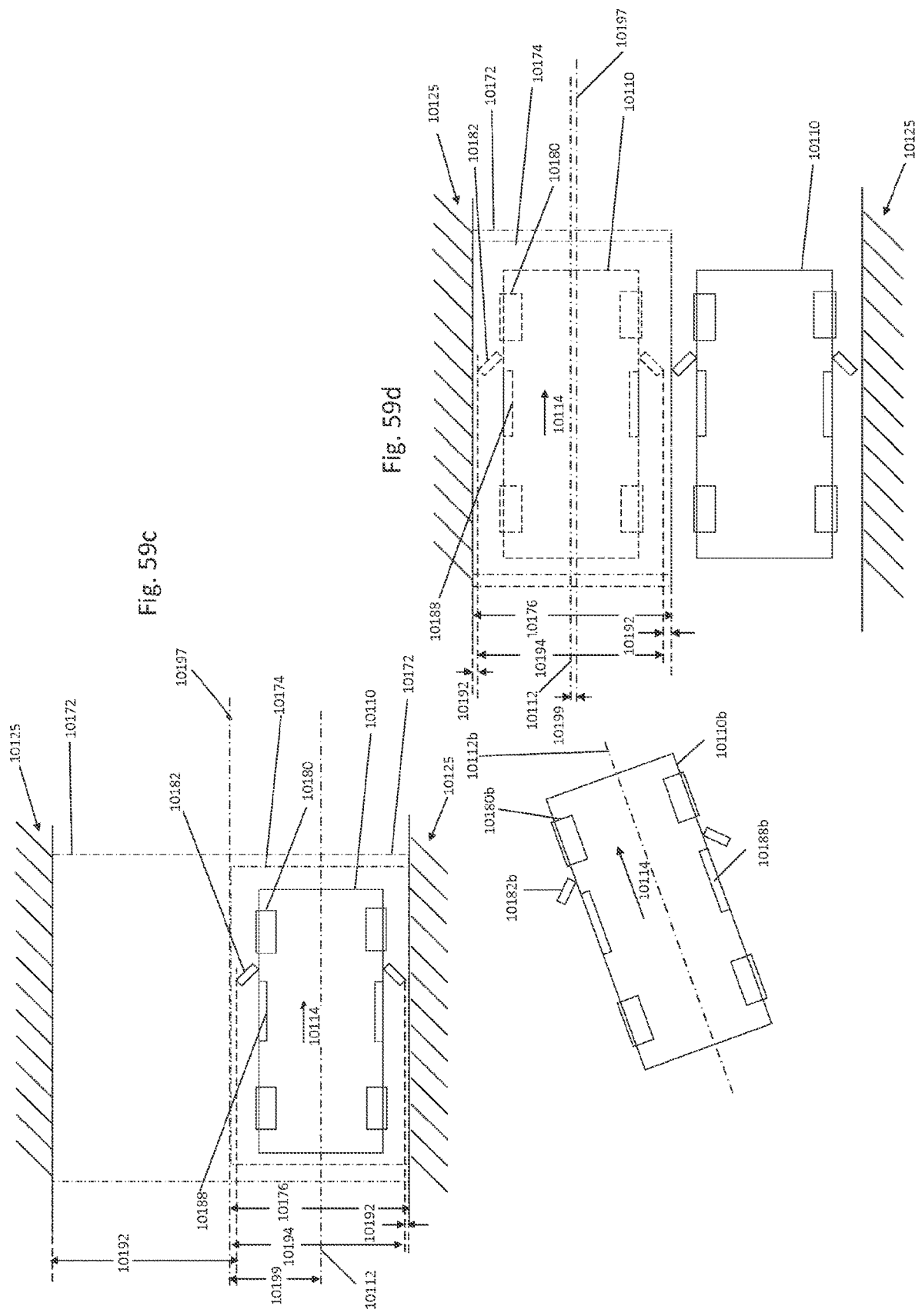

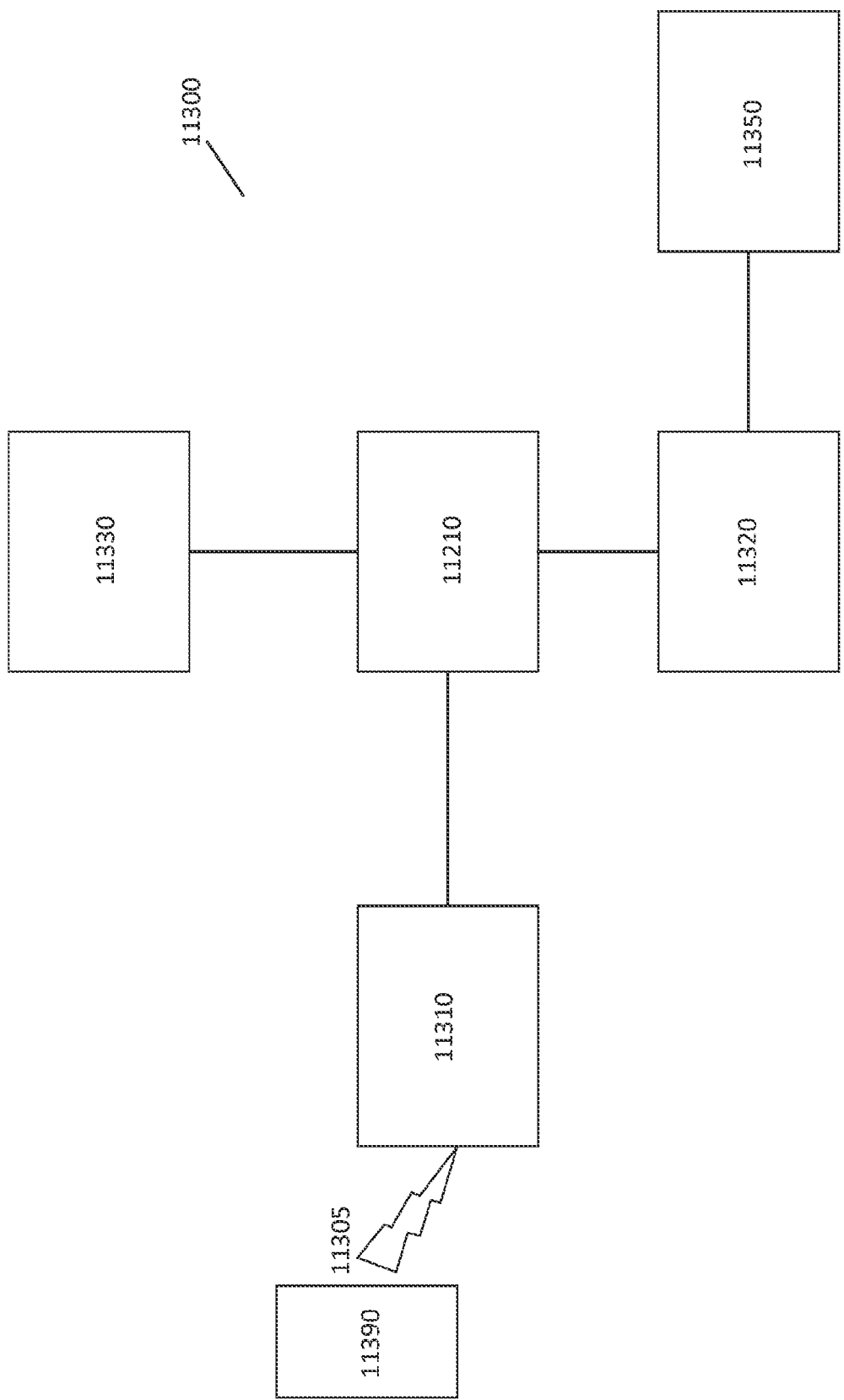

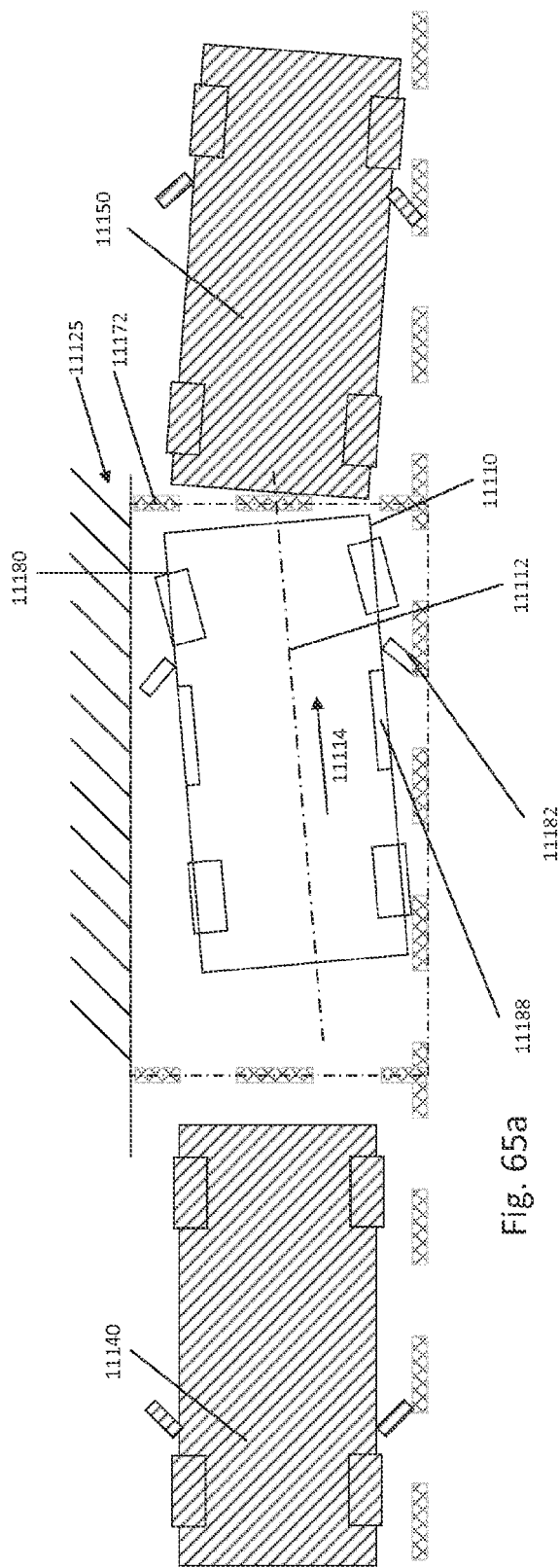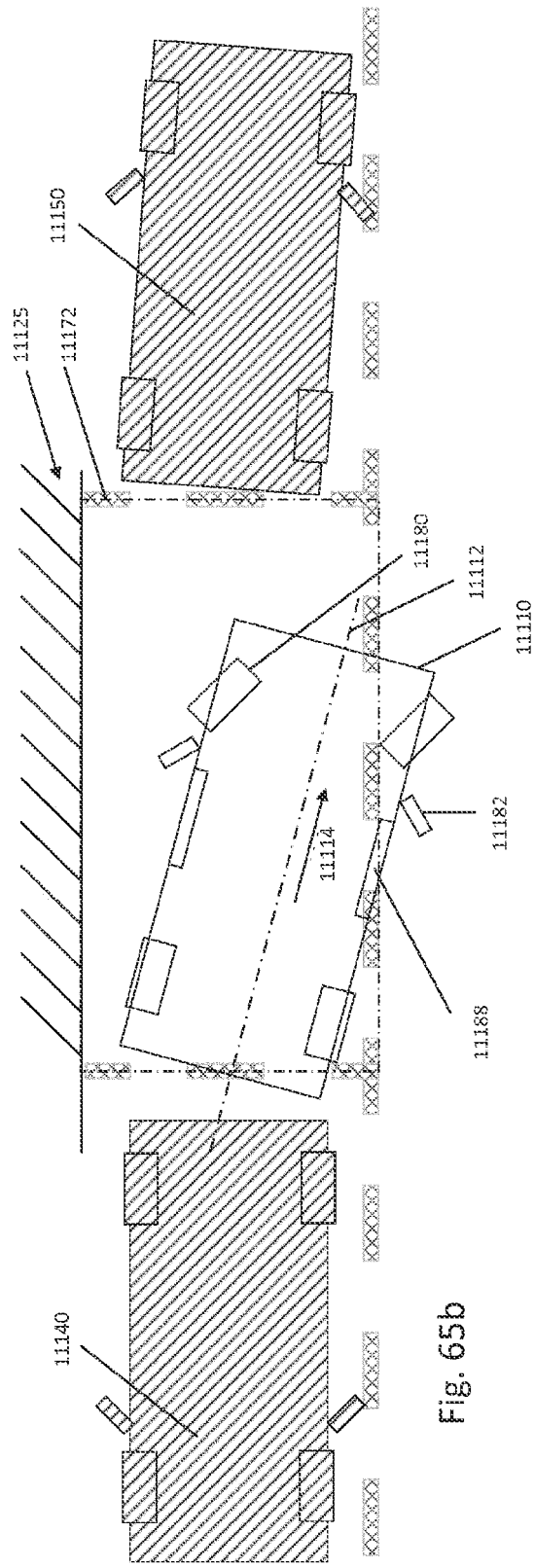

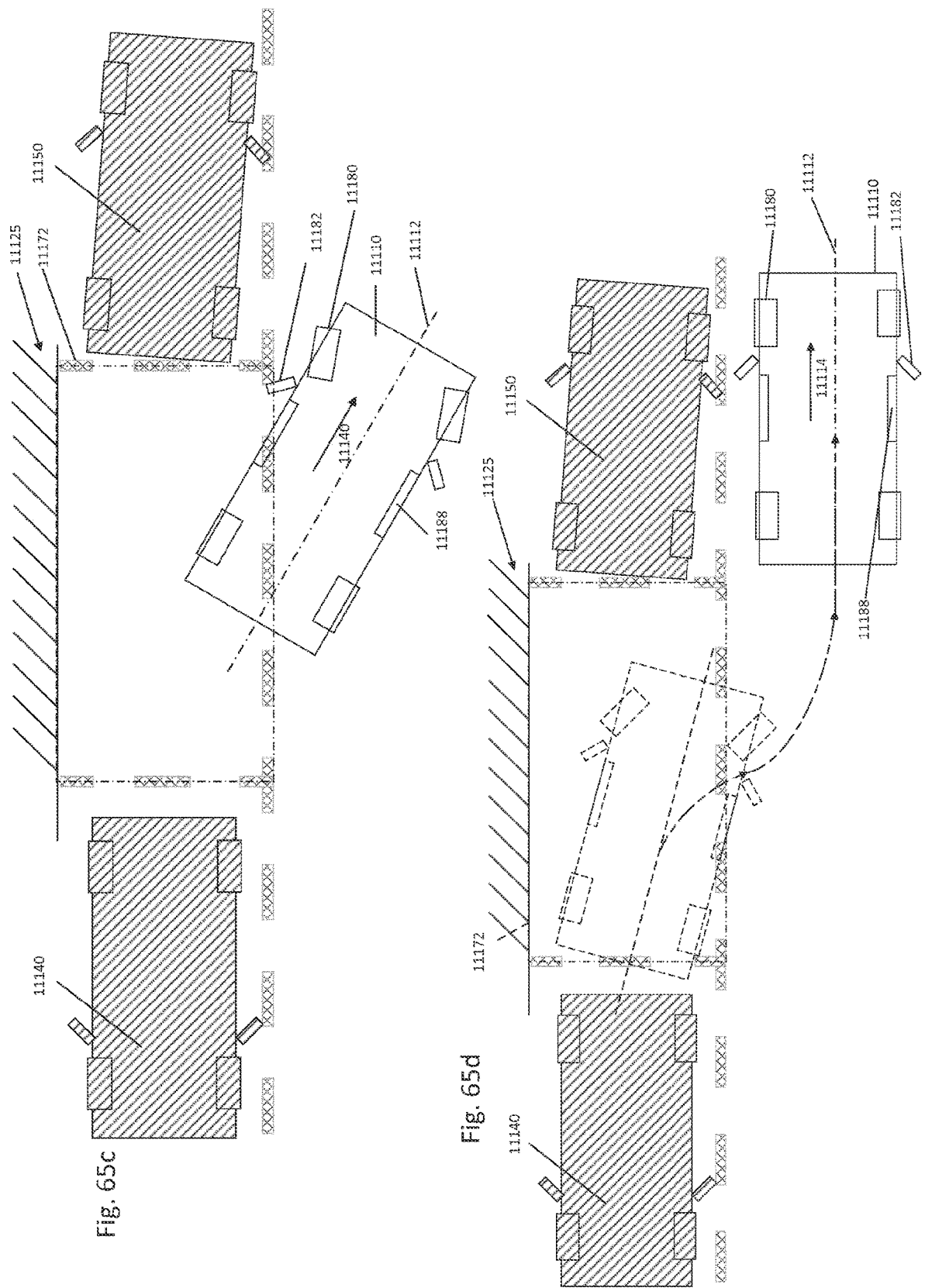

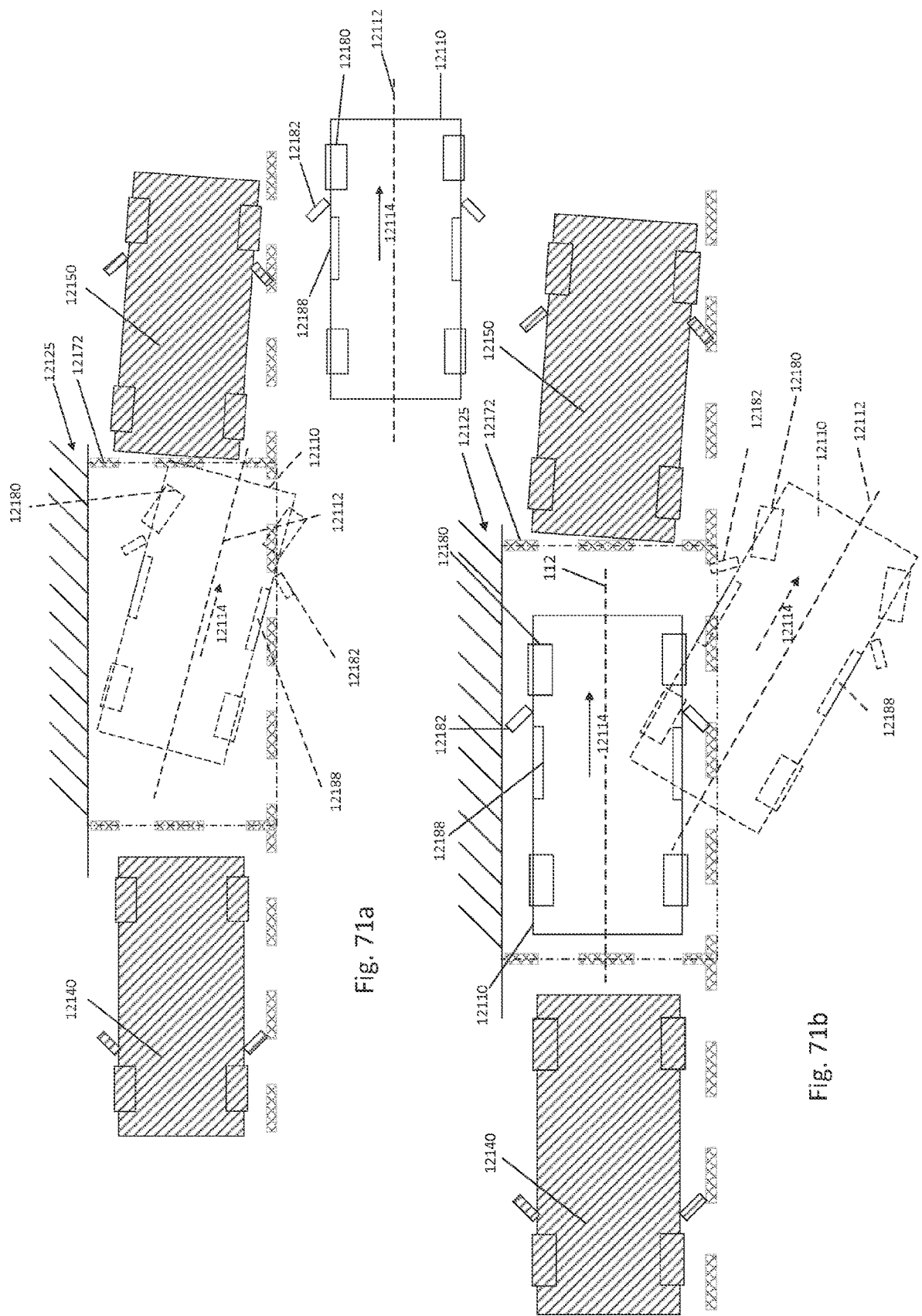

US 11,897,456 B2

APPARATUS AND METHOD FOR CONTROLLING VEHICLE MOVEMENT

TECHNICAL FIELD

The present disclosure relates to controlling movement of a vehicle and particularly, but not exclusively, to controlling performance of a defined manoeuvre by the vehicle. Aspects of the invention relate to a controller, to a system, to a method, to a vehicle and to computer software.

The present disclosure relates also to determining an orientation of a completed position of a vehicle, particularly, but not exclusively, to determining an orientation of a defined manoeuvre completed position of the vehicle. Aspects of the invention relate to a controller, to a system, to a method, to a vehicle and to computer software.

BACKGROUND

It is known for a vehicle to perform a defined manoeuvre, such as an automatic, or semi-autonomous, parking manoeuvre. A user typically instructs the vehicle to identify a possible defined manoeuvre when the owner is ready, such as when the owner is looking for or at a parking location. The vehicle may be instructed to perform the manoeuvre remotely e.g. via a mobile device at which a user input is received to instruct the manoeuvre.

Environment sensing means of the vehicle are used to determine a location of features in a vicinity of the vehicle such as, although not exclusively, markings, walls, posts, other vehicles etc. The vehicle may then be instructed, such as via the mobile device or other input medium, to move to a parked location in relation to the features. For example, it may be desired for a vehicle to move into a parking space bounded by the features. In order to prevent the vehicle contacting an object the environment sensing means determines a distance between the vehicle and the object and the automatic parking manoeuvre is performed to leave the vehicle a separation distance from the object. For example, the vehicle may be reversed towards the feature, until an appropriate separation distance is determined by the environment sensing means. If a space is large enough to receive the vehicle, the vehicle is parked in the middle of the space—for example, to be positioned in the centre of a garage. Once the vehicle has reached a completed parked position, the vehicle is switched off, typically with a parking brake applied.

Sometimes the features bounding a parking space can inhibit access to or from the vehicle. For example, a wall adjacent a parking space can impede the opening of a vehicle door, impeding or preventing access via that door.

Driver preference can be to leave the vehicle steered wheels straightened when parked, such as to appear tidy or prevent a vehicle wheel from protruding laterally. In other situations, it is preferred or even required to cramp vehicle wheels on sloping terrain of any gradient.

The defined manoeuvre is typically performed in various ambient conditions, such as irrespective of weather or lighting.

Sometimes the features bounding a parking space can inhibit access to the space for a vehicle. For example, a parking space may be too narrow to allow the vehicle to manoeuvre into or out of the parking space, such as with sufficient clearance, or even be too narrow to receive the vehicle as such (e.g. narrower than a maximum width of the vehicle).

Defined manoeuvres can be performed on different terrains, such as differing ground surface type or smoothness.

Sometimes drivers like the vehicle to be neatly parked, desiring a precise parked position of the vehicle. Often drivers like the defined manoeuvre to be performed swiftly.

The vehicle may be instructed to perform the manoeuvre remotely e.g. via a mobile device at which a user input is received to instruct the manoeuvre. Alternatively the vehicle may be instructed to perform the manoeuvre with the user in the vehicle.

Performance of the manoeuvre generally moves the vehicle from a start position, such as outside the parking space, to a completed position, such as in the parking space. If the vehicle has reached a completed parked position, the user can switch the vehicle off, typically with a parking brake applied.

Once the vehicle has completed the defined manoeuvre the user can control the vehicle, such as to drive manually. If the vehicle has reached a completed parked position, the user can switch the vehicle off, typically with a parking brake applied.

It is an object of embodiments of the invention to at least mitigate one or more of the problems of the prior art.

SUMMARY OF THE INVENTION

Aspects and embodiments of the invention provide a controller, a system, a method, a vehicle and computer software as claimed in the appended claims.

First Technique

According to an aspect of the invention, there is provided a controller arranged to operably provide at least one mode for performing a defined manoeuvre in dependence on an environment signal.

According to an aspect of the invention, there is provided a controller comprising: input means for receiving an environment signal indicative of a location of one or more features in a vicinity of a vehicle; output means for outputting a manoeuvre signal to cause the vehicle to perform a defined manoeuvre; and control means arranged to control the output means, the control means being arranged to provide at least one mode for performing at least a portion of the defined manoeuvre, the mode being selectable from a plurality of modes including at least one mode corresponding to an occupant-in-vehicle mode and at least one mode corresponding to an occupant-out-of-vehicle mode, the mode being selectable in dependence on the environment signal being indicative of a vehicle envelope suitable for the mode. Advantageously the vehicle may be caused to offer or provide only a mode or modes of performing a defined manoeuvre that are appropriate for a particular vehicle envelope.

The controller as described above, wherein:
the input means may comprise an electrical input for receiving the signal;
the output means may comprise an electrical output for outputting the signal; and
the control means may comprise one or more control devices such as electronic processing devices.

The defined manoeuvre may comprise a parking manoeuvre. The parking manoeuvre may comprise an in-parking manoeuvre, such as parking into a space to a stationary position. The parking manoeuvre may comprise an un-parking manoeuvre, such as driving out of a space from a stationary position. A defined manoeuvre completed position may comprise a parked position.

The occupant-in-vehicle mode may correspond to the environment signal being indicative that the vehicle envelope is suitable for receiving the vehicle and opening a vehicle aperture member in a received vehicle position. The received vehicle position may correspond to a defined manoeuvre completed position. The occupant-out-of-vehicle mode may correspond to the environment signal being indicative that the vehicle envelope is suitable for receiving the vehicle but is not suitable for opening a vehicle aperture member in a received vehicle position. The vehicle aperture member may comprise at least one of: a vehicle door, a vehicle roof, a vehicle boot or trunk, a vehicle bonnet or hood, a frunk, or the like. Advantageously, the provided mode or modes correspond such that where use of a vehicle aperture, such as for access, is required or desired, the mode or modes ensure appropriate usability of the one or more vehicle apertures in each vehicle envelope. For example, where the defined manoeuvre is a parking-in manoeuvre and the defined manoeuvre completed position is or will be such that access for the occupant to get out of the vehicle would be impeded or prohibited, then only the occupant-out-of vehicle mode, for that occupant, may be provided. Advantageously, such provision may prevent, or at least mitigate against, completion of a defined manoeuvre to a defined manoeuvre completed position whereby access for an occupant to or via the vehicle aperture is undesirably impeded.

The control means may be arranged to allow selection between the occupant-in-vehicle mode and the occupant-out-of-vehicle mode when the environment signal is indicative that the vehicle envelope is suitable for receiving the vehicle and opening the vehicle aperture member in the received vehicle position. Advantageously, where multiple modes are appropriate, a user may be able to select the mode they prefer.

The control means may be arranged to disallow selection of the occupant-in-vehicle mode when the environment signal is indicative that the vehicle envelope is not suitable for opening the vehicle aperture member in the received vehicle position. Advantageously, disallowing selection of the occupant-in-vehicle mode for unsuitable vehicle envelopes can prevent the completion of a defined manoeuvre to a position whereby an occupant cannot use or open a vehicle aperture, such as whereby the occupant may not be able to exit the vehicle via that aperture.

The vehicle envelope may comprise a target position suitable for receiving the vehicle in the defined manoeuvre completed position. The vehicle envelope may comprise a target defined manoeuvre completed position. The vehicle envelope may be determined in dependence on a one-dimensional property and/or measurement and/or estimation. The vehicle envelope may be determined in dependence on the environment signal being indicative of a length, such as an unobstructed length between features, the unobstructed length being sufficiently long for receiving the vehicle in the defined manoeuvre completed position. The vehicle envelope may be determined in dependence on a two-dimensional property and/or measurement and/or estimation. For example, the vehicle envelope may be determined in dependence on the environment signal being indicative of a length, such as between features, wherein along that length there is no obstruction within a particular width or breadth perpendicular to the length. The particular width or bready may correspond to at least a width or breadth of the vehicle, such as a vehicle width when the vehicle is parked and in a closed configuration, such as with vehicle aperture members closed. The particular width or breadth may correspond to at least a length of the vehicle, such as a vehicle length when the vehicle is parked and in the closed configuration in a perpendicular or parking lot or fishbone diagonal parked position. The vehicle envelope may comprise at least one dimension of a parking area and the received vehicle position may be a parked position. The vehicle envelope may correspond to a predefined parking space. The vehicle envelope may comprise a target length, area or volume for receiving the vehicle in or on in the defined manoeuvre completed position.

The control means may be arranged to determine a vacancy. The control means may be arranged to define at least one vehicle envelope within the vacancy, the vehicle envelope being suitable for receiving the vehicle in the defined manoeuvre completed position. The control means may be arranged to define within the vacancy at least one defined manoeuvre completed position for the vehicle. In at least some examples, the vehicle envelope may correspond to the vacancy.

The control means may be arranged to define at least two vehicle envelopes within the vacancy, each vehicle envelope comprising a discrete defined manoeuvre completed position that is offset within the vacancy.

The two vehicle envelopes may be non-overlapping. Alternatively, the two vehicle envelopes may be overlapping.

The two vehicle envelopes may extend in respective longitudinal directions adjacent and parallel each other. Alternatively, the two vehicle envelopes may extend along a same longitudinal axis, with a first vehicle envelope being longitudinally displaced along the longitudinal axis from a second vehicle envelope. In a yet further alternative, the vehicle envelopes may be arranged with non-parallel longitudinal axes, such as with a first vehicle envelope having a longitudinal axis perpendicular to a longitudinal axis of a second vehicle envelope.

The defined manoeuvre completed position may comprise a central position within the vacancy. The defined manoeuvre completed position may comprise a central position within the vehicle envelope, such as with the vehicle central longitudinal axis centrally located within the vehicle envelope (e.g. equidistant from respective lateral sides). Alternatively, the defined manoeuvre completed position may comprise an offset position, such as with the vehicle (and vehicle longitudinal central axis) offset towards a lateral side (e.g. a left or right side of the vehicle envelope or vacancy). Similarly, an axial midpoint of the vehicle may be positioned axially centrally in the vacancy and/or vehicle envelope—or, alternatively offset therein.

The controller may comprise a second output means for outputting a mode signal indicative of a plurality of selectable modes, the mode for performing the defined manoeuvre being selectable from the plurality of selectable modes by a user in dependence upon the mode signal. The second output means may comprise a notification output means. Advantageously, the user can be notified of the availability of one or more modes, allowing the user to select their preferred mode where available.

The controller may comprise a second input means for receiving a request signal indicative of a user request for selecting the mode when a plurality of modes are selectable. Advantageously, explicit user selection of a mode may be achieved. The request signal may be indicative of a wired or a wirelessly received signal indicative of a user request, such as from a users mobile device. Advantageously this may allow the vehicle to be effectively instructed from a users mobile device, such as remotely instructed.

The control means may be arranged to provide no selectable mode when the environment signal is indicative that the vehicle envelope is unsuitable for performing the defined manoeuvre. Advantageously, selection of an unsuitable mode may be prevented.

The control means may be arranged to prevent the output of a manoeuvre signal to cause the vehicle to perform the defined manoeuvre when the environment signal is indicative that the vehicle envelope is unsuitable for receiving the vehicle. Advantageously, performance of an unsuitable mode may be prevented.

The second output means may be arranged to provide a mode signal indicative of no mode being selectable, corresponding to the vehicle envelope being unsuitable for receiving the vehicle. Advantageously, the user may be made aware by notification that a vehicle envelope has been identified, but that it is unsuitable for performance of the defined manoeuvre—for example, where a vehicle envelope is too small for even the occupant-out-of-vehicle mode of performance of a defined manoeuvre.

The control means may be arranged for the selectable modes to be variable during the performance of the defined manoeuvre. Advantageously, this may allow the user to switch between modes as desired without cancelling or aborting the defined manoeuvre. For example, when unparking from a position whereby access to a vehicle aperture is inhibited, the user may be able to initiate an unparking defined manoeuvre performed in the occupant-out-of-vehicle mode, then switching mode to complete the defined manoeuvre in the occupant-in-vehicle mode (e.g. after the occupant has entered the vehicle during performance of the defined manoeuvre).

The control means may be arranged to ensure at least a minimum separation distance from the vehicle. The control means may be arranged to provide at least the minimum separation between the vehicle and the feature in the vicinity of the vehicle. The separation may be provided when the vehicle is in an open configuration, such as with at least one vehicle aperture open. The minimum separation may be provided during the performance of the defined manoeuvre, such as throughout the defined manoeuvre; and/or prior to and/or after initiation of the defined manoeuvre. For example, at least the minimum separation may be provided in the defined manoeuvre completed position.

The aperture member open position may comprise a fully open position. The fully open position may correspond to a maximally open position of the aperture member. The aperture open position may comprise a partially open position. The partially open position may correspond to a stable open position. For example, the aperture member may comprise a door with one or more biased open positions, the partially open position being an intermediate biased open position between the fully open position and a closed position. In at least some examples, a single mode may be provided corresponding to a maximally open position of the aperture member, whereby the aperture member can optionally also be partially opened (e.g. in dependence on a user preference). In other examples, a single mode may be provided corresponding to the partially open position (e.g. whereby an onus may be on a user not to fully open the aperture member if such opening may be impeded). In yet further examples, distinct modes may each be provided for partially open and fully open respectively.

According to an aspect there is provided a system comprising: the controller as described above, arranged to receive the environment signal and to output the manoeuvre signal; and environment sensing means for determining the location of one or more features in the vicinity of the vehicle and outputting the environment signal indicative thereof. Advantageously the system controls the provision of selectability of the modes.

The system may comprise actuator means for receiving the manoeuvre signal to cause the vehicle to perform the defined manoeuvre. Advantageously, the system controls movement of the vehicle to perform the defined manoeuvre.

The system may comprise receiver means for receiving a signal indicative of a user request for vehicle movement and outputting a request signal in dependence thereon. The receiver means may be for receiving a wired and/or wireless signal from a mobile device indicative of the user request. Advantageously user requests can be received originating from external to the vehicle, so as to allow mode selection in at least some instances whilst the occupant is out of the vehicle.

The controller may be arranged to control the provision of modes to the output means for performing the defined manoeuvre in dependence upon a presence of an occupant in the vehicle. For example, the controller may be arranged to receive an input indicative of the presence of the one or more occupants, such as from at least one sensor, indicative of a presence of one or more occupants in the vehicle (e.g. a movement sensor, weight sensor, input from an internal vehicle system, such as an internal-only input means). The controller may be arranged to receive an input indicative of the location and/or status of the one or more occupants, such as via a latch (e.g. a seat belt buckle), or location detection of keyfob or the like, or Driver Condition Recognition. Advantageously the provision of modes can be automatically limited to suit whether an occupant is in or out of the vehicle.

According to an aspect of the invention, there is provided a method of controlling movement of a vehicle to perform a defined manoeuvre, the method comprising: receiving an environment signal indicative of a location of one or more features in a vicinity of the vehicle; providing at least one mode for performing the defined manoeuvre in dependence upon the environment signal being indicative of a vehicle envelope suitable for the mode, the mode being selectable from a plurality of modes including at least one mode corresponding to an occupant-in-vehicle mode and at least one mode corresponding to an occupant-out-of-vehicle mode; and outputting a manoeuvre signal to cause the vehicle to perform at least a portion of the defined manoeuvre in a selected mode.

The method may comprise categorizing the vehicle envelope. The categories may comprise at least: suitable for receiving the vehicle and opening a vehicle aperture member in a received vehicle position; and suitable for receiving the vehicle but not suitable for opening a vehicle aperture member in a received vehicle position. Other categories and/or other modes, may be envisaged.

The occupant-in-vehicle mode may correspond to the category of suitable for receiving the vehicle and opening a vehicle aperture member in a received vehicle position. The occupant-out-of-vehicle mode may correspond to the category of suitable for receiving the vehicle but not suitable for opening a vehicle aperture member in a received vehicle position.

The method may comprise categorizing the vehicle envelope as one or more of: suitable for all occupants in the vehicle; suitable for at least one occupant in the vehicle; suitable for no occupants in the vehicle.

The portion of the defined manoeuvre may comprise one or more of: initiation of the defined manoeuvre; completion of the defined manoeuvre; and the entirety of the defined manoeuvre.

The method may comprise offering selectability of the mode to a user. Additionally, or alternatively, the method may comprise automatically selecting a default mode.

Second Technique

According to an aspect of the invention, there is provided a controller arranged to operably cause an orientation of a defined manoeuvre completed position of a vehicle to be determined.

According to an aspect of the invention, there is provided a controller, comprising:
 environment input means for receiving an environment signal indicative of a location of at least one feature in a vicinity of a vehicle;
 control means arranged to determine the orientation of a defined manoeuvre completed position of the vehicle in dependence on the environment signal; and
 output means for outputting a possible defined manoeuvre completed position signal in dependence on the determined orientation. Advantageously the defined manoeuvre can be performed to a preferable defined manoeuvre completed position orientation.

The controller as described above, wherein:
the input means may comprise an electrical input for receiving the signal;
the output means may comprise an electrical output for outputting the signal; and
the control means may comprise one or more control devices such as electronic processing devices.

The defined manoeuvre may comprise a parking manoeuvre. The parking manoeuvre may comprise a parking-in manoeuvre, such as parking into a space to a stationary position. The parking manoeuvre may comprise an unparking manoeuvre, such as parking out of a space from a stationary position. The defined manoeuvre completed position may comprise a parked position.

The controller may comprise a notification output means for outputting a notification signal indicative of the possible defined manoeuvre completed position signal.

The control means may be arranged to determine the orientation of the defined manoeuvre completed position in dependence on the environment signal being indicative of an orientation of the at least one feature in the vicinity of the vehicle.

The control means may be arranged to determine the orientation of the defined manoeuvre completed position to be aligned relative to the at least one feature in the vicinity of the vehicle.

The control means may be arranged to determine the orientation of the defined manoeuvre completed position to be parallel to the at least one feature in the vicinity of the vehicle.

The control means may be arranged to determine the orientation of the defined manoeuvre completed position to be perpendicular to the at least one feature in the vicinity of the vehicle.

The orientation of the at least one feature in the vicinity of the vehicle may comprise the orientation of at least one other vehicle in the vicinity of the vehicle.

The control means may be arranged to determine the orientations of a plurality of possible defined manoeuvre completed positions of the vehicle in dependence on the environment signal.

The control means may be arranged to notify a vehicle user of the orientations of the plurality of possible defined manoeuvre completed positions.

The controller may comprise output means for outputting a manoeuvre signal to cause the vehicle to perform a defined manoeuvre to the defined manoeuvre completed position; wherein the control means is arranged to control the output means to output the manoeuvre signal.

The controller may comprise request input means for receiving a request signal indicative of a wired or wirelessly received signal indicative of a user request for vehicle movement.

The control means may be arranged to determine the orientation of the defined manoeuvre completed position in dependence on a location of the vehicle.

The controller may comprise memory means for storing data therein, the control means being arranged to determine the orientation of the defined manoeuvre completed position in dependence on the data. Advantageously the controller may determine the orientation or a default orientation using historical data, such as associated with one or more of: a particular location, a scenario, a user and/or a pattern.

The control means may be arranged to determine a vacancy. The control means may be arranged to define at least one vehicle envelope within the vacancy, the vehicle envelope being suitable for receiving the vehicle in the defined manoeuvre completed position. The control means may be arranged to define within the vacancy at least one defined manoeuvre completed position for the vehicle.

The vehicle envelope may comprise a target position suitable for receiving the vehicle in the defined manoeuvre completed position. The vehicle envelope may comprise a target defined manoeuvre completed position. The vehicle envelope may be determined in dependence on a one-dimensional property and/or measurement and/or estimation. The vehicle envelope may be determined in dependence on the environment signal being indicative of a length, such as an unobstructed length between features, the unobstructed length being sufficiently long for receiving the vehicle in the defined manoeuvre completed position. The vehicle envelope may be determined in dependence on a two-dimensional property and/or measurement and/or estimation. For example, the vehicle envelope may be determined in dependence on the environment signal being indicative of a length, such as between features, wherein along that length there is no obstruction within a particular width or breadth perpendicular to the length. The particular width or breadly may correspond to at least a width or breadth of the vehicle, such as a vehicle width when the vehicle is parked and in a closed configuration, such as with vehicle aperture members closed. The particular width or breadth may correspond to at least a length of the vehicle, such as a vehicle length when the vehicle is parked and in the closed configuration in a perpendicular or parking lot or fishbone diagonal parked position. The vehicle envelope may comprise at least one dimension of a parking area and the defined manoeuvre completed position may be a parked position. The vehicle envelope may correspond to a predefined parking space. The vehicle envelope may comprise a target length, area or volume for receiving the vehicle in or on in the defined manoeuvre completed position.

The control means may be arranged to define at least two vehicle envelopes within the vacancy, each vehicle envelope comprising a discrete defined manoeuvre completed position that is offset within the vacancy.

The vehicle envelopes may be non-overlapping. Alternatively, the vehicle envelopes may be overlapping.

The vehicle envelopes may extend in respective longitudinal directions adjacent and parallel each other. Alternatively, the vehicle envelopes may extend along a same longitudinal axis, with a first vehicle envelope being longitudinally displaced along the longitudinal axis from a second vehicle envelope. In a yet further alternative, the vehicle envelops may be arranged with non-parallel longitudinal axes, such as with a first vehicle envelope having a longitudinal axis perpendicular to a longitudinal axis of a second vehicle envelope.

The control means may be arranged to determine the orientation in dependence on a position of a vehicle occupant. Advantageously an orientation, such as a forwards/rearwards or parallel/perpendicular orientation, can be adapted to suit a position of a vehicle occupant, such as whether the vehicle occupant is positioned in or out of the vehicle.

The controller may comprise memory means for storing data therein, the control means being arranged to determine the orientation in dependence on the data.

The control means may be arranged to adapt the defined manoeuvre completed position and/or the orientation thereof in dependence on the environment signal being indicative of a change in at least one feature in the vicinity of the vehicle. Advantageously the defined manoeuvre may be adapted during performance, such as in response to an actual change in the feature, such as a movement, and/or a detected change in the feature, such as a discovery of a previously undetected parameter of the feature (e.g. a previously shielded or undetected void or protrusion or the like)

The controller may comprise control means arranged to determine the orientation in dependence on a mode of performance of at least a portion of the defined manoeuvre. Advantageously, the orientation can be adapted to be appropriate for a mode. For example, the controller may be arranged to adapt the orientation in dependence on the mode being an occupant in-vehicle mode or an occupant out of vehicle mode. The controller may comprise control means arranged to adapt the orientation in dependence on at least one of: an ambient condition in the vicinity of the vehicle (e.g. precipitation, such as rain; temperature; light level; wind; etc.); a terrain in the vicinity of the vehicle (e.g. road surface, off-road surface, smoothness of road surface, etc).

According to an aspect of the invention, there is provided a system, comprising: the controller as described above, arranged to output the possible defined manoeuvre completed position signal.

The system may comprise notification output means for notifying the vehicle user of the possible defined manoeuvre completed position.

The system may comprise environment sensing means for determining the location of the at least one feature in the vicinity of the vehicle and for outputting the environment signal.

The system may comprise receiver means for wirelessly receiving a signal from a mobile device indicative of a user request and outputting a request signal in dependence thereon.

The notification output means may be arranged to output a notification signal for the visual and/or audio notification indicative of the possible defined manoeuvre completed position.

The system may comprise environment sensing means for determining the location of the at least one feature in the vicinity of the vehicle.

The system may comprise receiver means for receiving a signal indicative of the user request and outputting the request signal in dependence thereon.

Where the control means is arranged to output the manoeuvre signal; the system may comprise actuator means for receiving the manoeuvre signal to cause the vehicle to perform the defined manoeuvre.

According to an aspect of the invention, there is provide a method of determining an orientation of a defined manoeuvre completed position of a vehicle, the method comprising:
  receiving an environment signal indicative of a location of at least one feature in a vicinity of the vehicle;
  in dependence on the environment signal, determining with a control means the orientation of the defined manoeuvre completed position of the vehicle; and
  outputting a possible defined manoeuvre completed position signal in dependence on the determined orientation.

The method may comprise outputting a notification signal indicative of the possible defined manoeuvre completed position signal.

The method may comprise determining with the control means the orientation of the defined manoeuvre completed position in dependence on the environment signal being indicative of an orientation of the at least one feature in the vicinity of the vehicle.

The method may comprise determining the orientation of the defined manoeuvre completed position to be aligned relative to the at least one feature in the vicinity of the vehicle.

The at least one feature in the vicinity of the vehicle may comprise at least one other vehicle in the vicinity of the vehicle.

The method may comprise determining the orientations of a plurality of possible defined manoeuvre completed positions of the vehicle in dependence on the environment signal; and notifying a vehicle user of the orientations of the plurality of possible defined manoeuvre completed positions.

The method may comprise offering selectability of the orientation to a user, such as selection from the plurality of possible defined manoeuvre completed positions.

The method may comprise determining the orientation of the defined manoeuvre completed position in dependence on a location of the vehicle.

The method may comprise receiving a request signal indicative of a wired or wirelessly received signal indicative of a user request for vehicle movement.

The method may comprise outputting a manoeuvre signal to cause the vehicle to perform a defined manoeuvre to the defined manoeuvre completed position; the output means being controlled by the control means to output the manoeuvre signal.

The method may comprise storing data in a memory means, and determining the possible defined manoeuvre completed position in dependence on the data.

The method may comprise detecting a vacancy in dependence on the environment signal.

The method may comprise, in dependence on at least one dimension parameter of the vacancy derived from the environment signal, determining at least one vehicle envelope within the vacancy. The vehicle envelope may be suitable for receiving the vehicle in the defined manoeuvre completed position.

The method may comprise determining the vehicle envelope in dependence on the environment signal being indicative of at least one additional parameter associated with the vacancy in addition to the dimension parameter.

The method may comprise categorising the vacancy in one or more categories, the categories corresponding to one or more of:
- the vacancy comprises a vehicle envelope suitable for receiving the vehicle in the defined manoeuvre completed position;
- the vacancy comprises a vehicle envelope suitable for receiving the vehicle in the defined manoeuvre completed position on performance of a particular mode of defined manoeuvre;
- the vacancy comprises a vehicle envelope of a particular orientation;
- the vacancy comprises a plurality of vehicle envelopes;
- the vacancy comprises a single vehicle envelope; and
- the vacancy comprises no vehicle envelope.

Third Technique

According to an aspect of the invention, there is provided a controller arranged to operably cause a vehicle wheel in a completed position of a defined manoeuvre to be angularly offset, particularly with respect to a feature in a vicinity of the vehicle.

According to an aspect of the invention, there is provided a controller comprising: input means for receiving an environment signal indicative of a location of one or more features in a vicinity of a vehicle; output means for outputting a manoeuvre signal to cause the vehicle to perform a defined manoeuvre to a completed position; and control means arranged to control the output means in dependence on the environment signal to cause a vehicle wheel in the completed position to be angularly offset with respect to a feature in the vicinity of the vehicle. Advantageously the vehicle may be caused to have an improved wheel configuration in the completed position, such as for the vehicle to have the vehicle wheel angled favourably relative to the feature in the vicinity of the vehicle.

The controller as described above, wherein:
- the input means may comprise an electrical input for receiving the signal;
- the output means may comprise an electrical output for outputting the signal; and
- the control means may comprise one or more control devices such as electronic processing devices.

The defined manoeuvre may comprise a parking manoeuvre. The parking manoeuvre may comprise an in-parking manoeuvre, such as parking into a space to a stationary position. The parking manoeuvre may comprise an un-parking manoeuvre, such as parking out of a space from a stationary position. The completed position may comprise a parked position.

The control means may be arranged to control the output means to cause the vehicle wheel in the completed position to be angularly offset towards the feature in the vicinity of the vehicle. The vehicle wheel in the completed position may be angularly offset towards the feature such that the vehicle wheel would contact the feature in an event of the vehicle rolling.

The one or more features may comprise a kerb. The control means may be arranged to control the output means to cause the vehicle wheel in the completed position to be angularly offset towards the kerb. Advantageously, this may allow or cause the vehicle wheel to be impeded by the kerb from rolling, or from rolling further than may be desired (e.g. to rest the vehicle wheel against the kerb, to prevent the vehicle rolling further), such as in the event a user does not apply, or releases, a parking brake, particularly when the vehicle is on a slope.

Angularly offsetting may comprise providing at least a minimum angle between the vehicle wheel and a longitudinal axis of the vehicle. Accordingly, angularly offsetting may comprise deviating the vehicle wheel from a forward, straight trajectory parallel to the vehicle's longitudinal axis.

The control means may be arranged to control the output means to cause the vehicle wheel in the completed position to be angularly offset with respect to the feature in the vicinity of the vehicle at a predetermined offset angle. Advantageously, this may cause the vehicle to have the vehicle wheel angularly offset by a sufficient angle, such as at or above a threshold angle.

The predetermined offset angle may correspond to a maximum wheel angle with respect to the vehicle longitudinal axis, such as a 'wheel lock' offset angle. The predetermined offset angle may be sufficient to allow the vehicle wheel to contact the feature under a weight of the vehicle propelling the vehicle.

The control means may be arranged to control the output means to cause the vehicle to have a cramped wheel configuration upon completion of the defined manoeuvre. Advantageously, in at least some examples, such control means may assist in ensuring compliance with requirements, such as parking regulations requiring parked cars to have cramped wheels. The cramped wheel configuration may comprise blocking the one or more vehicle wheels diagonally against the kerb, such as by turning the vehicle wheel or wheels into the kerb when facing downhill and away from the kerb (e.g. out to the street) when facing uphill.

The control means may be arranged to control the output means to cause the vehicle wheel in the completed position to be angularly offset with respect to the feature in the vicinity of the vehicle in dependence upon an inclination. The control means may be arranged to control the output means to cause the vehicle wheel in the completed position to be angularly offset with respect to the feature in the vicinity of the vehicle in dependence upon a direction of the inclination. The control means may be arranged to control the output means to cause the vehicle wheel in the completed position to be angularly offset towards the feature in a downwards or downhill direction. For example, the vehicle wheel in the completed position may be caused to be angularly offset towards the feature in a vehicle forward direction when the vehicle is inclined downwards or downhill in the vehicle forward direction. Additionally, or alternatively, the vehicle wheel in the completed position may be caused to be angularly offset towards the feature in a vehicle rearward direction when the vehicle is inclined downwards or downhill in the vehicle rearward direction (e.g. uphill in the vehicle forward direction). The inclination may be of the vehicle, particularly in the completed position, such as may be indicated by an accelerometer, gravity sensor, vehicle suspension system or the like. The inclination may be of a surface for bearing the vehicle, such as a ground surface. The inclination may comprise a longitudinal inclination, such as of the vehicle along its longitudinal axis from front to back. Advantageously, this may allow or cause the vehicle to be impeded by the kerb from rolling too far downwards or downhill, such as under the weight of the vehicle in the event that the user does not apply, or releases, the parking brake.

The controller may comprise a second input means for receiving a request signal indicative of a received signal indicative of a user request. The request signal may be indicative of a wired or a wirelessly received signal indicative of a user request, such as from a users mobile device. Advantageously this may allow the vehicle to be effectively instructed from a users mobile device, such as remotely instructed.

The controller may be configurable, such as by the user. In at least some examples, the controller may be configurable to apply the angular offset as a default setting, such as at every defined manoeuvre completed position or at least every stationary parked position. The controller may be arranged to allow for user adaptation. The user may be able to at least partially override, program, configure or adjust the controller to vary one or more of the following: the provision of the angular offset; the incline threshold for providing the angular offset; the location or locations where the angular offset is provided; the direction of the angular offset; and the angle of the angular offset. The controller may be arranged to be manually overridden, programmed or adjusted, such as to adjust the output of the manoeuvre signal. Additionally, or alternatively, the controller may be arranged to automatically, or semi-automatically, override, program or adjust the output of the manoeuvre signal, such as by learning from a user behaviour, such as a repeated user behaviour associated with one or more of: an input pattern; a geographic location; a user identity (e.g. where the vehicle is used noncontemporaneously by multiple users). For example, the controller may be arranged to not angularly offset the vehicle wheel when the vehicle is positioned at a particular location, such as a home or garage, where the user has previously overridden, cancelled or rejected an angular offsetting of the vehicle wheel. The controller may comprise a self-learning, such as to learn when and/or where to apply the angular offset.

The user may comprise an occupant. The user may comprise a driver of the vehicle. The user may be located in the vehicle. The user may be located out of the vehicle, such as for at least a portion of performance of the defined manoeuvre. The vehicle may comprise one or more non-driver occupants. In at least some examples, one or more users and/or occupants may be located in and/or out of the vehicle.

The control means may be arranged to control the output means to cause as part of the performance of the defined manoeuvre the vehicle wheel to be angularly offset in the completed position. The control mans may be arranged to control the output means to configure the vehicle in the completed position. Advantageously, this may allow the controller to ensure the angular offset of the vehicle wheel, even where the vehicle has attained a completed position without the output means being controlled by the control means for the entirety of a performance to attain the completed position.

The control means may be arranged to control the output means to angularly offset the vehicle wheel whilst the vehicle is stationary, such as in the completed position. Advantageously, this may allow the controller to control only a portion of a manoeuvre, such as subsequent to a user-controlled portion of the manoeuvre.

The control means may be arranged to determine a vacancy. The control means may be arranged to define at least one vehicle envelope within the vacancy, the vehicle envelope being suitable for receiving the vehicle in the defined manoeuvre completed position. The control means may be arranged to define within the vacancy at least one defined manoeuvre completed position for the vehicle.

The vehicle envelope may comprise a target position suitable for receiving the vehicle in the defined manoeuvre completed position. The vehicle envelope may comprise a target defined manoeuvre completed position. The vehicle envelope may be determined in dependence on a one-dimensional property and/or measurement and/or estimation. The vehicle envelope may be determined in dependence on the environment signal being indicative of a length, such as an unobstructed length between features, the unobstructed length being sufficiently long for receiving the vehicle in the defined manoeuvre completed position. The vehicle envelope may be determined in dependence on a two-dimensional property and/or measurement and/or estimation. For example, the vehicle envelope may be determined in dependence on the environment signal being indicative of a length, such as between features, wherein along that length there is no obstruction within a particular width or breadth perpendicular to the length. The particular width or bready may correspond to at least a width or breadth of the vehicle, such as a vehicle width when the vehicle is parked and in a closed configuration, such as with vehicle aperture members closed. The particular width or breadth may correspond to at least a length of the vehicle, such as a vehicle length when the vehicle is parked and in the closed configuration in a perpendicular or parking lot or fishbone diagonal parked position. The vehicle envelope may comprise at least one dimension of a parking area and the defined manoeuvre completed position may be a parked position. The vehicle envelope may correspond to a predefined parking space. The vehicle envelope may comprise a target length, area or volume for receiving the vehicle in or on in the defined manoeuvre completed position.

The control means may be arranged to define at least two vehicle envelopes within the vacancy, each vehicle envelope comprising a discrete completed position that is offset within the vacancy.

The two vehicle envelopes may be non-overlapping. Alternatively, the two vehicle envelopes may be overlapping.

The two vehicle envelopes may extend in respective longitudinal directions adjacent and parallel each other. Alternatively, the two vehicle envelopes may extend along a same longitudinal axis, with a first vehicle envelope being longitudinally displaced along the longitudinal axis from a second vehicle envelope. In a yet further alternative, the vehicle envelops may be arranged with non-parallel longitudinal axes, such as with a first vehicle envelope having a longitudinal axis perpendicular to a longitudinal axis of a second vehicle envelope.

According to an aspect of the invention, there is provided a system, comprising: the controller as described above, arranged to receive the environment signal and to output the manoeuvre signal; environment sensing means for determining the location of one or more features in the vicinity of the vehicle and outputting the environment signal indicative thereof; and actuator means for receiving the manoeuvre signal to cause the vehicle to perform the defined manoeuvre to the completed position with the vehicle wheel in the completed position angularly offset with respect to the feature in the vicinity of the vehicle. Advantageously the vehicle wheel may be autonomously angularly offset with respect to the environment signal. The environment sensing means may be one or more environment sensing devices.

The vehicle wheel may comprise a road wheel. The vehicle wheel that is angularly offset may be a steerable wheel, such as for changing a direction of the vehicle. The vehicle wheel may be steerable by a steering wheel. The vehicle wheel may comprise a front wheel. The vehicle wheel may comprise a rear wheel. Multiple wheels may be angularly offset, such as one or more pairs of vehicle wheels. Angularly offsetting may comprise angularly offsetting front and/or rear wheel or wheels of a vehicle with rear wheel steer.

The controller may be arranged to provide an indication of the angular offset. The indication may comprise a visual indication. The indication may comprise the existence and/or magnitude and/or direction of the angular offset. The indication may be provided external and/or discrete from the vehicle, such as via a mobile device. The indication may be provided within the vehicle. The controller may be arranged to control the output means to cause the steering wheel to be rotationally offset with respect to a neutral position of the steering wheel, indicative to a user that the vehicle wheel is angularly offset. Particularly where a steering wheel may have a rotational or positional similarity or symmetry, such that the steering wheel can be or appear to be in the neutral position when the vehicle wheel is not in a corresponding neutral vehicle wheel position. The neutral position or positions of the steering wheel and/or the vehicle wheel may correspond to a straightened position of the vehicle wheel, such as with the vehicle wheel parallel to the longitudinal axis of the vehicle. Angularly offsetting the vehicle wheel may comprise angling the vehicle wheel away from the neutral position. Advantageously, the rotationally offset steering wheel may indicate to a user that the vehicle wheel is angularly offset, optionally in which direction the vehicle wheel is angularly offset. In other examples, a position of the steering wheel may not be indicative of the angular offset of the one or more vehicle wheels, such as where the vehicle wheel is steered by steer-by-wire or the like.

The system may comprise receiver means for wirelessly receiving a signal from a mobile device indicative of a user request for vehicle movement and outputting a request signal in dependence thereon. Additionally, or alternatively, the receiver means may be for wiredly receiving the signal from the mobile device.

The control means may be arranged to control the output means in dependence upon a location of the vehicle to selectively cause the vehicle wheel in the completed position to be angularly offset with respect to the feature in the vicinity of the vehicle. The control means may be arranged to determine whether or not the vehicle wheel should be angularly offset in dependence on the location. The control means may be arranged to determine a direction of angular offset, such as a direction of rotation of the vehicle wheel, in dependence on the location. The control means may be arranged to determine an angle of offset in dependence on the location. The location may be indicated by a navigation system, such as a satellite navigation system. The location may be associated with geo-fencing. The location may be indicated by data stored in memory. The control means may be arranged to determine the inclination, of the vehicle and/or the ground surface, in dependence on the location. Additionally, or alternatively, the control means may be arranged to determine the inclination, of the vehicle and/or the ground surface, in dependence on an input from a vehicle sensor, such as an accelerometer. Additionally, or alternatively, the control means may be arranged to determine the inclination, of the vehicle and/or the ground surface, in dependence on the environment signal.

According to an aspect of the invention, there is provided a method of controlling movement of a vehicle to perform a defined manoeuvre, the method comprising: receiving an environment signal indicative of a location of one or more features in a vicinity of the vehicle; and controlling an output means in dependence on the environment signal such that a vehicle wheel is caused to be angularly offset with respect to a feature in the vicinity of the vehicle in a completed position of the defined manoeuvre.

The one or more features may comprise a kerb and the method may comprise angularly offsetting the wheel towards the kerb in the completed position of the defined manoeuvre.

The method may comprise receiving a signal from a mobile device indicative of a user request to perform the defined manoeuvre.

The method may comprise determining the location of the one or more features with an environment sensing means.

Fourth Technique

According to an aspect of the invention, there is provided a controller arranged to operably cause a vehicle to perform at least a portion of a defined manoeuvre in dependence on an ambient condition.

According to an aspect of the invention, there is provided a controller comprising: input means for receiving an ambient condition signal indicative of an ambient condition in a vicinity of a vehicle; output means for outputting a manoeuvre signal to cause the vehicle to perform a defined manoeuvre; and control means arranged to control the output means to cause the vehicle to perform at least a portion of the defined manoeuvre in dependence on the ambient condition signal. Advantageously, the vehicle may be caused to adapt the performance of the defined manoeuvre to suit the ambient condition.

The controller as described above, wherein:
- the input means may comprise an electrical input for receiving the signal;
- the output means may comprise an electrical output for outputting the signal; and
- the control means may comprise one or more control devices such as electronic processing devices.

The defined manoeuvre may comprise a parking manoeuvre. The parking manoeuvre may comprise an in-parking manoeuvre, such as parking into a space to a stationary position. The parking manoeuvre may comprise an un-parking manoeuvre, such as parking out of a space from a stationary position. A defined manoeuvre completed position may comprise a parked position.

The control means may be arranged to control the output means to cause the vehicle to perform at least a portion of the defined manoeuvre in accordance with a vehicle movement control profile determined in dependence on the ambient condition signal. Advantageously, the vehicle may be caused to perform the defined manoeuvre in a controlled manner appropriate for the ambient condition.

The vehicle movement control profile may comprise a speed parameter. The speed parameter may be indicative of a first order speed parameter. Advantageously, the vehicle may be caused to perform the defined manoeuvre with a vehicle speed appropriate for the ambient condition.

The control means may be arranged to select the vehicle movement control profile in dependence on a categorisation of the ambient condition. Advantageously, the vehicle may select, such as automatically select, parameters for performance of the defined manoeuvre associated with predetermined categories of one or more ambient conditions.

The speed parameter may be indicative of an acceleration of the vehicle. Advantageously, the vehicle may be caused to perform the defined manoeuvre with an appropriate acceleration, such as to perform the defined manoeuvre efficiently and/or without undue acceleration of the vehicle or a user or content thereof.

The speed parameter may be indicative of a jerk of the vehicle. Advantageously, the vehicle may be caused to perform the defined manoeuvre with an appropriate rate of change of acceleration, which may be physically and/or psychologically appropriate for the user.

The speed parameter may comprise a maximum speed parameter. Advantageously, the vehicle may be caused to perform the defined manoeuvre with or within a maximum speed, acceleration and/or jerk; such that the defined manoeuvre is performed efficiently, and/or physically and/or psychologically appropriate for a user.

The maximum speed parameter of a vehicle movement control profile corresponding to a first ambient condition may be less than the maximum speed parameter of a vehicle movement control profile corresponding to a second ambient condition. Advantageously, the maximum speed parameter can be varied to suit a variation in the ambient condition.

The vehicle movement control profile may be dependent upon a terrain in a vicinity of the vehicle. Advantageously, the vehicle may be caused to adapt the performance of the defined manoeuvre to suit the terrain.

The control means may be arranged to select the vehicle movement control profile in dependence on a categorisation of the terrain. Advantageously, the vehicle may select, such as automatically select, parameters for performance of the defined manoeuvre associated with predetermined categories of terrain.

The terrain may be a surface. The surface may comprise a ground surface, such as a load-bearing surface (e.g. vehicle-bearing). The surface may comprise a driveable surface, such as for receiving at least one vehicle wheel thereon. The surface may comprise a substrate.

The terrain may comprise one or more of: a road terrain; an off-road terrain; a bumpy terrain; a smooth terrain; a slippy terrain; a flat terrain; a material. The terrain may be categorised in dependence on one or more parameters corresponding to one or more of: bumpiness; smoothness; roughness; grip; slip; friction; one or more gradients; one or more inclines; one or more materials. The one or more parameters may comprise a magnitude and/or a direction.

The ambient condition may comprise one or more of: a temperature; an air temperature; a surface temperature, such as a road temperature; precipitation, such as rain, snow, hail; moisture; humidity; fog; mist; particles, such as airborne particles; light level; wind; wind speed; wind direction. The categories for categorisation of the one or more ambient conditions may comprise categories corresponding to the types of the one or more ambient conditions. For example, the categories may comprise: hot; warm; cold; rainy; snowy; dry; wet; humid; foggy; misty; dark; light; windy etc. In at least some examples, multiple categories may be provided corresponding to each ambient condition parameter. For example, several categories may be provided for the temperature, such as "hot air", "warm air", "cold air", "freezing air"; "hot road", "warm road", "cold road", "freezing road", etc. It will also be appreciated, that the one or more ambient conditions may be categorised in multiple categories simultaneously. For example, the one or more ambient conditions may be categorised as "warm, wet, windy and dark". The one or more ambient conditions may comprise multiple such categories or parameters.

The controller may comprise a second input means for receiving a request signal indicative of a received signal indicative of a user request. The request signal may be indicative of a wired or a wirelessly received signal indicative of a user request, such as from a users mobile device. Advantageously this may allow the vehicle to be effectively instructed from a users mobile device, such as remotely instructed with the user out of the vehicle.

The user may comprise an occupant. The user may comprise a driver of the vehicle. The user may be located in the vehicle. The user may be located out of the vehicle, such as for at least a portion of performance of the defined manoeuvre. The vehicle may comprise one or more non-driver occupants. In at least some examples, one or more users and/or occupants may be located in and/or out of the vehicle.

The control means may be arranged to determine a vacancy. The control means may be arranged to define at least one vehicle envelope within the vacancy, the vehicle envelope being suitable for receiving the vehicle in the defined manoeuvre completed position. The control means may be arranged to define within the vacancy at least one defined manoeuvre completed position for the vehicle.

The vehicle envelope may comprise a target position suitable for receiving the vehicle in the defined manoeuvre completed position. The vehicle envelope may comprise a target defined manoeuvre completed position. The vehicle envelope may be determined in dependence on a one-dimensional property and/or measurement and/or estimation. The vehicle envelope may be determined in dependence on the environment signal being indicative of a length, such as an unobstructed length between features, the unobstructed length being sufficiently long for receiving the vehicle in the defined manoeuvre completed position. The vehicle envelope may be determined in dependence on a two-dimensional property and/or measurement and/or estimation. For example, the vehicle envelope may be determined in dependence on the environment signal being indicative of a length, such as between features, wherein along that length there is no obstruction within a particular width or breadth perpendicular to the length. The particular width or bready may correspond to at least a width or breadth of the vehicle, such as a vehicle width when the vehicle is parked and in a closed configuration, such as with vehicle aperture members closed. The particular width or breadth may correspond to at least a length of the vehicle, such as a vehicle length when the vehicle is parked and in the closed configuration in a perpendicular or parking lot or fishbone diagonal parked position. The vehicle envelope may comprise at least one dimension of a parking area and the defined manoeuvre completed position may be a parked position. The vehicle envelope may correspond to a pre-defined parking space. The vehicle envelope may comprise a target length, area or volume for receiving the vehicle in or on in the defined manoeuvre completed position.

The control means may be arranged to define at least two vehicle envelopes within the vacancy, each vehicle envelope comprising a discrete defined manoeuvre completed position that is offset within the vacancy.

The two vehicle envelopes may be non-overlapping. Alternatively, the two vehicle envelopes may be overlapping.

The two vehicle envelopes may extend in respective longitudinal directions adjacent and parallel each other. Alternatively, the two vehicle envelopes may extend along a same longitudinal axis, with a first vehicle envelope being longitudinally displaced along the longitudinal axis from a second vehicle envelope. In a yet further alternative, the vehicle envelops may be arranged with non-parallel longitudinal axes, such as with a first vehicle envelope having a longitudinal axis perpendicular to a longitudinal axis of a second vehicle envelope.

According to an aspect of the invention, there is provided a system, comprising: the controller as described above, arranged to receive the ambient condition signal and to output the manoeuvre signal; and actuator means for receiving the manoeuvre signal to cause the vehicle to perform the defined manoeuvre in dependence on the ambient condition in the vicinity of the vehicle.

The system may comprise ambient condition sensing means for determining the one or more ambient conditions in the vicinity of the vehicle and outputting the ambient condition signal indicative thereof.

The system may comprise environment sensing means for determining a location of one or more features in the vicinity of the vehicle and outputting an environment signal indicative thereof.

The system may comprise the controller arranged to control the output means to cause the vehicle to perform at least a portion of the defined manoeuvre in accordance with a vehicle movement control profile determined in dependence on the ambient condition signal.

The system may comprise a controller arranged to select the vehicle movement control profile in dependence on the one or more features.

The system may comprise a controller arranged to select the vehicle movement control profile in dependence on a location of the vehicle.

The system may comprise a controller arranged to select the vehicle movement control profile for performing the defined manoeuvre in dependence on a drive mode of the vehicle. The drive mode of the vehicle may comprise one or more of: "off-road", "sport", "normal"; "race"; "comfort"; "individual", "economy" etc. The drive mode may correspond to vehicle parameters, such as ride settings.

The system may comprise a controller arranged to select the vehicle movement control profile for performing the defined manoeuvre in dependence on a presence of an occupant in the vehicle.

The system may comprise: receiver means for receiving a signal indicative of a user request for vehicle movement and outputting a request signal in dependence thereon. The receiver means may be for wirelessly receiving the signal from a mobile device.

The system may comprise a controller arranged to receive a terrain signal indicative of at least one terrain in a vicinity of the vehicle. The controller may be arranged to select the vehicle movement control profile for performing the defined manoeuvre in dependence upon the terrain signal.

The system may comprise: terrain sensing means for determining a terrain in the vicinity of the vehicle and outputting the terrain signal indicative thereof.

According to an aspect of the invention, there is provided a method of controlling movement of a vehicle to perform a defined manoeuvre, the method comprising: receiving an ambient condition signal indicative of an ambient condition in a vicinity of the vehicle; and controlling an output means in dependence on the ambient condition signal such that at least a portion of the defined manoeuvre is performed in dependence on the ambient condition in the vicinity of the vehicle.

The method may comprise determining the ambient condition with an ambient condition sensing means.

The method may comprise controlling the output means in dependence on the ambient condition signal such that at least a portion of the defined manoeuvre is performed in accordance with a vehicle movement control profile dependent upon the ambient condition in the vicinity of the vehicle.

The method may comprise selecting the vehicle movement control profile in dependence on a drive mode of the vehicle.

The method may comprise selecting the vehicle movement control profile in dependence on a presence of an occupant in the vehicle.

The method may comprise determining a terrain in the vicinity of the vehicle and selecting the vehicle movement control profile in dependence upon the terrain.

The method may comprise determining a location of one or more features in a vicinity of the vehicle with an environment sensing means. The method may comprise selecting the vehicle movement control profile in dependence upon the one or more features.

The method may comprise receiving a signal from a mobile device indicative of a user request to perform the defined manoeuvre.

Fifth Technique

According to an aspect of the invention, there is provided a controller arranged to operably alter in dependence on an environment signal a position of a moveable projection of a vehicle during performance of a defined manoeuvre.

According to an aspect of the invention, there is provided a controller comprising: input means for receiving an environment signal indicative of a location of one or more features in a vicinity of a vehicle; output means for outputting a manoeuvre signal to cause the vehicle to perform a defined manoeuvre; and control means arranged to control the output means to cause the vehicle to perform the defined manoeuvre, the control means being arranged to control the output means to alter a position of a moveable projection of the vehicle during the defined manoeuvre in dependence on the environment signal. Advantageously the vehicle may be caused to alter the position of the moveable projection to suit the environment.

The controller as described above, wherein:
the input means may comprise an electrical input for receiving the signal;
the output means may comprise an electrical output for outputting the signal; and
the control means may comprise one or more control devices such as electronic processing devices.

The defined manoeuvre may comprise a parking manoeuvre. The parking manoeuvre may comprise an in-parking manoeuvre, such as parking into a space to a stationary position. The parking manoeuvre may comprise an un-parking manoeuvre, such as parking out of a space from a stationary position. A defined manoeuvre completed position may comprise a parked position.

The input means may be arranged for receiving the environment signal from an environment sensing means associated with the moveable projection of the vehicle. Advantageously, there may be at least a portion of the environment sensing means associated with the moveable projection, such as connected to or in the moveable projection.

The controller may comprise a memory means for storing data therein. The memory means may be arranged to store data received via the input means prior to altering the position of the moveable projection of the vehicle. The memory means may be arranged to store data received prior to and/or during and/or subsequent to the performance of the defined manoeuvre. Advantageously, the controller may be able to store data, such as of the environment, for subsequent use of the data.

The control means may be arranged to control the output means in dependence upon the data stored in the memory means.

Advantageously, the control means may be able to use data, such as previously stored data about the environment, to control the output means, such as when it is less able to obtain data or such data from the input means.

The control means may be arranged to control the output means to cause the moveable projection of the vehicle to be altered during the defined manoeuvre in dependence upon the data stored in the memory means. The control means may be able to use stored data after it is no longer possible or less able to obtain data to control the position of the moveable projection, such as where the environment sensing means has been reconfigured or repositioned (e.g. where the environment sensing means is associated with the moveable projection).

The control means may be arranged to control the output means to reconfigure the moveable projection of the vehicle during a parking defined manoeuvre from an expanded position of the moveable projection of the vehicle to a collapsed position of the moveable projection of the vehicle. Advantageously, the control means may be able to cause the vehicle to adopt a particular configuration (e.g. smaller, or narrower) during the parking defined manoeuvre.

The control means may be arranged to control the output means to alter the position of the moveable projection of the vehicle during an unparking defined manoeuvre from a collapsed position of the moveable projection of the vehicle to an expanded position of the moveable projection of the vehicle. Advantageously, the control means may be able to cause the vehicle to adopt another particular configuration (e.g. with a deployed, fully-deployed or activated moveable projection) during the unparking defined manoeuvre, such as to allow completion of the defined manoeuvre and/or subsequent performance of the vehicle with the moveable projection in a normal driving use configuration (e.g. with the deployed, fully-deployed or activated moveable projection).

The control means may be arranged to control the output means to cause the position of the moveable projection of the vehicle to be altered during the defined manoeuvre in dependence on the environment signal being indicative of a feature, such as a feature in proximity of the vehicle or moveable projection, in a location proximal to a projected or predicted vehicle trajectory, particularly that of the movable projection. Advantageously, the moveable projection's position can be altered to accommodate or assist a future path or trajectory of the vehicle.

The controller may comprise a second input means for receiving a request signal indicative of a received signal indicative of a user request. The request signal may be indicative of a wired or a wirelessly received signal indicative of a user request, such as from a users mobile device. Advantageously this may allow the vehicle to be effectively instructed from a users mobile device, such as remotely instructed.

The user may comprise an occupant. The user may comprise a driver of the vehicle. The user may be located in the vehicle. The user may be located out of the vehicle, such as for at least a portion of performance of the defined manoeuvre. The vehicle may comprise one or more non-driver occupants. In at least some examples, one or more users and/or occupants may be located in and/or out of the vehicle.

The moveable projection may comprise one or more of: a vehicle mirror, such as a side mirror; a vehicle image sensing means, such as a camera; Lidar; ultrasonic sensor; or the like. The expanded position of the moveable projection may comprise an active configuration of the moveable projection. The collapsed position of the moveable projection may comprise an inactive configuration of the moveable projection.

The control means may be arranged to determine a vacancy. The control means may be arranged to define at least one vehicle envelope within the vacancy, the vehicle envelope being suitable for receiving the vehicle in the defined manoeuvre completed position. The control means may be arranged to define within the vacancy at least one defined manoeuvre completed position for the vehicle.

The vehicle envelope may comprise a target position suitable for receiving the vehicle in the defined manoeuvre completed position. The vehicle envelope may comprise a target defined manoeuvre completed position. The vehicle envelope may be determined in dependence on a one-dimensional property and/or measurement and/or estimation. The vehicle envelope may be determined in dependence on the environment signal being indicative of a length, such as an unobstructed length between features, the unobstructed length being sufficiently long for receiving the vehicle in the defined manoeuvre completed position. The vehicle envelope may be determined in dependence on a two-dimensional property and/or measurement and/or estimation. For example, the vehicle envelope may be determined in dependence on the environment signal being indicative of a length, such as between features, wherein along that length there is no obstruction within a particular width or breadth perpendicular to the length. The particular width or bready may correspond to at least a width or breadth of the vehicle, such as a vehicle width when the vehicle is parked and in a closed configuration, such as with vehicle aperture members closed. The particular width or breadth may correspond to at least a length of the vehicle, such as a vehicle length when the vehicle is parked and in the closed configuration in a perpendicular or parking lot or fishbone diagonal parked position. The vehicle envelope may comprise at least one dimension of a parking area and the received vehicle position may be a parked position. The vehicle envelope may correspond to a predefined parking space. The vehicle envelope may comprise a target length, area or volume for receiving the vehicle in or on in the defined manoeuvre completed position.

The control means may be arranged to define at least two vehicle envelopes within the vacancy, each vehicle envelope comprising a discrete defined manoeuvre completed position that is offset within the vacancy.

The vehicle envelopes may be non-overlapping. Alternatively, the vehicle envelopes may be overlapping.

The vehicle envelopes may extend in respective longitudinal directions adjacent and parallel each other. Alternatively, the vehicle envelopes may extend along a same longitudinal axis, with a first vehicle envelope being longitudinally displaced along the longitudinal axis from a second vehicle envelope. In a yet further alternative, the vehicle envelopes may be arranged with non-parallel longitudinal axes, such as with a first vehicle envelope having a longitudinal axis perpendicular to a longitudinal axis of a second vehicle envelope.

According to an aspect of the invention, there is provided a system comprising: the controller as described above, arranged to receive the environment signal and to output the manoeuvre signal; environment sensing means for determining the location of one or more features in the vicinity of the vehicle and outputting the environment signal indicative thereof.

The system may comprise actuator means for receiving the manoeuvre signal to cause the vehicle to perform the defined manoeuvre.

The system may comprise: receiver means for receiving a signal indicative of a user request for vehicle movement and outputting a request signal in dependence thereon. The receiver means may be for wirelessly receiving a signal from a mobile user device indicative of the user request.

The controller may be arranged to control the output means for performing the defined manoeuvre in dependence upon a presence of an occupant in the vehicle.

According to an aspect of the invention, there is provided a method of controlling movement of a vehicle to perform a defined manoeuvre, the method comprising: receiving an environment signal indicative of a location of one or more features in a vicinity of the vehicle; and controlling an output means in dependence on the environment signal such that a moveable projection of the vehicle is caused to be positioned during the defined manoeuvre in dependence on the environment signal.

The method may comprise altering a position of the moveable projection of the vehicle mirror with respect to a feature in the vicinity of the vehicle.

The method may comprise determining the location of the one or more features with an environment sensing means and outputting the environment signal from the environment sensing means.

The environment sensing means may be associated with the moveable projection of the vehicle.

The method may comprise storing data received from the environment sensing means prior to altering the position of or a reconfiguration of the moveable projection.

The method may comprise controlling the output means in dependence on the stored data.

The method may comprise controlling the output means in dependence on the stored data to perform the defined manoeuvre in dependence on the stored data.

The method may comprise controlling the output means in dependence on the stored data to alter the position of or configure the moveable projection during the defined manoeuvre in dependence upon the stored data.

The method may comprise altering the position of or reconfiguring the moveable projection of the vehicle between an expanded position and a collapsed position during the defined manoeuvre.

The method may comprise receiving a signal indicative of a user request to perform the defined manoeuvre. The method may comprise receiving the signal from a mobile device indicative of the user request to perform the defined manoeuvre.

Sixth Technique

According to an aspect of the invention, there is provided a controller arranged to operably cause a vehicle to perform at least a portion of a defined manoeuvre in dependence on a terrain.

According to an aspect of the invention, there is provided a controller comprising: input means for receiving a terrain signal indicative of a terrain in a vicinity of a vehicle; output means for outputting a manoeuvre signal to cause the vehicle to perform a defined manoeuvre; and control means arranged to control the output means in dependence on the terrain signal. Advantageously, the vehicle may be caused to adapt the performance of the defined manoeuvre to suit the terrain.

The controller as described above, wherein:
the input means may comprise an electrical input for receiving the signal;
the output means may comprise an electrical output for outputting the signal; and
the control means may comprise one or more control devices such as electronic processing devices.

The defined manoeuvre may comprise a parking manoeuvre. The parking manoeuvre may comprise an in-parking manoeuvre, such as parking into a space to a stationary position. The parking manoeuvre may comprise an un-parking manoeuvre, such as parking out of a space from a stationary position. A defined manoeuvre completed position may comprise a parked position.

The control means may be arranged to control the output means to cause the vehicle to perform at least a portion of the defined manoeuvre in accordance with a vehicle movement control profile determined in dependence on the terrain signal. Advantageously, the vehicle may be caused to perform the defined manoeuvre in a controlled manner appropriate for the terrain.

The vehicle movement control profile may comprise a speed parameter. The speed parameter may be indicative of a first order speed parameter. Advantageously, the vehicle may be caused to perform the defined manoeuvre with a vehicle speed appropriate for the terrain.

The control means may be arranged to select the vehicle movement control profile in dependence on a categorisation of the terrain. Advantageously, the vehicle may select, automatically or otherwise, parameters for performance of the defined manoeuvre associated with predetermined categories of terrain or terrains.

The terrain may be a surface. The surface may comprise a ground surface, such as a load-bearing surface (e.g. vehicle-bearing). The surface may comprise a driveable surface, such as for receiving at least one vehicle wheel thereon. The surface may comprise a substrate.

The categories of terrain may comprise one or more of: a road terrain; an off-road terrain; a bumpy terrain; a smooth terrain; a slippy terrain; a flat terrain; a material. The terrain may be categorised according to one or more parameters corresponding to one or more of: bumpiness; smoothness; roughness; grip; slip; friction; one or more gradients; one or more inclines; one or more materials. The one or more parameters may comprise a magnitude and/or a direction.

In addition, or an alternative, to dependence on the terrain signal, the control means may be arranged to control the output means in dependence on a topography signal indicative of a topography in the vicinity of the vehicle.

The speed parameter may be indicative of an acceleration of the vehicle. Advantageously, the vehicle may be caused to perform the defined manoeuvre with an appropriate acceleration, such as to perform the defined manoeuvre efficiently and/or without undue acceleration of the vehicle or content thereof or an occupant.

The speed parameter may be indicative of a jerk of the vehicle. Advantageously, the vehicle may be caused to perform the defined manoeuvre with an appropriate rate of change of acceleration, which may be physically and/or psychologically appropriate for the user.

The speed parameter comprises a maximum speed parameter. Advantageously, the vehicle may be caused to perform the defined manoeuvre with a maximum speed, acceleration and/or jerk; such that the defined manoeuvre is performed efficiently, and/or physically and/or psychologically appropriate for a user.

The maximum speed parameter of a vehicle movement control profile corresponding to a first terrain may be less than the maximum speed parameter of a vehicle movement control profile corresponding to a second terrain. Advantageously, the maximum speed parameter can be varied to suit a variation in the terrain.

The maximum speed parameter of a vehicle movement control profile corresponding to an off-road terrain may be less than the maximum speed parameter of a vehicle movement control profile corresponding to an on-road terrain. Advantageously, the maximum speed parameter may be reduced to accommodate differences in forces. In at least some examples, the maximum speed parameter of the vehicle movement control profile corresponding to an off-road terrain may be the same or greater than the maximum speed parameter of the vehicle movement control profile corresponding to an on-road terrain. For example, there may be an increased maximum jerk for the vehicle movement control profile corresponding to the off-road terrain, such as where a user may be accustomed to or expect an increased jerk (e.g. particularly associated with a bumpy terrain).

The movement control profile may be dependent upon an ambient condition in a vicinity of the vehicle. Advantageously, the vehicle may be caused to adapt the performance of the defined manoeuvre to suit the ambient condition.

The controller may comprise a second input means for receiving a request signal indicative of a received signal indicative of a user request. The request signal may be indicative of a wired or a wirelessly received signal indicative of a user request, such as from a users mobile device. Advantageously this may allow the vehicle to be effectively instructed from a users mobile device, such as remotely instructed.

The user may comprise an occupant. The user may comprise a driver of the vehicle. The user may be located in the vehicle. The user may be located out of the vehicle, such as for at least a portion of performance of the defined manoeuvre. The vehicle may comprise one or more non-driver occupants. In at least some examples, one or more users and/or occupants may be located in and/or out of the vehicle.

The control means may be arranged to determine a vacancy. The control means may be arranged to define at least one vehicle envelope within the vacancy, the vehicle envelope being suitable for receiving the vehicle in the defined manoeuvre completed position. The control means may be arranged to define within the vacancy at least one defined manoeuvre completed position for the vehicle.

The vehicle envelope may comprise a target position suitable for receiving the vehicle in the defined manoeuvre completed position. The vehicle envelope may comprise a target defined manoeuvre completed position. The vehicle envelope may be determined in dependence on a one-dimensional property and/or measurement and/or estimation. The vehicle envelope may be determined in dependence on the environment signal being indicative of a length, such as an unobstructed length between features, the unobstructed length being sufficiently long for receiving the vehicle in the defined manoeuvre completed position. The vehicle envelope may be determined in dependence on a two-dimensional property and/or measurement and/or estimation. For example, the vehicle envelope may be determined in dependence on the environment signal being indicative of a length, such as between features, wherein along that length there is no obstruction within a particular width or breadth perpendicular to the length. The particular width or bready may correspond to at least a width or breadth of the vehicle, such as a vehicle width when the vehicle is parked and in a closed configuration, such as with vehicle aperture members closed. The particular width or breadth may correspond to at least a length of the vehicle, such as a vehicle length when the vehicle is parked and in the closed configuration in a perpendicular or parking lot or fishbone diagonal parked position. The vehicle envelope may comprise at least one dimension of a parking area and the defined manoeuvre completed position may be a parked position. The vehicle envelope may correspond to a predefined parking space. The vehicle envelope may comprise a target length, area or volume for receiving the vehicle in or on in the defined manoeuvre completed position.

The control means may be arranged to define at least two vehicle envelopes within the vacancy, each vehicle envelope comprising a discrete defined manoeuvre completed position that is offset within the vacancy.

The two vehicle envelopes may be non-overlapping. Alternatively, the two vehicle envelopes may be overlapping.

The two vehicle envelopes may extend in respective longitudinal directions adjacent and parallel each other. Alternatively, the two vehicle envelopes may extend along a same longitudinal axis, with a first vehicle envelope being longitudinally displaced along the longitudinal axis from a second vehicle envelope. In a yet further alternative, the vehicle envelops may be arranged with non-parallel longitudinal axes, such as with a first vehicle envelope having a longitudinal axis perpendicular to a longitudinal axis of a second vehicle envelope.

According to an aspect of the invention, there is provided a system comprising: the controller as described above, arranged to receive the terrain signal and to output the manoeuvre signal; and actuator means for receiving the manoeuvre signal to cause the vehicle to perform the defined manoeuvre in dependence on the terrain signal.

The system may comprise: terrain sensing means for determining the terrain in the vicinity of the vehicle and outputting the terrain signal indicative thereof.

The system may comprise: environment sensing means for determining a location of one or more features in the vicinity of the vehicle and outputting an environment signal indicative thereof. The terrain sensing means may comprise the environment sensing means.

The control means may be arranged to control the output means to cause the vehicle to perform at least a portion of the defined manoeuvre in accordance with a vehicle movement control profile determined in dependence on the terrain signal.

The control means may be arranged to select a vehicle movement profile in dependence on the one or more features.

The control means may be arranged to select the vehicle movement control profile in dependence upon a location of the vehicle.

The control means may be arranged to select the vehicle movement control profile for performing the defined manoeuvre in dependence upon a drive mode of the vehicle.

The control means may be arranged to select the vehicle movement control profile for performing the defined manoeuvre in dependence upon a presence of an occupant in the vehicle.

The control means may be arranged to receive an ambient condition signal indicative of at least one ambient condition in a vicinity of the vehicle. The control means may be arranged to select the vehicle movement control profile for performing the defined manoeuvre in dependence upon the ambient condition signal.

The system may comprise: receiver means for receiving a signal indicative of a user request for vehicle movement and outputting a request signal in dependence thereon. The receiver means may be for wirelessly receiving a signal from a mobile user device indicative of the user request.

The system may comprise ambient condition sensing means for determining the one or more ambient conditions in the vicinity of the vehicle and outputting the ambient condition signal indicative thereof.

According to a further aspect of the invention, there is provided a method of controlling movement of a vehicle to perform a defined manoeuvre, the method comprising: receiving a terrain signal indicative of a terrain in a vicinity of the vehicle; and controlling an output means in dependence on the terrain signal such that at least a portion of the defined manoeuvre is performed in dependence on the terrain in the vicinity of the vehicle.

The method may comprise determining the terrain with a terrain sensing means.

The method may comprise controlling the output means in dependence on the terrain signal such that at least a portion of the defined manoeuvre is performed in accordance with a vehicle movement control profile dependent on the terrain in the vicinity of the vehicle.

The method may comprise selecting the vehicle movement control profile in dependence upon a vehicle drive mode.

The method may comprise selecting the vehicle movement control profile in dependence on a presence of an occupant in the vehicle.

The method may comprise determining an ambient condition in the vicinity of the vehicle and selecting the vehicle movement control profile in dependence on the ambient condition.

The method may comprise determining a location of one or more features in a vicinity of the vehicle with an environment sensing means; and selecting the vehicle movement control profile in dependence upon the one or more features.

The method may comprise receiving a signal indicative of a user request to perform the defined manoeuvre. The method may comprise receiving the signal from a mobile device indicative of the user request to perform the defined manoeuvre.

Seventh Technique

According to an aspect of the invention, there is provided a controller arranged to operably cause a vehicle to perform a defined manoeuvre within a number of trajectory parts, the number being selectively adapted in dependence on an environment signal.

According to an aspect of the invention, there is provided a controller comprising: input means for receiving an environment signal indicative of a location of one or more features in a vicinity of a vehicle; output means for outputting a manoeuvre signal to cause the vehicle to perform a defined manoeuvre to a defined manoeuvre completed position; and control means arranged to control the output means to cause the vehicle to perform the defined manoeuvre, the control means being arranged to determine a planned trajectory to perform the defined manoeuvre within a number of trajectory parts to the defined manoeuvre completed position within a defined manoeuvre completed position tolerance range relative to a feature in the vicinity of the vehicle, wherein the control means is arranged to determine the defined manoeuvre completed position tolerance range in dependence on the environment signal. Advantageously the vehicle may be caused to perform the defined manoeuvre within a number of trajectory parts that is adaptable for features in the vicinity of the vehicle.

The controller as described above, wherein:
the input means may comprise an electrical input for receiving the signal;
the output means may comprise an electrical output for outputting the signal; and
the control means may comprise one or more control devices such as electronic processing devices.

The defined manoeuvre may comprise a parking manoeuvre. The parking manoeuvre may comprise an in-parking manoeuvre, such as parking into a space to a stationary position. The parking manoeuvre may comprise an un-parking manoeuvre, such as parking out of a space from a stationary position. The defined manoeuvre completed position may comprise a parked position.

The control means may be arranged to determine the number of trajectory parts in dependence on the defined manoeuvre completed position tolerance range. Advantageously, the number of trajectory parts may be adapted to suit the defined manoeuvre completed position tolerance range.

The control means may be arranged to inversely relate the number of trajectory parts to the defined manoeuvre completed position tolerance range such that the defined manoeuvre is limited to a smaller number of trajectory parts when the defined manoeuvre completed position tolerance range is larger and the defined manoeuvre is limited to a larger number of trajectory parts when the defined manoeuvre completed position tolerance range is smaller. Advantageously the number of trajectory parts may be in proportion to the size of the defined manoeuvre completed position tolerance range, such as inversely proportionate. Accordingly the preciseness or neatness of the defined manoeuvre completed position may be relative to a vehicle envelope within which the vehicle is positioned.

The control means may be arranged to determine a vacancy. The control means may be arranged to define at least one vehicle envelope within the vacancy, the vehicle envelope being suitable for receiving the vehicle in the defined manoeuvre completed position. The control means may be arranged to define within the vacancy at least one defined manoeuvre completed position for the vehicle.

The vehicle envelope may comprise a target position suitable for receiving the vehicle in the defined manoeuvre completed position. The vehicle envelope may comprise a target defined manoeuvre completed position. The vehicle envelope may be determined in dependence on a one-dimensional property and/or measurement and/or estimation. The vehicle envelope may be determined in dependence on the environment signal being indicative of a length, such as an unobstructed length between features, the unobstructed length being sufficiently long for receiving the vehicle in the defined manoeuvre completed position. The vehicle envelope may be determined in dependence on a two-dimensional property and/or measurement and/or estimation. For example, the vehicle envelope may be determined in dependence on the environment signal being indicative of a length, such as between features, wherein along that length there is no obstruction within a particular width or breadth perpendicular to the length. The particular width or bready may correspond to at least a width or breadth of the vehicle, such as a vehicle width when the vehicle is parked and in a closed configuration, such as with vehicle aperture members closed. The particular width or breadth may correspond to at least a length of the vehicle, such as a vehicle length when the vehicle is parked and in the closed configuration in a perpendicular or parking lot or fishbone diagonal parked position. The vehicle envelope may comprise at least one dimension of a parking area and the defined manoeuvre completed position may be a parked position. The vehicle envelope may correspond to a predefined parking space. The vehicle envelope may comprise a target length, area or volume for receiving the vehicle in or on in the defined manoeuvre completed position.

The control means may be arranged to define at least two vehicle envelopes within the vacancy, each vehicle envelope comprising a discrete defined manoeuvre completed position that is offset within the vacancy.

The two vehicle envelopes may be non-overlapping. Alternatively, the two vehicle envelopes may be overlapping.

The two vehicle envelopes may extend in respective longitudinal directions adjacent and parallel each other. Alternatively, the two vehicle envelopes may extend along a same longitudinal axis, with a first vehicle envelope being longitudinally displaced along the longitudinal axis from a second vehicle envelope. In a yet further alternative, the vehicle envelops may be arranged with non-parallel longitudinal axes, such as with a first vehicle envelope having a longitudinal axis perpendicular to a longitudinal axis of a second vehicle envelope.

The control means may be arranged to determine both the defined manoeuvre completed position tolerance range and the number of trajectory parts in dependence on the environment signal being indicative of a vehicle envelope parameter of a vehicle envelope for receiving the vehicle. Advantageously, both the number of trajectory parts and the defined manoeuvre completed position tolerance range may be adapted to suit the vehicle envelope in which the vehicle is positioned in the defined manoeuvre completed position.

The control means may be arranged to provide a larger defined manoeuvre completed position tolerance range for a vehicle envelope with a larger vehicle envelope parameter. For example, the vehicle envelope parameter may be one or more dimensions, such as a separation to or between one or more features in the vicinity of the vehicle. Advantageously the defined manoeuvre completed position tolerance range may be larger when the vehicle envelope is larger, such as to allow a less precise defined manoeuvre completed position when there is a larger separation to one or more features in the vicinity of the vehicle. For example, where the vehicle envelope comprises a bigger parking space, there may be a larger tolerance range provided (e.g. the vehicle may be less precisely positioned in the space).

The control means may be arranged to provide a smaller number of trajectory parts for a vehicle envelope with a larger vehicle envelope parameter. Advantageously the defined manoeuvre completed position tolerance range may be smaller when the vehicle envelope is smaller, such as to allow a more precise defined manoeuvre completed position when there is a smaller separation to one or more features in the vicinity of the vehicle.

The control means may be arranged to determine at least one of the defined manoeuvre completed position tolerance range and the number of trajectory parts in dependence on a location of a vehicle occupant. The location of the occupant may be within the vehicle, such as of a driver in a driving seat. Advantageously, the number of trajectory parts or the defined manoeuvre completed position tolerance range can be adapted to suit whether one or more occupants are in or out of the vehicle. For example, the control means may be arranged to allow fewer trajectory parts for a quicker defined manoeuvre when there is a vehicle occupant, such as the driver, present in the vehicle (and optionally vice versa, such as when there is no vehicle occupant present). Alternatively, the control means may be arranged to allow more trajectory parts for a more precise defined manoeuvre completed position when there is a vehicle occupant, such as the driver, present in the vehicle (and optionally vice versa, such as when there is no vehicle occupant present).

The control means may be arranged to determine at least one of the defined manoeuvre completed position tolerance range and the number of trajectory parts in dependence on a mode for performing the defined manoeuvre. The mode of performance may comprise one or more of: at least one mode corresponding to an occupant-in-vehicle mode; and at least one mode corresponding to an occupant-out-of-vehicle mode. Advantageously the performance of the defined manoeuvre (e.g. the number of trajectory parts or changes of direction) may be adapted to suit a mode of performance, such as for whether an occupant is located in or out of the vehicle (e.g. for physical and/or psychological effects on the user).

The number of number of trajectory parts within which the defined manoeuvre is performed may be a maximum number of trajectory parts. Advantageously, the defined manoeuvre may be limited to a maximum number of parts, such the defined manoeuvre, or at least a users perception thereof, is not performed in too many trajectory parts.

The planned trajectory may be from a defined manoeuvre start position to the defined manoeuvre completed position. The number of trajectory parts may be a total number of trajectory parts from the defined manoeuvre start position to the defined manoeuvre completed position. Advantageously, the entire defined manoeuvre may be performed with a limited total number of trajectory parts, such as may be deemed acceptable or desirable physically and/or psychologically to the user.

The defined manoeuvre completed position tolerance range may comprise at least one of an angular range and a distance range relative to the feature in the vicinity of the vehicle. Advantageously, the defined manoeuvre completed position tolerance range can help ensure that the vehicle is aligned and/or spaced (e.g. from or relative to at least one feature in the vicinity) as may be desired or required by a user.

The control means may be arranged to determine each sequential trajectory part being in an opposite vehicle longitudinal direction relative to a preceding trajectory part. Advantageously, the vehicle may be caused to iteratively or sequentially move backwards then forwards (or vice versa), such as may provide consecutive continuous movements in any single longitudinal direction.

The controller may comprise an input means for receiving a request signal indicative of a received signal indicative of a user request for vehicle movement. The request signal may be indicative of a wired or a wirelessly received signal indicative of a user request, such as from a user's mobile device. For example, the request signal may indicate a user request (e.g. for performance of a portion of a particular defined manoeuvre) that has been sent wirelessly from a mobile device and received by the controller or another device or system connected thereto. Advantageously this may allow the vehicle to be effectively instructed from a users mobile device, such as remotely instructed.

The user may comprise an occupant. The user may comprise a driver of the vehicle. The user may be located in the vehicle. The user may be located out of the vehicle, such as for at least a portion of performance of the defined manoeuvre. The vehicle may comprise one or more non-driver occupants. In at least some examples, one or more users and/or occupants may be located in and/or out of the vehicle.

According to an aspect of the invention, there is provided a system, comprising: the controller as described above, arranged to receive the environment signal and to output the manoeuvre signal; environment sensing means arranged to determine the location of the one or more features in the vicinity of the vehicle; and actuator means for receiving the manoeuvre signal to cause the vehicle to perform the defined manoeuvre.

The system may comprise receiver means for receiving a signal indicative of a user request for vehicle movement and outputting a request signal in dependence thereon.

The system may comprise user input means for receiving user input for configuring the control means to determine at least one of the defined manoeuvre completed position tolerance range and the number of trajectory parts.

The system may comprise location input means for receiving location input for configuring the control means to determine at least one of the defined manoeuvre completed position tolerance range and the number of trajectory parts in dependence on a location parameter.

According to an aspect of the invention, there is provided a method of controlling movement of a vehicle to perform a defined manoeuvre to a defined manoeuvre completed position, the method comprising: receiving an environment signal indicative of a location of one or more features in a vicinity of the vehicle; determining a defined manoeuvre completed position tolerance range in dependence on the environment signal; determining a planned trajectory to perform the defined manoeuvre within a number of trajectory parts to the defined manoeuvre completed position within the defined manoeuvre completed position tolerance range relative to a feature in the vicinity of the vehicle; and outputting a manoeuvre signal to cause the vehicle to perform the defined manoeuvre.

The method may comprise determining the number of trajectory parts in dependence on the defined manoeuvre completed position tolerance range.

The method may comprise inversely relating the number of trajectory parts to the defined manoeuvre completed position tolerance range such that the defined manoeuvre is performed in a smaller number of trajectory parts when the defined manoeuvre completed position tolerance range is larger and the defined manoeuvre is limited to a larger number of trajectory parts when the defined manoeuvre completed position tolerance range is smaller.

The method may comprise determining both the defined manoeuvre completed position tolerance range and the number of trajectory parts in dependence on the environment signal being indicative that a vehicle envelope parameter of a vehicle envelope for receiving the vehicle is above a threshold.

The method may comprise providing a larger defined manoeuvre completed position tolerance range for a vehicle envelope with a larger vehicle envelope parameter.

The method may comprise providing a smaller number of trajectory parts for a vehicle envelope with a smaller vehicle envelope parameter.

The method may comprise determining at least one of the defined manoeuvre completed position tolerance range and the number of trajectory parts in dependence on a location of a vehicle occupant.

The method may comprise sequentially moving the vehicle in a single alternate longitudinal vehicle direction with each sequential trajectory part, such that each trajectory part is in an opposite longitudinal vehicle direction to at least one of an immediately preceding and an immediately subsequent trajectory part.

The method may comprise receiving a signal indicative of a user request for vehicle movement and outputting a request signal in dependence thereon.

The method may comprise determining at least one of the number of trajectory parts and the defined manoeuvre completed position tolerance range in dependence on an ambient condition signal.

Eighth Technique

According to an aspect of the invention, there is provided a controller arranged to operably cause a vehicle to perform a defined manoeuvre in a mode corresponding to an occupant-in-vehicle mode or a mode corresponding to an occupant-out-of-vehicle mode, the mode being variable during the defined manoeuvre.

According to an aspect of the invention, there is provided a controller comprising: output means for outputting a manoeuvre signal to cause a vehicle to perform a defined manoeuvre; and control means arranged to control the output means, the control means being arranged to provide a mode for performing at least a portion of the defined manoeuvre, the mode being selectable from a plurality of modes including at least one mode corresponding to an occupant-in-vehicle mode and at least one mode corresponding to an occupant-out-of-vehicle mode, the control means being arranged to vary the mode during the defined manoeuvre. Advantageously, the defined manoeuvre can be performed with a plurality of modes, the mode changing during the manoeuvre, such as to suit a user.

The controller as described above, wherein:
  the input means may comprise an electrical input for receiving the signal;
  the output means may comprise an electrical output for outputting the signal; and
  the control means may comprise one or more control devices such as electronic processing devices.

The defined manoeuvre may comprise a parking manoeuvre. The parking manoeuvre may comprise an in-parking manoeuvre, such as parking into a space to a stationary position. The parking manoeuvre may comprise an un-parking manoeuvre, such as parking out of a space from a stationary position. A defined manoeuvre completed position may comprise a parked position.

The controller may comprise an input means for receiving a request signal indicative of a received signal indicative of a user request for vehicle movement.

The input means may be for receiving a request signal indicative of a mode selection.

The control means may be arranged for the mode to be selectable in dependence on a location of a vehicle occupant. Advantageously only one or more modes appropriate or best-suited for locations of the vehicle occupant may be selectable.

The control means may be arranged to control the mode in dependence on the vehicle occupant location transitioning between an in-vehicle location and an out of vehicle location. Advantageously the mode may be changed by the occupant moving into or out of the vehicle.

The controller may be arranged to receive an input indicative of the location and/or status of the one or more occupants, such as via a latch (e.g. a seat belt buckle), or location detection of keyfob or the like, or Driver Condition Recognition.

The controller may comprise an environment input means for receiving an environment signal indicative of a location of one or more features in a vicinity of the vehicle, wherein the control means is arranged for the mode to be selectable in dependence upon the environment signal being indicative of a vehicle envelope suitable for the mode. Advantageously, only the mode or modes appropriate or best-suited for the vehicle envelope may be selectable.

The user may comprise the occupant. The user may comprise a driver of the vehicle. The user may be located in the vehicle. The user may be located out of the vehicle, such as for at least a portion of performance of the defined manoeuvre. The vehicle may comprise one or more non-driver occupants. In at least some examples, one or more users and/or occupants may be located in and/or out of the vehicle.

The control means may be arranged to determine a vacancy. The control means may be arranged to define at least one vehicle envelope within the vacancy, the vehicle envelope being suitable for receiving the vehicle in the defined manoeuvre completed position. The control means may be arranged to define within the vacancy at least one defined manoeuvre completed position for the vehicle.

The vehicle envelope may comprise a target position suitable for receiving the vehicle in the defined manoeuvre completed position. The vehicle envelope may comprise a target defined manoeuvre completed position. The vehicle envelope may be determined in dependence on a one-dimensional property and/or measurement and/or estimation. The vehicle envelope may be determined in dependence on the environment signal being indicative of a length, such as an unobstructed length between features, the unobstructed length being sufficiently long for receiving the vehicle in the defined manoeuvre completed position. The vehicle envelope may be determined in dependence on a two-dimensional property and/or measurement and/or estimation. For example, the vehicle envelope may be determined in dependence on the environment signal being indicative of a length, such as between features, wherein along that length there is no obstruction within a particular width or breadth perpendicular to the length. The particular width or breadty may correspond to at least a width or breadth of the vehicle, such as a vehicle width when the vehicle is parked and in a closed configuration, such as with vehicle aperture members closed. The particular width or breadth may correspond to at least a length of the vehicle, such as a vehicle length when the vehicle is parked and in the closed configuration in a perpendicular or parking lot or fishbone diagonal parked position. The vehicle envelope may comprise at least one dimension of a parking area and the defined manoeuvre completed position may be a parked position. The vehicle envelope may correspond to a predefined parking space. The vehicle envelope may comprise a target length, area or volume for receiving the vehicle in or on in the defined manoeuvre completed position.

The control means may be arranged to define at least two vehicle envelopes within the vacancy, each vehicle envelope comprising a discrete defined manoeuvre completed position that is offset within the vacancy.

The two vehicle envelopes may be non-overlapping. Alternatively, the two vehicle envelopes may be overlapping.

The two vehicle envelopes may extend in respective longitudinal directions adjacent and parallel each other. Alternatively, the two vehicle envelopes may extend along a same longitudinal axis, with a first vehicle envelope being longitudinally displaced along the longitudinal axis from a second vehicle envelope. In a yet further alternative, the vehicle envelops may be arranged with non-parallel longitudinal axes, such as with a first vehicle envelope having a longitudinal axis perpendicular to a longitudinal axis of a second vehicle envelope.

According to an aspect of the invention, there is provided a system, comprising: the controller as described above, arranged to output the manoeuvre signal; and actuator means for receiving the manoeuvre signal to cause the vehicle to perform the defined manoeuvre.

The system may comprise receiver means for receiving a signal indicative of a user request for vehicle movement and outputting a request signal in dependence thereon. The signal indicative of the user request may be wiredly or wirelessly received. The controller may be arranged to receive an input indicative of the location and/or status of the one or more occupants, such as via a latch (e.g. a seat belt buckle), or location detection of keyfob or the like, or Driver Condition Recognition.

The controller may be arranged to control the provision of modes in dependence on a location of a vehicle occupant.

The system may comprise environment sensing means for determining the location of one or more features in the vicinity of the vehicle.

According to an aspect of the invention, there is provided a method of controlling movement of a vehicle to perform a defined manoeuvre, the method comprising: providing a mode for performing at least a portion of the defined manoeuvre, the mode being selectable from a plurality of modes including at least one mode corresponding to an occupant-in-vehicle mode and at least one mode corresponding to an occupant-out-of-vehicle mode; outputting a manoeuvre signal to cause the vehicle to perform at least a portion of the defined manoeuvre in a selected mode; and varying the mode during the performance of the defined manoeuvre.

The method may comprise receiving a signal indicative of a user request for vehicle movement and outputting a request signal in dependence thereon.

The method may comprise the user selecting the mode.

The method may comprise automatically selecting a default mode.

The method may comprise automatically selecting the default mode in dependence on the presence of an occupant in the vehicle.

The method may comprise receiving an environment signal indicative of a location of one or more features in a vicinity of the vehicle, and providing the selectable mode in dependence on a feature in the vicinity of the vehicle.

The portion of the defined manoeuvre may comprise one or more of: initiation of the defined manoeuvre; completion of the defined manoeuvre; and the entirety of the defined manoeuvre.

The method may comprise offering selectability of the mode to a user.

Ninth Technique

According to an aspect of the invention, there is provided a controller arranged to operably cause a vehicle to automatically notify a user of an opportunity to perform a defined manoeuvre.

According to an aspect of the invention, there is provided a controller comprising:

input means for receiving an input signal;

control means arranged to determine a defined manoeuvre opportunity for a performance of at least a portion of a defined manoeuvre by a vehicle;

notification output means for outputting a notification signal; the control means being arranged to control the notification output means to output the notification signal indicative of the determination by the control means of the defined manoeuvre opportunity;

the control means being arranged to control the notification output means to automatically notify a vehicle user independently of a user request for determination by the control means of the defined manoeuvre opportunity; wherein the control means is arranged to control the notification output means to notify the vehicle user of the defined manoeuvre opportunity in dependence on the input signal being indicative of a vehicle parameter, manoeuvre output means for outputting a manoeuvre signal to cause the vehicle to perform the defined manoeuvre; and request input means for receiving a request signal indicative of a user request for the performance of at least the portion of the defined manoeuvre, the manoeuvre output means being controlled by the control means to cause the vehicle to perform the defined manoeuvre in dependence on the request signal.

The controller as described above, wherein:

the input means may comprise an electrical input for receiving the signal;

the output means may comprise an electrical output for outputting the signal; and the control means may comprise one or more control devices such as electronic processing devices.

The defined manoeuvre may comprise a parking manoeuvre. The parking manoeuvre may comprise an in-parking manoeuvre, such as parking into a space to a stationary position. The parking manoeuvre may comprise an un-parking manoeuvre, such as parking out of a space from a stationary position. The defined manoeuvre completed position may comprise a parked position.

The vehicle parameter may be a non-speed parameter. The vehicle parameter may be indicative of at least one of: a status of the vehicle; and a position of the vehicle.

The vehicle parameter may be associable with the performance of the defined manoeuvre. The vehicle parameter may be selectable from at least two vehicle parameters, the two vehicle parameters including at least a vehicle speed parameter and at least one vehicle additional parameter. The vehicle additional parameter may comprise the non-speed parameter.

The control means may be arranged to control the notification means to output the notification signal indicative of the defined manoeuvre opportunity without requiring a user activation of the controller to determine the defined manoeuvre opportunity.

The control means may be arranged to control the notification means to output the notification signal indicative of the determination of the defined manoeuvre opportunity in dependence on the input signal from the input means, wherein the controller is arranged to receive the input signal from at least one of a plurality of input sources.

The control means may be arranged to control the notification means to output the notification signal indicative of the determination of the defined manoeuvre opportunity, in dependence on the input signal, wherein the input signal comprises at least one of:

an environment signal indicative of a location of at least one feature in a vicinity of the vehicle;

a motion signal indicative of a motion of the vehicle;

a steering signal indicative of a steering input;

an event signal indicative of a vehicle event; and a location signal indicative of a vehicle location.

The control means may be arranged to control the notification means to output the notification signal in dependence on a determination by the control means of a user-initiated manoeuvre.

The control means may be arranged to transfer control from the user to the control means for a continuance of the performance of the user-initiated manoeuvre as a defined manoeuvre.

The control means may be arranged to determine the opportunity in dependence on a determination of a planned trajectory to perform the defined manoeuvre to a defined manoeuvre completed position.

The control means may be arranged to determine a plurality of opportunities for performing at least a portion of a defined manoeuvre, the control means being arranged to control the notification means to output the notification signal to the user of the determination of the plurality of opportunities.

The controller may comprise user input means for receiving a request signal indicative of a received signal indicative of a user request. The request signal may be indicative of a wired or a wirelessly received signal indicative of the user request, such as from a users mobile device.

Advantageously this may allow the vehicle to be effectively instructed from a users mobile device, such as remotely instructed with the user out of the vehicle.

The user may comprise an occupant. The user may comprise a driver of the vehicle. The user may be located in the vehicle. The user may be located out of the vehicle, such as for at least a portion of performance of the defined manoeuvre. The vehicle may comprise one or more non-driver occupants. In at least some examples, one or more users and/or occupants may be located in and/or out of the vehicle.

The control means may be arranged to control the manoeuvre output means to perform the defined manoeuvre from a user-initiated manoeuvre end position in dependence on the request signal. Advantageously, the vehicle may be caused to perform a defined manoeuvre from a non-specific defined manoeuvre start position, such as corresponding to any user-initiated manoeuvre end position or not a prescribed defined manoeuvre start position.

The user-initiated manoeuvre may comprise a parking manoeuvre. The user-initiated parking manoeuvre may comprise a partial parking manoeuvre, such as to an incomplete parked position (e.g. not fully in or out of a parking place). The parking manoeuvre may comprise an in-parking manoeuvre, such as parking into a space to a stationary position. The parking manoeuvre may comprise an un-parking manoeuvre, such as parking out of a space from a stationary position. The user-initiated manoeuvre end position may comprise a stationary vehicle position.

The control means may be arranged to detect performance of the user-initiated manoeuvre, in dependence on the input signal. The control means may be arranged to control the notification output means to notify the user of the detection by the control means of the user-initiated manoeuvre. Advantageously, the user may be alerted to a possibility of the performance of the defined manoeuvre.

The control means may be arranged to control the notification output means to automatically output the notification signal on detection by the control means of the user-initiated manoeuvre. The control means may be arranged to offer the user continuance as a defined manoeuvre. Advantageously the user may be offered the possibility of the performance of the defined manoeuvre without necessarily explicitly requesting or seeking the possibility.

The control means may be arranged to control the notification output means to output the notification signal independently of a user request for the manoeuvre output means to be controlled by the control means. Advantageously, the controller may be configured to automatically output the notification signal without requiring an activation of the control means by the vehicle user. For example, the user may otherwise be unaware of the possibility of the performance of a defined manoeuvre (such as in a particular scenario) such that allowing the notification signal to be output independently of the user request may allow the user to be offered the possibility of more or more useful defined manoeuvres (e.g. compared to only those expressly sought by the user in advance).

The control means may be arranged to control the notification output means in dependence at least partially on the input signal received prior to the user-initiated manoeuvre to the user-initiated manoeuvre end position. Advantageously the control means may be able to determine from the prior input signal whether one or more defined manoeuvres is possible (e.g. where the prior input signal comprised data no longer available via a corresponding input means).

The control means may be configurable to suppress the notification output means, such as from notifying the vehicle user of the detection by the control means of the user-initiated manoeuvre. Advantageously, the user can customise the control means. For example, in a scenario or type of scenario where the user may not wish to perform a defined manoeuvre (e.g. where the user has a different identity, such as when the vehicle has a different driver), then the control means can be configured not to notify the user.

The control means may be arranged to control the manoeuvre output means to cause the vehicle to follow a planned trajectory from the user-initiated manoeuvre end position to a defined manoeuvre completed position. Advantageously, the control means can determine a trajectory in advance for the vehicle to perform the defined manoeuvre.

The planned trajectory may comprise at least a partial correction of the user-initiated manoeuvre performed prior to the user request. Advantageously, at least a portion of the user-initiated manoeuvre can be corrected or undone. For example, where a user has entered or partially entered a parking space or location suboptimally in a user-initiated parking manoeuvre, such as at an unsuitable angle of the vehicle relative to the space or location, the control means may be arranged to more suitably position the vehicle in the space or location; and/or arranged to remove the vehicle from the parking space or location (e.g. to entirely restart the parking as a defined manoeuvre).

The control means may be arranged to control the manoeuvre output means to cause the vehicle to perform a reversal of at least a portion of the user-initiated manoeuvre performed prior to the defined manoeuvre.

The control means may be arranged to control the manoeuvre output means to perform the defined manoeuvre from a user-defined start position for the defined manoeuvre, the user-defined start position for the defined manoeuvre corresponding to the user-initiated manoeuvre end position. The start position for the defined manoeuvre may comprise an intermediate manoeuvre position, such as partially in and/or out of a vehicle vacancy The controller may comprise memory means for storing data therein. The memory means may be arranged to store data received via the input means. The control means may be arranged to control the notification means to output the notification signal indicative of the opportunity in dependence on the data The stored data may be indicative of a previously performed defined manoeuvre.

The control means may be arranged to control the manoeuvre output means to cause the vehicle to perform a repetition of at least a portion of the previously performed defined manoeuvre. The performance may be selective.

The control means may be arranged to control the manoeuvre output means to cause the vehicle to perform a reversal of at least a portion of the previously performed defined manoeuvre. The reversal may comprise a contra-manoeuvre or inversion. For example, the reversal may comprise an unparking manoeuvre of a previous parking manoeuvre, or a parking manoeuvre of a previous unparking manoeuvre.

The stored data may be indicative of a previously performed user-initiated manoeuvre.

The control means may be arranged to control the notification output means to notify the user in dependence on the previously-performed user-initiated manoeuvre having been followed by a defined manoeuvre.

The input means may be arranged to receive a plurality of input signals from a plurality of input sources, the plurality of input signals being selected from at least:
  an environment signal indicative of a feature in a vicinity of the vehicle;
  a motion signal indicative of a motion of the vehicle;
  a steering signal indicative of a user steering;
  an event signal indicative of a vehicle event; and
  a location signal indicative of a geographical location.

According to an aspect of the invention, there is provided a system, comprising: the controller as described above, arranged to output the manoeuvre signal; and actuator means for receiving the manoeuvre signal to cause the vehicle to perform the defined manoeuvre.

The system may comprise environment sensing means for determining the location of one or more features in the vicinity of the vehicle; and for outputting the environment signal indicative thereof.

The environment sensing means may be automatically activatable in dependence on the vehicle speed parameter.

The environment sensing means may be automatically activatable independently of the vehicle speed parameter.

The environment sensing means may be automatically activatable in dependence on the vehicle additional parameter.

The environment sensing means may be automatically activatable independently of the vehicle additional parameter.

The environment sensing means may be automatically activatable in dependence on either of the vehicle speed parameter or the vehicle additional parameter. For example, reaching an appropriate threshold of either of the vehicle speed parameter or the vehicle additional parameter may be sufficient to automatically activate the environment sensing means.

The environment sensing means may be automatically activatable independently of either of the vehicle speed parameter or the vehicle additional parameter. Advantageously, the environment sensing means may only require one parameter (e.g. reaching a threshold) to be activated.

The system may comprise receiver means. The receiver means may be for receiving a user signal indicative of the user request. The receiver means may be for outputting the request signal in dependence on receipt of the user signal. The receiver means may be for receiving a wired and/or wireless signal, such as from a mobile device indicative of the user request. Advantageously user requests can be received originating from external to the vehicle, so as to allow defined manoeuvre performance in at least some instances whilst the occupant is out of the vehicle.

The system may comprise a notification means for notifying the user.

According to an aspect of the invention, there is provided a method of controlling movement of a vehicle to perform a defined manoeuvre, the method comprising:
  receiving an input signal, the input signal being indicative of a vehicle parameter,
  determining with a control means a defined manoeuvre opportunity for a performance of at least a portion of a defined manoeuvre by a vehicle;
  automatically notifying a vehicle user of the determination of the defined manoeuvre opportunity for the performance of at least a portion of the defined manoeuvre, independently of a user request for determination of the defined manoeuvre opportunity for the performance of at least the portion of the defined manoeuvre; the notification of the vehicle user of the opportunity being in dependence on receipt of the input signal being indicative of a vehicle parameter;
  receiving a request signal indicative of a user request for the performance of at least the portion of the defined manoeuvre with a manoeuvre output means controlled by the control means;
  outputting a manoeuvre signal with a manoeuvre output means controlled by the control means to cause the vehicle to perform the defined manoeuvre in dependence on the request signal.

The vehicle parameter may be a non-speed parameter and may be indicative of at least one of: a status of the vehicle; and a position of the vehicle.

The method may comprise controlling the notification means to output the notification signal indicative of the opportunity for the performance of the portion of the defined manoeuvre without requiring a user activation of the control means to seek determination of the opportunity.

The method may comprise notifying the user of the determination of the opportunity, in dependence on receipt of the input signal and the input signal comprises at least one of:
  an environment signal indicative of a location of at least one feature in a vicinity of the vehicle;
  a motion signal indicative of a motion of the vehicle;
  a steering signal indicative of a user steering input;
  an event signal indicative of a vehicle event; and
  a location signal indicative of a vehicle location.

The method may comprise performing the defined manoeuvre, wherein the defined manoeuvre is a parking manoeuvre.

The method may comprise determining a user-initiated manoeuvre and notifying the user of the opportunity in dependence on the determination of the user-initiated manoeuvre.

The method may comprise receiving an environment signal indicative of a location of at least one feature in the vicinity of the vehicle;
  detecting a vacancy in dependence on the environment signal, the vacancy comprising a vehicle envelope suitable for receiving the vehicle in a defined manoeuvre completed position; and
  determining the opportunity in dependence on the detection of the vacancy.

The vehicle envelope may comprise a target position suitable for receiving the vehicle in the defined manoeuvre completed position. The vehicle envelope may comprise a target defined manoeuvre completed position. The vehicle envelope may be determined in dependence on a one-dimensional property and/or measurement and/or estimation. The vehicle envelope may be determined in dependence on the environment signal being indicative of a length, such as an unobstructed length between features, the unobstructed length being sufficiently long for receiving the vehicle in the defined manoeuvre completed position. The vehicle envelope may be determined in dependence on a two-dimensional property and/or measurement and/or estimation. For example, the vehicle envelope may be determined in dependence on the environment signal being indicative of a length, such as between features, wherein along that length there is no obstruction within a particular width or breadth perpendicular to the length. The particular width or bready may correspond to at least a width or breadth of the vehicle, such as a vehicle width when the vehicle is parked and in a closed configuration, such as with vehicle aperture members closed. The particular width or breadth may correspond to at least a length of the vehicle, such as a vehicle length when the vehicle is parked and in the closed configuration in a perpendicular or parking lot or fishbone diagonal parked position. The vehicle envelope may comprise at least one dimension of a parking area and the defined manoeuvre completed position may be a parked position. The vehicle envelope may correspond to a predefined parking space. The vehicle envelope may comprise a target length, area or volume for receiving the vehicle in or on in the defined manoeuvre completed position.

The method may comprise receiving a request signal indicative of a wired or wirelessly received signal indicative of a user request for vehicle movement.

The method may comprise storing data in a memory means, and determining the opportunity in dependence on the data.

The method may comprise associating the vehicle parameter with the performance of the defined manoeuvre. The vehicle parameter may be selectable from at least two vehicle parameters, the two vehicle parameters including at least a vehicle speed parameter and at least one vehicle additional parameter.

The method may comprise receiving the request signal, wherein the request signal is indicative of a user request to transfer control from the user to the control means for a continuance of a user-initiated manoeuvre as the defined manoeuvre.

The method may comprise, in dependence on the input signal, detecting with the control means the user-initiated manoeuvre, notifying the user of the detection by the control means of the user-initiated manoeuvre; and offering transfer of control to the control means for the continuance of the user-initiated manoeuvre as the defined manoeuvre.

The method may comprise allowing the vehicle to revert to user control prior to completion of the defined manoeuvre to a defined manoeuvre completed position.

The method may comprise determining a location of one or more features in a vicinity of the vehicle with an environment sensing means.

The method may comprise receiving a signal from a mobile device indicative of a user request to perform the defined manoeuvre.

Tenth Technique

According to an aspect of the invention, there is provided a controller arranged to operably cause a vehicle to perform a defined manoeuvre to a defined manoeuvre completed position within a vacancy, with the vehicle selectively offset within the vacancy in the defined manoeuvre completed position.

According to an aspect of the invention, there is provided a controller, comprising: environment input means for receiving an environment signal indicative of a location of at least one feature in a vicinity of a vehicle; control means arranged to determine a vacancy in dependence on the environment signal; the control means being arranged to define within the vacancy at least one defined manoeuvre completed position for the vehicle; user input means for receiving a request signal indicative of a user request; output means for outputting a manoeuvre signal to cause the vehicle to perform a defined manoeuvre to the defined manoeuvre completed position; wherein the control means is arranged to control the output means to selectively offset the defined manoeuvre completed position within the vacancy. Advantageously the defined manoeuvre can be performed to a more preferable defined manoeuvre completed position, not necessarily centrally positioned or aligned.

The controller as described above, wherein:
- the input means may comprise an electrical input for receiving the signal;
- the output means may comprise an electrical output for outputting the signal; and
- the control means may comprise one or more control devices such as electronic processing devices.

The defined manoeuvre may comprise a parking manoeuvre. The parking manoeuvre may comprise an in-parking manoeuvre, such as parking into a space to a stationary position. The parking manoeuvre may comprise an un-parking manoeuvre, such as parking out of a space from a stationary position. The defined manoeuvre completed position may comprise a parked position.

The control means may be arranged to selectively offset the defined manoeuvre completed position in dependence on the request signal. Advantageously the defined manoeuvre can be performed to an offset defined manoeuvre completed position as selected by a user.

The control means may be arranged to selectively offset the defined manoeuvre completed position in dependence on a feature indicated by the environment signal. Advantageously the defined manoeuvre can be performed to a defined manoeuvre completed position that is offset towards or away from a particular feature.

The control means may be arranged to selectively offset the defined manoeuvre completed position in dependence on a proximity to the vehicle of the feature indicated by the environment signal. Advantageously the defined manoeuvre can be performed to position the vehicle a predetermined distance, or a minimum or a maximum distance, from a feature.

The control means may be arranged to selectively offset the defined manoeuvre completed position towards the feature indicated by the environment signal. Advantageously the defined manoeuvre can be performed to a more preferable defined manoeuvre completed position, offset towards a particular feature.

Alternatively, the control means may be arranged to selectively offset the defined manoeuvre completed position away from the feature indicated by the environment. In at least some examples, the control means may be arranged to offset the vehicle towards a first feature and/or away from a second feature.

The feature relative to or from which the vehicle is to be offset may comprise a feature for vehicle alignment therewith. For example, the feature to or from which the vehicle is to be offset may comprise a feature adjacent and/or aligned with the defined manoeuvre completed position. The control means may be arranged to determine the feature as a feature for offsetting and/or alignment. The control means may be arranged to determine whether the feature is an obstacle for avoidance and/or a feature for alignment and/or offsetting the vehicle thereto. For example, the control means may be arranged to determine an orientation of the feature, such as an orientation of at least one surface of the feature and/or an axis (e.g. longitudinal) of the feature. The orientation of the feature may comprise an angle, such as an angle relative to a target defined manoeuvre completed position and/or the vehicle longitudinal axis and/or a target space or envelope for receiving the vehicle. The control means may be arranged to offset and/or align the vehicle relative to features with an orientation comprising a particular angle. For example, the control means may be arranged to offset and/or align the vehicle relative to features that are orientated with an angle (relative to the defined manoeuvre completed position and/or vehicle longitudinal axis) below a threshold. The control means may be arranged to determine features with a particular orientation as features for alignment and/or offsetting. For example, the control means may be arranged to align and offset the vehicle in the defined manoeuvre completed position, the vehicle being aligned and offset with respect to an adjacent feature whereby the adjacent feature has an angle of deviation of, for example, less than 5 degrees, from an original target defined manoeuvre completed position. The control means may be arranged to determine features with another particular orientation, such as above an angle threshold, as obstacles for avoidance and/or manoeuvring around.

The control means may be arranged to determine a vacancy. The control means may be arranged to define at least one vehicle envelope within the vacancy, the vehicle envelope being suitable for receiving the vehicle in the defined manoeuvre completed position. The control means may be arranged to define within the vacancy at least one defined manoeuvre completed position for the vehicle.

The vehicle envelope may comprise a target position suitable for receiving the vehicle in the defined manoeuvre completed position. The vehicle envelope may comprise a target defined manoeuvre completed position. The vehicle envelope may be determined in dependence on a one-dimensional property and/or measurement and/or estimation. The vehicle envelope may be determined in dependence on the environment signal being indicative of a length, such as an unobstructed length between features, the unobstructed length being sufficiently long for receiving the vehicle in the defined manoeuvre completed position. The vehicle envelope may be determined in dependence on a two-dimensional property and/or measurement and/or estimation. For example, the vehicle envelope may be determined in dependence on the environment signal being indicative of a length, such as between features, wherein along that length there is no obstruction within a particular width or breadth perpendicular to the length. The particular width or bready may correspond to at least a width or breadth of the vehicle, such as a vehicle width when the vehicle is parked and in a closed configuration, such as with vehicle aperture members closed. The particular width or breadth may correspond to at least a length of the vehicle, such as a vehicle length when the vehicle is parked and in the closed configuration in a perpendicular or parking lot or fishbone diagonal parked position. The vehicle envelope may comprise at least one dimension of a parking area and the defined manoeuvre completed position may be a parked position. The vehicle envelope may correspond to a pre-defined parking space. The vehicle envelope may comprise a target length, area or volume for receiving the vehicle in or on in the defined manoeuvre completed position.

The control means may be arranged to define at least two vehicle envelopes within the vacancy, each vehicle envelope comprising a discrete defined manoeuvre completed position that is offset within the vacancy.

The vehicle envelopes may be non-overlapping. Alternatively, the vehicle envelopes may be overlapping.

The vehicle envelopes may extend in respective longitudinal directions adjacent and parallel each other. Alternatively, the vehicle envelopes may extend along a same longitudinal axis, with a first vehicle envelope being longitudinally displaced along the longitudinal axis from a second vehicle envelope. In a yet further alternative, the vehicle envelops may be arranged with non-parallel longitudinal axes, such as with a first vehicle envelope having a longitudinal axis perpendicular to a longitudinal axis of a second vehicle envelope.

The control means may be arranged to selectively offset the defined manoeuvre completed position in dependence on a location of a vehicle occupant. Advantageously an offset, such as a direction of offset and/or a magnitude (distance and/or angle) can be adapted to suit a location of a vehicle occupant, such as whether the vehicle occupant is located in or out of the vehicle. The location of the user may be in the vehicle. For example, where all occupants in the vehicle (e.g. a single or lone vehicle driver occupant, such as a driver) is located in a seat or seats on one side of the vehicle (e.g. left side in a left-hand-drive vehicle), then the offset may be to provide a greater clearance or separation of the vehicle on that one side (e.g. to provide more room for access from/to the vehicle for that/those occupant or occupants on that one side). The location of the occupant may be out of the vehicle. For example, where there are no occupants located in the vehicle, another parameter may be more determinate for defining the offset or the default offset.

The controller may comprise memory means for storing data therein, the control means being arranged to selectively offset the defined manoeuvre completed position in dependence on the data. Advantageously the controller may determine an offsetting parameter or criteria using historical data, such as associated with one or more of: a particular location, a scenario, a user and/or a pattern.

The control means may be arranged to adapt the defined manoeuvre completed position in dependence on the environment signal being indicative of a change in at least one feature in the vicinity of the vehicle. Advantageously the defined manoeuvre may be adapted during performance, such as in response to an actual change in the feature, such as a movement, and/or a detected change in the feature, such as a discovery of a previously undetected parameter of the feature (e.g. a previously shielded or undetected void or protrusion or the like).

The controller may comprise notification output means for outputting a notification signal for notifying a user. The control means may be arranged to control the notification output means to notify the user of the determination by the control means of at least one selectable offset defined manoeuvre completed position. Advantageously the offsetting and/or selection thereof may be displayed and optionally offered to the user.

The request signal may be indicative of a received signal indicative of the user request. The signal indicative of the user request may be wiredly or wirelessly received. Advantageously, in at least some examples the user can request an offset, or at least a property of the offset.

The controller may comprise control means arranged to selectively offset the defined manoeuvre completed position in dependence on a mode of performance of at least a portion of the defined manoeuvre. Advantageously, the offset can be adapted to be appropriate for a mode. For example, the controller may be arranged to adapt the offset in dependence on the mode being an occupant in-vehicle mode or an occupant out of vehicle mode. The controller may comprise control means arranged to adapt the offset in dependence on at least one of: an ambient condition in the vicinity of the vehicle (e.g. precipitation, such as rain; temperature; light level; wind; etc.); a terrain in the vicinity of the vehicle (e.g. road surface, off-road surface, smoothness of road surface, etc).

The controller may comprise control means arranged to vary a magnitude of the offset. The magnitude may comprise an angle and/or a distance.

According to an aspect of the invention, there is provided a system, comprising: the controller as described above, arranged to output the manoeuvre signal; and actuator means for receiving the manoeuvre signal to cause the vehicle to perform the defined manoeuvre.

The system may comprise environment sensing means for determining the location of the at least one feature in the vicinity of the vehicle.

The system may comprise receiver means for receiving a signal indicative of the user request and outputting the request signal in dependence thereon.

According to an aspect of the invention, there is provide a method of controlling movement of a vehicle to perform a defined manoeuvre, the method comprising: receiving an environment signal indicative of a location of at least one feature in a vicinity of a vehicle; determining a vacancy in dependence on the environment signal; defining within the vacancy at least one defined manoeuvre completed position for the vehicle; selectively offsetting the defined manoeuvre completed position within the vacancy; and outputting a manoeuvre signal to cause the vehicle to perform the defined manoeuvre to the defined manoeuvre completed position.

The method may comprise receiving a request signal indicative of a user request and selectively offsetting the defined manoeuvre completed position in dependence on the request signal.

The method may comprise selectively offsetting the defined manoeuvre completed position in dependence on a feature indicated by the environment signal.

The method may comprise notifying a user of the determination of at least one offset defined manoeuvre completed position, the offset optionally being selectable.

Eleventh Technique

According to an aspect of the invention, there is provided a controller arranged to operably cause a vehicle to perform a defined manoeuvre with a transition phase during which control is transferable to the user, to allow the vehicle to transition from the defined manoeuvre to a user-controlled post-manoeuvre vehicle movement.

According to an aspect of the invention, there is provided a controller comprising: input means for receiving a user control request signal indicative of a user request for control; output means for outputting a manoeuvre signal to cause a vehicle to perform a defined manoeuvre to a defined manoeuvre completed position; and control means arranged to control the output means to cause the vehicle to perform the defined manoeuvre; wherein the control means is arranged to determine a transition phase of the defined manoeuvre during which control is transferable to the user upon receipt of the user control request signal, to allow the vehicle to transition from the defined manoeuvre to a user-controlled post-manoeuvre vehicle movement. Advantageously, the defined manoeuvre can be performed with control being transferred to the user prior to the defined manoeuvre being completed to a defined manoeuvre completed position.

The controller as described above, wherein:
the input means may comprise an electrical input for receiving the signal;
the output means may comprise an electrical output for outputting the signal; and
the control means may comprise one or more control devices such as electronic processing devices.

The defined manoeuvre may comprise a parking manoeuvre. The parking manoeuvre may comprise an in-parking manoeuvre, such as parking into a space to a stationary position. The parking manoeuvre may comprise an un-parking manoeuvre, such as parking out of a space from a stationary position. The defined manoeuvre completed position may comprise a parked position.

The transition phase may be defined between a transition position and the completed position of the defined manoeuvre, with the controller being arranged to allow transfer of control to the user at any point of the transition phase between the transition position and the defined manoeuvre completed position. Advantageously, the transition phase is defined between two positions to provide more than a single transition position, allowing transfer at multiple positions.

The controller may comprise a notification output means for outputting a notification signal for notifying the user of commencement of the transition phase. Advantageously, the user may be explicitly alerted to the possibility of transferring control.

The control means may be arranged to provide a phased transfer to user control. Advantageously, assistance may be provided during a phased control transfer, such as to allow a smooth transition.

The control means may be arranged to determine the transition phase such that no change in a lateral direction of movement of the vehicle is required during the transition phase to complete the defined manoeuvre to the defined manoeuvre completed position. Advantageously, the vehicle can be moved to the defined manoeuvre completed position from any position of the transition phase without requiring any change in the lateral direction (e.g. without requiring a change or reversal of movement of the steering wheel).

The control means may be arranged to determine the transition phase such that no change in a longitudinal direction of movement of the vehicle is required during the transition phase to complete the defined manoeuvre to the defined manoeuvre completed position. Advantageously, the controller may ensure that the vehicle can continue in a single longitudinal direction (e.g. forwards, without reversing) after initiation of the transition phase, such that only a single continuous longitudinal movement of the vehicle s required (e.g. without requiring a change of gear and/or longitudinal direction).

The controller may comprise input means for receiving an environment signal indicative of a location of one or more features in a vicinity of a vehicle; and wherein the control means is arranged to determine the transition phase to correspond to a portion of the defined manoeuvre after a feature in the vicinity of the vehicle has been cleared. Advantageously, the control means may be arranged to prevent control transfer to the user before a feature has been cleared, such as to prevent or mitigate against contact of the vehicle with the feature.

The control means may be arranged to be over-ridden at any point of the defined manoeuvre, including outside the transition phase (e.g. prior to the transition phase). Advantageously, the control means may be arranged to allow the user to interrupt the defined manoeuvre at any juncture. The overriding may interrupt the defined manoeuvre so as to cancel the defined manoeuvre.

The control means may be arranged to allow control transfer to the user during the transition phase without interrupting the defined manoeuvre. Advantageously, the control means can enable control transfer without entirely cancelling the defined manoeuvre.

The control means may be arranged to allow transfer to the user of a control of an output signal to a motive control means during at least a motive control portion of the transition phase. Advantageously, the transition phase may define a particular portion whereby control of a speed or acceleration of the vehicle can be at least partially transferred.

The control means may be arranged to allow transfer to the user of a control of an output signal to a steering control means during at least a steering control portion of the transition phase. Advantageously, the transition phase may define a particular portion whereby control of a steering of the vehicle can be at least partially transferred. The steering control portion may be different from the motive control portion. In at least some examples, the commencement of allowance of control transfer for the steering may be non-contemporaneous with the commencement of allowance of control transfer for the speed or acceleration of the vehicle. For example, where further steering is still required to clear a feature in the vicinity of the vehicle, but no change in longitudinal direction is required, at least partial control of the vehicle speed may be transferred to the user, whilst control of the steering is still fully by or with the control means.

The controller may comprise input means for receiving a request signal indicative of a received signal indicative of a user request. The request signal may be indicative of a wired or a wirelessly received signal indicative of a user request, such as from a users mobile device. Advantageously this may allow the vehicle to be effectively instructed from a users mobile device, such as remotely instructed with the user out of the vehicle.

The user may comprise an occupant. The user may comprise a driver of the vehicle. The user may be located in the vehicle. The user may be located out of the vehicle, such as for at least a portion of performance of the defined manoeuvre. The vehicle may comprise one or more non-driver occupants. In at least some examples, one or more users and/or occupants may be located in and/or out of the vehicle.

In an absence of the user input during the transition phase, the control means may be arranged to control the output means to control the vehicle to perform the defined manoeuvre to the defined manoeuvre completed position for subsequent transfer of control to the user after completion of the defined manoeuvre. Advantageously the defined manoeuvre can still be completed without requiring any control transfer.

The control means may be arranged to determine a vacancy. The control means may be arranged to define at least one vehicle envelope within the vacancy, the vehicle envelope being suitable for receiving the vehicle in the defined manoeuvre completed position. The control means may be arranged to define within the vacancy at least one defined manoeuvre completed position for the vehicle.

The vehicle envelope may comprise a target position suitable for receiving the vehicle in the defined manoeuvre completed position. The vehicle envelope may comprise a target defined manoeuvre completed position. The vehicle envelope may be determined in dependence on a one-dimensional property and/or measurement and/or estimation. The vehicle envelope may be determined in dependence on the environment signal being indicative of a length, such as an unobstructed length between features, the unobstructed length being sufficiently long for receiving the vehicle in the defined manoeuvre completed position. The vehicle envelope may be determined in dependence on a two-dimensional property and/or measurement and/or estimation. For example, the vehicle envelope may be determined in dependence on the environment signal being indicative of a length, such as between features, wherein along that length there is no obstruction within a particular width or breadth perpendicular to the length. The particular width or bready may correspond to at least a width or breadth of the vehicle, such as a vehicle width when the vehicle is parked and in a closed configuration, such as with vehicle aperture members closed. The particular width or breadth may correspond to at least a length of the vehicle, such as a vehicle length when the vehicle is parked and in the closed configuration in a perpendicular or parking lot or fishbone diagonal parked position. The vehicle envelope may comprise at least one dimension of a parking area and the defined manoeuvre completed position may be a parked position. The vehicle envelope may correspond to a predefined parking space. The vehicle envelope may comprise a target length, area or volume for receiving the vehicle in or on in the defined manoeuvre completed position.

The control means may be arranged to define at least two vehicle envelopes within the vacancy, each vehicle envelope comprising a discrete defined manoeuvre completed position that is offset within the vacancy.

The two vehicle envelopes may be non-overlapping. Alternatively, the two vehicle envelopes may be overlapping.

The two vehicle envelopes may extend in respective longitudinal directions adjacent and parallel each other. Alternatively, the two vehicle envelopes may extend along a same longitudinal axis, with a first vehicle envelope being longitudinally displaced along the longitudinal axis from a second vehicle envelope. In a yet further alternative, the vehicle envelops may be arranged with non-parallel longitudinal axes, such as with a first vehicle envelope having a longitudinal axis perpendicular to a longitudinal axis of a second vehicle envelope.

According to an aspect of the invention, there is provided a system, comprising: the controller as described above, arranged to output the manoeuvre signal; and an actuator means for receiving the manoeuvre signal to cause the vehicle to perform the defined manoeuvre.

The system may comprise user input means for receiving the user request for control transfer.

The system may comprise a notification means for notifying the user of commencement of the transition phase.

The system may comprise receiver means for receiving a signal indicative of a user request for vehicle movement and outputting a request signal in dependence thereon. The receiver means may be for receiving a wired and/or wireless signal from a mobile device indicative of the user request. Advantageously user requests can be received originating from external to the vehicle, so as to allow mode selection in at least some instances whilst the occupant is out of the vehicle.

The system may comprise environment sensing means for determining the location of one or more features in the vicinity of the vehicle and outputting the environment signal indicative thereof.

According to an aspect of the invention, there is provided a method of controlling movement of a vehicle to perform a defined manoeuvre, the method comprising: controlling an output means with a control means to cause the vehicle to perform the defined manoeuvre; determining a transition phase of the defined manoeuvre during which control is transferable to a user upon receipt of a user control request signal; transferring control to the user in dependence upon receipt of the user control request signal being during the transition phase, to allow the vehicle to transition from the defined manoeuvre to a user-controlled post-manoeuvre vehicle movement.

The method may comprise allowing the vehicle to transition to user control prior to completion of the defined manoeuvre.

The method may comprise: receiving an environment signal indicative of a location of one or more features in a vicinity of the vehicle; clearing a feature in the vicinity of the vehicle during a pre-transition phase of the defined manoeuvre; and commencing the transition phase after clearing the feature in the vicinity of the vehicle.

The method may comprise determining the location of the one or more features with an environment sensing means.

The method may comprise commencing the transition phase when the defined manoeuvre can be completed with no changes in a longitudinal direction of movement of the vehicle.

The method may comprise receiving a signal from a mobile device indicative of a user request to perform the defined manoeuvre.

The method may comprise overriding the control means at any phase of the defined manoeuvre.

Twelfth Technique

According to an aspect of the invention, there is provided a controller arranged to operably cause a vehicle to continue a user-initiated manoeuvre as a defined manoeuvre.

According to an aspect of the invention, there is provided a controller comprising: input means for receiving an input signal; manoeuvre output means for outputting a manoeuvre signal to cause a vehicle to perform a defined manoeuvre; control means arranged to control the manoeuvre output means; notification output means for outputting a notification signal for notifying a user; and request input means for receiving a request signal indicative of a user request for a transfer of control from the user to the control means for a continuance of a user-initiated manoeuvre as a defined manoeuvre; the control means being arranged to control the manoeuvre output means to perform the defined manoeuvre from a user-initiated manoeuvre end position in dependence on the request signal. Advantageously, the vehicle may be caused to perform a defined manoeuvre from a non-specific defined manoeuvre start position, such as corresponding to any user-initiated manoeuvre end position or not a prescribed defined manoeuvre start position.

The controller as described above, wherein:
the input means may comprise an electrical input for receiving the signal;
the output means may comprise an electrical output for outputting the signal; and the control means may comprise one or more control devices such as electronic processing devices.

The defined manoeuvre may comprise a parking manoeuvre. The parking manoeuvre may comprise an in-parking manoeuvre, such as parking into a space to a stationary position. The parking manoeuvre may comprise an un-parking manoeuvre, such as parking out of a space from a stationary position. The defined manoeuvre completed position may comprise a parked position.

The user-initiated manoeuvre may comprise a parking manoeuvre. The user-initiated parking manoeuvre may comprise a partial parking manoeuvre, such as to an incomplete parking position (e.g. not fully in or out of a parking place). The parking manoeuvre may comprise an in-parking manoeuvre, such as parking into a space to a stationary position. The parking manoeuvre may comprise an un-parking manoeuvre, such as parking out of a space from a stationary position. The user-initiated manoeuvre end position may comprise a stationary vehicle position.

The control means may be arranged to detect performance of the user-initiated manoeuvre, in dependence on the input signal. The control means may be arranged to control the notification output means to notify the user of the detection by the control means of the user-initiated manoeuvre. Advantageously, the user may be alerted to a possibility of the performance of the defined manoeuvre.

The control means may be arranged to control the notification output means to automatically output the notification signal on detection by the control means of the user-initiated manoeuvre. The control means may be arranged to offer the user continuance as a defined manoeuvre. Advantageously the user may be offered the possibility of the performance of the defined manoeuvre without necessarily explicitly requesting or seeking the possibility.

The control means may be arranged to control the notification output means to output the notification signal independently of a user request for the manoeuvre output means to be controlled by the control means. Advantageously, the controller may be configured to automatically output the notification signal without requiring an activation of the control means by the vehicle user. For example, the user may otherwise be unaware of the possibility of the performance of a defined manoeuvre (such as in a particular scenario) such that allowing the notification signal to be output independently of the user request may allow the user to be offered the possibility of more or more useful defined manoeuvres (e.g. compared to only those expressly sought by the user in advance).

The control means may be arranged to control the notification output means in dependence at least partially on the input signal received prior to the user-initiated manoeuvre to the user-initiated manoeuvre end position. Advantageously the control means may be able to determine from the prior input signal whether one or more defined manoeuvres is possible (e.g. where the prior input signal comprised data no longer available via a corresponding input means).

The control means may be configurable to suppress the notification output means, such as from notifying the vehicle user of the detection by the control means of the user-initiated manoeuvre. Advantageously, the user can customise the control means. For example, in a scenario or type of scenario where the user may not wish to perform a defined manoeuvre (e.g. where the user has a different identity, such as when the vehicle has a different driver), then the control means can be configured not to notify the user.

The control means may be arranged to control the manoeuvre output means to cause the vehicle to follow a planned trajectory from the user-initiated manoeuvre end position to a defined manoeuvre completed position. Advantageously, the control means can determine a trajectory in advance for the vehicle to perform the defined manoeuvre.

The planned trajectory may comprise at least a partial correction of the user-initiated manoeuvre performed prior to the user request. Advantageously, at least a portion of the user-initiated manoeuvre can be corrected or undone. For example, where a user has entered or partially entered a parking space or location suboptimally in a user-initiated parking manoeuvre, such as at an unsuitable angle of the vehicle relative to the space or location, the control means may be arranged to more suitably position the vehicle in the space or location; and/or arranged to remove the vehicle from the parking space or location (e.g. to entirely restart the parking as a defined manoeuvre).

The control means may be arranged to control the manoeuvre output means to cause the vehicle to perform a reversal of at least a portion of the user-initiated manoeuvre performed prior to the defined manoeuvre.

The controller may comprise memory means for storing data therein, the memory means being arranged to store data received via the input means.

The stored data may be indicative of a previously performed defined manoeuvre.

The control means may be arranged to control the manoeuvre output means to cause the vehicle to perform a repetition of at least a portion of the previously performed defined manoeuvre. The performance may be selective.

The control means may be arranged to control the manoeuvre output means to cause the vehicle to perform a reversal of at least a portion of the previously performed defined manoeuvre. The reversal may comprise a contra-manoeuvre or inversion. For example, the reversal may comprise an unparking manoeuvre of a previous parking manoeuvre, or a parking manoeuvre of a previous unparking manoeuvre.

The stored data may be indicative of a previously performed user-initiated manoeuvre.

The control means may be arranged to control the notification output means to notify the user in dependence on the previously-performed user-initiated manoeuvre having been followed by a defined manoeuvre.

The control means may be arranged to control the manoeuvre output means to perform the defined manoeuvre from a user-defined start position for the defined manoeuvre, the user-defined start position for the defined manoeuvre corresponding to the user-initiated manoeuvre end position. The start position for the defined manoeuvre may comprise an intermediate manoeuvre position, such as partially in and/or out of a vacancy The input means may be arranged to receive a plurality of input signals from a plurality of input sources, the plurality of input signals being selected from at least:
 an environment signal indicative of a feature in a vicinity of the vehicle;
 a motion signal indicative of a motion of the vehicle;
 a steering signal indicative of a user steering;
 an event signal indicative of a vehicle event; and
 a location signal indicative of a geographical location.

The controller may comprise input means for receiving a request signal indicative of a received signal indicative of a user request. The request signal may be indicative of a wired or a wirelessly received signal indicative of a user request, such as from a users mobile device. Advantageously this may allow the vehicle to be effectively instructed from a users mobile device, such as remotely instructed with the user out of the vehicle.

The user may comprise an occupant. The user may comprise a driver of the vehicle. The user may be located in the vehicle. The user may be located out of the vehicle, such as for at least a portion of performance of the defined manoeuvre. The vehicle may comprise one or more non-driver occupants. In at least some examples, one or more users and/or occupants may be located in and/or out of the vehicle.

The control means may be arranged to determine the vacancy. The control means may be arranged to define at least one vehicle envelope within the vacancy, the vehicle envelope being suitable for receiving the vehicle in the defined manoeuvre completed position. The control means may be arranged to define within the vacancy at least one defined manoeuvre completed position for the vehicle.

The vehicle envelope may comprise a target position suitable for receiving the vehicle in the defined manoeuvre completed position. The vehicle envelope may comprise a target defined manoeuvre completed position. The vehicle envelope may be determined in dependence on a one-dimensional property and/or measurement and/or estimation. The vehicle envelope may be determined in dependence on the environment signal being indicative of a length, such as an unobstructed length between features, the unobstructed length being sufficiently long for receiving the vehicle in the defined manoeuvre completed position. The vehicle envelope may be determined in dependence on a two-dimensional property and/or measurement and/or estimation. For example, the vehicle envelope may be determined in dependence on the environment signal being indicative of a length, such as between features, wherein along that length there is no obstruction within a particular width or breadth perpendicular to the length. The particular width or bready may correspond to at least a width or breadth of the vehicle, such as a vehicle width when the vehicle is parked and in a closed configuration, such as with vehicle aperture members closed. The particular width or breadth may correspond to at least a length of the vehicle, such as a vehicle length when the vehicle is parked and in the closed configuration in a perpendicular or parking lot or fishbone diagonal parked position. The vehicle envelope may comprise at least one dimension of a parking area and the defined manoeuvre completed position may be a parked position. The vehicle envelope may correspond to a pre-defined parking space. The vehicle envelope may comprise a target length, area or volume for receiving the vehicle in or on in the defined manoeuvre completed position.

The control means may be arranged to define at least two vehicle envelopes within the vacancy, each vehicle envelope comprising a discrete defined manoeuvre completed position that is offset within the vacancy.

The two vehicle envelopes may be non-overlapping. Alternatively, the two vehicle envelopes may be overlapping.

The two vehicle envelopes may extend in respective longitudinal directions adjacent and parallel each other. Alternatively, the two vehicle envelopes may extend along a same longitudinal axis, with a first vehicle envelope being longitudinally displaced along the longitudinal axis from a second vehicle envelope. In a yet further alternative, the vehicle envelops may be arranged with non-parallel longitudinal axes, such as with a first vehicle envelope having a longitudinal axis perpendicular to a longitudinal axis of a second vehicle envelope.

According to an aspect of the invention, there is provided a system, comprising: the controller as described above, arranged to output the manoeuvre signal; and actuator means for receiving the manoeuvre signal to cause the vehicle to perform the defined manoeuvre.

The system may comprise environment sensing means for determining the location of one or more features in the vicinity of the vehicle; and for outputting the environment signal indicative thereof.

The system may comprise receiver means. The receiver means may be for receiving a user signal indicative of the user request for continuance of the user-initiated manoeuvre as the defined manoeuvre with the manoeuvre output means controlled by the control means. The receiver means may be for outputting the request signal in dependence on receipt of the user signal. The receiver means may be for receiving a wired and/or wireless signal, such as from a mobile device indicative of the user request. Advantageously user requests can be received originating from external to the vehicle, so as to allow defined manoeuvre performance in at least some instances whilst the occupant is out of the vehicle.

The system may comprise a notification means for notifying the user.

According to an aspect of the invention, there is provided a method of controlling movement of a vehicle to perform a defined manoeuvre, the method comprising:
  performing a user-initiated manoeuvre to a user-initiated manoeuvre end position;
  receiving a request signal indicative of a user request to transfer control from a user to a control means for a continuance of the user-initiated manoeuvre as a defined manoeuvre;
  controlling with the control means a manoeuvre output means to output a manoeuvre signal to cause the vehicle to perform the defined manoeuvre from the user-initiated manoeuvre end position.

The method may comprise receiving an input signal; and outputting a notification signal for notifying a user.

The method may comprise, in dependence on the input signal, detecting with the control means the user-initiated manoeuvre, notifying the user of the detection by the control means of the user-initiated manoeuvre; and offering transfer of control to the control means for the continuance of the user-initiated manoeuvre as the defined manoeuvre.

The method may comprise allowing the vehicle to revert to user control prior to completion of the defined manoeuvre to a defined manoeuvre completed position.

The method may comprise determining a location of one or more features in a vicinity of the vehicle with an environment sensing means.

The method may comprise receiving a signal from a mobile device indicative of a user request to perform the defined manoeuvre.

For all techniques, according to an aspect of the invention, there is provided a vehicle comprising a controller according to an aspect of the invention, a system according to an aspect of the invention or arranged to perform a method according to an aspect of the invention.

For all techniques, according to an aspect of the invention, there is provided computer software which, when executed by a processing means, is arranged to perform a method according to an aspect of the invention. The computer software may be stored on a computer readable medium. The computer software may be tangibly stored on a computer readable medium. The computer readable medium may be non-transitory.

Any controller or controllers described herein may suitably comprise a control unit or computational device having one or more electronic processors. Thus the system may comprise a single control unit or electronic controller or alternatively different functions of the controller may be embodied in, or hosted in, different control units or controllers. As used herein the term "controller" or "control unit" will be understood to include both a single control unit or controller and a plurality of control units or controllers in a control system collectively operating to provide any stated control functionality. To configure a controller, a suitable set of instructions may be provided which, when executed, cause said control unit or computational device to implement the control techniques specified herein. The set of instructions may suitably be embedded in said one or more electronic processors. Alternatively, the set of instructions may be provided as software saved on one or more memory associated with said controller to be executed on said computational device. A first controller may be implemented in software run on one or more processors. One or more other controllers may be implemented in software run on one or more processors, optionally the same one or more processors as the first controller. Other suitable arrangements may also be used.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

The twelve main techniques identified above can be used separately, or together, in any practical combination.

BRIEF DESCRIPTION OF THE DRAWINGS

One or more embodiments of the invention will now be described by way of example only, with reference to the accompanying drawings, in which:

FIG. 5 shows a vehicle according to an embodiment of the invention;

FIG. 7a shows a vehicle in relation to a feature in a vicinity of the vehicle;

FIG. 9 shows a system according to an embodiment of the invention;

FIG. 11a, shows the vehicle according to an embodiment of the invention in a scenario based on that of FIG. 7a;

FIG. 13a shows a vehicle in relation to a feature in a vicinity of the vehicle;

FIG. 13b shows the vehicle in relation to the feature in the vicinity of the vehicle in another scenario;

FIG. 17 illustrates movement of a vehicle according to an embodiment of the invention;

FIG. 25a shows a vehicle in relation to a feature in a vicinity of the vehicle;

FIG. 25b shows the vehicle in relation to the feature in the vicinity of the vehicle in another scenario;

FIG. 29a illustrates movement of a vehicle according to an embodiment of the invention;

FIG. 29b illustrates movement of the vehicle in another scenario;

FIGS. 41a to 41e illustrate sequentially the vehicle performing a defined manoeuvre according to an embodiment of the invention;

FIG. 41f illustrates the vehicle following a performance of a portion of a defined manoeuvre as an alternative to that shown in FIGS. 41d and 41e;

FIG. 41g illustrates a position of the vehicle following a movement of the vehicle according to an embodiment of the invention in a scenario similar to FIG. 37b;

FIG. 41h illustrates a position of the vehicle following another movement of the vehicle to an embodiment of the invention in a scenario similar to FIG. 37b;

FIG. 41i illustrates a position of the vehicle according to an embodiment of the invention following a defined manoeuvre in another scenario;

FIG. 41j illustrates a position of the vehicle according to an embodiment of the invention following a defined manoeuvre in a scenario similar to FIG. 41i;

FIGS. 47a, 47b, 47c and 47d illustrate movement of a vehicle according to an embodiment of the invention;

FIG. 49a shows a vehicle in relation to a feature in a vicinity of the vehicle;

FIG. 49b shows the vehicle in relation to the feature in the vicinity of the vehicle in another scenario;

FIG. 53a illustrates movement of a vehicle according to an embodiment of the invention;

FIG. 53b illustrates movement of a vehicle according to an embodiment of the invention in another scenario;

FIG. 55a shows a vehicle in relation to a feature in a vicinity of the vehicle;

FIG. 55b shows the vehicle in relation to the feature, in another scenario;

FIG. 59a, shows the vehicle according to an embodiment of the invention in a scenario based on that of FIG. 55a;

FIGS. 59b, 59c and 59d illustrate the vehicle in scenarios based on that of FIG. 55b;

FIG. 63 shows a system according to an embodiment of the invention;

FIGS. 65a, 65b, 65c and 65d sequentially illustrate the vehicle performing a defined manoeuvre based on the scenario of FIG. 61;

FIG. 71a illustrates movement of a vehicle according to an embodiment of the invention;

FIG. 71b illustrates movement of a vehicle according to an embodiment of the invention in another scenario.

DETAILED DESCRIPTION

First Technique

Figure 1A:
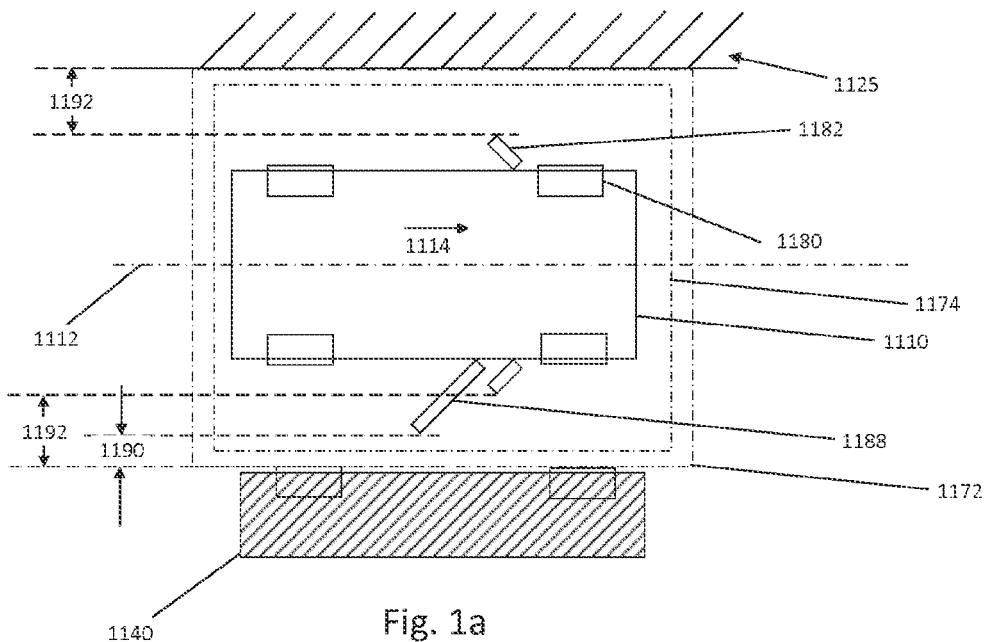
FIG. 1a shows a vehicle in relation to a feature in a vicinity of the vehicle.
Figure 1B:
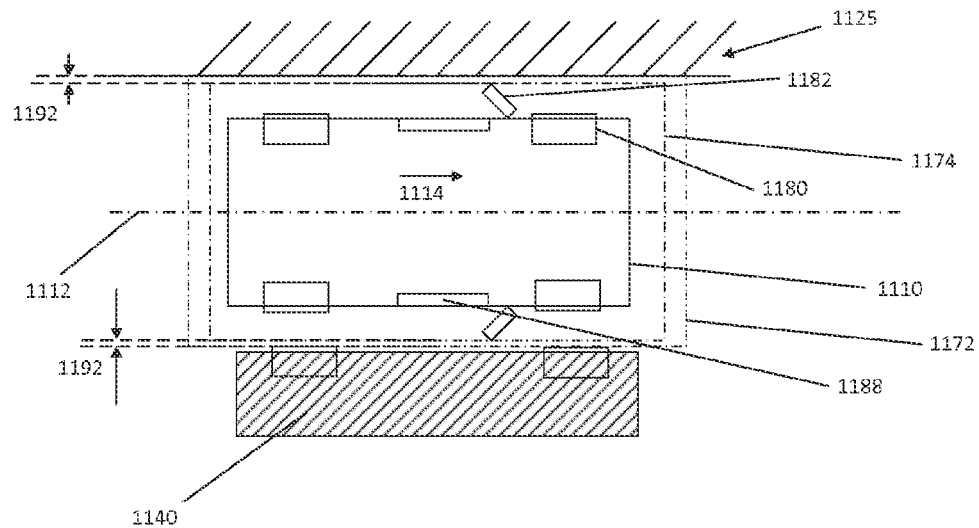
FIG. 1b shows the vehicle in relation to the feature in the vicinity of the vehicle in another scenario.

FIGS. 1a and 1b illustrate a vehicle 1110 according to an embodiment of the invention in two different scenarios. In both scenarios, the vehicle 1110 is illustrated at a defined manoeuvre completed position, each with a separation 1192 of the vehicle 1110 in a closed configuration from a feature 1125 in a vicinity of the vehicle 1110, as will be explained.

In FIG. 1(a) the vehicle 1110 is at the defined manoeuvre completed position where a defined manoeuvre has been performed with an occupant-in-vehicle mode. The defined manoeuvre completed position of FIG. 1a is intended to be a parked position of the vehicle 1110 whereby the occupant can exit and/or enter the vehicle 1110 via a vehicle aperture accessed by opening a vehicle aperture member 1188. The vehicle 1110 is shown in relation to a feature 1125 in a vicinity of the vehicle 1110. The feature 1125 is, in this example, an object which is a wall that is generally parallel to a central longitudinal axis 1112 of the vehicle 1110 i.e. generally parallel to a side of the vehicle 1110, such as a left side here—in the defined manoeuvre completed position. The object is not limited to being a wall 1125 and may be, for example, a bollard, wall or other object at, on or adjacent a ground surface for the vehicle 1110, such as a road. There is a separation 1192 provided between the vehicle 1110 in a closed configuration at the defined manoeuvre completed position. In FIG. 1(a), the separation 1192 is such that allows the vehicle aperture member 1188 to be opened, shown here with a separation 1190 between the vehicle 1110 in the open configuration of FIG. 1(a) and a feature in the vicinity of the vehicle, shown here as an adjacent object 1140, such as an adjacent vehicle.

In FIG. 1(b) the vehicle 1110 is at a position intended to be a parked position of the vehicle 1110 whereby access to or via the vehicle aperture is restricted. The vehicle 1110 is again shown in FIG. 1(b) in relation to the feature 1125 in the vicinity of the vehicle 1110, and the adjacent object 1140, with the adjacent object 1140 and the feature 1125 being closer than in FIG. 1(a) such that the vacancy 1172 and vehicle envelope 1174 therebetween is smaller. In the scenario shown in FIG. 1(b), opening of the vehicle aperture member 1188 is prevented or at least restricted by the adjacent feature 1125 and object 1140, such that the vehicle 1110 is shown in a closed configuration in FIG. 1(b). Accordingly, an occupant may have difficulty, or even be prevented from, getting into and/or out of the vehicle.

Embodiments of the present invention aim to ameliorate one or both of these problems.

It will be understood in both cases shown in FIGS. 1(a) and (b) that the defined manoeuvre may be a manoeuvre of the vehicle 1110 which is performed automatically by the vehicle 1110 i.e. under control of one or more systems of the vehicle 1110. The defined manoeuvre may be considered to be performed automatically by the vehicle 1110, or at least semi autonomously. In FIGS. 1(a) and 1(b) the defined manoeuvre may be a parking manoeuvre to control the vehicle 1110 to drive into a parking structure or parking place bounded by the adjacent feature 1125 and object 1140.

To perform the defined manoeuvre, the vehicle 1110 comprises environment sensing means for determining a location of features 1125 in the vicinity of the vehicle 1110. The environment sensing means may comprise one or more sensing devices or imaging devices. The one or more sensing devices may emit radiation and receive radiation reflected from the features in the vicinity of the vehicle, such as ultrasonic sensing devices, although it will be appreciated that the present invention is not limited in this respect. Such environment sensing means have a minimum distance to which accuracy the location of the features 1125 may be determined due to, for example, a resolution of an imaging device or a signal-to-noise ratio of a sensing device.

The feature or features sensed by the environment sensing means may be such as to have an actual and/or a perceived effect on the performance of the defined manoeuvre, such as physically and/or psychologically influencing a users experience of performance of the defined manoeuvre.

In FIG. 1(a) the vehicle 1110 is at the defined manoeuvre completed position where the defined manoeuvre has been performed with an occupant-in-vehicle mode. In FIG. 1(b) the vehicle 1110 is at the defined manoeuvre completed position where the defined manoeuvre has been performed with an occupant-out-of-vehicle mode, intended to be a parked position of the vehicle 1110 whereby access to or via the vehicle aperture is restricted.

In both situations, it may be advantageous for the manoeuvre or manoeuvres to be performed whilst a person in control of the vehicle 1110 is external to the vehicle 1110. For example, access to the vehicle 1110 may be limited in FIG. 1(a) or 1(b) after performing the defined manoeuvre (e.g. where the feature 1125 is a wall or other hindrance to opening a vehicle door). In some scenarios a subsequent performance of a defined manoeuvre, such as to unpark the vehicle 1110, may be performed with a different availability of modes. For example, where a defined manoeuvre may be performed to the defined manoeuvre completed position of FIG. 1(a) with the occupant located either in or out of the vehicle 1110, if the adjacent object 1140 is moved or replaced by a further object whereby the separation 1190 is reduced such that the vehicle aperture member 1188 cannot be adequately opened, then the occupant-in-vehicle mode or modes may not be available.

In FIGS. 1(a) and 1(b), the vehicle 1110 is illustrated as having a vehicle forward direction, indicated by arrow 1114, as can be appreciated by FIG. 1(b) in particular, the vehicle envelope 1174 can correspond to the vacancy 1172. As will be further explained, the properties of the vacancy 1172, such as the dimensions, can be determinativee for suitability of one or more modes for performing the defined manoeuvre. As described here, the control means is not required to distinguish or specifically differentiate between the vacancy 1172 and the vehicle envelope 1174. Accordingly, assessment of suitability of one or more modes can be based purely on the vacancy 1172 or vehicle envelope 1174 without requiring discrete steps for each of the vacancy 1172 and vehicle envelope 1174. For example, the control means is arranged to determine that a vacancy 1172 is of a sufficient dimension or dimensions to inherently comprise a vehicle envelope 1174 suitable for receiving the vehicle 1110 in the defined manoeuvre completed position in a first mode, such as the occupant-out-of-vehicle mode. The control means is arranged to determine whether the sufficient dimension or dimensions of the vacancy 1172 is/are great enough to allow receipt of the vehicle 1110 in the defined manoeuvre completed position with access to or via the one or more vehicle apertures, such that a second mode may also be suitable, such as the occupant-in-vehicle mode.

Figure 2:
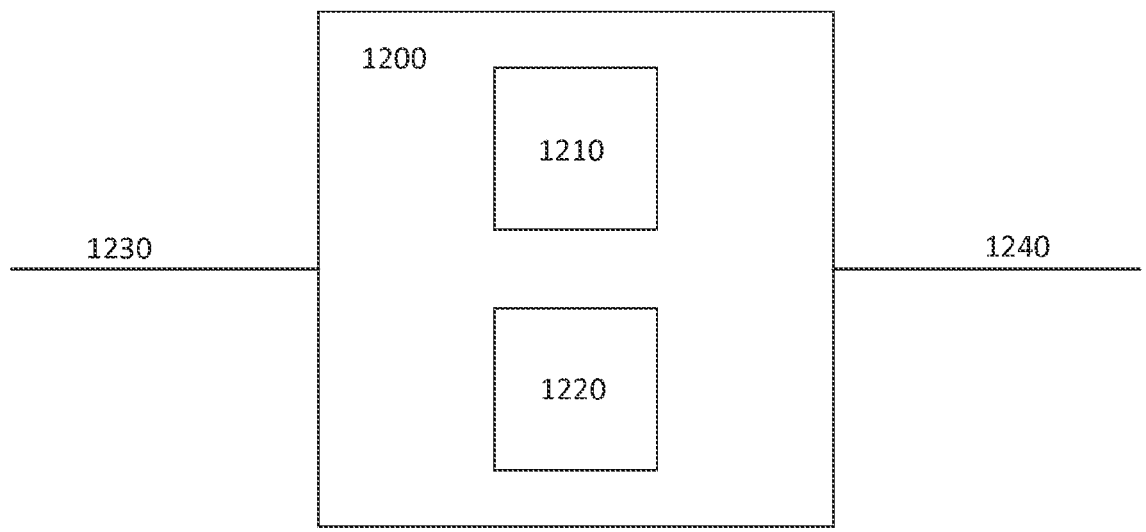
FIG. 2 shows a controller according to an embodiment of the invention.
Figure 6:
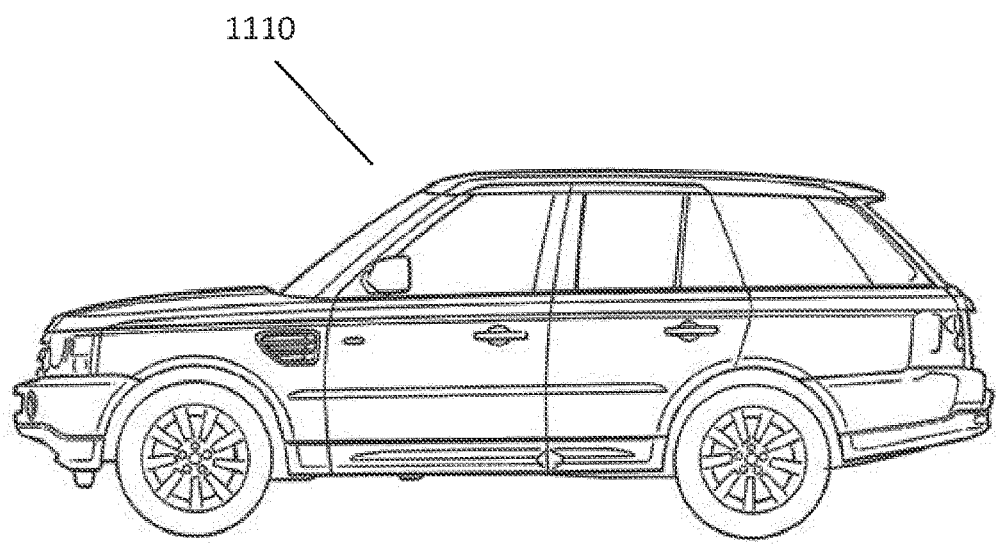
FIG. 6 is a vehicle according to an embodiment of the invention.

FIG. 2 illustrates a controller 1200 or control unit 1200 according to an embodiment of the invention, such as comprised in the vehicle 1110 of FIG. 1.

The controller 1200 comprises a control means 1210, input means 1230 and output means 1240. In some embodiments the controller comprises a memory means 1220 such as one or more memory devices 1220 for storing data therein. The output means 1240 may comprise an electrical output for outputting a manoeuvre signal. The manoeuvre signal represents an instruction for the vehicle 1110 to move.

Here, the input means 1230 is for receiving an environment signal indicative of the features 1125 1140 in the vicinity of the vehicle 1110. The control means 1210 is arranged to control the output means 1240 to cause the vehicle 1110 to perform at least a portion of the defined manoeuvre in dependence on the environment signal. Here, the controller comprises a second output means for outputting a mode signal indicative of selectable modes. The control means is arranged to output the mode signal indicative of a plurality of modes. The mode for performing the defined manoeuvre is selectable from the plurality of selectable modes by a user in dependence upon the mode signal. In at least some examples, the second output means comprises a notification output means. Advantageously, the user can be notified of the availability of one or more modes, allowing the user to select their preferred mode where available. For example, prior to performing the defined manoeuvre to the defined manoeuvre completed position of FIG. 1(b), or a subsequent defined manoeuvre therefrom, the user can be notified of one or more occupant-out-of-vehicle modes for performing the defined manoeuvre. Similarly, prior to performance of a defined manoeuvre to or from the defined manoeuvre completed position of FIG. 1(a), the user may be notified of the availability of one or more modes of both occupant-out-of-vehicle and occupant-in-vehicle modes for performing the defined manoeuvre or manoeuvres.

Here, the control means 1210 is arranged to provide a mode signal indicative of no mode being selectable, corresponding to the vehicle envelope 1174 being unsuitable for receiving the vehicle 1110. Accordingly, the user is made aware by notification that a vehicle envelope or vacancy has been identified, but that it is unsuitable for performance of the defined manoeuvre—for example, where a vehicle envelope is too small for even the occupant-out-of-vehicle mode of performance of a defined manoeuvre (e.g. whereby the adjacent feature 1125 and object 1140 are closer together than in FIG. 1(*b*) with insufficient dimensions for receiving or accommodating the vehicle 1110 even in the closed configuration.

To perform the defined manoeuvre, the vehicle 1110 comprises environment sensing means for determining a location of features in the vicinity of the vehicle 1110. The environment sensing means may comprise one or more sensing devices or imaging devices. The one or more sensing devices may emit radiation and receive radiation reflected from the features in the vicinity of the vehicle, such as ultrasonic sensing devices, although it will be appreciated that the present invention is not limited in this respect. Such environment sensing means have a minimum distance to which accuracy the location of the features may be determined due to, for example, a resolution of an imaging device or a signal-to-noise ratio of a sensing device.

Once in the defined manoeuvre completed position (e.g. FIG. 1(*a*) or 1(*b*)), the user typically applies a parking brake, to leave the vehicle stationary with the engine switched off.

The control means 1210 may be formed by one or more electronic processing devices such as an electronic processor. The processor may operably execute computer readable instructions stored in the one or more memory devices 1220. The control means 1210 is arranged to control the output means 1240 to output the manoeuvre signal in dependence on the environment signal, as will be explained. In some embodiments the input means 1230 and output means 1240 may be combined such as by being formed by an I/O unit or interface unit. For example, the controller 1210 may comprise an interface to a network forming a communication bus of a vehicle. The communication bus may be a communication bus such as Ethernet using a suitable communication protocol such as the Internet Protocol (IP), although embodiments of the invention are not limited in this respect.

Here, the input means 1230 comprises an electrical input for receiving the environment signal. The input means 1230 may comprise an electrical input for receiving a request signal. In at least some examples, the controller 1210 comprises a further input means for receiving a request signal indicative of a received signal indicative of a user request. The request signal may be indicative of a wired or a wirelessly received signal indicative of a user request, such as from a users mobile device. Advantageously this may allow the vehicle to be effectively instructed from a users mobile device, such as remotely instructed. The user request may comprise the mode selection.

The user may comprise an occupant. The user may comprise a driver of the vehicle. The user may be located in the vehicle. The user may be located out of the vehicle, such as for at least a portion of performance of the defined manoeuvre. The vehicle may comprise one or more non-driver occupants. In at least some examples, one or more users and/or occupants may be located in and/or out of the vehicle.

It will be appreciated that the controller 1200 may be arranged to perform a portion of the defined manoeuvre. For example, the user may initiate the manoeuvre with control being transferred to the controller 1210 thereafter to complete the defined manoeuvre.

Figure 3:
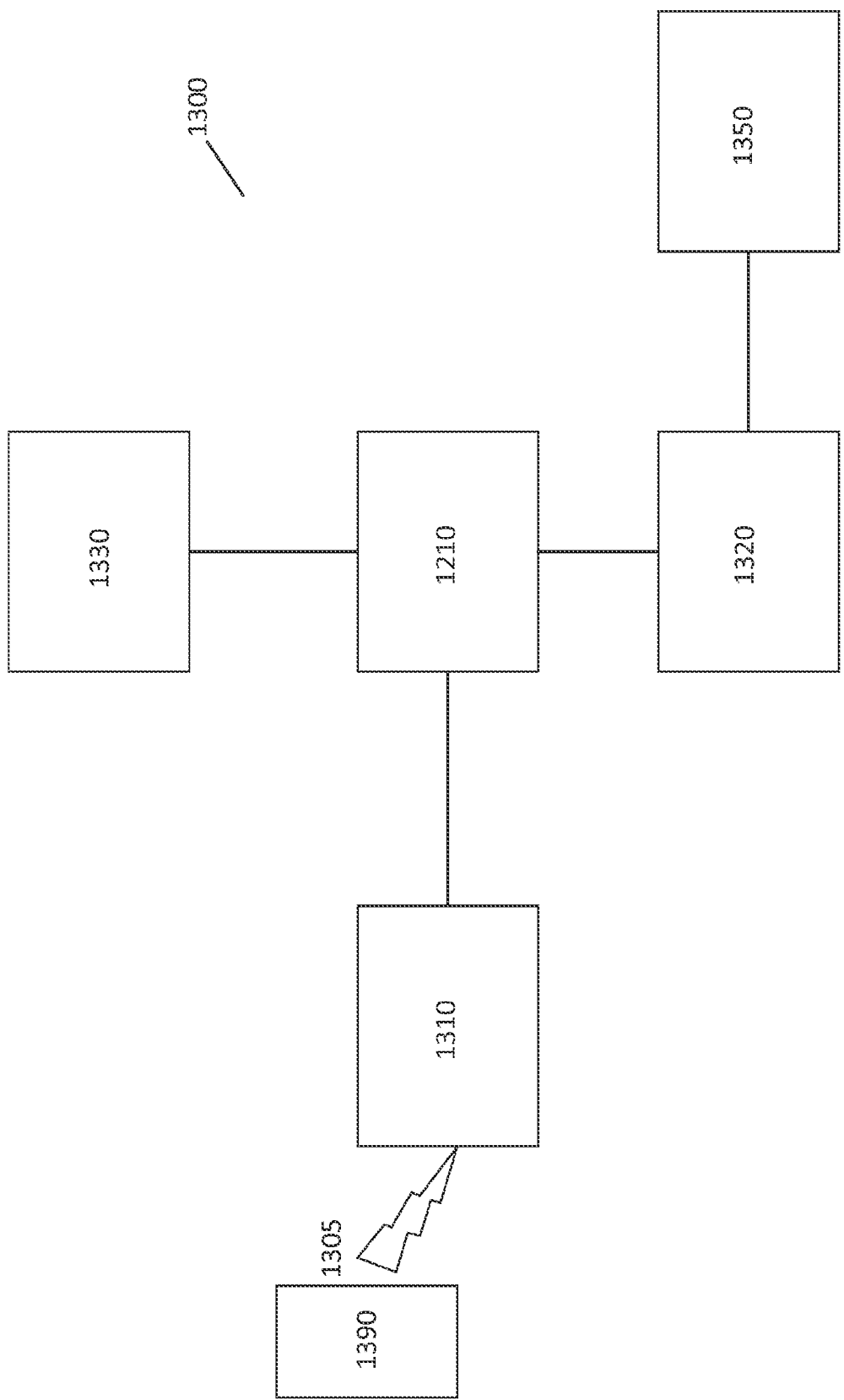
FIG. 3 shows a system according to an embodiment of the invention.

FIG. 3 illustrates a system 1300 according to an embodiment of the invention. The system 1300 comprises the controller 1210 described above and shown in FIG. 2.

The system 1300 comprises environment sensing means 1330 for determining information about an environment of the vehicle 1110. In particular, the environment sensing means 1330 is provided for determining a location of one or more features in a vicinity of the vehicle 1110. The environment sensing means 1330 is arranged to output an environment signal indicative of the determined features. The environment signal may be environment data which may be stored in a memory. The environment sensing means may comprise one or more sensing devices such as imaging devices, such as cameras, or other sensing devices such as LI DAR, ultrasonic devices, sonar devices etc. Signals output by each of the sensing devices may be used to form a representation of the environment of the vehicle 1110 which is stored in the memory for use by other systems of the vehicle 1110.

Here, the vehicle 1110 comprises environment sensing means for determining a location of at least one feature in the vicinity of the vehicle 1110; and outputting an environment signal indicative thereof. The environment sensing means is arranged to determine a location of features such as surface markings, which may be painted lines denoting a perimeter of a parking bay, for example, or objects such as walls, posts or other vehicles in relation to which the vehicle is required to manoeuvre. The control means is arranged to determine an absence of features, such as a separation between obstructive features, such as the adjacent feature 1125 and object 1140 shown here, in dependence on the environment signal. Accordingly, the control means is arranged to determine a vacancy 1172 where no features, such as no obstructive features, are located. Where the vacancy 1172 is sufficiently great, the control means is arranged to determine a vehicle envelope 1174 suitable for receiving the vehicle 1110 in the defined manoeuvre completed position. The vehicle envelope 1174 comprises a target position suitable for receiving the vehicle 1110 in the defined manoeuvre completed position. As such, the vehicle envelope 1174 here comprises a target defined manoeuvre completed position. In at least this example, the vehicle envelope 1174 is determined in dependence on a one-dimensional property and/or measurement and/or estimation. In particular here, the vehicle envelope 1174 is determined in dependence on the environment signal being indicative of a length, such as an unobstructed length between features 1125, 1140. The unobstructed length is sufficiently long for receiving the vehicle 1110 in the defined manoeuvre completed position, the length here being a separation between features 1125, 1140 that is greater than the vehicle width in the defined manoeuvre completed position. The defined manoeuvre may comprise, for example, parking in a parked position.

The controller 1210 of the system 1300 here comprises defined manoeuvre means. The control means is arranged to control the vehicle 1110 to perform at least one defined manoeuvre. The controller 1210 may comprise a defined manoeuvre controller for controlling one or more systems of the vehicle 1110 to perform one or more defined manoeuvres. The defined manoeuvre means may be associated with one or more actuators 1350 of the vehicle 1110. The one or more actuators 1350 are provided for effecting movement of the vehicle 1110. The actuators may comprise one or more of a power steering mechanism arranged to provide steering of wheels of the vehicle 1110 in dependence on signals received from the controller 1210. A second actuator may comprise a powered braking mechanism of the vehicle 1110 which is arranged to actuate brakes of the vehicle in dependence on signals received from the controller 1210. A third actuator comprises the powertrain of the vehicle. The controller 1210 is arranged to control the steering of the vehicle wheel 1180 relative to the feature.

The system 1300 shown here comprises a motive control means 1320. The motive control means 1320 may be a motive control unit. The motive control means 1320 is arranged to receive the manoeuvre signal output by the controller 1210. The motive control means 1320 is associated with one or more motive units of the vehicle 1110 which may form part of a powertrain (not shown) of the vehicle 1110. The motive units may comprise one or more of an internal combustion engine and one or more electric machines of the vehicle 1110. The powertrain is arranged to provide power, or torque, to cause movement in the longitudinal axis of the vehicle 1110 i.e. forward or backward movement of the vehicle 1100 in dependence on the manoeuvre signal received from the controller 1210. The motive control means 1320 is arranged to control the application of torque to one or more wheels of the vehicle 1110 to move the vehicle 1110 in the longitudinal axis of the vehicle i.e. to move the vehicle generally forwards or backwards. The torque may comprise driving torque i.e. applied in a direction of desired movement, such as forwards. The torque may also comprise braking torque i.e. applied to resist the driving torque. In at least some embodiments both driving torque and braking torque may be applied simultaneously in order to provide low-speed movement of the vehicle 1110. The braking torque may also be applied at least partly after the driving torque in order to effect accurate movement of the vehicle 1110. To achieve control of the steering, the controller 1210 may communicate with the motive control means 1320. Thus the one or more actuators 1350 can control a direction and movement of the vehicle to perform the defined manoeuvre. The defined manoeuvre is performed in dependence on the environment signal provided by the environment sensing means 1330.

The one or more defined manoeuvres which may be performed by the vehicle 1110 under control of the controller 1210 may comprise a parking manoeuvre, such as a parking-in manoeuvre wherein the vehicle 1110 is controlled to arrive at a parked position.

As shown here, the system 1300 comprises a receiver means 1310 for receiving a signal 1305. The signal 1305 may be wirelessly received from a mobile device 1390 associated with a person responsible for the vehicle 1110. The signal 1305 is indicative of a user request for vehicle movement of the vehicle 1110. The receiver means 1310 is arranged to output the request signal to the input means 1230 of the controller 1210 as described above. The request signal may be output by the receiver means 1310 onto a communication bus of the vehicle 1110 which may communicably couple the components of the system 1300.

The receiver means 1310 may be in the form of a radio unit 1310. The radio unit 1310 may comprise a receiver for receiving radio signals 1305 from the mobile device 1390. In some embodiments the radio unit 1310 may also comprise a transmitter, or may be a transceiver 1310 configured to receive radio signals 1305 transmitted from the mobile device 1390 and transmit signals to the mobile device 1390. The radio unit 1103 and the mobile device 1390 may be arranged to provide a wireless local area network, via which two-way communication may take place between the radio unit 1103 and the mobile device 1390. For example, the radio unit 1103 may be arranged to communicate by WiFi® with the mobile device 1390. In alternative embodiments other radio communication standards may be used for the communication. In one example, communication between the radio unit 1103 and the mobile device 1390 is provided via Bluetooth®, although other protocols or standards may be envisaged.

The mobile device 1390 may be an electronic key fob associated with the vehicle 1110, such as may be used to gain entry and to activate or power up the vehicle 1110. The mobile device 1390 may, in other embodiments, be an electronic device associated with the person responsible for the vehicle 1100 such as a mobile telephone, tablet, watch, wearable electronic device or other computing device associated with the person. The mobile device 1390 is capable of receiving a user input indicating the person's desire to move the vehicle 1110. The user input may be provided in the form of a button or key press, activation of a graphically displayed icon, a gesture or voice command. Other forms of user input may also be envisaged.

Figure 4:
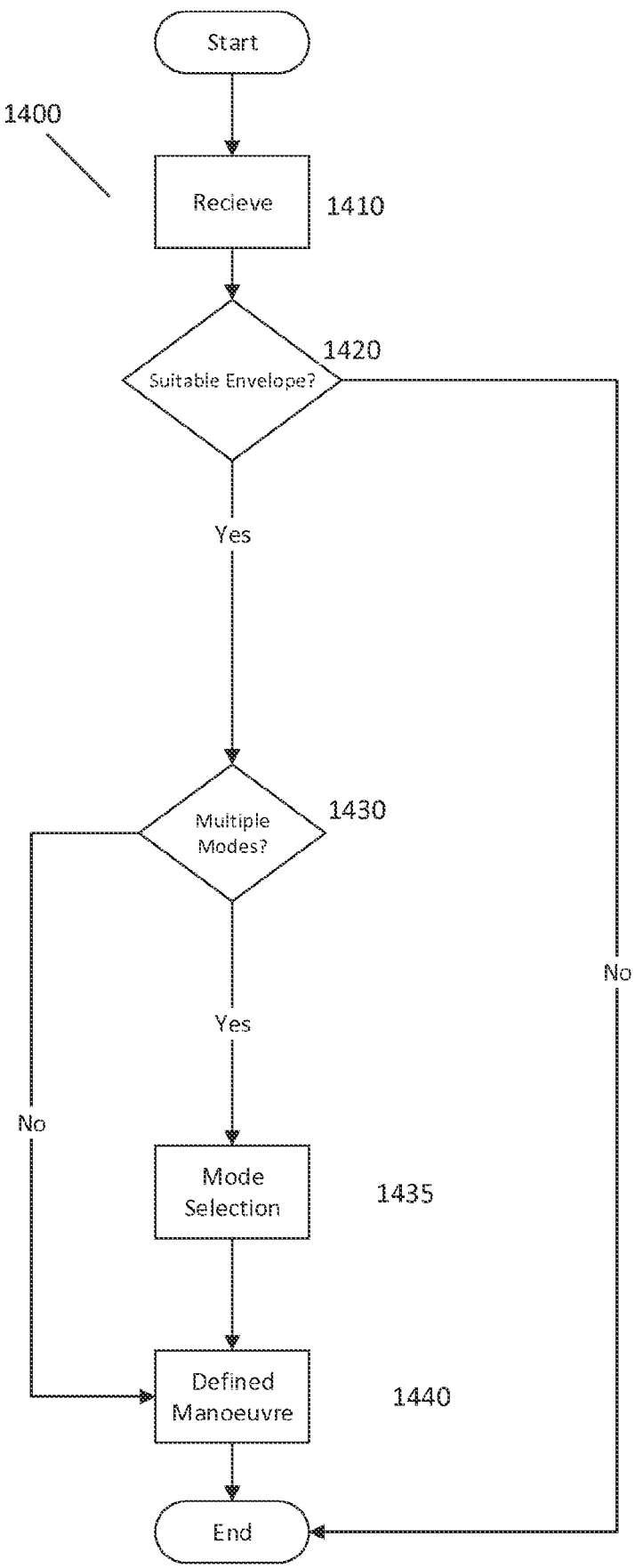
FIG. 4 shows a method according to an embodiment of the invention.

FIG. 4 illustrates a method 1400 according to an embodiment of the invention. The method 1400 is a method of controlling movement of the vehicle 1110. The method 1400 may be formed by the controller 1210 and system 1300 described above with reference to FIGS. 2 and 3. The method 1400 will be described with reference to FIG. 5 as an example which corresponds broadly to the situation shown in FIG. 1.

The method 1400 broadly comprises steps of receiving 1410 the environment signal from the environment sensing means 1330 which is indicative of a feature 1125, 1140 in a vicinity of the vehicle 1110 and, in dependence thereon, determining 1420 a presence of a suitable envelope for receiving the vehicle in one or more modes of performance of a defined manoeuvre. The control means identifies 1430 whether multiple modes are suitable. Where a plurality of modes are suitable, a mode signal is output indicative of modes of performance suitable for performing a defined manoeuvre. Upon selection 1435 of a mode, the control means control the performance of the defined manoeuvre 1440.

Referring to FIG. 4, the illustrated embodiment of the method 1400 comprises a step of receiving 1410 the environment signal from the environment sensing means 1330. The controller 1210 determines 1420 whether the environment signal is indicative of one or more features 1125 in the vicinity of the vehicle 1110 corresponding to a suitable vehicle envelope. If there is no suitable mode, then no defined manoeuvre is performed. In at least some examples, such non-performance or unavailability is communicated to the user (e.g. the user is notified that no suitable vehicle envelope or vacancy or only an unsuitable vehicle envelope or vacancy has been detected).

It will be appreciated that in at least some examples, the defined manoeuvre can be performed without an explicit or discrete mode selection by the user. For example, where only a single mode is available or suitable, performance of the defined manoeuvre 1440 may be performed in that mode by default. Likewise, in at least some examples, there may be a general default mode provided for performing one or more defined manoeuvres, such as a preferred mode where multiple modes may be available. The default mode may be adaptable, such as programmable by a user and/or self-learning such as to evolve or adapt (e.g. with user behaviour over a period of time).

The mode may be selected explicitly via a user input, such as selection via an interface. In at least some examples, the mode selection may be via a user action. For example, where an occupant-out-of-vehicle mode is available, selection of that mode may be at least partially achieved by an occupant transitioning from a location in the vehicle to a location out of the vehicle. Such transitioning may be automatically detected, such as via a vehicle system (e.g. seat sensor, door sensor, movement sensor, etc). Similarly, selection may be via a vehicle system, such as operation of an accelerator, gear selection, switch, brake, indicator, or the like.

The controller 1210 may be arranged to allow for user adaptation. For example, the user may be able to at least partially override, program or adjust the controller 1210 such that one or more of the following: the provision of the angular offset; the incline threshold for providing the angular offset; the one or more locations where the angular offset is provided; the direction of the angular offset; and the angle of the angular offset. The controller 1210 may be arranged to be manually overridden, programmed or adjusted, such as to adjust the output of the manoeuvre signal. Additionally, or alternatively, the controller 1210 may be arranged to automatically, or semi-automatically, override, program or adjust the output of the manoeuvre signal, such as by learning from a user behaviour, such as a repeated user behaviour, associated with one or more of: an input pattern; a geographic location; a user identity (e.g. where the vehicle 1110 is used noncontemporaneously by multiple users). For example, the controller 1210 may be arranged to not offer a mode when the vehicle is positioned at a particular location, such as a home or garage, where the user has previously overridden, cancelled or rejected that mode.

In FIG. 5, the vehicle 1110 is illustrated as being located in a defined manoeuvre completed position in a vehicle envelope 1174 defined in a vacancy 1172 bounded by adjacent features 1125, 1140, similar to FIGS. 1(*a*) and 1(*b*). In FIG. 5, the vehicle 1110 is shown in the defined manoeuvre completed position with the vehicle 1110 in a closed configuration with a separation between the vehicle 1110 and adjacent features 1125, 1140 respectively on each lateral side of the vehicle 1110. As shown here, the closed configuration of the vehicle 1110 comprises a collapsed position of a moveable projection 1182 of the vehicle 1110, shown here as a side mirror. As shown here, the defined manoeuvre performed to arrive at the defined manoeuvre completed position of FIG. 5 has been performed with the vehicle in an occupant-out-of-vehicle mode. Here, the defined manoeuvre into the position of FIG. 5 has been performed with the occupant located out of the vehicle for at least a last portion of the defined manoeuvre. As will be appreciated, the dimensions of the vehicle envelope 1174 defined by the vacancy 1172 are such that at least some vehicle aperture members 1188 are inaccessible or at least not fully openable. Accordingly, access to and from the vehicle apertures by the vehicle aperture members 1188 is impeded. Furthermore, the dimensions of the vehicle envelope 1174 defined by the vacancy 1172 are such that performance of the defined manoeuvre may have been impeded or prevented by the vehicle projections 1182 in an expanded position, such as the expanded positions of the vehicle projections 1182 shown in FIGS. 1(*a*) and 1(*b*). Accordingly, the performance of the defined manoeuvre to arrive at the defined manoeuvre completed position of FIG. 5 has included altering a position of the moveable projection 1182 prior to or during the defined manoeuvre, in dependence on the environment signal. Here, the mode of performance for performing the defined manoeuvre has included a vehicle collapsed projection mode.

As a result of the method 1400 the vehicle may be more advantageously positioned or configured following performance of a defined manoeuvre. For example, an occupant may be prevented from being trapped in a vehicle, or damaging the vehicle and/or an adjacent object. It will also be appreciated that embodiments of the present invention are not limited to being useful in association with a defined manoeuvre. It may be useful to provide a selectable mode for performing a portion of a manoeuvre as a defined manoeuvre even when parked or when having being driven by a human driver. For example, identifying the available modes to the user may be indicative of accessibility of vehicle apertures, assisting the user in choosing a performance of a manoeuvre (e.g. a user may choose to perform a parking manoeuvre manually where an occupant-in-vehicle mode is notified as being available).

Second Technique

Figure 7B:
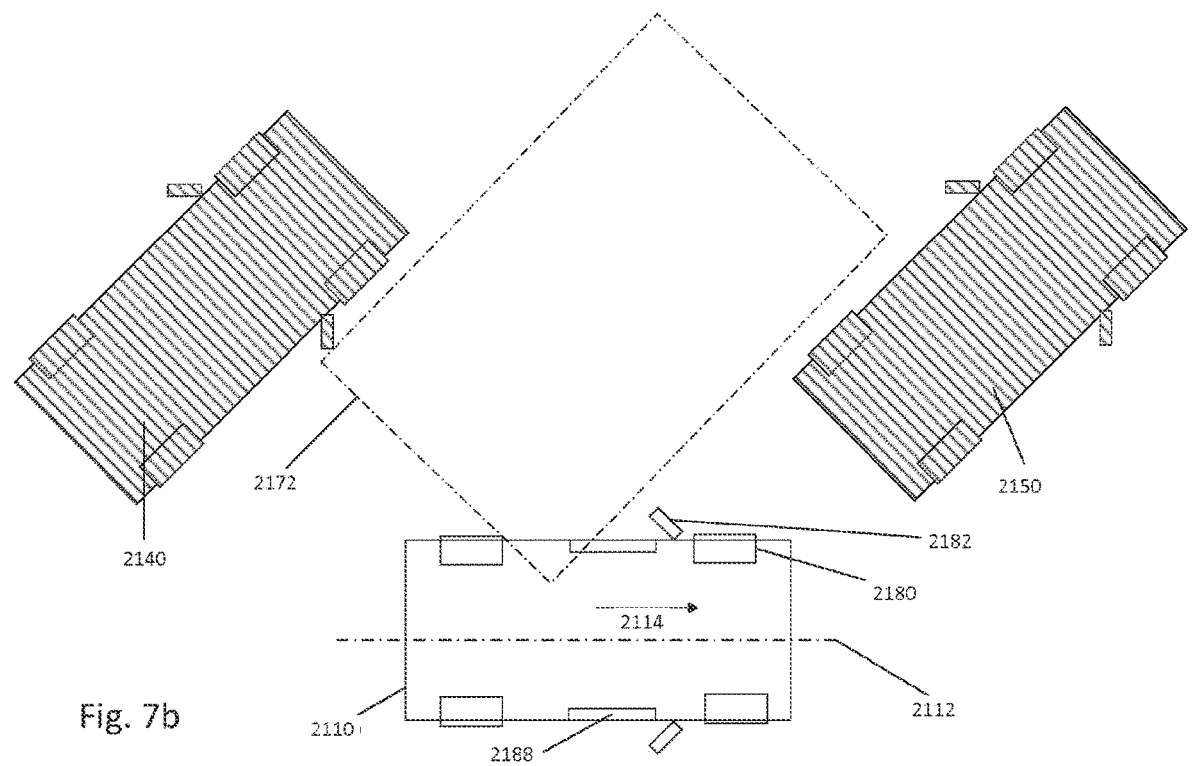
FIG. 7b shows the vehicle in relation to the feature, in another scenario.
Figure 7C:
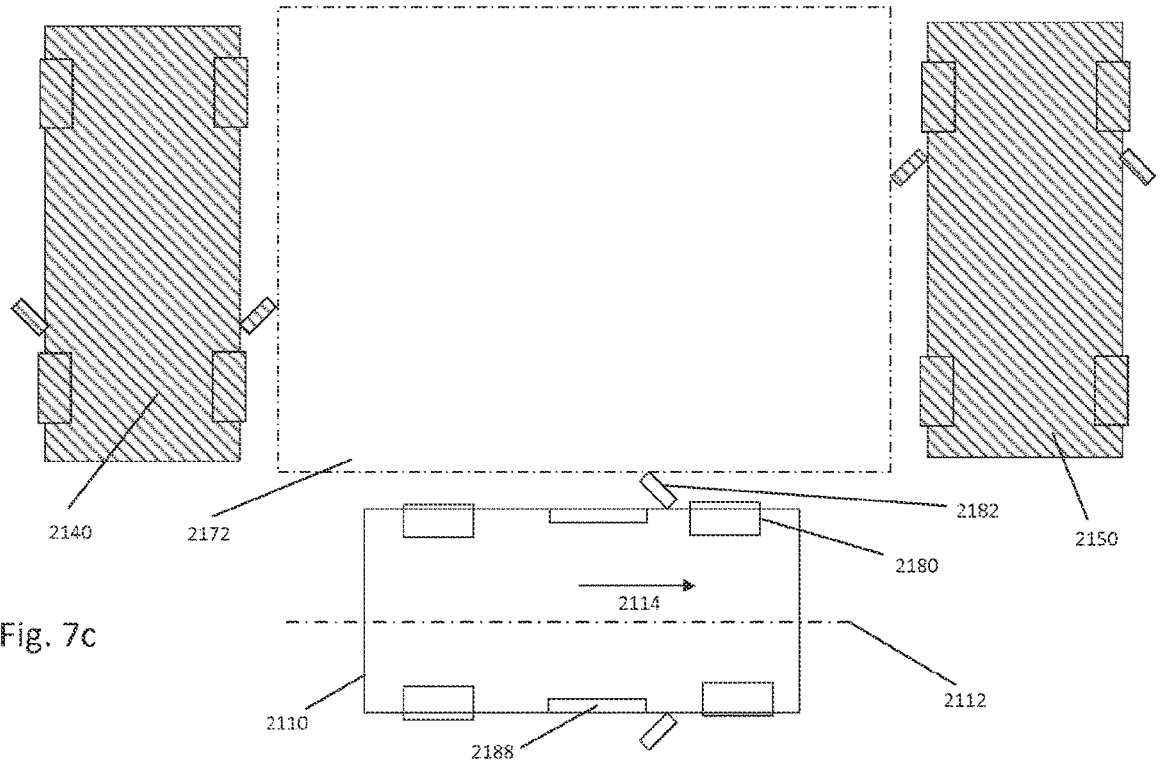
FIG. 7c shows the vehicle in relation to the feature, in another scenario.

FIGS. 7*a*, 7*b* and 7*c* illustrate a vehicle 2110 according to an embodiment of the invention in three scenarios. In FIGS. 7*a* and 7*b*, the vehicle 2110 is illustrated as having a vehicle forward direction, indicated by arrow 2114, shown parallel to a central longitudinal axis 2112 of the vehicle 2110. In the illustrated scenarios, the vehicle 2110 is shown at a defined manoeuvre start position. In the particular scenarios shown in FIGS. 7*a*, 7*b* and 7*c*, it may be desirable to perform a defined manoeuvre to park the vehicle 2110 in the defined manoeuvre completed position in a vacancy 2172.

In FIGS. 7*a*, 7*b* and 7*c* the vehicle 2110 is shown adjacent a vacancy 2172, where the defined manoeuvre would be performed with the vehicle 2110 performing a parking-in defined manoeuvre to enter the vacancy 2172. In FIG. 7*a*, the vehicle 2110 is shown in relation to a feature 2125 in a vicinity of the vehicle 2110. The feature 2125 is, in this example, an object which is a wall that is parallel to the longitudinal axis 2112 of the vehicle 2110 i.e. generally parallel to a side of the vehicle 2110, such as a left side here—in the defined manoeuvre completed position. The object is not limited to being a wall 2125 and may be, for example, a bollard, fence, barrier, or other object at or adjacent the vacancy 2172, such as to form a boundary thereof. As shown in FIGS. 7*a*, 7*b* and 7*c*, another feature 2140, in the form of a stationary vehicle bounds an end of the vacancy 2172. Likewise, another feature 2150, in the form of another stationary vehicle bounds an opposite end of the vacancy 2172. It will be appreciated that in each scenario, although not shown, there may be a further boundary or limitation to the vacancy 2172, (e.g. in FIGS. 7*b* and 7*c* there may be a wall feature similar to that 2125 of FIG. 7*a*). It will be appreciated that although shown here in plan view, the scenarios depicted are three dimensional.

As can be seen from FIG. 7*c* in particular, it may be unclear and/or there may be multiple options for orienting the vehicle in the space indicated by the vacancy 2172.

Embodiments of the present invention aim to ameliorate such problems.

It will be understood in the scenarios shown in FIGS. 7*a*, 7*b* and 7*c* that the defined manoeuvre may be a manoeuvre of the vehicle 2110 which is performed automatically by the vehicle 2110 i.e. under control of one or more systems of the vehicle 2110. The defined manoeuvre may be considered to be performed automatically by the vehicle 2110, or at least semi autonomously. As shown, in FIGS. 7*a*, 7*b* and 7*c* the defined manoeuvre may be a parking manoeuvre to control the vehicle 2110 to drive into a parking place.

As will be further explained, it may be advantageous for at least a portion of the manoeuvre to be performed whilst a person in control of the vehicle 2110 is external to the vehicle 2110. For example, access to the vehicle 2110 may be limited in FIG. 7a after performing the defined manoeuvre.

To perform the defined manoeuvre, the vehicle 2110 comprises environment sensing means for determining a location of features 2125, 2140 in the vicinity of the vehicle 2110. The environment sensing means may comprise one or more sensing devices or imaging devices. The one or more sensing devices may emit radiation and receive radiation reflected from the features in the vicinity of the vehicle, such as ultrasonic sensing devices, although it will be appreciated that the present invention is not limited in this respect. Such environment sensing means have a minimum distance to which accuracy the location of the features 2125 may be determined due to, for example, a resolution of an imaging device or a signal-to-noise ratio of a sensing device.

In the particular examples shown here, the vehicle 2110 comprises a portion of the environment sensing means in or on the vehicle moveable projection 2182. For example, each side or wing mirror of the vehicle 2110 can have a camera or the like mounted thereto or thereon.

Figure 8:
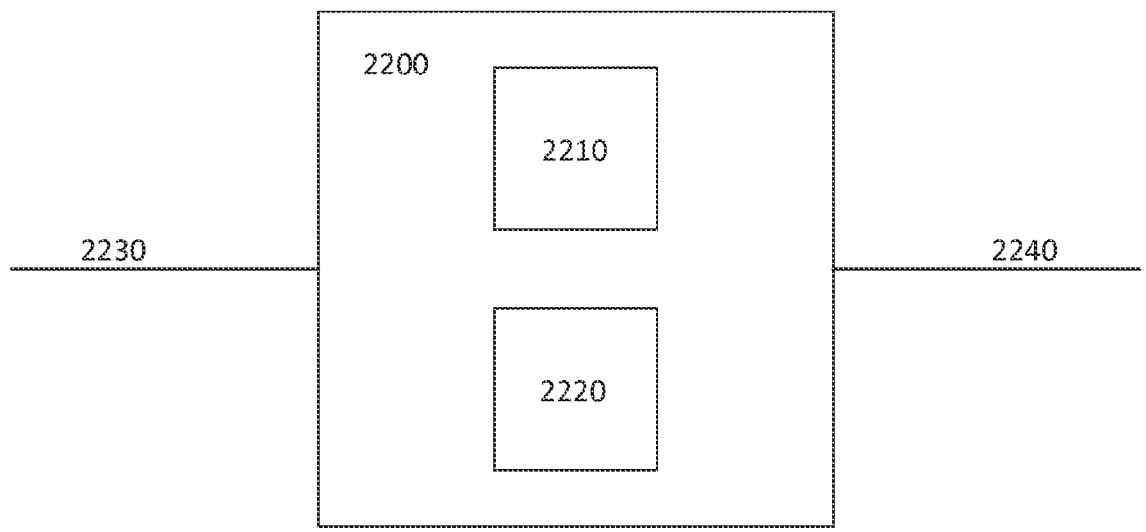
FIG. 8 shows a controller according to an embodiment of the invention.
Figure 12:
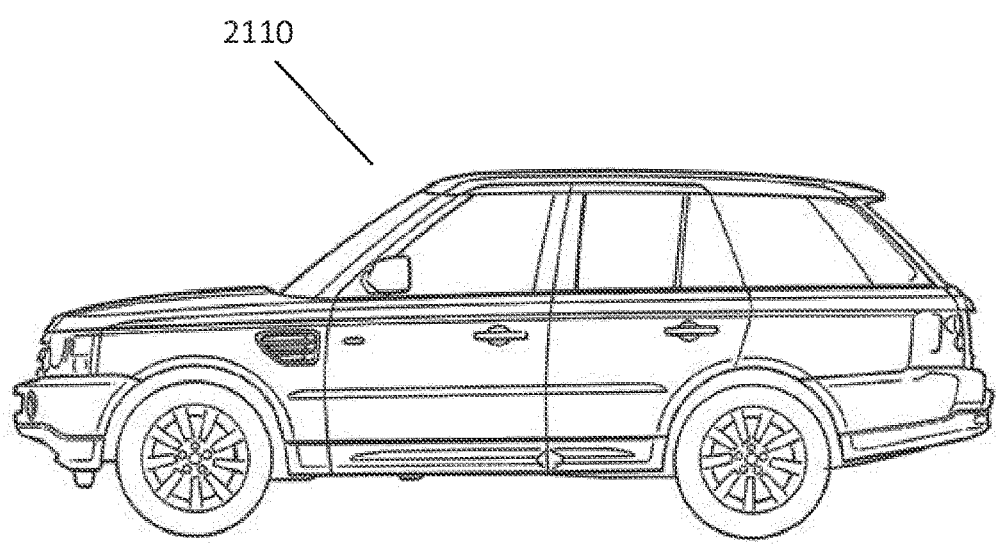
FIG. 12 is a vehicle according to an embodiment of the invention.

FIG. 8 illustrates a controller 2200 or control unit 2200 according to an embodiment of the invention, such as comprised in the vehicle 2110 of FIGS. 7(a) and 7(b).

The controller 2200 comprises a control means 2210, input means 2230 and output means 2240. In some embodiments the controller comprises a memory means 2220 such as one or more memory devices 2220 for storing data therein. Here, the input means 2230 is for receiving an environment signal indicative of the features 2125, 2140, 2150 in the vicinity of the vehicle 2110.

The control means 2210 is arranged to determine the orientation of a defined manoeuvre completed position of the vehicle 2110 in dependence on the environment signal. The output means 2240 is for outputting a possible defined manoeuvre completed position signal in dependence on the determined orientation. Advantageously, the controller 2200 can determine the orientation of the defined manoeuvre completed position based on a context, such as indicated by the environment signal.

Here, the controller 2200 comprises a notification output means for outputting a notification signal indicative of the possible defined manoeuvre completed position. The control means 2210 is arranged to output the notification signal indicative of a plurality of possible defined manoeuvre completed positions. In at least some examples, the defined manoeuvre completed position is selectable from the plurality of selectable possible defined manoeuvre completed position by a user in dependence upon the possible defined manoeuvre completed position signal. Advantageously, the user can be notified of the availability of one or more target defined manoeuvre completed positions, allowing the user to select their preferred target defined manoeuvre completed position where available. For example, the user may be offered a possibility of a rearwards parallel orientation of the vehicle 2110 in the scenario of FIG. 7c, such as indicated in broken lines in FIG. 11c.

In at least some examples, the control means 2210 is arranged to provide a notification signal indicative of no possible defined manoeuvre completed position, corresponding to a scenario (not shown) whereby the vacancy 2172 is unsuitable for receiving the vehicle 2110 on performance of a defined manoeuvre. Accordingly, the user is made aware by notification that a vacancy has been identified, but that it is unsuitable for performance of the defined manoeuvre—for example, where a vacancy is too small for the performance of a defined manoeuvre (e.g. whereby the adjacent feature 2125, or objects 2140, 2150 are significantly closer together than in FIG. 7a, with insufficient dimensions for receiving or accommodating the vehicle 2110—even with the vehicle in a closed configuration).

The control means 2210 may be formed by one or more electronic processing devices such as an electronic processor. The processor may operably execute computer readable instructions stored in the one or more memory devices 2220. The control means 2210 is arranged to control the output means 2240 to output the possible defined manoeuvre completed position signal in dependence on the environment signal, as will be explained. In some embodiments the input means 2230 and output means 2240 may be combined such as by being formed by an I/O unit or interface unit. For example, the controller 2210 may comprise an interface to a network forming a communication bus of a vehicle. The interface bus may be an Internet Protocol (IP) based communication bus such as Ethernet, although embodiments of the invention are not limited in this respect. The input means 2230 may comprise an electrical input for receiving the environment signal.

As shown here, the memory means 2220 can be used to store data from the input means 2230. For example, the memory means can store data about the features 2125, 2140, or the vacancy 2172 for future use. For example, where an occupant or user of the vehicle 2110 has actively selected (e.g. by inputting one or more parameter inputs) or implicitly shown (e.g. through a repeated behavioural or use pattern) a preferences for a target defined manoeuvre completed position and/or orientation for one or more scenarios, the memory means can store data corresponding to the preference to provide a default and/or automatic target defined manoeuvre completed position and/or orientation in dependence on the input (e.g. environment signal and/or location signal, etc) being indicative of a such or similar scenario for the preference or preferences.

The data may be stored prior to and during performance of the defined manoeuvre, for use during the performance of the defined manoeuvre. In addition, or alternatively, the data may be stored for use during a subsequent defined manoeuvre. For example, where the data is stored prior to or during the performance of the defined manoeuvre to arrive at the defined manoeuvre completed position of any of FIGS. 11a to 11e, as shown in broken lines, then the stored data may be used for or during a subsequent defined manoeuvre, such as an unparking manoeuvre from the defined manoeuvre completed position of FIGS. 11a to 11e. Where stored data, such as of the features 2125, 2140, 2150 is used for the performance of at least a portion of the defined manoeuvre, the controller 2200 may perform a check, such as to the validity or continued validity of the data. For example, the controller 2200 may corroborate the data with another input, such as with a later input from the environment sensing means, or input from another portion of the environment sensing means (e.g. another sensor or camera located at another portion of the vehicle 2110, the another sensor or camera able to confirm the continued presence and/or position of the feature or features 2125, 2140, 2150).

In at least some examples, the controller 2210 may comprise a second input means for receiving a request signal indicative of a received signal indicative of a user request, such as a wirelessly received signal. In at least some examples, the request signal is indicative of a wirelessly received signal representing a user request for movement of the vehicle 2110 to a desired defined manoeuvre completed position. The user request may be for the performance of the defined manoeuvre to a selected target defined manoeuvre completed position and/or orientation.

In at least some examples, the controller 2200 may comprise a manoeuvre output means. The manoeuvre output means may comprise an electrical output for outputting a manoeuvre signal. The manoeuvre signal represents an instruction for the vehicle 2110 to move. The instruction provided by the manoeuvre signal is provided to cause the vehicle 110 to perform the defined manoeuvre. The control means 2210 is arranged to control the manoeuvre output means to cause the vehicle 2110 to perform at least a portion of the defined manoeuvre in dependence on the environment signal.

It will be appreciated that the controller 2200 may be arranged to perform a portion of the defined manoeuvre in a particular mode. For example, the user may initiate the manoeuvre with control being transferred to the controller 2210 thereafter to perform the defined manoeuvre to the defined manoeuvre completed position, with the mode of performance being variable during the performance of the portion of the defined manoeuvre (e.g. between an occupant-in-vehicle mode and an occupant-out-of-vehicle mode).

FIG. 9 illustrates a system 2300 according to an embodiment of the invention. The system 2300 comprises the controller 2210 described above and shown in FIG. 8.

The system 2300 comprises environment sensing means 2330 for determining information about an environment of the vehicle 2110. In particular, the environment sensing means 2330 is provided for determining a location of one or more features in a vicinity of the vehicle 2110. In at least some examples, a portion of the environment sensing means is associated with the one or more moveable projections 2182, such as at least one sensor or camera mounted in or on a vehicle wing mirror. The environment sensing means 2330 is arranged to output an environment signal indicative of the determined features. The environment signal may be environment data which may be stored in the memory. The environment sensing means may comprise one or more sensing devices such as imaging devices, such as cameras, or other sensing devices such as LI DAR, radar, ultrasonic devices, sonar devices etc. Signals output by each of the sensing devices may be used to form a representation of the environment of the vehicle 2110 which is stored in the memory for use by other systems of the vehicle 2110.

Here, the environment sensing means 2330 is arranged to determine a location of features such as surface markings, which may be painted lines denoting a perimeter of a parking bay, for example, or objects such as walls, posts or other vehicles in relation to which the vehicle is required to manoeuvre. The control means is arranged to determine an absence of features, such as a separation between obstructive features, such as the adjacent features 2140, 2150 shown here, in dependence on the environment signal. Accordingly, the control means is arranged to determine a vacancy 2172 where no features, such as no obstructive features, are located. Where the vacancy 2172 is sufficiently great, the control means is arranged to determine a vehicle envelope 2174 suitable for receiving the vehicle 2110 in the defined manoeuvre completed position. The vehicle envelope 2174 comprises a target position suitable for receiving the vehicle 2110 in the defined manoeuvre completed position. As such, the vehicle envelope 2174 here comprises a target defined manoeuvre completed position. In at least this example, the vehicle envelope 2174 is determined in dependence on a one-dimensional property and/or measurement and/or estimation. In particular, here, the vehicle envelope 2174 is determined in dependence on the environment signal being indicative of a length, such as an unobstructed length between features 2140, 2150. The unobstructed length is sufficiently long for receiving the vehicle 2110 in the defined manoeuvre completed position, the length here being a separation between features 2140, 2150 that is greater than the vehicle length in the defined manoeuvre completed position. The defined manoeuvre may comprise, for example, parking in a parked position.

The environment sensing means 2330 is arranged to determine the orientation of the one or more features in the vicinity, such as the orientation of adjacent vehicles 2140, 2150.

The controller 2210 of the system 2300 here comprises defined manoeuvre means. The control means is arranged to control the vehicle 2110 to perform at least one defined manoeuvre. The controller 2210 may comprise a defined manoeuvre controller for controlling one or more systems of the vehicle 2110 to perform one or more defined manoeuvres. The defined manoeuvre means may be associated with one or more actuators 2350 of the vehicle 2110. The one or more actuators 2350 are provided for effecting movement of the vehicle 2110. The actuators may comprise one or more of a power steering mechanism arranged to provide steering of wheels of the vehicle 2110 in dependence on signals received from the controller 2210. A second actuator may comprise a powered braking mechanism of the vehicle 2110 which is arranged to actuate brakes of the vehicle in dependence on signals received from the controller 2210. A third actuator comprises the powertrain of the vehicle. The controller 2210 is arranged to control the steering of the vehicle wheel 2180 relative to the feature 2125. A fourth actuator 2350 comprises one or more mechanisms for altering the position of the one or more moveable projections 2182.

The system 2300 shown here comprises a motive control means 2320. The motive control means 2320 may be a motive control unit. The motive control means 2320 is arranged to receive the manoeuvre signal output by the controller 2210. The motive control means 2320 is associated with one or more motive units of the vehicle 2110 which may form part of a powertrain (not shown) of the vehicle 2110. The motive units may comprise one or more of an internal combustion engine and one or more electric machines of the vehicle 2110. The powertrain is arranged to provide power, or torque, to cause movement in the longitudinal axis of the vehicle 2110 i.e. forward or backward movement of the vehicle 2100 in dependence on the manoeuvre signal received from the controller 2210. The motive control means 2320 is arranged to control the application of torque to one or more wheels of the vehicle 2110 to move the vehicle 2110 in the longitudinal axis of the vehicle i.e. to move the vehicle generally forwards or backwards. The torque may comprise driving torque i.e. applied in a direction of desired movement, such as forwards. The torque may also comprise braking torque i.e. applied to resist the driving torque. In at least some embodiments both driving torque and braking torque may be applied simultaneously in order to provide low-speed movement of the vehicle 2110. The braking torque may also be applied at least partly after the driving torque in order to effect accurate movement of the vehicle 2110. To achieve control of the steering, the controller 2210 may communicate with the motive control means 2320. Thus the one or more actuators 2350 can control a direction and movement of the vehicle to perform the defined manoeuvre. The defined manoeuvre is performed in dependence on the environment signal provided by the environment sensing means 2330.

The one or more defined manoeuvres which may be performed by the vehicle 2110 under control of the controller 2210 may comprise a parking manoeuvre, such as shown in FIGS. 11a to 11e wherein the vehicle 2110 is controlled to arrive at a parked position.

As shown here, the system 2300 comprises a receiver means 2310 for receiving a signal 2305. The signal 2305 may be wirelessly received from a mobile device 2390 associated with a person responsible for the vehicle 2110. The signal 2305 is indicative of a user request for vehicle movement of the vehicle 2110, as noted above. The receiver means 2310 is arranged to output the request signal to the input means 2230 of the controller 2210 as described above. The request signal may be output by the receiver means 2310 onto a communication bus of the vehicle 2110 which may communicably couple the components of the system 2300.

The receiver means 2310 may be in the form of a radio unit 2310. The radio unit 2310 may comprise a receiver for receiving radio signals 2305 from the mobile device 2390. In some embodiments the radio unit 2310 may also comprise a transmitter, or may be a transceiver 2310 configured to receive radio signals 2305 transmitted from the mobile device 2390 and transmit signals to the mobile device 2390. The radio unit 2103 and the mobile device 2390 may be arranged to provide a wireless local area network, via which two-way communication may take place between the radio unit 2103 and the mobile device 2390. For example, the radio unit 2103 may be arranged to communicate by WiFi® with the mobile device 2390. In alternative embodiments other radio communication standards may be used for the communication. In one example, communication between the radio unit 2103 and the mobile device 2390 is provided via Bluetooth®, although other protocols or standards may be envisaged.

The mobile device 2390 may be an electronic key fob associated with the vehicle 2110, such as may be used to gain entry and to activate or power up the vehicle 2110. The mobile device 2390 may, in other embodiments, be an electronic device associated with the person responsible for the vehicle 2100 such as a mobile telephone, tablet, watch, wearable electronic device or other computing device associated with the person. The mobile device 2390 is capable of receiving a user input indicating the person's desire to move the vehicle 2110. The user input may be provided in the form of a button or key press, activation of a graphically displayed icon, a gesture or voice command. Other forms of user input may also be envisaged.

Figure 10:
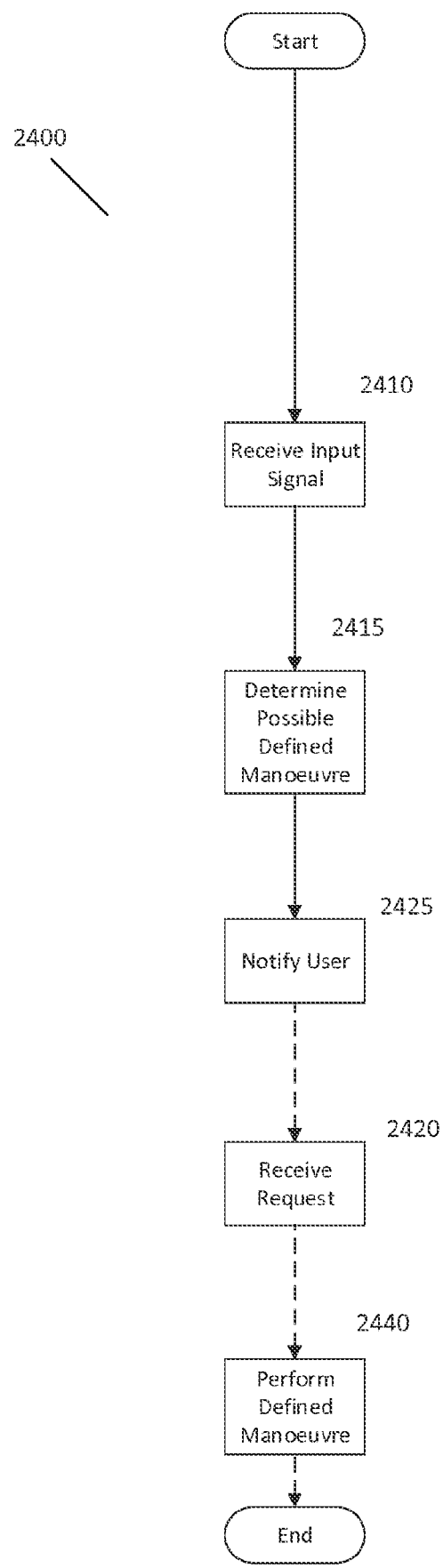
FIG. 10 shows a method according to an embodiment of the invention.

FIG. 10 illustrates a method 2400 according to an embodiment of the invention. The method 2400 is a method of controlling movement of the vehicle 2110. The method 2400 may be formed by the controller 2210 and system 2300 described above with reference to FIGS. 8 and 9. The method 2400 will be described with reference to FIGS. 11(a), 11(b) and 11(c) to 11(e) as examples which correspond to the scenarios shown in FIGS. 7(a), 7(b) and 7(c) respectively.

The method 2400 broadly comprises steps of receiving 2410 the environment signal from the environment sensing means 2330 which is indicative of a feature 2125, 2140 in a vicinity of the vehicle 2110 and, in dependence thereon, determining 2415 an orientation of a possible defined manoeuvre completed position for receiving the vehicle, following performance of a defined manoeuvre. The control means determines 2415 whether the vehicle 2110 could be oriented within the vacancy 2172; such as where multiple target defined manoeuvre completed positions or orientations are possible. For example, in the scenario depicted in FIG. 7b, the control means determines whether the vehicle 2110 can be oriented in a forwards and/or a rearwards facing orientation in the vacancy, and parallel to the adjacent vehicles 2140, 2150. Where a defined manoeuvre is possible, a notification signal is output 2425 indicative of which defined manoeuvre completed position and orientation is possible (e.g. forwards or rearwards and/or parallel or perpendicular), thereby offering a choice of target defined manoeuvre completed positions or orientations suitable for receiving the vehicle upon performance of the defined manoeuvre. Optionally, upon request 2420 of an orientation or defined manoeuvre completed position, the control means controls the performance of the defined manoeuvre 2440.

Referring to FIG. 10, the illustrated embodiment of the method 2400 comprises a step of receiving 2410 the environment signal from the environment sensing means 2330. The controller 2210 determines 2420 whether the environment signal is indicative of one or more features 2125 in the vicinity of the vehicle 2110 corresponding to suitable vacancy 2172. If there is no suitable vacancy, then no defined manoeuvre is performed. In at least some examples, such non-performance or unavailability is communicated to the user (e.g. the user is notified that no suitable vehicle vacancy or only an unsuitable vacancy has been detected).

It will be appreciated that in at least some examples, the defined manoeuvre can be performed without an explicit or discrete selection by the user. For example, where only a single target defined manoeuvre completed position is available or most suitable, performance of the defined manoeuvre 2440 may be performed to the defined manoeuvre completed position without any express selection between options or notification thereof. Likewise, in at least some examples, there may be a general default orientation provided for performing one or more defined manoeuvres, such as a preferred orientation where multiple orientations may be available. The default may be adaptable, such as programmable by a user and/or self-learning such as to evolve or adapt (e.g. with user behaviour over a period of time). In at least some examples, there may be a default mode to perform the defined manoeuvre without any option or requirement to select an orientation. In other examples, the default mode may be to a particular orientation, such as with perpendicular parking-in performed rearwards to leave the vehicle 2110 facing forwards 2114 out of the vacancy 2172 in the direction entered, such as to ease unparking—or vice versa, with the parking-in performed rearwards to ease access to a boot or trunk of the vehicle 2110 from the vacancy 2172 entrance side.

The defined manoeuvre completed position and/or orientation may be selected explicitly via a user input, such as selection via an interface. In at least some examples, the defined manoeuvre completed position and/or orientation selection may be via a user action. For example, where an defined manoeuvre completed position and/or orientation is available, selection of an defined manoeuvre completed position and/or orientation may be at least partially achieved by user positioning the vehicle 2110 in a defined manoeuvre start position with the vehicle 2110 offset towards the preferred direction for orienting the vehicle 2110 in the defined manoeuvre completed position (e.g. whereby the defined manoeuvre can be initiated with the vehicle 2110 travelling in the forwards or rearwards direction respectively). Additionally, or alternatively, selection may be via another system or interface, such as activation of a left/right signal indicator; a steering wheel, touchscreen, voice command, or a location of an occupant (e.g. an occupant opening a vehicle door, exiting a vehicle seat, etc.).

In FIG. 11(a), the vehicle 2110 is illustrated in broken lines at a possible defined manoeuvre completed position with a possible orientation after the performance of a defined manoeuvre from the start position of FIG. 7(a) to the defined manoeuvre completed position of FIG. 11(a), according to an embodiment of the invention. Such a possible defined manoeuvre completed position and/or orientation can be notified to the user in advance of performance of the defined manoeuvre. Here, the defined manoeuvre would be performed to a target defined manoeuvre completed position to orient the vehicle 2110 parallel to the adjacent vehicles 2140, 2150 in a parallel, on-street parking defined manoeuvre.

Figure 11B:
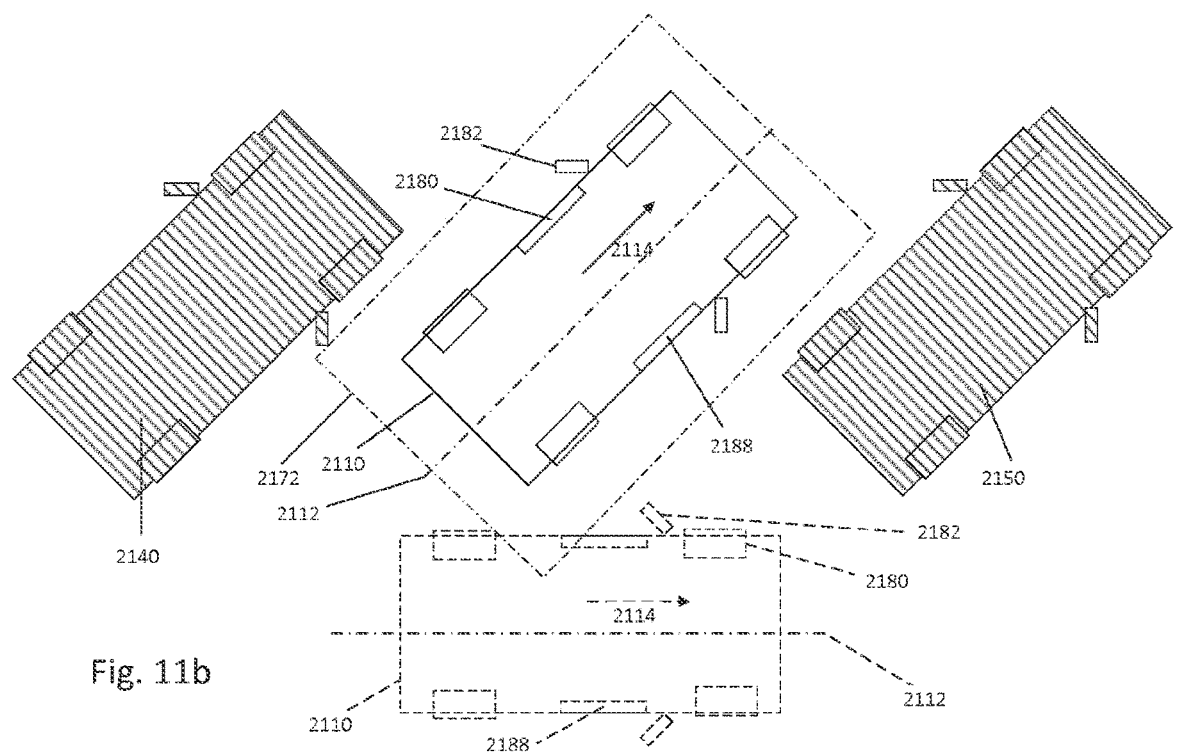
FIG. 11b, shows the vehicle according to an embodiment of the invention in a scenario based on that of FIG. 7b.

FIG. 11(b) shows a scenario generally similar to that shown in FIG. 7(b). In FIG. 11(b) the control means has identified a possibility of and preference for orienting the vehicle 2110 within the vacancy 2172 in a similar direction and facing a similar direction as that of both adjacent vehicles 2140, 2150. As shown here, the vehicle 2110 is shown in FIG. 11b having performed the defined manoeuvre under the control of the controller, with the start position of FIG. 7b shown in broken lines. In alternative examples (not shown), the controller may offer the user an option of an alternate orientation, such as with the vehicle facing forwards out of the vacancy 2172, in an opposite direction to that shown.

Figure 11C:
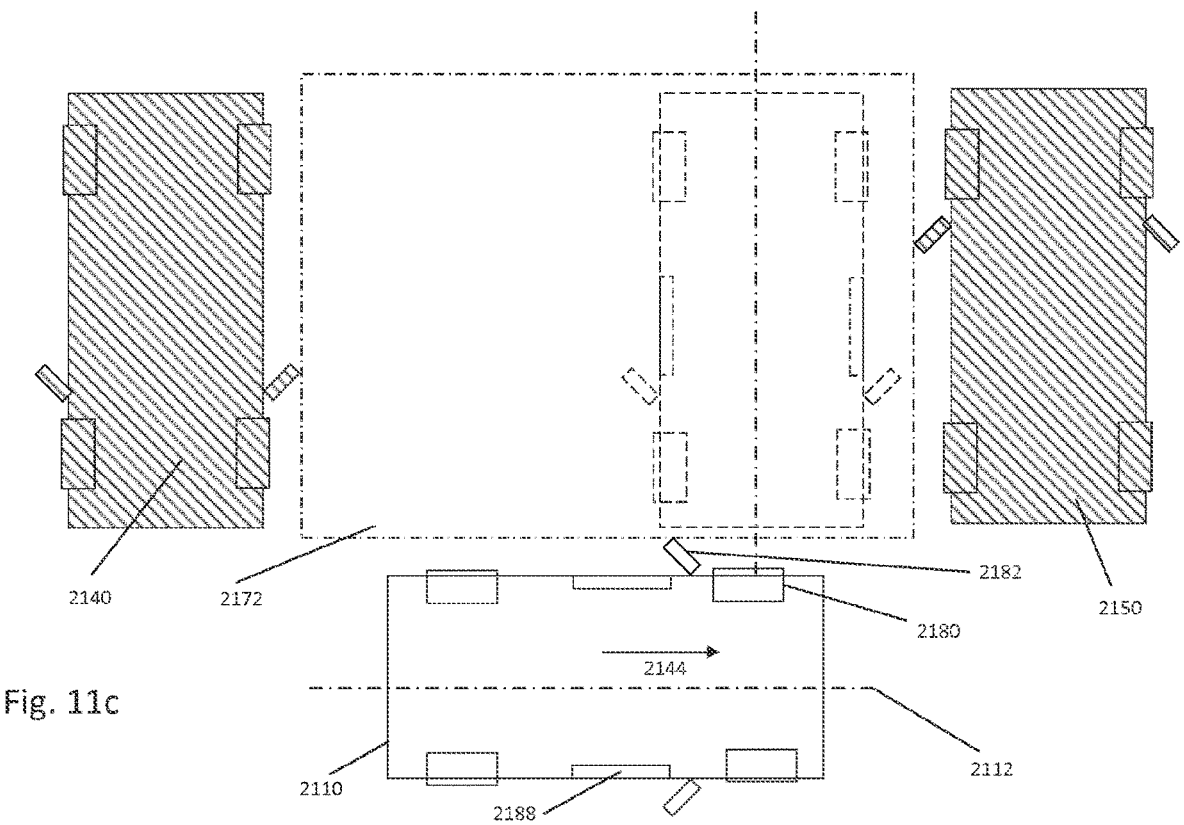
FIGS. 11c, 11d and 11e illustrate the vehicle in scenarios based on that of FIG. 7c.
Figure 11D:
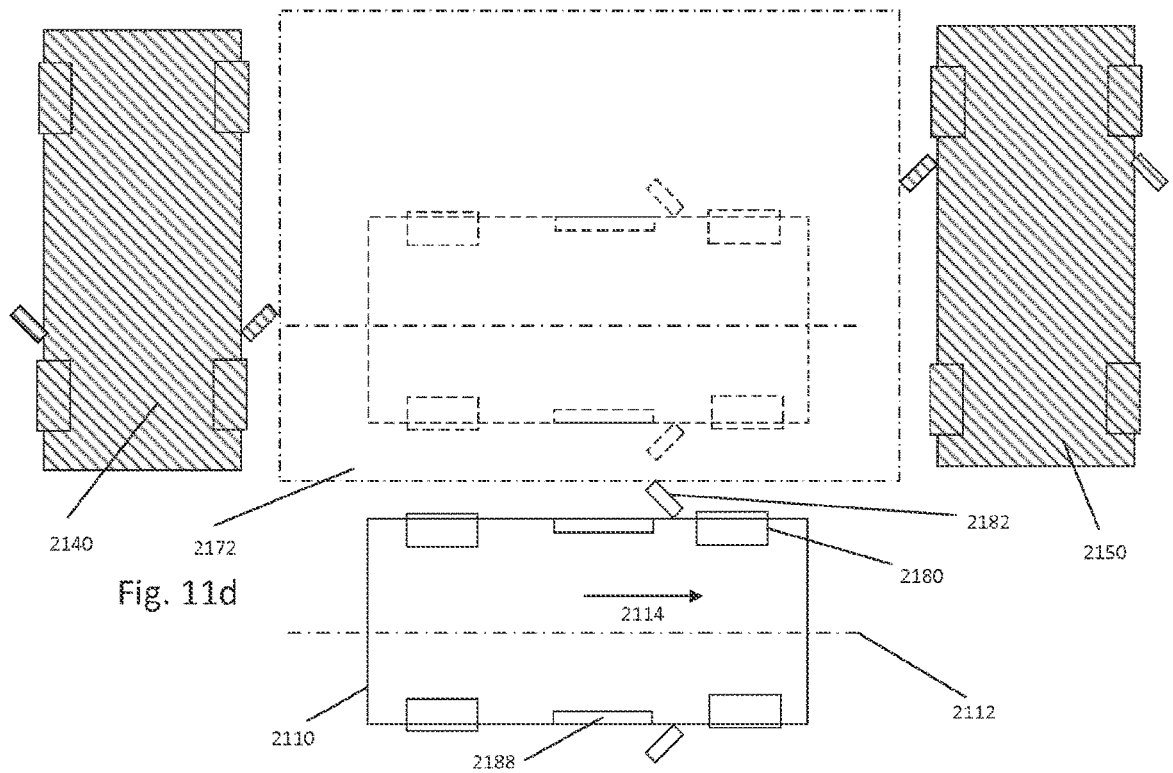
Figure 11E:
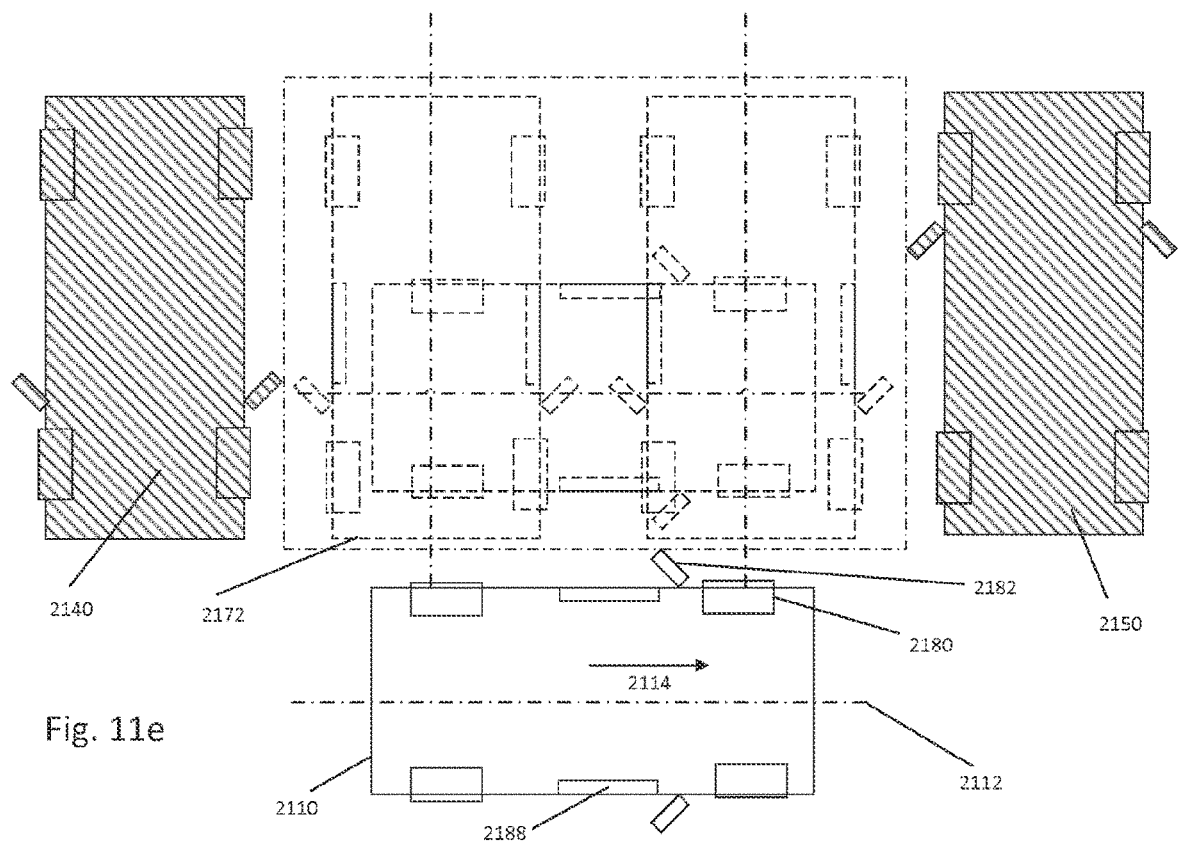

FIGS. 11(c), 11(d) and 11(e) show scenarios generally similar to that shown in FIG. 7(c). In FIG. 11e, three example possible defined manoeuvre completed position with possible orientations are indicated. The user (not shown) is offered selection of the possible defined manoeuvre completed position and possible orientation; and, upon the users selection, the defined manoeuvre can be performed to the desired defined manoeuvre completed position, shown in broken lines in FIG. 11(e).

Depending on preferences or particular embodiment, the controller may select or offer a default defined manoeuvre and/or orientation, such as indicated in FIG. 11c. It will be appreciated that the scenario as depicted in FIG. 11(c) now presents a further scenario for a possible defined manoeuvre. For example, a further vehicle (not shown) may now be able to perform a defined manoeuvre into the vacancy 2172 between the already-parked vehicle 2110 and the left-hand adjacent vehicle 2140. It will be appreciated that the performance of the defined manoeuvre to the offset defined manoeuvre completed position as shown in FIG. 11(c) has allowed the vacancy of FIGS. 7(c) and 11(c) to be used for receiving two vehicles, which may not otherwise have been possible (e.g. as shown in FIG. 11(d)).

Once in the defined manoeuvre completed position, being parked positions in each of FIGS. 11(a), 11(b), 11(c) 11(d), and 11(e) the user 2195 typically applies a parking brake, to leave the vehicle 2110 stationary with the engine switched off.

The controller 2200 may be arranged to offer and/or select the possible defined manoeuvre completed position with a possible orientation in dependence on the environment signal, such as the properties of the vacancy 2172. For example, the controller 2200 may be arranged to offer and/or select the possible defined manoeuvre completed position with a possible orientation in dependence on the size of the vacancy 2172, the alignment of the adjacent objects 2140, 2150, or other parameters associated with the vacancy 2172. In at least some examples, the available possible defined manoeuvre completed position with a possible orientation may be limited (e.g. by a vacancy 2172 comprising dimensions unsuitable for access to/from one or more vehicle openings when oriented to a particular direction). Additionally, or alternatively, the controller 2200 may be arranged to offer and/or select the possible defined manoeuvre completed position with a possible orientation in dependence on other parameters, such as one or more of: an ambient environmental condition (e.g. rain, temperature, lightness, darkness, time of day, day of week, etc); a terrain condition (e.g. road surface condition, off-road surface condition, gradient, etc); a location or locations of multiple vehicle occupants (e.g. the location of each vehicle occupant).

The controller 2210 may be arranged to allow for user adaptation. For example, the user may be able to at least partially override, program or adjust the controller 2210 for one or more of the following: the one or more available possible defined manoeuvre completed positions; the possible orientation or orientations; the one or more inputs for determination of the available possible defined manoeuvre completed position and/or possible orientation; a selection means for selecting the defined manoeuvre completed position and/or possible orientation. The controller 2210 may be arranged to be manually overridden, programmed or adjusted, such as to adjust the output of the manoeuvre signal. Additionally, or alternatively, the controller 2210 may be arranged to automatically, or semi-automatically, override, program or adjust the output of the manoeuvre signal, such as by learning from a user behaviour, such as a repeated user behaviour, associated with one or more of: an input pattern; a geographic location; a user identity (e.g. where the vehicle 2110 is used noncontemporaneously by multiple users). For example, the controller 2210 may be arranged to automatically select a default orientation when the occupant 2195 is located at a particular location (e.g. relative to the vehicle 2110); or when the vehicle 2110 is positioned at a particular location, such as a home or garage where the user has previously performed a defined manoeuvre into a known vacancy.

It will be appreciated that other defined manoeuvres than illustrated may be performed. It will be appreciated that the controller 2200 may be arranged to allow occupant transitioning between in and out of vehicle locations during the performance of the defined manoeuvre. For example, the controller 2200 may be arranged to allow interruption or pausing of the defined manoeuvre, such as to allow the occupant 2195 to transition into or out of the vehicle 2110 whilst the vehicle 2110 is stationary. In at least some examples, the vehicle 2110 may have steerable rear wheels; or the vacancy may comprise a fishbone (diagonal) vacancy 2172 or a perpendicular vacancy (e.g. with the vehicle 2110 parked end on).

As a result of the method 2400 the vehicle may be more advantageously positioned or configured following performance of a defined manoeuvre. It will also be appreciated that embodiments of the present invention are not limited to being useful in association with a defined manoeuvre. It may be useful to provide an indication of possible defined manoeuvre completed positions and/or possible orientations for performing a portion of a defined manoeuvre even when parked or when being driven by a human driver.

Third Technique

FIGS. 13a and 13b illustrate a vehicle 3110 according to an embodiment of the invention in two different scenarios. In FIG. 13a, the vehicle 3110 is illustrated as having a vehicle forward direction, indicated by arrow 3114, corresponding to an opposite direction to a downward inclination or slope direction, indicated by arrow 3116. In FIG. 13b, the vehicle 3110 is illustrated as having the vehicle forward direction, indicated by arrow 3114, corresponding to the downward inclination or slope direction, indicated by arrow 3116. In both scenarios, the vehicle 3110 is illustrated at a defined manoeuvre completed position with a vehicle wheel 3180 parallel to a feature 3125 in a vicinity of the vehicle 3110, as will be explained.

In FIG. 13(a) the vehicle 3110 is at the completed position where the defined manoeuvre is a manoeuvre to leave the vehicle pointing uphill, intended to be a parked positioned of the vehicle 3110. The vehicle 3110 is shown in relation to a feature 3125 in a vicinity of the vehicle 3110. The feature 3125 is, in this example, an object which is a kerb that is parallel to a longitudinal axis 3112 of the vehicle 3110 i.e. generally parallel to a side of the vehicle 3110, such as a left side here—in the completed position. The object is not limited to being a kerb 3125 and may be, for example, a verge, gutter, bollard, sidewalk, wall or other object at or adjacent an edge of a ground surface for the vehicle, such as a road edge.

In FIG. 13(b) the vehicle 3110 is at the completed position where the defined manoeuvre is a manoeuvre to leave the vehicle pointing downhill, intended to be a parked positioned of the vehicle 3110. The vehicle 3110 is again shown in relation to the feature 3125 in the vicinity of the vehicle 3110.

It will be understood in both cases shown in FIGS. 13(a) and (b) that the defined manoeuvre may be a manoeuvre of the vehicle 3110 which is performed automatically by the vehicle 3110 i.e. under control of one or more systems of the vehicle 3110. The defined manoeuvre may be considered to be performed automatically by the vehicle 3110, or at least semi autonomously. In FIG. 13(a) the defined manoeuvre may be a parking manoeuvre to control the vehicle 3110 to drive into the parking structure 3125 or parking place. In FIG. 13(b) the defined manoeuvre may be a manoeuvre to move the vehicle 3110 from the parked position, such as in general direction of arrow 3155, from between the other vehicles 3140, 3150.

In both situations, it may be advantageous for the manoeuvre to be performed whilst a person in control of the vehicle 3110 is external to the vehicle 3110. For example, access to the vehicle 3110 may be limited in FIG. 13(a) or 13(b) after performing the defined manoeuvre (e.g. where the feature 3125 is a wall or other hindrance to opening a vehicle door).

To perform the defined manoeuvre, the vehicle 3110 comprises environment sensing means for determining a location of features 3125 in the vicinity of the vehicle 3110. The environment sensing means may comprise one or more sensing devices or imaging devices. The one or more sensing devices may emit radiation and receive radiation reflected from the features in the vicinity of the vehicle, such as ultrasonic sensing devices, although it will be appreciated that the present invention is not limited in this respect. Such environment sensing means have a minimum distance to which accuracy the location of the features 3125 may be determined due to, for example, a resolution of an imaging device or a signal-to-noise ratio of a sensing device.

Once in the completed position, being parked positions in FIGS. 13(a) and 13(b), the user typically applies a parking brake, to leave the vehicle stationary with the engine switched off. In an event of incorrect application of the parking brake, or an unintended release of the parking brake, the vehicle 3110 may roll undesirably in the downhill direction 3116—rearwards in FIG. 13(a) and forwards in FIG. 13(b). Even without an incorrect application or unintended release of the parking brake, the vehicle 3110 may be parked undesirably, such as in violation of local parking regulations for vehicles parked on inclines.

Embodiments of the present invention aim to ameliorate one or both of these problems.

Figure 14:
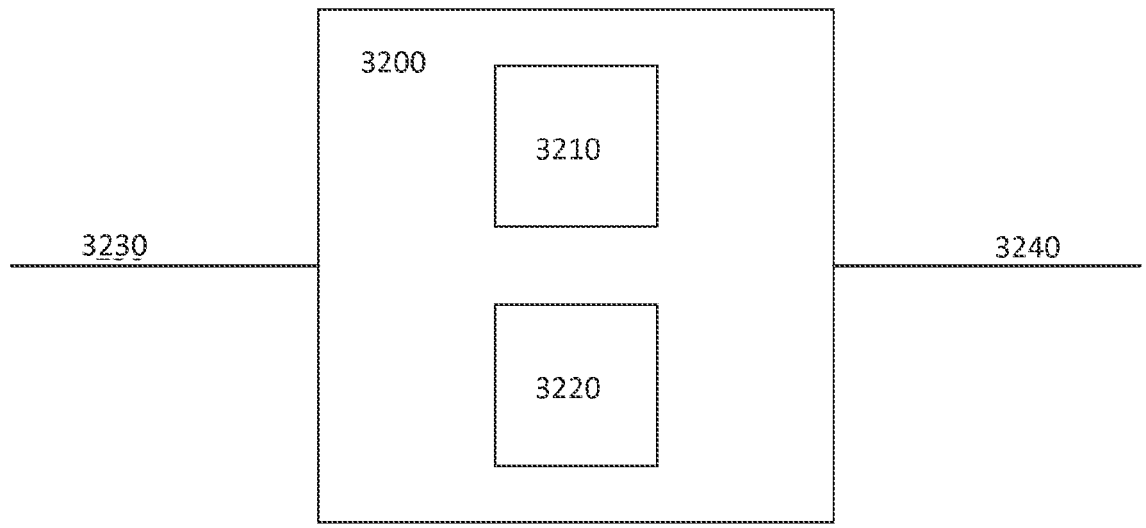
FIG. 14 shows a controller according to an embodiment of the invention.

FIG. 14 illustrates a controller 3200 or control unit 3200 according to an embodiment of the invention, such as comprised in the vehicle 3110 of FIGS. 13(a) and 13(b).

The controller 3200 comprises a control means 3210, input means 3230 and output means 3240. In some embodiments the controller comprises a memory means 3220 such as one or more memory devices 3220 for storing data therein. The output means 3240 may comprise an electrical output for outputting a manoeuvre signal. The manoeuvre signal represents an instruction for the vehicle 3110 to move. The instruction provided by the manoeuvre signal is provided to cause the vehicle wheel 3180 in the completed position to be angularly offset with respect to the feature 3125 in the vicinity of the vehicle 3125. Here, the instruction provided is to cause the vehicle wheel 3180 to be angled towards the feature 3125. The feature 3125 to which the vehicle wheel 3180 should be angled towards may be determined in dependence on a user input, such as user activation of an indicator (turn signaller). For example, the controller may determine the feature 3125 as a kerb towards which the vehicle wheel 3180 should be angularly offset, in dependence on the user input. In other examples, the user may explicitly specify or request the direction of angular offsetting. In some examples, no user action or input is required to determine if, or in which direction, and angular offset is required, such as where the controller 3200 automatically applies the angular offset—either in all such parking-in defined manoeuvres or in all particular situations meeting parameters or criteria defined as requiring an angular offset. The control means 3210 may be formed by one or more electronic processing devices such as an electronic processor. The processor may operably execute computer readable instructions stored in the one or more memory devices 3220. The control means 3210 is arranged to control the output means 3240 to output the manoeuvre signal in dependence on the environment signal, as will be explained. In some embodiments the input means 3230 and output means 3240 may be combined such as by being formed by an I/O unit or interface unit. For example, the controller 3210 may comprise an interface to a network forming a communication bus of a vehicle. The interface bus may be an Internet Protocol (IP) based communication bus such as Ethernet, although embodiments of the invention are not limited in this respect.

The input means 3230 may comprise an electrical input for receiving an environment signal. The input means 3230 may comprise an electrical input for receiving a request signal. Here, the request signal is indicative of a wirelessly received signal representing a user request for movement of the vehicle 3110.

In at least some examples, the controller 3210 may comprise a second input means for receiving a request signal indicative of a received signal indicative of a user request, such as a wirelessly received signal. For example, the request signal may indicate a user request (e.g. for performance of a portion of a particular defined manoeuvre) that has been sent wirelessly from a mobile device and received by the controller or another device or system connected thereto.

It will be appreciated that the controller 3200 may be arranged to perform a portion of the defined manoeuvre. For example, the user may initiate the manoeuvre with control being transferred to the controller 3210 thereafter to complete the defined manoeuvre. In at least some examples, the controller 3210 is arranged to angularly offset the vehicle wheel 3180 after the vehicle 3110 has been generally positioned in a parked position, such as under user control. The controller 3210 may be arranged to indicate a possibility of angularly offsetting the vehicle wheel to the user, and controlling the output means in dependence on the user request therefor. In at least some examples, the controller may be arranged to automatically angularly offset the vehicle wheel without requiring an explicit user request therefor. The portion of the defined manoeuvre controlled by the controller may consist of angularly offsetting the vehicle wheel 3180.

Figure 15:
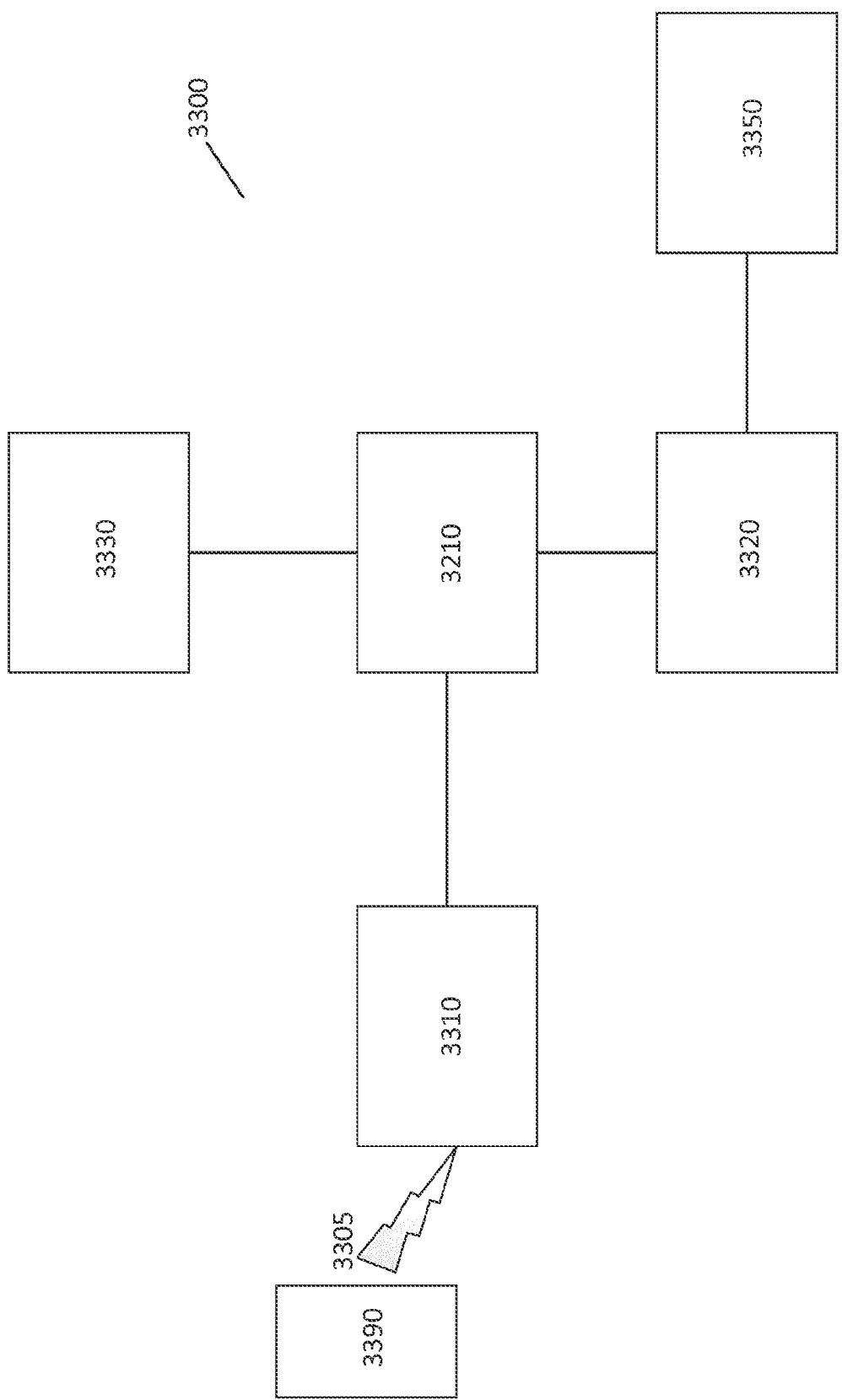
FIG. 15 shows a system according to an embodiment of the invention.

FIG. 15 illustrates a system 3300 according to an embodiment of the invention. The system 3300 comprises the controller 3210 described above and shown in FIG. 14.

The system 3300 comprises environment sensing means 3330 for determining information about an environment of the vehicle 3110. In particular, the environment sensing means 3330 is provided for determining a location of one or more features in a vicinity of the vehicle 3110. The environment sensing means 3330 is arranged to output an environment signal indicative of the determined features. The environment signal may be environment data which may be stored in a memory. The environment sensing means may comprise one or more sensing devices such as imaging devices, such as cameras, or other sensing devices such as LIDAR, radar, ultrasonic devices, sonar devices etc. Signals output by each of the sensing devices may be used to form a representation of the environment of the vehicle 3110 which is stored in the memory for use by other systems of the vehicle 3110.

Here, the environment sensing means 3330 is arranged to determine a location of features such as surface markings, which may be painted lines denoting a perimeter of a parking bay, for example, or objects such as walls, posts or other vehicles in relation to which the vehicle is required to manoeuvre. The control means is arranged to determine an absence of features, such as a separation between obstructive features (not shown) in dependence on the environment signal. Accordingly, the control means is arranged to determine a vacancy 3172 where no features, such as no obstructive features, are located. Where the vacancy 3172 is sufficiently great, the control means is arranged to determine a vehicle envelope suitable for receiving the vehicle 3110 in the defined manoeuvre completed position. The vehicle envelope comprises a target position suitable for receiving the vehicle 3110 in the defined manoeuvre completed position. As such, the vehicle envelope can comprise a target defined manoeuvre completed position. In at least some examples, the vehicle envelope is determined in dependence on a one-dimensional property and/or measurement and/or estimation. In particular, here, the vehicle envelope is determined in dependence on the environment signal being indicative of a length, such as an unobstructed length between features (not shown). The unobstructed length is sufficiently long for receiving the vehicle 3110 in the defined manoeuvre completed position, the length being a separation between features that is greater than the vehicle length or width in the defined manoeuvre completed position. The defined manoeuvre may comprise, for example, parking in a parked position.

The controller 3210 of the system 3300 here comprises defined manoeuvre means. The control means is arranged to control the vehicle 3110 to perform at least one defined manoeuvre. The controller 3210 may comprise a defined manoeuvre controller for controlling one or more systems of the vehicle 3110 to perform one or more defined manoeuvres. The defined manoeuvre means may be associated with one or more actuators 3350 of the vehicle 3110. The one or more actuators 3350 are provided for effecting movement of the vehicle 3110. The actuators may comprise one or more of a power steering mechanism arranged to provide steering of wheels of the vehicle 3110 in dependence on signals received from the controller 3210. A second actuator may comprise a powered braking mechanism of the vehicle 3110 which is arranged to actuate brakes of the vehicle in dependence on signals received from the controller 3210. A third actuator comprises the powertrain of the vehicle. The controller 3210 is arranged to control the steering of the vehicle wheel 3180 relative to the feature 3125. The controller 3210 is arranged to control the application of a steering force to cause the vehicle wheel to be angled generally towards the feature 3125, when the vehicle is positioned in a defined manoeuvre completed position.

The system 3300 shown here comprises a motive control means 3320. The motive control means 3320 may be a motive control unit. The motive control means 3320 is arranged to receive the manoeuvre signal output by the controller 3210. The motive control means 3320 is associated with one or more motive units of the vehicle 3110 which may form part of a powertrain (not shown) of the vehicle 3110. The motive units may comprise one or more of an internal combustion engine and one or more electric machines of the vehicle 3110. The powertrain is arranged to provide power, or torque, to cause movement in the longitudinal axis of the vehicle 3110 i.e. forward or backward movement of the vehicle 3100 in dependence on the manoeuvre signal received from the controller 3210. The motive control means 3320 is arranged to control the application of torque to one or more wheels of the vehicle 3110 to move the vehicle 3110 in the longitudinal axis of the vehicle i.e. to move the vehicle generally forwards or backwards. The torque may comprise driving torque i.e. applied in a direction of desired movement, such as forwards. The torque may also comprise braking torque i.e. applied to resist the driving torque. In at least some embodiments both driving torque and braking torque may be applied simultaneously in order to provide low-speed movement of the vehicle 3110. The braking torque may also be applied at least partly after the driving torque in order to effect accurate movement of the vehicle 3110. To achieve control of the steering, the controller 3210 may communicate with the motive control means 3320. Thus the one or more actuators 3350 can control a direction and movement of the vehicle to perform the defined manoeuvre. The defined manoeuvre is performed in dependence on the environment signal provided by the environment sensing means 3330.

The one or more defined manoeuvres which may be performed by the vehicle 3110 under control of the controller 3210 may comprise a parking manoeuvre, such as shown in FIGS. 13(*a*) and 13(*b*) wherein the vehicle 3110 is controlled to arrive at a parked position.

As shown here, the system 3300 comprises a receiver means 3310 for receiving a signal 3305. The signal 3305 may be wirelessly received from a mobile device 3390 associated with a person responsible for the vehicle 3110. The signal 3305 is indicative of a user request for vehicle movement of the vehicle 3110, as noted above. The receiver means 3310 is arranged to output the request signal to the input means 3230 of the controller 3210 as described above. The request signal may be output by the receiver means 3310 onto a communication bus of the vehicle 3110 which may communicably couple the components of the system 3300.

The receiver means 3310 may be in the form of a radio unit 3310. The radio unit 3310 may comprise a receiver for receiving radio signals 3305 from the mobile device 3390. In some embodiments the radio unit 3310 may also comprise a transmitter, or may be a transceiver 3310 configured to receive radio signals 3305 transmitted from the mobile device 3390 and transmit signals to the mobile device 3390. The radio unit 3103 and the mobile device 3390 may be arranged to provide a wireless local area network, via which two-way communication may take place between the radio unit 3103 and the mobile device 3390. For example, the radio unit 3103 may be arranged to communicate by WiFi® with the mobile device 3390. In alternative embodiments other radio communication standards may be used for the communication. In one example, communication between the radio unit 3103 and the mobile device 3390 is provided via Bluetooth®, although other protocols or standards may be envisaged.

The mobile device 3390 may be an electronic key fob associated with the vehicle 3110, such as may be used to gain entry and to activate or power up the vehicle 3110. The mobile device 3390 may, in other embodiments, be an electronic device associated with the person responsible for the vehicle 3100 such as a mobile telephone, tablet, watch, wearable electronic device or other computing device associated with the person. The mobile device 3390 is capable of receiving a user input indicating the person's desire to move the vehicle 3110. The user input may be provided in the form of a button or key press, activation of a graphically displayed icon, a gesture or voice command. Other forms of user input may also be envisaged.

As shown here, the vehicle wheel 3180 is angled to contact the feature 3125 in the event of the vehicle 3110 rolling against or with the gradient. In other examples, the vehicle wheel 3180 may be angled to allow a different vehicle wheel to contact the feature 3125 in the event of the vehicle 3110 rolling. For example, a front, steerable vehicle wheel 3180 may be angled to allow or cause a rear vehicle wheel to contact the feature 3125 in the event of the vehicle rolling downhill.

Figure 16:
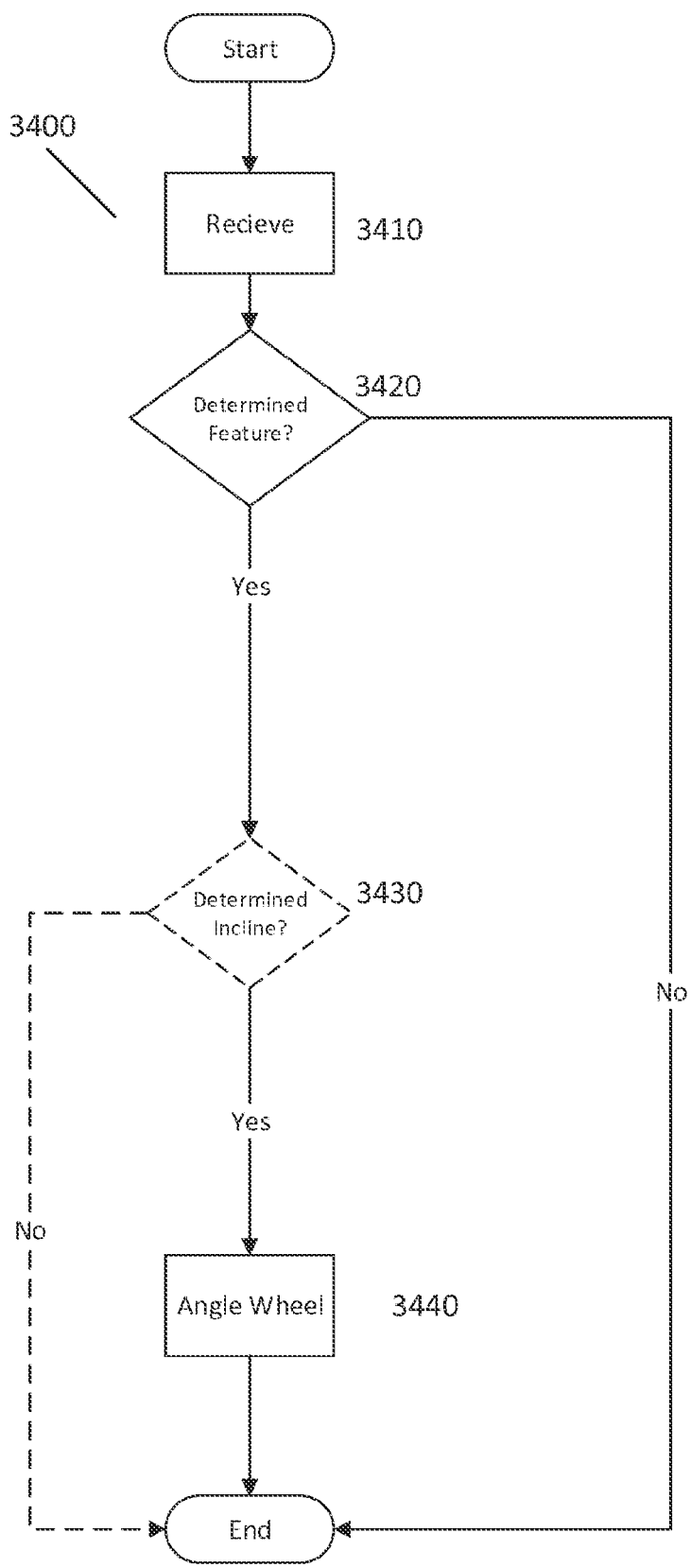
FIG. 16 shows a method according to an embodiment of the invention.

FIG. 16 illustrates a method 3400 according to an embodiment of the invention. The method 3400 is a method of controlling movement of the vehicle 3110. The method 3400 may be formed by the controller 3210 and system 3300 described above with reference to FIGS. 14 and 15. The method 3400 will be described with reference to FIGS. 17(a) and 17(b) as examples which correspond to the situations shown in FIGS. 1(a) and 1(b) respectively.

The method 3400 broadly comprises steps of receiving 3410 the environment signal from the environment sensing means 3330 which is indicative of a feature 3125 in a vicinity of the vehicle 3110 and, in dependence thereon, controlling 3440 an angle of one or more wheels 3180 of the vehicle 3110 relative to the feature 3125 to angularly offset the one or more vehicle wheels 3180 relative to the longitudinal axis 3112 of the vehicle 3110.

Referring to FIG. 16, the illustrated embodiment of the method 3400 comprises a step of receiving 3410 the environment signal from the environment sensing means 3330. The controller 3210 determines 3420 whether the environment signal is indicative of one or more features 3125 in the vicinity of the vehicle 3110 corresponding to an object relative to which the vehicle wheel 3180 may be desired to be angularly offset.

In the embodiment shown here, there is an optional additional step 3430 whereby the controller 3210 determines whether the vehicle 3110, and/or a ground surface proximal (e.g. under) the vehicle 3110 is inclined. The controller 3210 may determine a presence of the incline; and in at least some embodiments, a direction and/or a magnitude of the incline. In dependence thereon, the controller 3210 may determine whether there is a sufficient incline, and in which direction; and whether there is a suitable feature 3125, such as a kerb, in the vicinity of the vehicle 3110. In dependence thereon, the controller 3210 may output a corresponding manoeuvre signal to instruct movement of the vehicle 3110, in particular rotation of the vehicle wheel 3180 relative to the vehicle 3110, in step 3440. As noted above, in at least some embodiments, the controller 3210 may determine a preferred angular offset 3184 of the vehicle wheel 3180 and output the manoeuvre signal in dependence thereon. In particular, the controller 3210 may output the manoeuvre signal to cause the vehicle wheel 3180 to be angled towards the feature 3125 in a downhill direction, such that the vehicle wheel 3180 would contact the feature 3125 in the event of the vehicle moving, such as rolling, from the completed manoeuvre position (e.g. of FIG. 13(a) or 13(b)). The inclination may be determined in dependence on a vehicle sensor, such as a vehicle accelerometer (not shown). The inclination may be determined based upon the environment signal, such as a determination of a feature relative to the vehicle 3110 (e.g. based on a slope of the feature 3125 in the vicinity of the vehicle; and or on an additional feature, such as a vertical post). The controller 3210 may be arranged to determine the feature 3125 as a kerb from multiple objects denoted by the environment signal. In at least some examples, the controller may determine the presence, direction and/or magnitude of the incline based on the location of the vehicle 3110, such as indicated from data stored in the memory 3220 and/or from a geographical location system of the vehicle 3110, such as a navigation system, and/or of the mobile device proximal to or associated with the user of the vehicle.

In at least some examples, for the provision of the manoeuvre signal to angularly offset the vehicle wheel 3180 the controller 3210 may require a presence of an incline above a minimum threshold, such as above around 1 degrees from horizontal, preferably above around 3 degrees from horizontal—although may be a higher threshold in at least some examples, such as above around 5 degrees from horizontal. The minimum incline threshold may correspond to a possible rolling of the vehicle and/or a regulatory requirement—such as where a parking regulation requires cramping of vehicle wheels when parked on inclines of 3 degrees or more. Other inclines may be envisaged.

The controller 3210 may be arranged to angularly offset the vehicle wheel 3180 by at least a minimum angle 184, such as at least around 10 degrees, preferably at least around 15 degrees, optionally at least around 20 degrees, relative to the longitudinal axis 3112 of the vehicle 3110. The minimum angle 184 may correspond to a minimum angle at least that of a regulatory requirement for wheel cramping. In at least some examples, the angle 184 of offset corresponds to a maximum angular offset of the vehicle wheel 3180 relative to the longitudinal axis 3112 of the vehicle 3110, such as full lock of the steerable vehicle wheel 3180.

The controller 3210 may be arranged to allow for user adaptation. For example, the user may be able to at least partially override, program or adjust the controller 3210 such that one or more of the following: the provision of the angular offset; the incline threshold for providing the angular offset; the location or locations where the angular offset is provided; the direction of the angular offset; and the angle of the angular offset. The controller 3210 may be arranged to be manually overridden, programmed or adjusted, such as to adjust the output of the manoeuvre signal. Additionally, or alternatively, the controller 3210 may be arranged to automatically, or semi-automatically, override, program or adjust the output of the manoeuvre signal, such as by learning from a user behaviour, such as a repeated user behaviour, associated with one or more of: an input pattern; a geographic location; a user identity (e.g. where the vehicle 3110 is used noncontemporaneously by multiple users). For example, the controller 3210 may be arranged to not angularly offset the vehicle wheel 3110 when the vehicle is positioned at a particular location, such as a home or garage, where the user has previously overridden, cancelled or rejected an angular offsetting of the vehicle wheel 3180. In at least some examples, the controller 3200 comprises a self-learning, such as to learn when and/or where to apply the angular offset.

It will be appreciated that the vehicle 3110 may be positioned on an incline in the defined manoeuvre completed position whereby the downhill direction is not necessarily parallel or aligned with the vehicle longitudinal axis 3112. For example, the direction of incline may have a transverse component, such as associated with a camber of a road. Particularly herefor, the controller may be arranged to determine a direction of roll, or likely roll, of the vehicle 3110, such as under gravity, and the vehicle wheel 3180 may be angularly offset in dependence thereon.

In at least some examples the controller 3210 may be arranged to apply a braking means and/or to engage a gear or drive function of the vehicle 3110 to prevent or inhibit unintended rolling of the vehicle, such as when the vehicle is parked on an incline.

Figure 18:
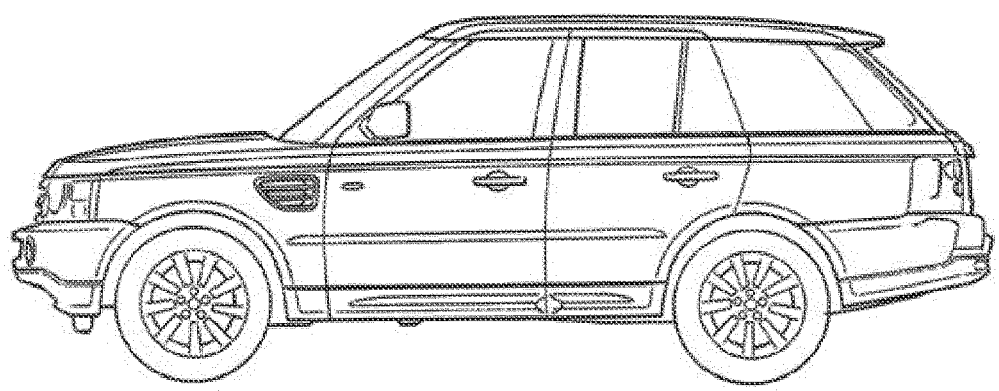
FIG. 18 is a vehicle according to an embodiment of the invention.

FIG. 18 shows a side view of an example vehicle according to an embodiment of the invention, being a car (private, passenger, non-service vehicle) as shown here.

As a result of the method 3400 the vehicle may be more advantageously positioned or configured following performance of a defined manoeuvre. It will also be appreciated that embodiments of the present invention are not limited to being useful in association with a defined manoeuvre. It may be useful to angularly offset the vehicle wheel 3180 even when parked or when having being driven by a human driver.

Fourth Technique

Figure 19:
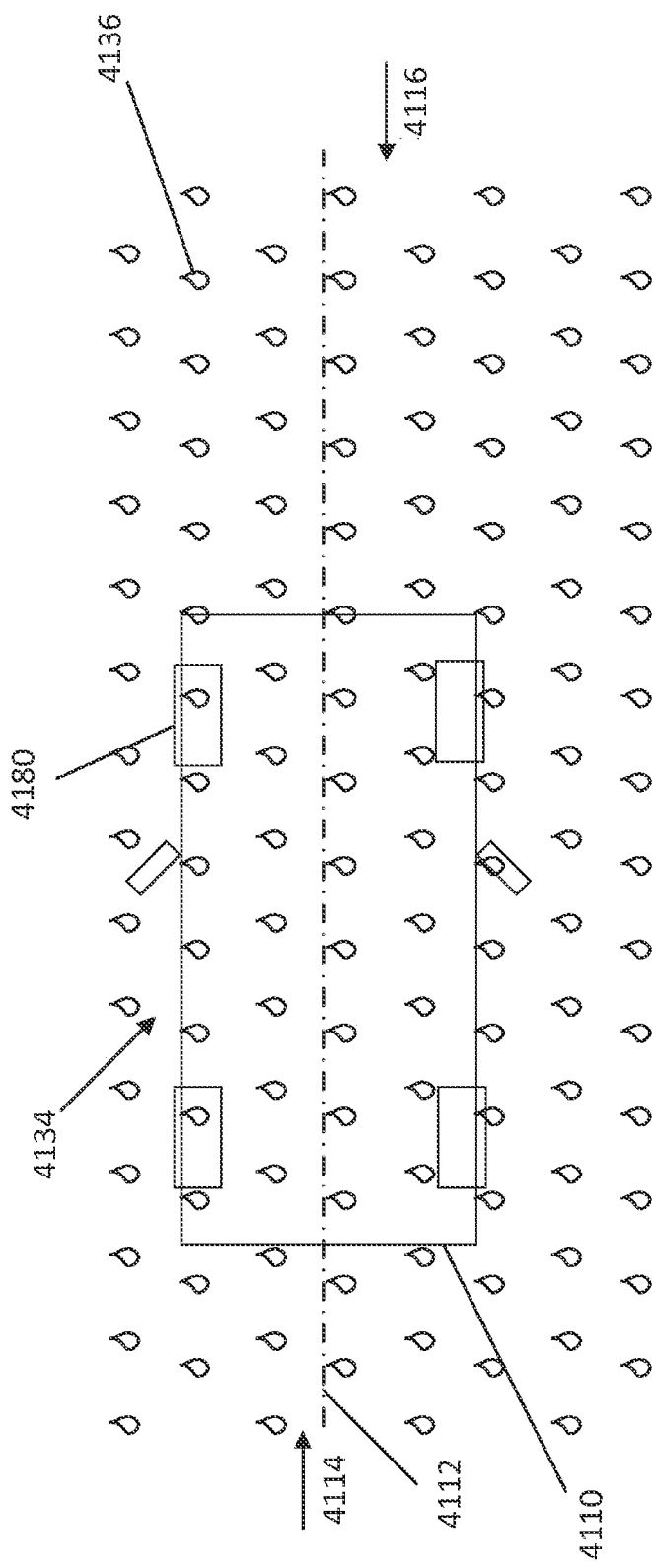
FIG. 19 shows a vehicle with an ambient condition in a vicinity of the vehicle.

FIG. 19 illustrates a vehicle 4110 according to an embodiment of the invention.

In FIG. 19 the vehicle 4110 is shown at a defined manoeuvre start position in advance of performing a defined manoeuvre, such as to a parked positioned of the vehicle 4110. The vehicle is shown here with a longitudinal axis 4112 and having a vehicle forward direction, indicated by arrow 4114. Here an ambient condition in the vicinity of the vehicle is shown as precipitation 4136, such as rain. The ambient condition is not limited to being precipitation and may include, for example, a temperature; an air temperature; a surface temperature, such as a road temperature; precipitation, such as rain, snow, hail; moisture; humidity; fog; mist; particles, such as airborne particles; light level; wind; wind speed; wind direction.

It will be understood that the defined manoeuvre may be a manoeuvre of the vehicle 4110 which is performed automatically by the vehicle 4110 i.e. under control of one or more systems of the vehicle 4110. The defined manoeuvre may be considered to be performed automatically by the vehicle 4110, or at least semi autonomously. In FIG. 19 the defined manoeuvre may be a parking manoeuvre to control the vehicle 4110 to drive into a parking structure or parking place. In at last some situations, it may be advantageous for the manoeuvre to be performed whilst a person in control of the vehicle 4110 is external to the vehicle 4110. For example, access to the vehicle 4110 may be limited after performing the defined manoeuvre.

The ambient condition or conditions may be such as to have an actual and/or a perceived effect on the performance of the defined manoeuvre, such as to physically and/or psychologically influence a user's experience of performance of the defined manoeuvre.

Embodiments of the present invention aim to ameliorate one or both of these problems.

Figure 20:
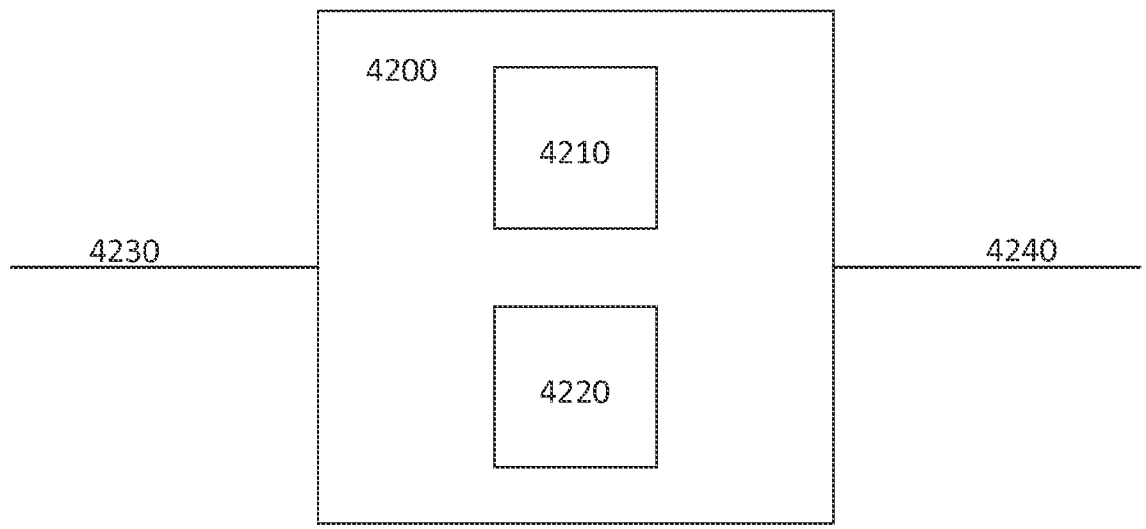
FIG. 20 shows a controller according to an embodiment of the invention.

FIG. 20 illustrates a controller 4200 or control unit 4200 according to an embodiment of the invention, such as comprised in the vehicle 4110 of FIG. 19.

The controller 4200 comprises a control means 4210, input means 4230 and output means 4240. In some embodiments the controller comprises a memory means 4220 such as one or more memory devices 4220 for storing data therein. The output means 4240 may comprise an electrical output for outputting a manoeuvre signal. The manoeuvre signal represents an instruction for the vehicle 4110 to move.

Here, the input means 4230 is for receiving an ambient condition signal indicative of the ambient condition 4136 in the vicinity of the vehicle 4110. The control means 4210 is arranged to control the output means 4240 to cause the vehicle 4110 to perform at least a portion of the defined manoeuvre in dependence on the ambient condition signal. Here, the control means 4210 is arranged to control the output means 4240 to cause the vehicle 4110 to perform at least a portion of the defined manoeuvre in accordance with a vehicle movement control profile determined in dependence on the ambient condition signal. Accordingly, the vehicle 4110 is caused to perform the defined manoeuvre in a controlled manner appropriate for the ambient condition.

The vehicle movement control profile comprises a speed parameter. Here, the speed parameter is indicative of a first order speed parameter. The control means 4210 is arranged to select the vehicle movement control profile in dependence on a categorisation of the ambient condition 4136. Advantageously, the control means 4210 of the vehicle 4110 automatically selects parameters for performance of the defined manoeuvre associated with predetermined categories of one or more ambient conditions. Here, the speed parameter is indicative of an acceleration and a jerk of the vehicle 4110, jerk being a rate of change of acceleration of the vehicle 4110. Accordingly, the vehicle 4110 is caused to perform the defined manoeuvre with an appropriate acceleration, such as to perform the defined manoeuvre efficiently and/or without undue acceleration of the vehicle 4110 or a user or content thereof. For example, as shown here with an ambient condition 4136 of rain, the vehicle movement control profile is selected to provide reduced speed parameters, such as reduced maximum speed, maximum acceleration and maximum jerk. Accordingly, where there is an increased possibility of decreased grip (e.g. due to the rain wetting a road or other surface under the vehicle wheels 4180); or at least an increased possibility of a users perception of decreased grip, then the controller 4200 adapts the performance of the defined manoeuvre to reduce the possibility of the vehicle 4110 slipping or at least reduce a user's perception of the possibility of the vehicle 4110 slipping. Accordingly, the vehicle 4110 is caused to perform the defined manoeuvre with an appropriate speed, acceleration and rate of change of acceleration, which is physically and psychologically suited to the ambient conditions to be comfortable for the user.

It will be appreciated that for other ambient conditions, other vehicle movement control profiles may be used. For example, the maximum speed parameter of the vehicle movement control profile corresponding to the wet ambient condition 4136 of FIG. 19 may be less than the maximum speed parameter of a vehicle movement control profile corresponding to a dry ambient condition. Accordingly, the maximum speed parameter can be varied to suit a variation in the ambient condition 4136. It will be appreciated that the vehicle movement control profile can be varied during the performance of the defined manoeuvre: for example, if the ambient condition changes (e.g. if the rain only starts subsequent to initiation of the defined manoeuvre).

To perform the defined manoeuvre, the vehicle 4110 comprises environment sensing means for determining a location of features in the vicinity of the vehicle 4110. The environment sensing means may comprise one or more sensing devices or imaging devices. The one or more sensing devices may emit radiation and receive radiation reflected from the features in the vicinity of the vehicle, such as ultrasonic sensing devices, although it will be appreciated that the present invention is not limited in this respect. Such environment sensing means have a minimum distance to which accuracy the location of the features may be determined due to, for example, a resolution of an imaging device or a signal-to-noise ratio of a sensing device.

It will be appreciated, that in at least some examples, the environment sensing means provides the ambient condition signal, or at least an input therefor. For example, the environment sensing means may comprise a sensor or imaging device capable of detecting precipitation and/or mist and/or fog. Additional or alternative inputs from or for the ambient condition signal may include one or more of: one or more thermometers; one or more wipers; vehicle lighting; traction sensor. For example, where a wiper is activated, manually and/or automatically, then the control means 4210 can be adapted accordingly, such as to a wet weather vehicle movement control profile, with a reduced speed parameter. Similarly, lighting of the vehicle 4110, manually and/or automatically activated, is used in at least some examples to determine the light level ambient condition—and the control means 4210 is arranged to adapt the output means 4240 accordingly (e.g. to reduce the speed parameter in darker ambient conditions). The ambient condition signal may be at least partially dependent on an ambient condition measurement. In addition, or alternatively, the ambient condition signal may be dependent at least partially on an estimated condition. The estimated condition may be derived from one or more other parameters or statuses. For example, where a vehicle is in a geographic location (e.g. not in a tunnel, shadow, etc) at a daytime for that location, then a low light level indication may be taken as indicative of an overcast or cloudy ambient condition.

Once in the defined manoeuvre completed position (not shown), the user typically applies a parking brake, to leave the vehicle stationary with the engine switched off.

The control means 4210 may be formed by one or more electronic processing devices such as an electronic processor. The processor may operably execute computer readable instructions stored in the one or more memory devices 4220. The control means 4210 is arranged to control the output means 4240 to output the manoeuvre signal in dependence on the environment signal, as will be explained. In some embodiments the input means 4230 and output means 4240 may be combined such as by being formed by an I/O unit or interface unit. For example, the controller 4210 may comprise an interface to a network forming a communication bus of a vehicle. The interface bus may be an Internet Protocol (IP) based communication bus such as Ethernet, although embodiments of the invention are not limited in this respect.

Here, the input means 4230 comprises an electrical input for receiving the ambient condition signal. The input means 4230 may comprise an electrical input for receiving an environment signal. The input means 4230 may comprise an electrical input for receiving a request signal. In at least some examples, the controller 4210 comprises a second input means for receiving a request signal indicative of a received signal indicative of a user request, such as a wirelessly received signal.

It will be appreciated that the controller 4200 may be arranged to perform a portion of the defined manoeuvre. For example, the user may initiate the manoeuvre with control being transferred to the controller 4210 thereafter to complete the defined manoeuvre.

Figure 21:
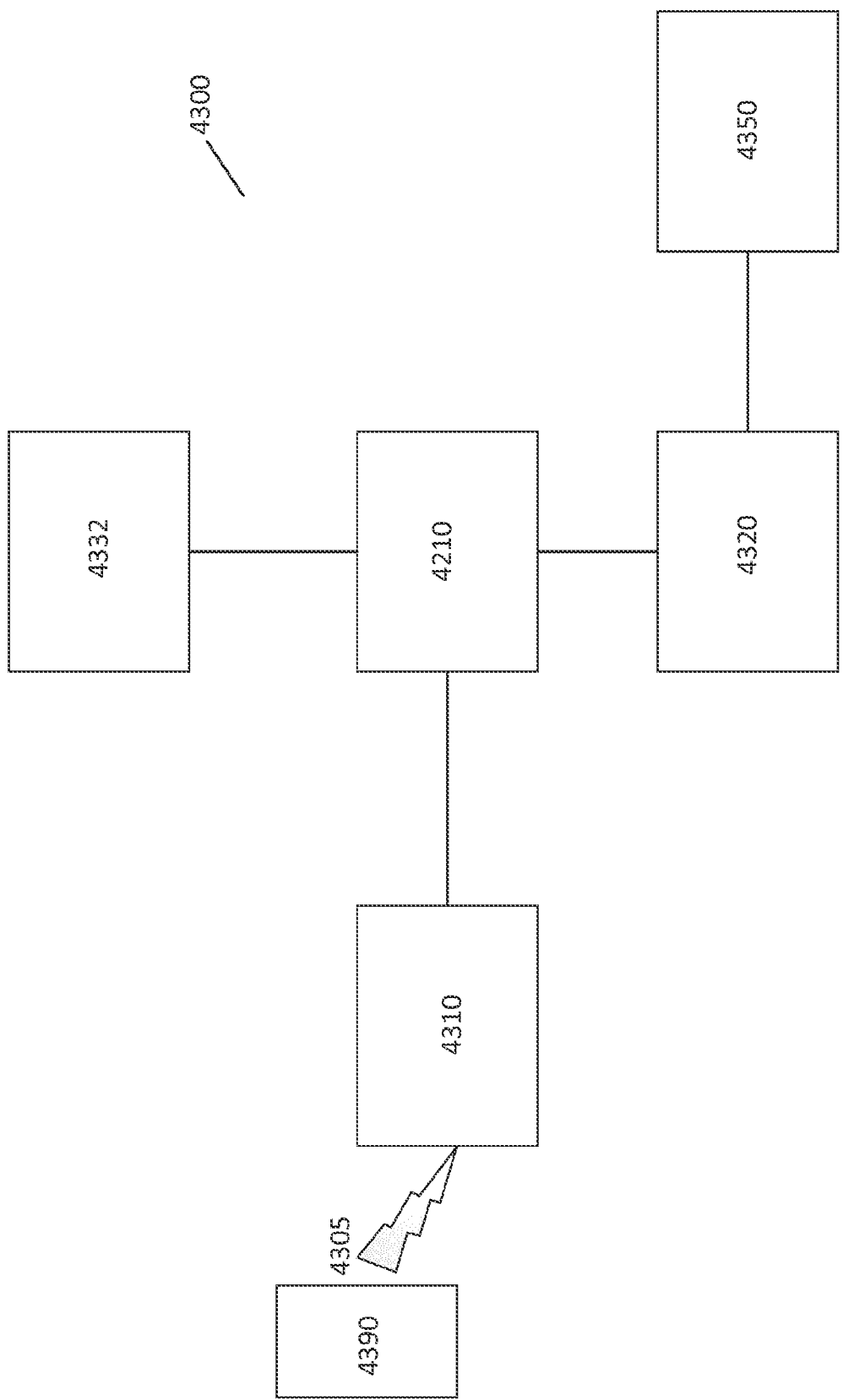
FIG. 21 shows a system according to an embodiment of the invention.

FIG. 21 illustrates a system 4300 according to an embodiment of the invention. The system 4300 comprises the controller 4210 described above and shown in FIG. 20.

The system 4300 comprises ambient condition sensing means 4332 for determining information about an ambient condition in the vicinity of the vehicle 4110. The ambient condition sensing means 4332 is arranged to output an ambient condition signal indicative of the determined ambient condition. The ambient condition signal may be ambient condition data which may be stored in a memory. The ambient condition sensing means may comprise one or more sensing devices such as environment sensing means (e.g. imaging devices, such as cameras, or other sensing devices such as LI DAR, radar, ultrasonic devices, sonar devices etc.); thermometers; precipitation sensors; traction sensors; light sensors. Signals output by each of the sensing devices may be used to form a representation of the ambient conditions in the vicinity of the vehicle 4110 which is stored in the memory for use by other systems of the vehicle 4110. In at least some examples, the ambient condition signal is dependent at least partially on an estimated condition. The estimated condition may be based, for example, on a geographic location, a time of day, time of week, time of year, weather forecast; and/or another vehicle system in addition or instead of the ambient condition sensing means.

Here, the vehicle comprises environment sensing means for determining a location of at least one feature in the vicinity of the vehicle; and outputting an environment signal indicative thereof. The environment sensing means is arranged to determine a location of features such as surface markings, which may be painted lines denoting a perimeter of a parking bay, for example, or objects such as walls, posts or other vehicles in relation to which the vehicle is required to manoeuvre. The control means is arranged to determine an absence of features, such as a separation between obstructive features (not shown) in dependence on the environment signal. Accordingly, the control means is arranged to determine a vacancy where no features, such as no obstructive features, are located. Where the vacancy is sufficiently great, the control means is arranged to determine a vehicle envelope suitable for receiving the vehicle 4110 in the defined manoeuvre completed position. The vehicle envelope comprises a target position suitable for receiving the vehicle 4110 in the defined manoeuvre completed position. As such, the vehicle envelope comprises a target defined manoeuvre completed position. In at least some examples, the vehicle envelope is determined in dependence on a one-dimensional property and/or measurement and/or estimation. In particular, the vehicle envelope can be determined in dependence on the environment signal being indicative of a length, such as an unobstructed length between features (not shown). The unobstructed length is sufficiently long for receiving the vehicle 4110 in the defined manoeuvre completed position, the length being a separation between features that is greater than the vehicle length or width in the defined manoeuvre completed position. The defined manoeuvre may comprise, for example, parking in a parked position.

The controller 4210 of the system 4300 here comprises defined manoeuvre means. The control means is arranged to control the vehicle 4110 to perform at least one defined manoeuvre. The controller 4210 may comprise a defined manoeuvre controller for controlling one or more systems of the vehicle 4110 to perform one or more defined manoeuvres. The defined manoeuvre means may be associated with one or more actuators 4350 of the vehicle 4110. The one or more actuators 4350 are provided for effecting movement of the vehicle 4110. The actuators may comprise one or more of a power steering mechanism arranged to provide steering of wheels of the vehicle 4110 in dependence on signals received from the controller 4210. A second actuator may comprise a powered braking mechanism of the vehicle 4110 which is arranged to actuate brakes of the vehicle in dependence on signals received from the controller 4210. A third actuator comprises the powertrain of the vehicle. The controller 210 is arranged to control the steering of the vehicle wheel 180 relative to the feature.

The system 4300 shown here comprises a motive control means 4320. The motive control means 4320 may be a motive control unit. The motive control means 4320 is arranged to receive the manoeuvre signal output by the controller 4210. The motive control means 4320 is associated with one or more motive units of the vehicle 4110 which may form part of a powertrain (not shown) of the vehicle 4110. The motive units may comprise one or more of an internal combustion engine and one or more electric machines of the vehicle 4110. The powertrain is arranged to provide power, or torque, to cause movement in the longitudinal axis of the vehicle 4110 i.e. forward or backward movement of the vehicle 4100 in dependence on the manoeuvre signal received from the controller 4210. The motive control means 4320 is arranged to control the application of torque to one or more wheels of the vehicle 4110 to move the vehicle 4110 in the longitudinal axis of the vehicle i.e. to move the vehicle generally forwards or backwards. The torque may comprise driving torque i.e. applied in a direction of desired movement, such as forwards. The torque may also comprise braking torque i.e. applied to resist the driving torque. In at least some embodiments both driving torque and braking torque may be applied simultaneously in order to provide low-speed movement of the vehicle 4110. The braking torque may also be applied at least partly after the driving torque in order to effect accurate movement of the vehicle 4110. To achieve control of the steering, the controller 4210 may communicate with the motive control means 4320. Thus the one or more actuators 4350 can control a direction and movement of the vehicle to perform the defined manoeuvre. The defined manoeuvre is performed in dependence on the ambient condition signal provided by the ambient condition sensing means 4332.

The one or more defined manoeuvres which may be performed by the vehicle 4110 under control of the controller 4210 may comprise a parking manoeuvre, such as a parking-in manoeuvre wherein the vehicle 4110 is controlled to arrive at a parked position.

As shown here, the system 4300 comprises a receiver means 4310 for receiving a signal 4305. The signal 4305 may be wirelessly received from a mobile device 4390 associated with a person responsible for the vehicle 4110. The signal 4305 is indicative of a user request for vehicle movement of the vehicle 4110. The receiver means 4310 is arranged to output the request signal to the input means 4230 of the controller 4210 as described above. The request signal may be output by the receiver means 4310 onto a communication bus of the vehicle 4110 which may communicably couple the components of the system 4300.

The receiver means 4310 may be in the form of a radio unit 4310. The radio unit 4310 may comprise a receiver for receiving radio signals 4305 from the mobile device 4390. In some embodiments the radio unit 4310 may also comprise a transmitter, or may be a transceiver 4310 configured to receive radio signals 4305 transmitted from the mobile device 4390 and transmit signals to the mobile device 4390. The radio unit 4103 and the mobile device 4390 may be arranged to provide a wireless local area network, via which two-way communication may take place between the radio unit 4103 and the mobile device 4390. For example, the radio unit 4103 may be arranged to communicate by WiFi® with the mobile device 4390. In alternative embodiments other radio communication standards may be used for the communication. In one example, communication between the radio unit 4103 and the mobile device 4390 is provided via Bluetooth®, although other protocols or standards may be envisaged.

The mobile device 4390 may be an electronic key fob associated with the vehicle 4110, such as may be used to gain entry and to activate or power up the vehicle 4110. The mobile device 4390 may, in other embodiments, be an electronic device associated with the person responsible for the vehicle 4100 such as a mobile telephone, tablet, watch, wearable electronic device or other computing device associated with the person. The mobile device 4390 is capable of receiving a user input indicating the person's desire to move the vehicle 4110. The user input may be provided in the form of a button or key press, activation of a graphically displayed icon, a gesture or voice command. Other forms of user input may also be envisaged.

Figure 22:
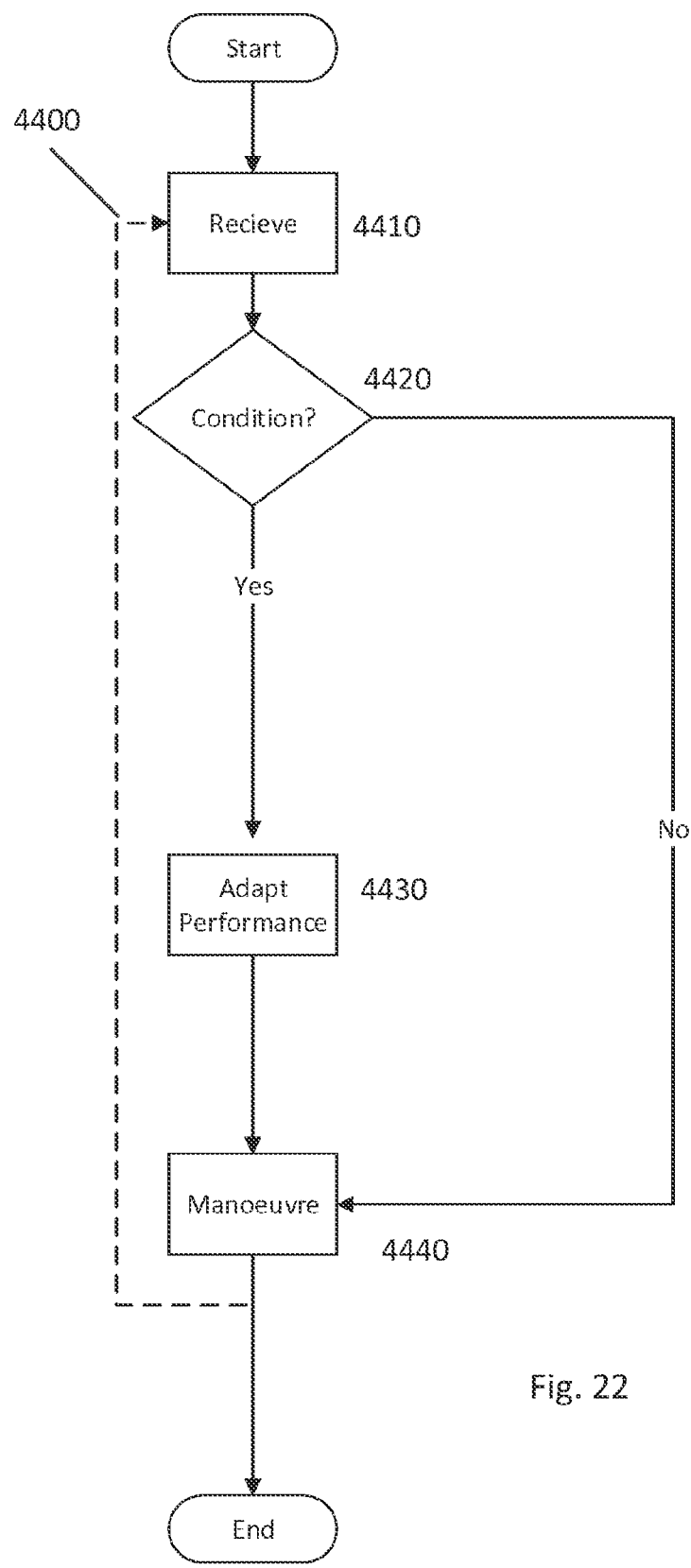
FIG. 22 shows a method according to an embodiment of the invention.

FIG. 22 illustrates a method 4400 according to an embodiment of the invention. The method 4400 is a method of controlling movement of the vehicle 4110. The method 4400 may be formed by the controller 4210 and system 4300 described above with reference to FIGS. 20 and 21. The method 4400 will be described with reference to FIG. 23 as an example which corresponds broadly to the situation shown in FIG. 19.

The method 4400 broadly comprises steps of receiving 4410 the ambient condition signal from the ambient condition sensing means 4332 which is indicative of an ambient condition in a vicinity of the vehicle 4110 and, in dependence thereon, controlling 4440 the vehicle's 4110 performance of a defined manoeuvre.

Referring to FIG. 22, the illustrated embodiment of the method 4400 comprises a step of receiving 4410 the ambient condition signal from the ambient condition sensing means

4332. The controller 4210 determines 4420 whether the ambient condition signal is indicative of an ambient condition associated with an adaptation 4430 of the performance of the defined manoeuvre 4440, such as according to a particular vehicle movement control profile corresponding to the sensed ambient condition.

Figure 23:
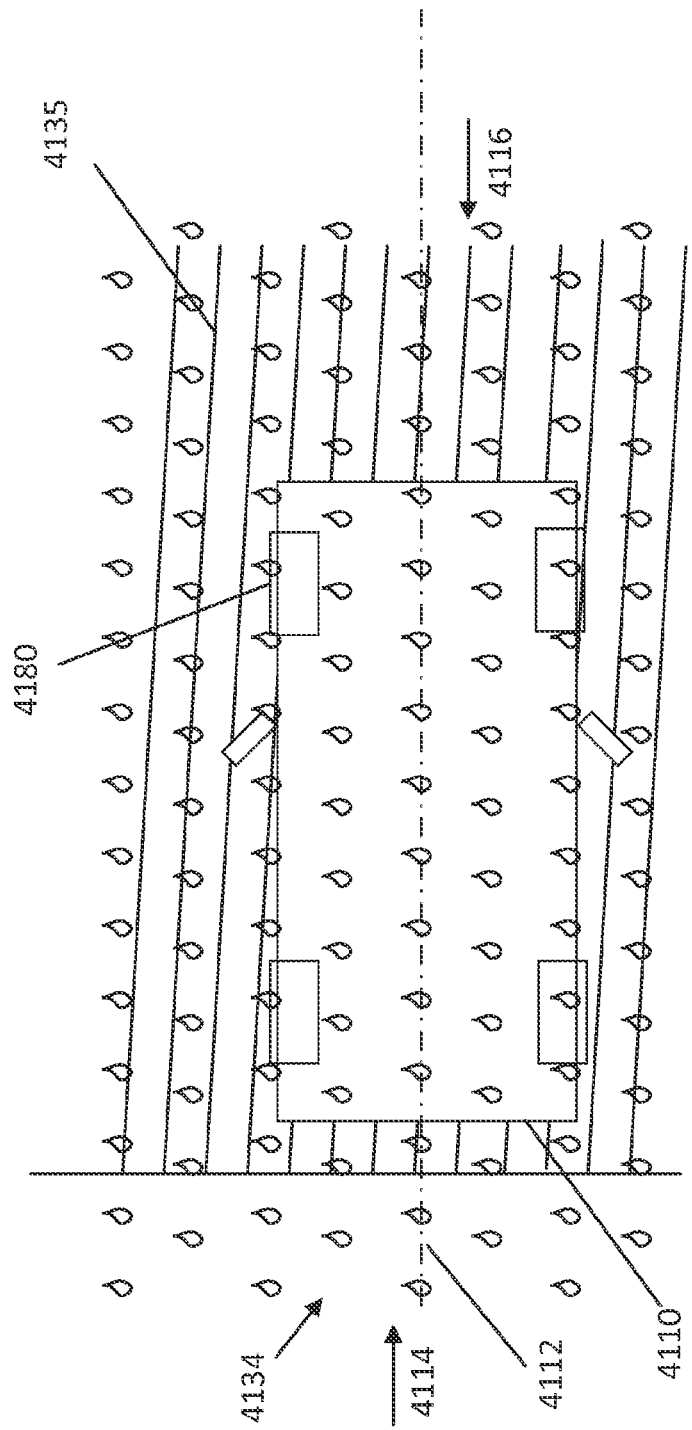
FIG. 23 illustrates a vehicle according to an embodiment of the invention.

In FIG. 23, the vehicle 4110 is illustrated as being located on a terrain 4135 with a similar ambient condition 4136 in the vicinity of the vehicle 4110 as FIG. 19. The control means 4210 is arranged to control the output means 4240 to cause the vehicle 4110 to perform at least a portion of the defined manoeuvre in accordance with a vehicle movement control profile determined in dependence on a terrain signal indicative of the terrain 4135 and on the ambient condition signal indicative of the ambient condition 4136. Accordingly, the vehicle 4110 is caused to perform the defined manoeuvre in a controlled manner appropriate for the terrain 4135 and the ambient condition 4136. The control means 4210 is arranged to select the vehicle movement control profile in dependence on a categorisation of the terrain 4135 and of the ambient condition 4136. Accordingly, the vehicle 4110 automatically selects parameters for performance of the defined manoeuvre associated with predetermined categories of terrain 4135 and ambient condition 4136.

The terrain 4135 is a surface. In at least some examples, the surface may comprise a ground surface, such as a load-bearing surface (e.g. vehicle-bearing). The surface may comprise a driveable surface, such as for receiving the vehicle wheels 4180 thereon. The surface may comprise a substrate.

In at least some examples, the categories of terrain comprise one or more of: a road terrain; an off-road terrain; a bumpy terrain; a smooth terrain; a slippy terrain; a flat terrain; a material. Here, the terrain 4135 is categorised according to one or more parameters corresponding to one or more of: bumpiness; smoothness; roughness; grip; slip; friction; one or more gradients; one or more inclines; one or more materials. The one or more parameters comprise a magnitude and/or a direction.

In some examples, in addition, or an alternative, to dependence on the terrain signal, the control means 4210 is arranged to control the output means 4240 in dependence on a topography signal indicative of a topography in the vicinity of the vehicle 4110.

Figure 24:
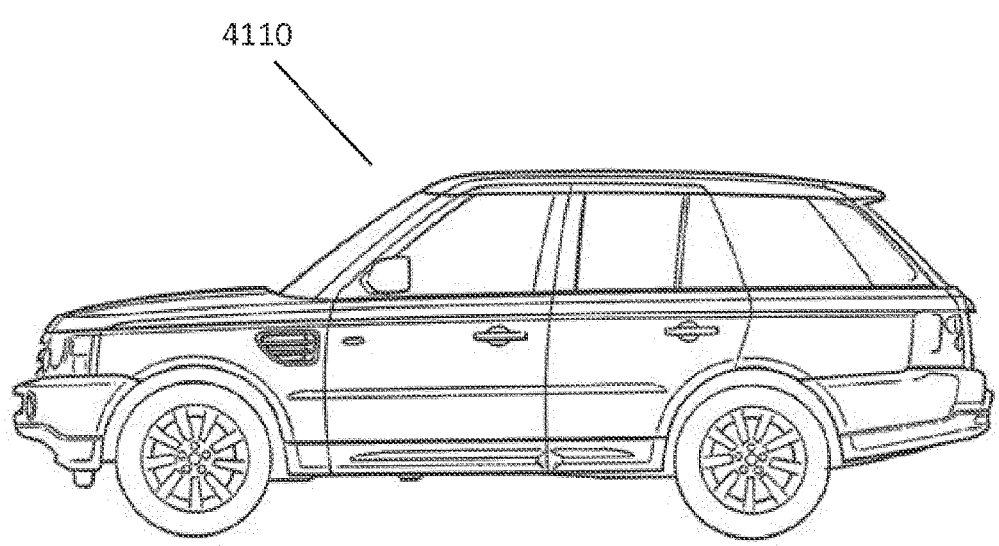
FIG. 24 is a vehicle according to an embodiment of the invention.

FIG. 24 shows a side view of an example vehicle according to an embodiment of the invention, being a car (private, passenger, non-service vehicle) as shown here.

As a result of the method 4400 the vehicle may be more advantageously positioned or configured following performance of a defined manoeuvre. It will also be appreciated that embodiments of the present invention are not limited to being useful in association with a defined manoeuvre. For example, it may be useful to adapt or provide performance, such as of a portion of a defined manoeuvre, in dependence on an ambient condition even when being driven by a human driver.

Fifth Technique

FIGS. 25*a* and 25*b* illustrate a vehicle 5110 according to an embodiment of the invention in two different scenarios. In FIGS. 25*a* and 25*b*, the vehicle 5110 is illustrated as having a vehicle forward direction, indicated by arrow 5114, shown parallel to a central longitudinal axis 5112 of the vehicle 5110. In both scenarios, the vehicle 5110 is illustrated at a defined manoeuvre start position with a defined manoeuvre completed position of the vehicle 5110 shown in broken lines. In both particular scenarios shown in FIGS. 25*a* and 25*b*, it may be desirable to perform a defined manoeuvre to park the vehicle 5110 in the defined manoeuvre completed position in a vacancy 5172.

In FIG. 25(*a*) the vehicle 5110 is shown in broken line at a target or desired defined manoeuvre completed position in a vehicle envelope 5174 in the vacancy 5172, where the defined manoeuvre would have been performed with the vehicle entering the vacancy 5172 in a forward direction 5114. The vehicle 5110 is shown in relation to a feature 5125 in a vicinity of the vehicle 5110. The feature 5125 is, in this example, an object which is a wall that is parallel to the longitudinal axis 5112 of the vehicle 5110 i.e. generally parallel to a side of the vehicle 5110, such as a left side here—in the defined manoeuvre completed position. The object is not limited to being a wall 5125 and may be, for example, a bollard, fence, barrier, or other object at or adjacent the vacancy 5172. As shown here, another feature 5140 in the form of a stationary vehicle bounds an opposite lateral side of the vacancy 5172 from the wall feature 5125.

In FIG. 25*a*, a dimension of the vehicle, being a width 5194 as shown here, is such that the vehicle 5110 cannot be manoeuvred into the apparent vehicle envelope 5174 in the vacancy 5172, as a corresponding dimension, shown here as a width 5176, of the vacancy's vehicle envelope 5174 is too small. Accordingly, the vehicle 5110 as such would not fit into the vacancy 5172, as indicated by vehicle moveable projections 5182 overlapping with the features 5125, 5140. It will be appreciated that although shown here in plan view, the scenarios depicted are three dimensional. Accordingly, in at least some scenarios the features 5125 and 5140 may be at a similar height as the vehicle moveable projection 5182 such that the vehicle moveable projections 5182 cannot be overlapping with the features 5125, 5140 in plan view (e.g. the vehicle projections would be undesirably in contact with the features 5125, 5140).

Similarly, the vacancy 5172 of the scenario of FIG. 25*b* may be such that the vehicle envelope 5174 appears suitable for receiving the vehicle 5110 therein, with a clearance 5192 between the vehicle 5110 in the closed configuration at the defined manoeuvre completed position, shown in broken lines, and the adjacent features 5125, 5140. However, the corresponding dimension 5176 of a portion 5142 of the vacancy 5172 is such that the vehicle 5110 would not be able to manoeuvre into the vacancy 5172. In particular, manoeuvring the vehicle 5110 forwards into the vacancy 5172 would have brought the vehicle moveable projection 5182 (on a right side of the vehicle 5110 as shown) into contact with the portion 5142 of the object 5140 (e.g. a projection of an adjacent stationary vehicle, as shown here). In FIG. 25*b*, the dimension of the vehicle 5110, being the width 5194 here, is such that the vehicle 5110 cannot be manoeuvred into the apparent vehicle envelope 5174 in the vacancy 5172, as the corresponding dimension, being the width 5176, of the vacancy's vehicle envelope 5174 is less than the vehicle width 5194.

Accordingly, in both scenarios it may not be possible to manoeuvre the vehicle 5110 into the vacancy 5172, at least not without contact between the vehicle and at least one of the features 5125, 5140, potentially causing damage to the features 5125, 5140 and/or the vehicle.

Embodiments of the present invention aim to ameliorate one or both of these problems.

It will be understood in both cases shown in FIGS. 25(*a*) and (*b*) that the defined manoeuvre may be a manoeuvre of the vehicle 5110 which is performed automatically by the vehicle 5110 i.e. under control of one or more systems of the vehicle 5110. The defined manoeuvre may be considered to be performed automatically by the vehicle 5110, or at least semi autonomously. In FIGS. 25a and 25b the defined manoeuvre may be a parking manoeuvre to control the vehicle 5110 to drive into a parking place.

In both situations, it may be advantageous for the manoeuvre to be performed whilst a person in control of the vehicle 5110 is external to the vehicle 5110. For example, access to the vehicle 5110 may be limited in FIG. 25(a) or 25(b) after performing the defined manoeuvre (e.g. where the feature 5125 or object 5140 forms a hindrance to opening a vehicle door 5188).

To perform the defined manoeuvre, the vehicle 5110 comprises environment sensing means for determining a location of features 5125 in the vicinity of the vehicle 5110. The environment sensing means may comprise one or more sensing devices or imaging devices. The one or more sensing devices may emit radiation and receive radiation reflected from the features in the vicinity of the vehicle, such as ultrasonic sensing devices, although it will be appreciated that the present invention is not limited in this respect. Such environment sensing means have a minimum distance to which accuracy the location of the features 5125 may be determined due to, for example, a resolution of an imaging device or a signal-to-noise ratio of a sensing device.

In the particular examples shown here, the vehicle 5110 comprises a portion of the environment sensing means in or on the vehicle moveable projection 5182. For example, each side or wing mirror of the vehicle 5110 can have a camera or the like mounted thereto or thereon.

Figure 26:
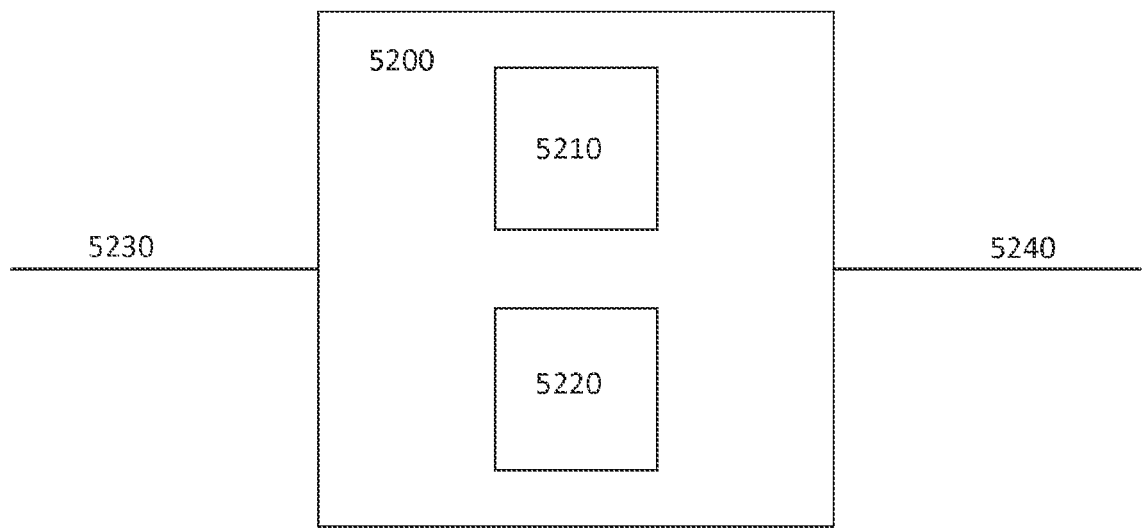
FIG. 26 shows a controller according to an embodiment of the invention.
Figure 30:
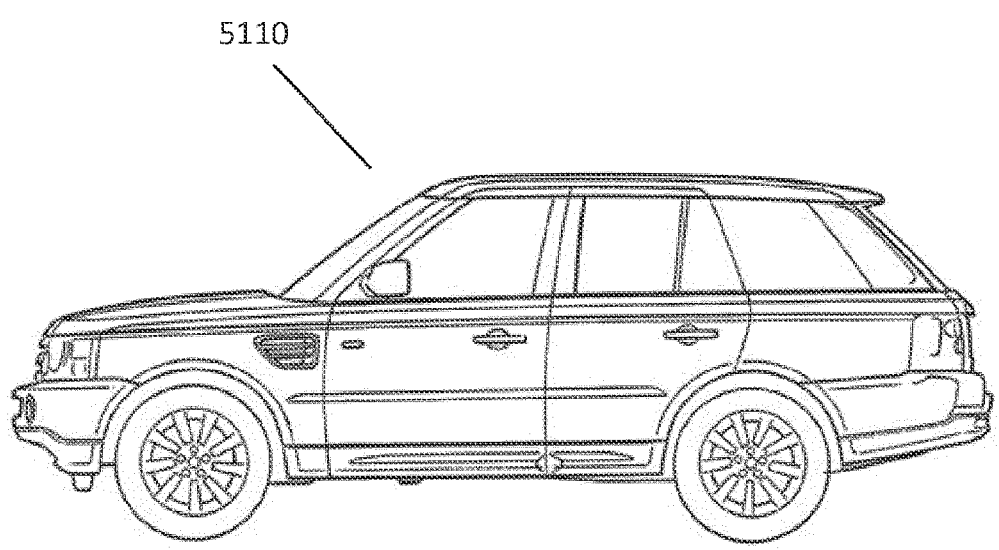
FIG. 30 is a vehicle according to an embodiment of the invention.

FIG. 26 illustrates a controller 5200 or control unit 5200 according to an embodiment of the invention, such as comprised in the vehicle 5110 of FIGS. 25(a) and 25(b).

The controller 5200 comprises a control means 5210, input means 5230 and output means 5240. In some embodiments the controller comprises a memory means 5220 such as one or more memory devices 5220 for storing data therein. The output means 5240 may comprise an electrical output for outputting a manoeuvre signal. The manoeuvre signal represents an instruction for the vehicle 5110 to move. The instruction provided by the manoeuvre signal is provided to cause the vehicle 5110 to perform the defined manoeuvre. Here, the controller 5200 may determine that one or more of the features 5125, 5140 are such that one or more of the vehicle moveable projections 5182 should be in a particular position during or at a particular stage of the defined manoeuvre. For example, the controller may determine the feature 5140 as having a portion 5142 for which one or more of the vehicle moveable projections 5182 should be collapsed. Accordingly, the controller 5200 may cause the vehicle's 5110 one or more moveable projections 5182 to be collapsed, prior to or during the performance of the defined manoeuvre prior to the vehicle's 5110 one or more moveable portions 5182 reaching the portion 5142. In other examples, the user may explicitly specify or request a position or repositioning of the vehicle's 5110 one or more moveable projections 5182. In at least some examples, the control means positions the one or more moveable projections 5182 at a default position (e.g. collapsed or expanded) for performing one or more defined manoeuvres.

The control means 5210 may be formed by one or more electronic processing devices such as an electronic processor. The processor may operably execute computer readable instructions stored in the one or more memory devices 5220. The control means 5210 is arranged to control the output means 5240 to output the manoeuvre signal in dependence on the environment signal, as will be explained. In some embodiments the input means 5230 and output means 5240 may be combined such as by being formed by an I/O unit or interface unit. For example, the controller 5210 may comprise an interface to a network forming a communication bus of a vehicle. The interface bus may be an Internet Protocol (IP) based communication bus such as Ethernet, although embodiments of the invention are not limited in this respect.

The input means 5230 may comprise an electrical input for receiving an environment signal. The input means 5230 may comprise an electrical input for receiving a request signal. Here, the request signal is indicative of a wirelessly received signal representing a user request for movement of the vehicle 5110.

As shown here, the memory means 5220 can be used to store data from the input means 5230. In particular, the memory means can store data about the features 5125, 5140 or the vacancy 5172 for future use. For example, where the environment sensing means, or a portion thereof, is associated with the moveable projection 5182 (e.g. where a camera or sensor is mounted to or on a wing mirror), then the memory means 5220 can store data therefrom prior to performing at least a portion of the defined manoeuvre. Particularly where the moveable projection 5182 may be moved to a position affecting environment sensing (e.g. a collapsed position whereby a camera or sensor view may be impeded), then storing data on the features 5125, 5140 can allow the defined manoeuvre to be performed relative to the features 5125 5140—such as including based on historical data thereon. The data may be stored prior to and during performance of the defined manoeuvre, for use during the performance of the defined manoeuvre. In addition, or alternatively, the data may be stored for use during a subsequent defined manoeuvre. The subsequent defined manoeuvre may be shortly after the defined manoeuvre or considerably later. The data may be stored for use for a subsequent reversal of the defined manoeuvre. For example, where the data is stored prior to or during the performance of the defined manoeuvre to arrive at the defined manoeuvre completed position of FIG. 25a or 25b as shown in broken lines, then the stored data may be used for or during a subsequent defined manoeuvre, such as an unparking manoeuvre from the defined manoeuvre completed position of FIG. 25a or 25b. The data may be stored for use during a subsequent repetition of the defined manoeuvre, such as where the defined manoeuvre is repeated at a later time (e.g. on returning to a same location, such as a garage, parking lot, or the like, where a defined manoeuvre has previously been performed). Where stored data, such as of the features 5125, 5140, is used for the performance of at least a portion of the defined manoeuvre, the controller 5200 may perform a check, such as to the validity or continued validity of the data. For example, the controller may corroborate the data with another input, such as with input from another portion of the environment sensing means (e.g. another sensor or camera located at another portion of the vehicle 5110, the another sensor or camera able to confirm the continued presence and/or position of the feature or features 5125, 5140).

In at least some examples, the controller 5210 may comprise a second input means for receiving a request signal indicative of a received signal indicative of a user request, such as a wirelessly received signal.

It will be appreciated that the controller 5200 may be arranged to perform a portion of the defined manoeuvre. For example, the user may initiate the manoeuvre with control being transferred to the controller 5210 thereafter to complete the defined manoeuvre. In at least some examples, the controller 5210 is arranged to alter the position of the moveable projections 5182 prior to or without a performance of a defined manoeuvre, such as prior to or during a performance of a manoeuvre under user control. The controller 5210 may be arranged to indicate a possibility of altering the position of the one or more moveable projections 5182 to the user, and controlling the output means in dependence on the user request therefor. In at least some examples, the controller is arranged to automatically alter the position of the one or more moveable projections 5182 without requiring an explicit user request therefor—during a performance of a defined manoeuvre and/or a user-controlled manoeuvre. The portion of the manoeuvre controlled by the controller may consist of altering the position of the one or more moveable projections 5182.

Figure 27:
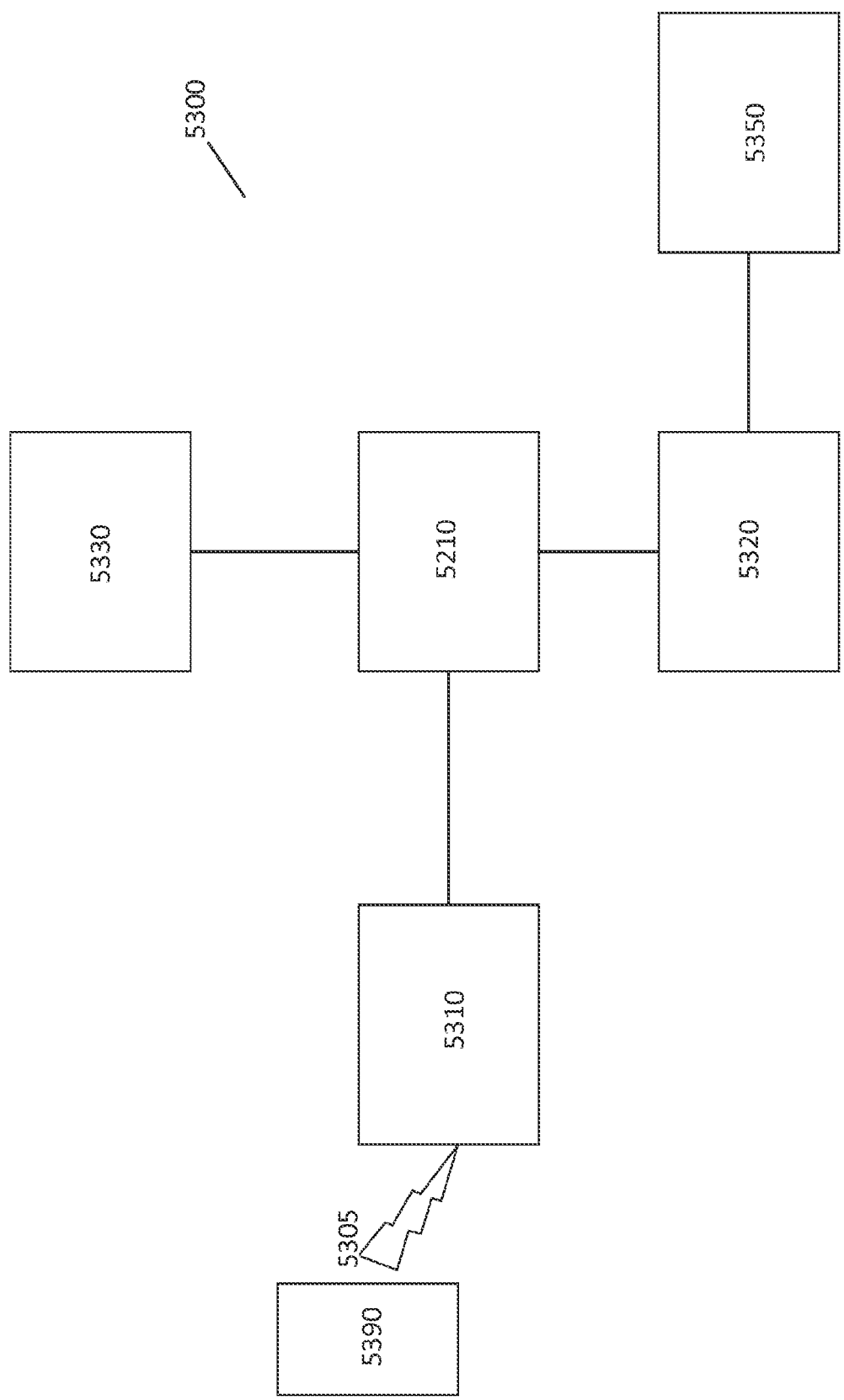
FIG. 27 shows a system according to an embodiment of the invention.

FIG. 27 illustrates a system 5300 according to an embodiment of the invention. The system 5300 comprises the controller 5210 described above and shown in FIG. 26.

The system 5300 comprises environment sensing means 5330 for determining information about an environment of the vehicle 5110. In particular, the environment sensing means 5330 is provided for determining a location of one or more features in a vicinity of the vehicle 5110. In at least some examples, a portion of the environment sensing means is associated with the one or more moveable projections 5182, such as one or more sensors or cameras mounted in or on a vehicle wing mirror. The environment sensing means 5330 is arranged to output an environment signal indicative of the determined features. The environment signal may be environment data which may be stored in a memory. The environment sensing means may comprise one or more sensing devices such as imaging devices, such as cameras, or other sensing devices such as LI DAR, radar, ultrasonic devices, sonar devices etc. Signals output by each of the sensing devices may be used to form a representation of the environment of the vehicle 5110 which is stored in the memory for use by other systems of the vehicle 5110.

Here, the environment sensing means 5330 is arranged to determine a location of features such as surface markings, which may be painted lines denoting a perimeter of a parking bay, for example, or objects such as walls, posts or other vehicles in relation to which the vehicle is required to manoeuvre. The control means is arranged to determine an absence of features, such as a separation between obstructive features, such as the adjacent feature 5125 and object 5140 shown here, in dependence on the environment signal. Accordingly, the control means is arranged to determine a vacancy 5172 where no features, such as no obstructive features, are located. Where the vacancy 5172 is sufficiently great, the control means is arranged to determine a vehicle envelope 5174 suitable for receiving the vehicle 5110 in the defined manoeuvre completed position. The vehicle envelope 5174 comprises a target position suitable for receiving the vehicle 5110 in the defined manoeuvre completed position. As such, the vehicle envelope 5174 here comprises a target defined manoeuvre completed position. In at least this example, the vehicle envelope 5174 is determined in dependence on a one-dimensional property and/or measurement and/or estimation. In particular here, the vehicle envelope 5174 is determined in dependence on the environment signal being indicative of a length, such as an unobstructed length between features 5125, 5140. The unobstructed length is sufficiently long for receiving the vehicle 5110 in the defined manoeuvre completed position, the length here being the separation 5176 between features 5125, 5140 that is greater than the vehicle width 5194 in the defined manoeuvre completed position. The defined manoeuvre may comprise, for example, parking in a parked position.

The controller 5210 of the system 5300 here comprises defined manoeuvre means. The control means is arranged to control the vehicle 5110 to perform at least one defined manoeuvre. The controller 5210 may comprise a defined manoeuvre controller for controlling one or more systems of the vehicle 5110 to perform one or more defined manoeuvres. The defined manoeuvre means may be associated with one or more actuators 5350 of the vehicle 5110. The one or more actuators 5350 are provided for effecting movement of the vehicle 5110. The actuators may comprise one or more of a power steering mechanism arranged to provide steering of wheels of the vehicle 5110 in dependence on signals received from the controller 5210. A second actuator may comprise a powered braking mechanism of the vehicle 5110 which is arranged to actuate brakes of the vehicle in dependence on signals received from the controller 5210. A third actuator comprises the powertrain of the vehicle. The controller 5210 is arranged to control the steering of the vehicle wheel 5180 relative to the feature 5125. A fourth actuator 5350 comprises one or more mechanisms for altering the position of the one or more moveable projections 5182.

The system 5300 shown here comprises a motive control means 5320. The motive control means 5320 may be a motive control unit. The motive control means 5320 is arranged to receive the manoeuvre signal output by the controller 5210. The motive control means 5320 is associated with one or more motive units of the vehicle 5110 which may form part of a powertrain (not shown) of the vehicle 5110. The motive units may comprise one or more of an internal combustion engine and one or more electric machines of the vehicle 5110. The powertrain is arranged to provide power, or torque, to cause movement in the longitudinal axis of the vehicle 5110 i.e. forward or backward movement of the vehicle 5100 in dependence on the manoeuvre signal received from the controller 5210. The motive control means 5320 is arranged to control the application of torque to one or more wheels of the vehicle 5110 to move the vehicle 5110 in the longitudinal axis of the vehicle i.e. to move the vehicle generally forwards or backwards. The torque may comprise driving torque i.e. applied in a direction of desired movement, such as forwards. The torque may also comprise braking torque i.e. applied to resist the driving torque. In at least some embodiments both driving torque and braking torque may be applied simultaneously in order to provide low-speed movement of the vehicle 5110. The braking torque may also be applied at least partly after the driving torque in order to effect accurate movement of the vehicle 5110. To achieve control of the steering, the controller 5210 may communicate with the motive control means 5320. Thus, the one or more actuators 5350 can control a direction and movement of the vehicle to perform the defined manoeuvre. The defined manoeuvre is performed in dependence on the environment signal provided by the environment sensing means 5330.

The one or more defined manoeuvres which may be performed by the vehicle 5110 under control of the controller 5210 may comprise a parking manoeuvre, such as shown in FIGS. 25(*a*) and 25(*b*) wherein the vehicle 5110 is controlled to arrive at a parked position.

As shown here, the system 5300 comprises a receiver means 5310 for receiving a signal 5305. The signal 5305 may be wirelessly received from a mobile device 5390 associated with a person responsible for the vehicle 5110. The signal 5305 is indicative of a user request for vehicle movement of the vehicle 5110, as noted above. The receiver means 5310 is arranged to output the request signal to the input means 5230 of the controller 5210 as described above. The request signal may be output by the receiver means 5310 onto a communication bus of the vehicle 5110 which may communicably couple the components of the system 5300.

The receiver means 5310 may be in the form of a radio unit 5310. The radio unit 5310 may comprise a receiver for receiving radio signals 5305 from the mobile device 5390. In some embodiments, the radio unit 5310 may also comprise a transmitter, or may be a transceiver 5310 configured to receive radio signals 5305 transmitted from the mobile device 5390 and transmit signals to the mobile device 5390. The radio unit 5103 and the mobile device 5390 may be arranged to provide a wireless local area network, via which two-way communication may take place between the radio unit 5103 and the mobile device 5390. For example, the radio unit 5103 may be arranged to communicate by WiFi® with the mobile device 5390. In alternative embodiments, other radio communication standards may be used for the communication. In one example, communication between the radio unit 5103 and the mobile device 5390 is provided via Bluetooth®, although other protocols or standards may be envisaged.

The mobile device 5390 may be an electronic key fob associated with the vehicle 5110, such as may be used to gain entry and to activate or power up the vehicle 5110. The mobile device 5390 may, in other embodiments, be an electronic device associated with the person responsible for the vehicle 5100 such as a mobile telephone, tablet, watch, wearable electronic device or other computing device associated with the person. The mobile device 5390 is capable of receiving a user input indicating the person's desire to move the vehicle 5110. The user input may be provided in the form of a button or key press, activation of a graphically displayed icon, a gesture or voice command. Other forms of user input may also be envisaged.

Figure 28:
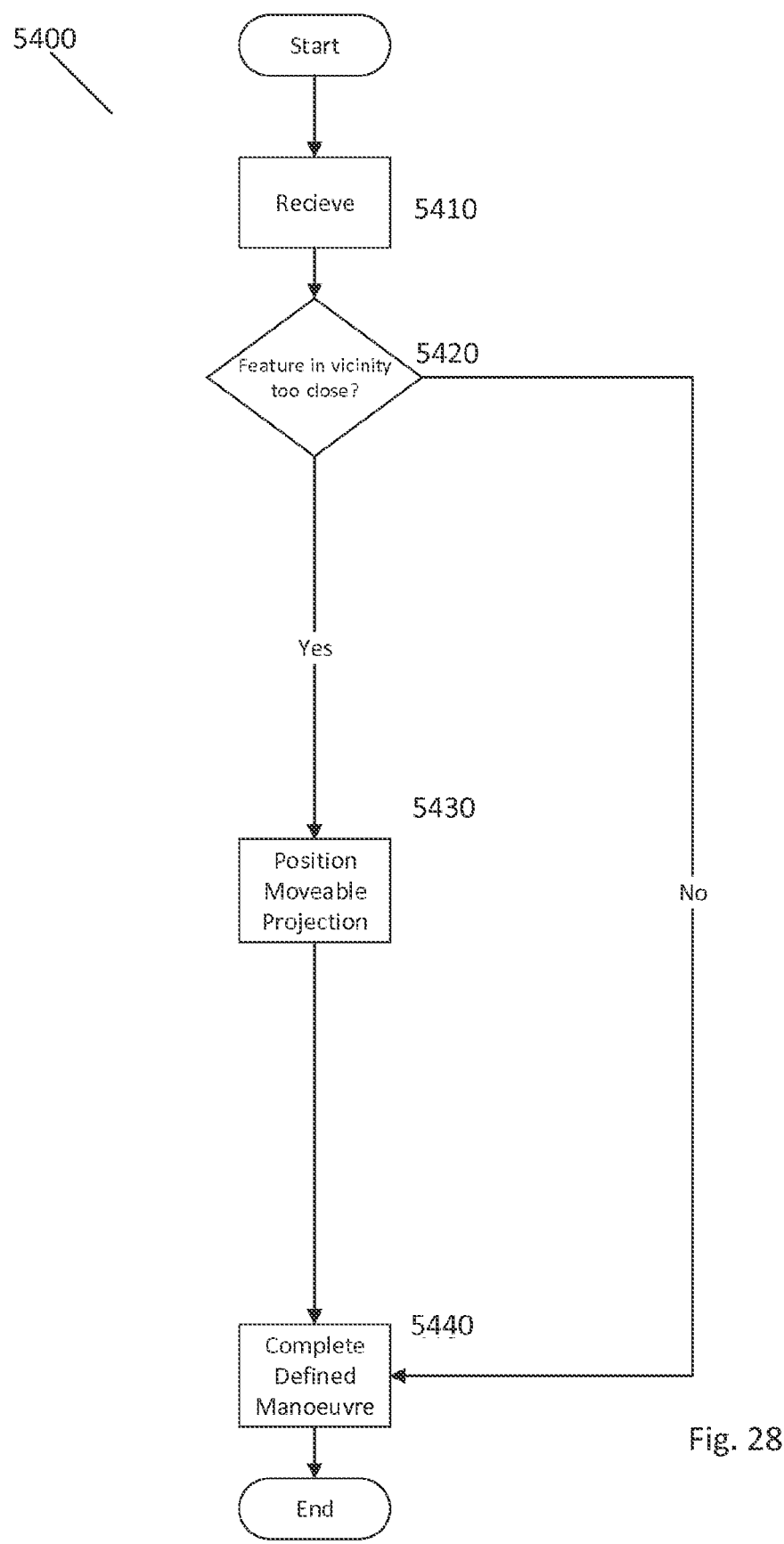
FIG. 28 shows a method according to an embodiment of the invention.

FIG. 28 illustrates a method 5400 according to an embodiment of the invention. The method 5400 is a method of controlling movement of the vehicle 5110. The method 5400 may be formed by the controller 5210 and system 5300 described above with reference to FIGS. 26 and 27. The method 5400 will be described with reference to FIGS. 29(*a*) and 29(*b*) as examples which correspond to the situations shown in FIGS. 25(*a*) and 25(*b*) respectively.

The method 5400 broadly comprises steps of receiving 5410 the environment signal from the environment sensing means 5330 which is indicative of a feature 5125 in a vicinity of the vehicle 5110 and, in dependence thereon, determining whether a position of the one or more moveable projections 5182 of the vehicle 5182 should be or will need to be altered.

Referring to FIG. 28, the illustrated embodiment of the method 5400 comprises a step of receiving 5410 the environment signal from the environment sensing means 5330. The controller 5210 determines 5420 whether the environment signal is indicative of one or more features 5125 in the vicinity of the vehicle 5110 corresponding to a scenario for which the position or positions of the one or more moveable projections 5182 may be desired to be altered, prior to or during the performance of the defined manoeuvre 5440.

In FIGS. 29*a* and 29*b*, the vehicle 5110 is illustrated as being located in a defined manoeuvre completed position in a vehicle envelope 5174 defined in a vacancy 5172 bounded by adjacent features 5125, 5140, similar to FIGS. 25(*a*) and 25(*b*). In FIGS. 29*a* and 29*b*, the vehicle 5110 is shown in the defined manoeuvre completed position with the vehicle 5110 in a closed configuration with a separation 5192 between the vehicle 5110 and adjacent features 5125, 5140 respectively on each lateral side of the vehicle 5110. As shown here, the closed configuration of the vehicle 5110 comprises a collapsed position of the moveable projection 5182 of the vehicle 5110, shown here as a side mirror. As shown here, the defined manoeuvre performed to arrive at the defined manoeuvre completed positions of FIGS. 29*a* and 29*b* has been performed with the vehicle in an occupant-out-of-vehicle mode. Here, the defined manoeuvre into the positions of FIGS. 29*a* and 29*b* has been performed with the occupant located out of the vehicle for at least a last portion of the defined manoeuvre. As will be appreciated, the dimensions of the vehicle envelope 5174 defined by the vacancy 5172 are such that at least some vehicle aperture members 5188 are inaccessible or at least not fully openable. Accordingly, access to and from the vehicle apertures by the vehicle aperture members 5188 is impeded. Furthermore, the dimensions of the vehicle envelope 5174 defined by the vacancy 5172 are such that performance of the defined manoeuvre may have been impeded or prevented by the vehicle projections 5182 in an expanded position, such as the expanded positions of the vehicle projections 5182 shown in FIGS. 25(*a*) and 25(*b*). Accordingly, the performance of the defined manoeuvre to arrive at the defined manoeuvre completed positions of FIGS. 29*a* and 29*b* has included altering the position of the moveable projections 5182 prior to or during the defined manoeuvre, in dependence on the environment signal. Here, the mode of performance for performing the defined manoeuvre has included a vehicle collapsed projection mode.

As will be appreciated from FIGS. 29*a* and 29*b* in particular, the alteration of the position of the one or more moveable projections prior to the completion of the defined manoeuvre, allows the vehicle 5110 to be manoeuvred into vacancies 5172 in a defined manoeuvre, which otherwise may not have been possible. The dimension 5194 of the vehicle 5110 during the performance of the portion of the defined manoeuvre where the corresponding dimension 5176 of the vacancy 5172 would otherwise impede or prevent the performance (as shown in FIGS. 25*a* and 25*b*) is less with the altered position of the moveable projections 5182 (e.g. less than in FIGS. 25*a* and 25*b*). In particular, the vehicle width 5194 is reduced as shown here for performing at least those portions of the defined manoeuvre. Accordingly, the vehicle 5110 is able to be manoeuvred into more restricted vacancies 5172 with defined manoeuvres than may otherwise be possible.

Once in the defined manoeuvre completed position, being parked positions in FIGS. 29(*a*) and 29(*b*), the user typically applies a parking brake, to leave the vehicle 5110 secured stationary with the engine switched off.

The controller 5210 may be arranged to allow for user adaptation. For example, the user may be able to at least partially override, program or adjust the controller 5210 such that one or more of the following: a separation or clearance threshold for altering the position of the one or more moveable projections is adaptable; which one or more moveable projections is/are repositionable; a parameter for determining a positioning of the one or more moveable projections (e.g. a timing, prompt, or particular input). The controller 5210 may be arranged to be manually overridden, programmed or adjusted, such as to adjust the output of the manoeuvre signal. Additionally, or alternatively, the controller 5210 may be arranged to automatically, or semi-automatically, override, program or adjust the output of the manoeuvre signal, such as by learning from a user behaviour, such as a repeated user behaviour, associated with one or more of: an input pattern; a geographic location; a user identity (e.g. where the vehicle 5110 is used noncontemporaneously by multiple users). For example, the controller 5210 may be arranged to automatically alter the position of the one or more moveable projections 5182 when the vehicle is positioned at a particular location, such as a home or garage where the user has previously performed a defined manoeuvre into a known vacancy.

It will be appreciated that other defined manoeuvres than illustrated may be performed. For example, the vehicle 5110 may be reversed into the vacancy 5172. Similarly, the moveable projection 5182 may be at a different location on the vehicle or project in a different direction. For example, the moveable projection 5182 may project upwardly and/or axially from the vehicle, in addition and/or alternatively to the lateral projections shown in FIGS. 25a and 25b (e.g. the moveable projection may be an antenna or camera or other vehicle portion projecting upwards or rearwards from the vehicle 5110).

As a result of the method 5400 the vehicle may be more advantageously positioned or configured following performance of a defined manoeuvre. It will also be appreciated that embodiments of the present invention are not limited to being useful in association with a defined manoeuvre. It may be useful to alter the position of a moveable projection of the vehicle in dependence on the environment signal even when parked or when having being driven by a human driver.

Sixth Technique

Figure 31:
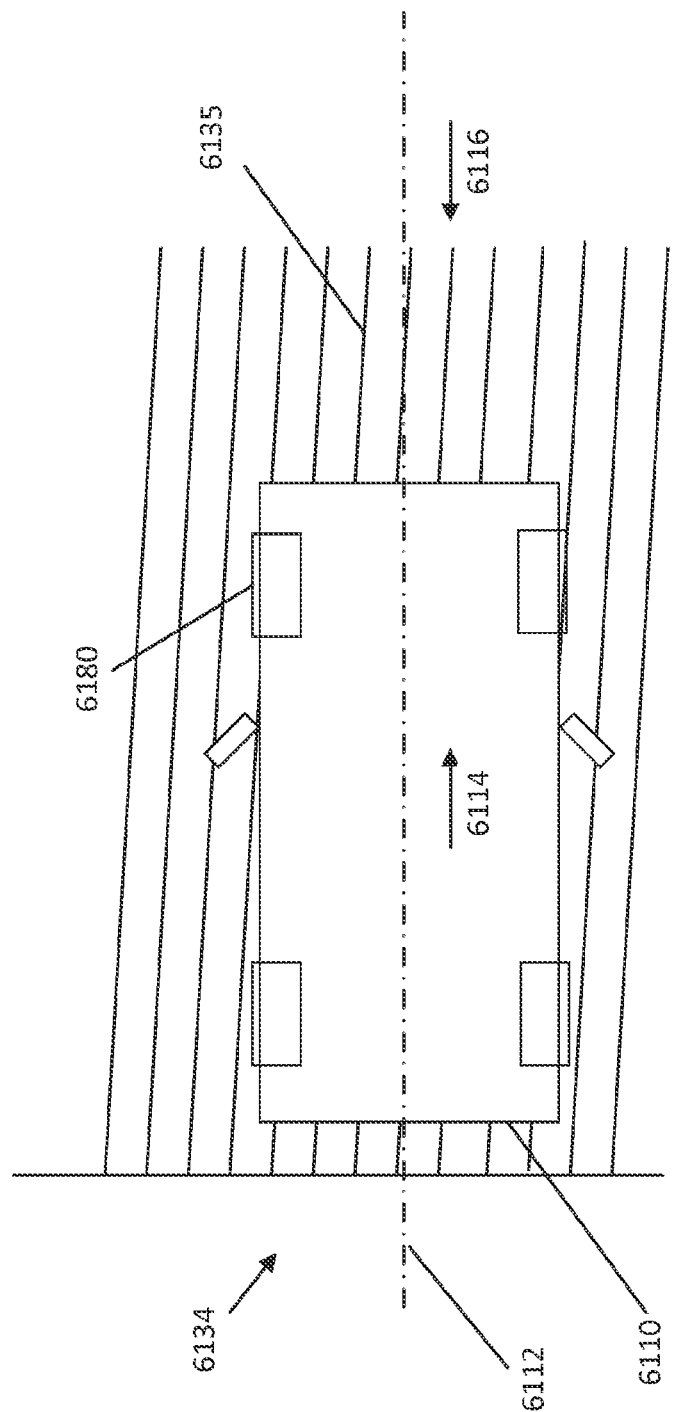
FIG. 31 shows a vehicle in relation to a terrain in a vicinity of the vehicle.

FIG. 31 illustrates a vehicle 6110 according to an embodiment of the invention.

In FIG. 31 the vehicle 6110 is shown at a defined manoeuvre start position in advance of performing a defined manoeuvre, such as to a parked positioned of the vehicle 6110. The vehicle is shown here with a longitudinal axis 6112 and having a vehicle forward direction, indicated by arrow 6114. Here a terrain 6135 in the vicinity of the vehicle is shown, such as a road ground surface. The terrain is not limited to being a road ground surface and may include, for example, another load-bearing surface such as an offroad ground surface.

It will be understood that the defined manoeuvre may be a manoeuvre of the vehicle 6110 which is performed automatically by the vehicle 6110 i.e. under control of one or more systems of the vehicle 6110. The defined manoeuvre may be considered to be performed automatically by the vehicle 6110, or at least semi autonomously. In FIG. 31 the defined manoeuvre may be a parking manoeuvre to control the vehicle 6110 to drive into a parking structure or parking place. In at last some situations, it may be advantageous for the manoeuvre to be performed whilst a person in control of the vehicle 6110 is external to the vehicle 6110. For example, access to the vehicle 6110 may be limited after performing the defined manoeuvre.

The terrain may be such as to have an actual and/or a perceived effect on the performance of the defined manoeuvre, such as physically and/or psychologically influencing a users experience of performance of the defined manoeuvre.

Embodiments of the present invention aim to ameliorate one or both of these problems.

Figure 32:
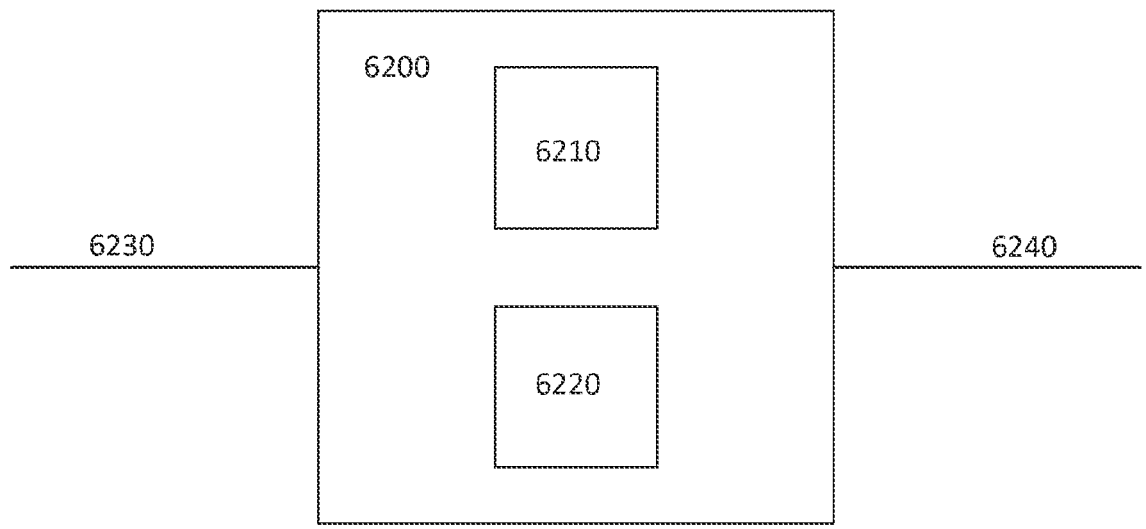
FIG. 32 shows a controller according to an embodiment of the invention.

FIG. 32 illustrates a controller 6200 or control unit 6200 according to an embodiment of the invention, such as comprised in the vehicle 6110 of FIG. 31.

The controller 6200 comprises a control means 6210, input means 6230 and output means 6240. In some embodiments the controller comprises a memory means 6220 such as one or more memory devices 6220 for storing data therein. The output means 6240 may comprise an electrical output for outputting a manoeuvre signal. The manoeuvre signal represents an instruction for the vehicle 6110 to move.

Here, the input means 6230 is for receiving a terrain signal indicative of the terrain 6135 in the vicinity of the vehicle 6110. The control means 6210 is arranged to control the output means 6240 to cause the vehicle 6110 to perform at least a portion of the defined manoeuvre in dependence on the terrain signal. Here, the control means 6210 is arranged to control the output means 6240 to cause the vehicle 6110 to perform at least a portion of the defined manoeuvre in accordance with a vehicle movement control profile determined in dependence on the terrain signal. Accordingly, the vehicle 6110 is caused to perform the defined manoeuvre in a controlled manner appropriate for the terrain 6135.

The vehicle movement control profile comprises a speed parameter. Here, the speed parameter is indicative of a first order speed parameter. The control means 6210 is arranged to select the vehicle movement control profile in dependence on a categorisation of the terrain 6135. Accordingly, the control means 6210 of the vehicle 6110 automatically selects parameters for performance of the defined manoeuvre associated with predetermined categories of terrain or terrains 6135. Here, the speed parameter is indicative of a speed, an acceleration and a jerk of the vehicle 6110, jerk being a rate of change of acceleration of the vehicle 6110. Accordingly, the vehicle 6110 is caused to perform the defined manoeuvre with an appropriate speed, acceleration and jerk; such as to perform the defined manoeuvre efficiently and/or without undue acceleration of the vehicle 6110 or a user or content thereof. For example, as shown here with a terrain 6135 of a particular road ground surface that may be slippy (e.g. due to loose gravel, or a muddy substrate), the vehicle movement control profile is selected to provide reduced speed parameters, such as reduced maximum speed, maximum acceleration and maximum jerk. Accordingly, where there is an increased possibility of decreased grip (e.g. due to the surface under the vehicle wheels 6180); or at least an increased possibility of a user's perception of decreased grip, then the controller 6200 adapts the performance of the defined manoeuvre to reduce the possibility of the vehicle 6110 slipping or at least reduce a users perception of the possibility of the vehicle 6110 slipping. Accordingly, the vehicle 6110 is caused to perform the defined manoeuvre with an appropriate speed, acceleration and rate of change of acceleration, which is physically and psychologically suited to the terrain 6135 to be comfortable for the user.

It will be appreciated that for other terrains, other vehicle movement control profiles may be used. For example, the maximum speed parameter of the vehicle movement control profile corresponding to the slippy terrain 6135 of FIG. 31 may be less than the maximum speed parameter of a vehicle movement control profile corresponding to a high-grip terrain, such as a dry, stable asphalt road surface. Accordingly, the maximum speed parameter can be varied to suit a variation in the terrain 6135. It will be appreciated that the vehicle movement control profile can be varied during the performance of the defined manoeuvre: for example, if the terrain changes (e.g. if the vehicle 6110 moves onto a different terrain 6135 subsequent to initiation of the defined manoeuvre).

To perform the defined manoeuvre, the vehicle 6110 comprises environment sensing means for determining a location of features in the vicinity of the vehicle 6110. The environment sensing means may comprise one or more sensing devices or imaging devices. The one or more sensing devices may emit radiation and receive radiation reflected from the features in the vicinity of the vehicle, such as ultrasonic sensing devices, although it will be appreciated that the present invention is not limited in this respect. Such environment sensing means have a minimum distance to which accuracy the location of the features may be determined due to, for example, a resolution of an imaging device or a signal-to-noise ratio of a sensing device.

It will be appreciated, that in at least some examples, the environment sensing means provides the terrain signal, or at least an input therefor. For example, the environment sensing means may comprise a sensor or imaging device capable of detecting a ground surface, or type thereof. Additional or alternative inputs from or for the terrain signal may include one or more of: one or more brake sensors; one or more accelerometers; one or more suspension sensors; one or more thermometers; one or more wipers; one or more traction sensors; at least one drive mode (e.g. "off-road", "sport", "normal", etc). For example, where a wiper is activated, manually and/or automatically, then the control means 6210 can be adapted accordingly, such as to a wet terrain weather vehicle movement control profile, with a reduced speed parameter. Similarly, the drive mode of the vehicle 6110, manually and/or automatically activated, is used in at least some examples to determine the terrain—and the control means 6210 is arranged to adapt the output means 6240 accordingly (e.g. to reduce the speed parameter on off-road terrain). The terrain signal may be at least partially dependent on a terrain sensing or measurement. In addition, or alternatively, the terrain signal may be dependent at least partially on an estimated terrain. The estimated terrain may be derived from one or more other parameters or statuses. For example, where a vehicle is in a geographic location, then an estimated terrain may be taken as indicative of terrain, such as based at least partially on a previous terrain sensing or estimation.

Once in the defined manoeuvre completed position (not shown), the user typically applies a parking brake, to leave the vehicle stationary with the engine switched off.

The control means 6210 may be formed by one or more electronic processing devices such as an electronic processor. The processor may operably execute computer readable instructions stored in the one or more memory devices 6220. The control means 6210 is arranged to control the output means 6240 to output the manoeuvre signal in dependence on the environment signal, as will be explained. In some embodiments the input means 6230 and output means 6240 may be combined such as by being formed by an I/O unit or interface unit. For example, the controller 6210 may comprise an interface to a network forming a communication bus of a vehicle. The interface bus may be an Internet Protocol (IP) based communication bus such as Ethernet, although embodiments of the invention are not limited in this respect.

Here, the input means 6230 comprises an electrical input for receiving the terrain signal. The input means 6230 may comprise an electrical input for receiving an environment signal. The input means 6230 may comprise an electrical input for receiving a request signal. In at least some examples, the controller 6210 comprises a second input means for receiving a request signal indicative of a received signal indicative of a user request, such as a wirelessly received signal.

It will be appreciated that the controller 6200 may be arranged to perform a portion of the defined manoeuvre. For example, the user may initiate the manoeuvre with control being transferred to the controller 6210 thereafter to complete the defined manoeuvre.

Figure 33:
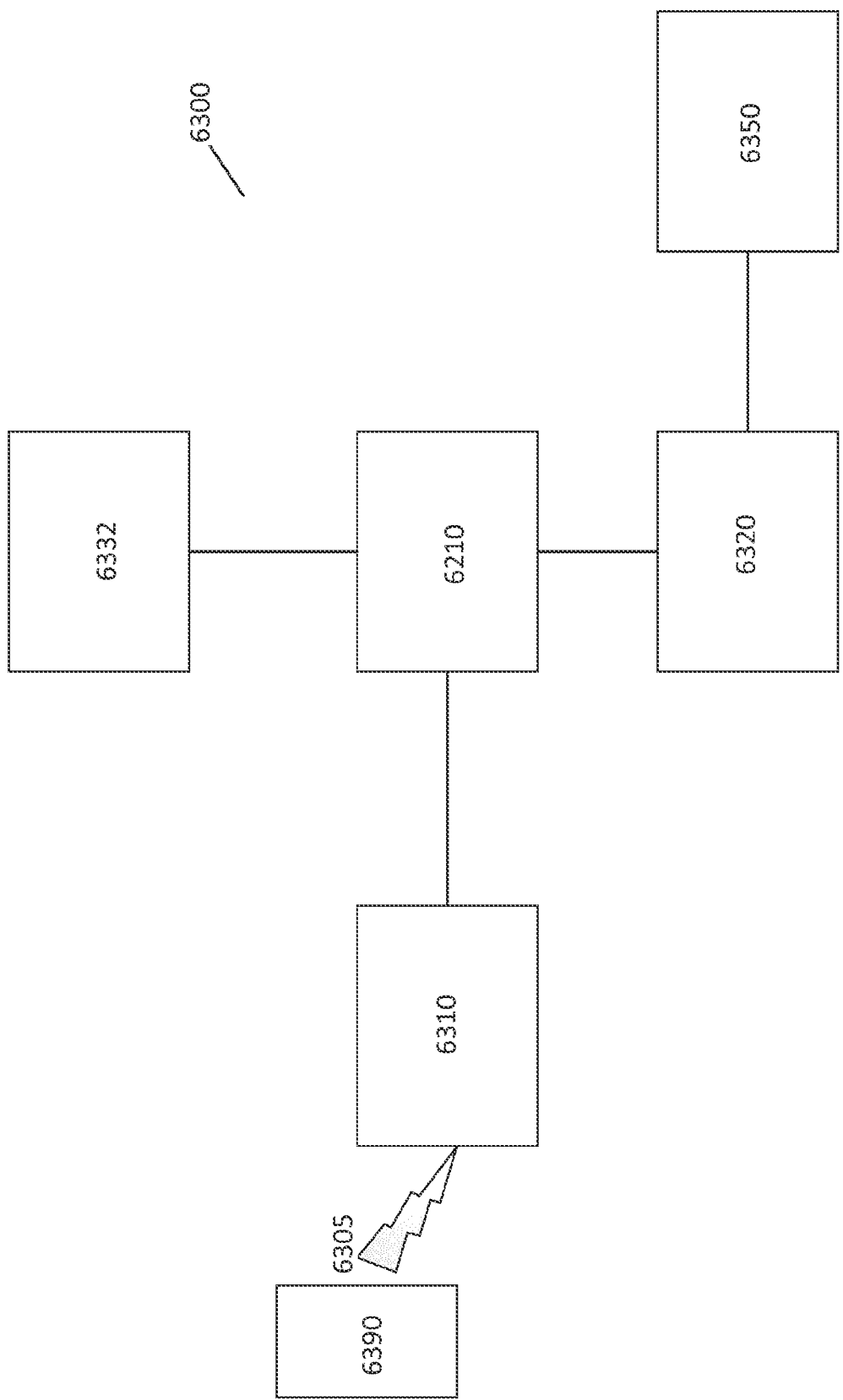
FIG. 33 shows a system according to an embodiment of the invention.

FIG. 33 illustrates a system 6300 according to an embodiment of the invention. The system 6300 comprises the controller 6210 described above and shown in FIG. 32.

The system 6300 comprises terrain sensing means 6331 for determining information about a terrain in the vicinity of the vehicle 6110. The terrain sensing means 6331 is arranged to output a terrain signal indicative of the determined terrain 6135. The terrain signal may be terrain data which may be stored in a memory. The terrain sensing means may comprise one or more sensing devices such as environment sensing means (e.g. imaging devices, such as cameras, or other sensing devices such as LIDAR, radar, ultrasonic devices, sonar devices etc.); thermometers; precipitation sensors; traction sensors; brake sensors. Signals output by each of the sensing devices may be used to form a representation of the terrains in the vicinity of the vehicle 6110 which is stored in the memory for use by other systems of the vehicle 6110. In at least some examples, the terrain signal is dependent at least partially on an estimated terrain. The estimated terrain may be based, for example, on a geographic location, a drive mode, and/or another vehicle system in addition or instead of the terrain sensing means.

Here, the vehicle comprises environment sensing means for determining a location of at least one feature in the vicinity of the vehicle; and outputting an environment signal indicative thereof. The environment sensing means is arranged to determine a location of features such as surface markings, which may be painted lines denoting a perimeter of a parking bay, for example, or objects such as walls, posts or other vehicles in relation to which the vehicle is required to manoeuvre. The control means is arranged to determine an absence of features, such as a separation between obstructive features (not shown) in dependence on the environment signal. Accordingly, the control means is arranged to determine a vacancy where no features, such as no obstructive features, are located. Where the vacancy is sufficiently great, the control means is arranged to determine a vehicle envelope suitable for receiving the vehicle 6110 in the defined manoeuvre completed position. The vehicle envelope comprises a target position suitable for receiving the vehicle 6110 in the defined manoeuvre completed position. As such, the vehicle envelope comprises a target defined manoeuvre completed position. In at least some examples, the vehicle envelope is determined in dependence on a one-dimensional property and/or measurement and/or estimation. In particular, the vehicle envelope can be determined in dependence on the environment signal being indicative of a length, such as an unobstructed length between features (not shown). The unobstructed length is sufficiently long for receiving the vehicle 6110 in the defined manoeuvre completed position, the length being a separation between features that is greater than the vehicle length or width in the defined manoeuvre completed position. The defined manoeuvre may comprise, for example, parking in a parked position.

The controller 6210 of the system 6300 here comprises defined manoeuvre means. The control means is arranged to control the vehicle 6110 to perform at least one defined manoeuvre. The controller 6210 may comprise a defined manoeuvre controller for controlling one or more systems of the vehicle 6110 to perform one or more defined manoeuvres. The defined manoeuvre means may be associated with one or more actuators 6350 of the vehicle 6110. The one or more actuators 6350 are provided for effecting movement of the vehicle 6110. The actuators may comprise one or more of a power steering mechanism arranged to provide steering of wheels of the vehicle 6110 in dependence on signals received from the controller 6210. A second actuator may comprise a powered braking mechanism of the vehicle 6110 which is arranged to actuate brakes of the vehicle in dependence on signals received from the controller 6210. A third actuator comprises the powertrain of the vehicle. The controller 6210 is arranged to control the steering of the vehicle wheel 6180 relative to the feature.

The system 6300 shown here comprises a motive control means 6320. The motive control means 6320 may be a motive control unit. The motive control means 6320 is arranged to receive the manoeuvre signal output by the controller 6210. The motive control means 6320 is associated with one or more motive units of the vehicle 6110 which may form part of a powertrain (not shown) of the vehicle 6110. The motive units may comprise one or more of an internal combustion engine and one or more electric machines of the vehicle 6110. The powertrain is arranged to provide power, or torque, to cause movement in the longitudinal axis of the vehicle 6110 i.e. forward or backward movement of the vehicle 6100 in dependence on the manoeuvre signal received from the controller 6210. The motive control means 6320 is arranged to control the application of torque to one or more wheels of the vehicle 6110 to move the vehicle 6110 in the longitudinal axis of the vehicle i.e. to move the vehicle generally forwards or backwards. The torque may comprise driving torque i.e. applied in a direction of desired movement, such as forwards. The torque may also comprise braking torque i.e. applied to resist the driving torque. In at least some embodiments both driving torque and braking torque may be applied simultaneously in order to provide low-speed movement of the vehicle 6110. The braking torque may also be applied at least partly after the driving torque in order to effect accurate movement of the vehicle 6110. To achieve control of the steering, the controller 6210 may communicate with the motive control means 6320. Thus the one or more actuators 6350 can control a direction and movement of the vehicle to perform the defined manoeuvre. The defined manoeuvre is performed in dependence on the terrain signal provided by the terrain sensing means 6331.

The one or more defined manoeuvres which may be performed by the vehicle 6110 under control of the controller 6210 may comprise a parking manoeuvre, such as a parking-in manoeuvre wherein the vehicle 6110 is controlled to arrive at a parked position.

As shown here, the system 6300 comprises a receiver means 6310 for receiving a signal 6305. The signal 6305 may be wirelessly received from a mobile device 6390 associated with a person responsible for the vehicle 6110. The signal 6305 is indicative of a user request for vehicle movement of the vehicle 6110. The receiver means 6310 is arranged to output the request signal to the input means 6230 of the controller 6210 as described above. The request signal may be output by the receiver means 6310 onto a communication bus of the vehicle 6110 which may communicably couple the components of the system 6300.

The receiver means 6310 may be in the form of a radio unit 6310. The radio unit 6310 may comprise a receiver for receiving radio signals 6305 from the mobile device 6390. In some embodiments the radio unit 6310 may also comprise a transmitter, or may be a transceiver 6310 configured to receive radio signals 6305 transmitted from the mobile device 6390 and transmit signals to the mobile device 6390. The radio unit 6103 and the mobile device 6390 may be arranged to provide a wireless local area network, via which two-way communication may take place between the radio unit 6103 and the mobile device 6390. For example, the radio unit 6103 may be arranged to communicate by WiFi® with the mobile device 6390. In alternative embodiments other radio communication standards may be used for the communication. In one example, communication between the radio unit 6103 and the mobile device 6390 is provided via Bluetooth®, although other protocols or standards may be envisaged.

The mobile device 6390 may be an electronic key fob associated with the vehicle 6110, such as may be used to gain entry and to activate or power up the vehicle 6110. The mobile device 6390 may, in other embodiments, be an electronic device associated with the person responsible for the vehicle 6100 such as a mobile telephone, tablet, watch, wearable electronic device or other computing device associated with the person. The mobile device 6390 is capable of receiving a user input indicating the person's desire to move the vehicle 6110. The user input may be provided in the form of a button or key press, activation of a graphically displayed icon, a gesture or voice command. Other forms of user input may also be envisaged.

Figure 34:
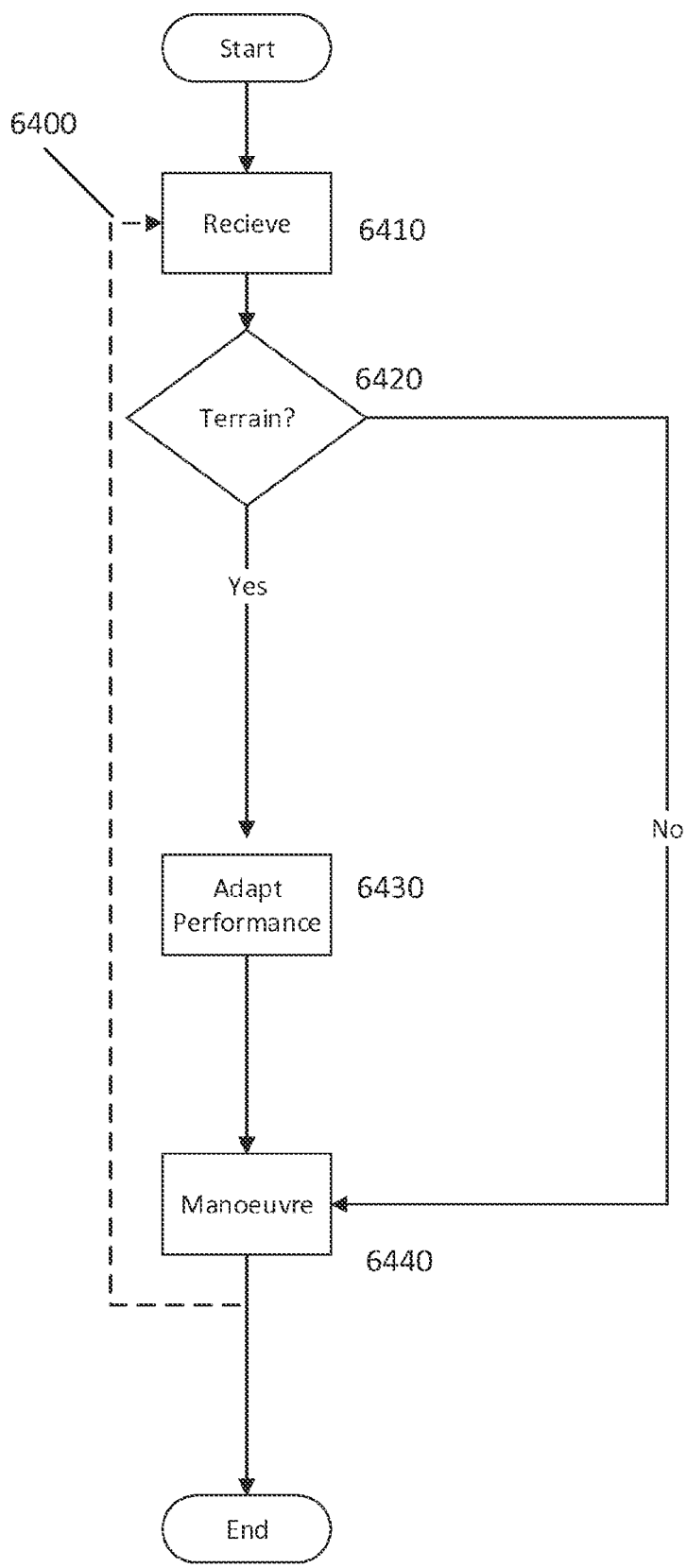
FIG. 34 shows a method according to an embodiment of the invention.

FIG. 34 illustrates a method 6400 according to an embodiment of the invention. The method 6400 is a method of controlling movement of the vehicle 6110. The method 6400 may be formed by the controller 6210 and system 6300 described above with reference to FIGS. 32 and 33. The method 6400 will be described with reference to FIG. 35 as an example which corresponds broadly to the situation shown in FIG. 31.

The method 6400 broadly comprises steps of receiving 6410 the terrain signal from the terrain sensing means 6331 which is indicative of a terrain 6135 in a vicinity of the vehicle 6110 and, in dependence thereon, controlling 6440 the vehicle's 6110 performance of a defined manoeuvre.

Referring to FIG. 34, the illustrated embodiment of the method 6400 comprises a step of receiving 6410 the terrain signal from the terrain sensing means 6331. The controller 6210 determines 6420 whether the terrain signal is indicative of a terrain associated with an adaptation 6430 of the performance of the defined manoeuvre 6440, such as according to a particular vehicle movement control profile corresponding to the sensed terrain.

Figure 35:
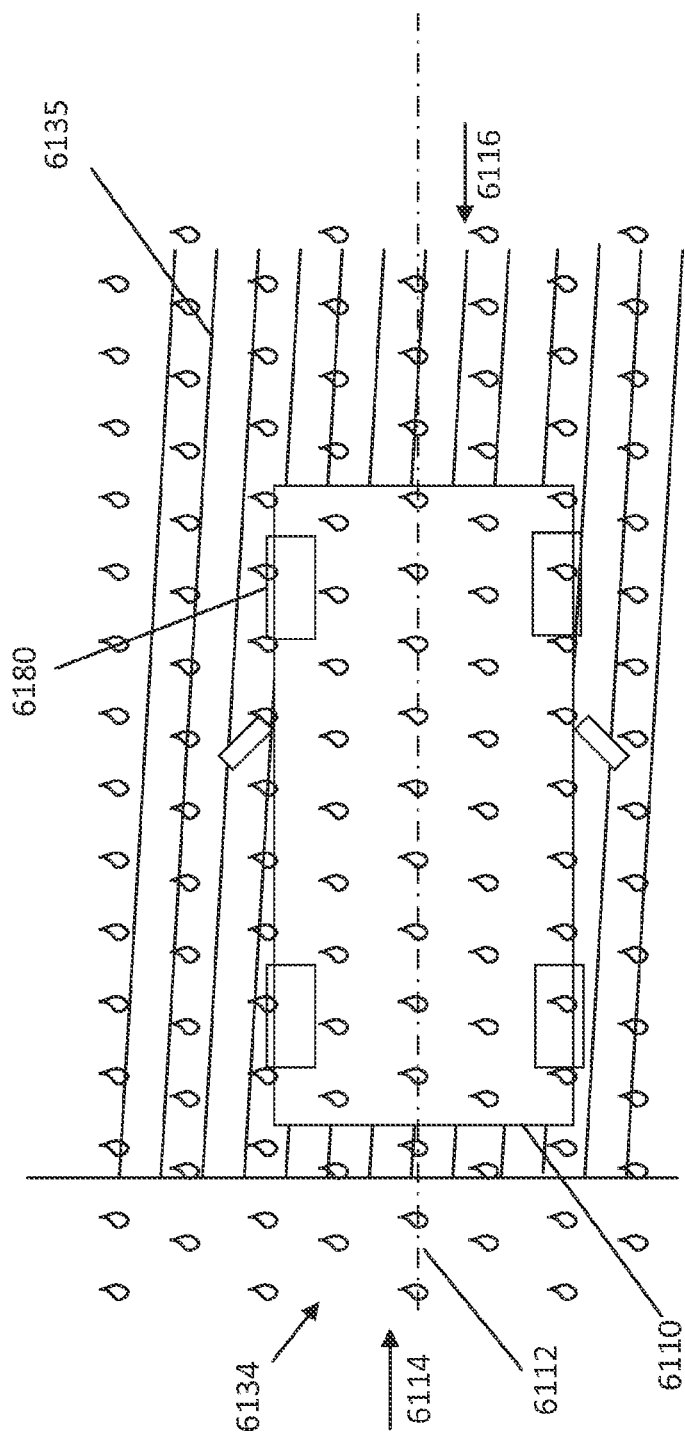
FIG. 35 illustrates a vehicle according to an embodiment of the invention.

In FIG. 35, the vehicle 6110 is illustrated as being located on a terrain 6135 similar to FIG. 31. The control means 6210 is arranged to control the output means 6240 to cause the vehicle 6110 to perform at least a portion of the defined manoeuvre in accordance with a vehicle movement control profile determined in dependence on a terrain signal indicative of the terrain 6135 and on an ambient condition signal indicative of an ambient condition 6136. Accordingly, the vehicle 6110 is caused to perform the defined manoeuvre in a controlled manner appropriate for the terrain 6135 and the ambient condition 6136. The control means 6210 is arranged to select the vehicle movement control profile in dependence on a categorisation of the terrain 6135 and of the ambient condition 6136. Accordingly, the vehicle 6110 automatically selects parameters for performance of the defined manoeuvre associated with predetermined categories of terrain 135 and ambient condition 136.

The terrain 6135 is a surface. In at least some examples, the surface may comprise a ground surface, such as a load-bearing surface (e.g. vehicle-bearing). The surface may comprise a driveable surface, such as for receiving the vehicle wheels 6180 thereon. The surface may comprise a substrate.

In at least some examples, the categories of terrain comprise one or more of: a road terrain; an off-road terrain; a bumpy terrain; a smooth terrain; a slippy terrain; a flat terrain; a material. Here, the terrain 6135 is categorised according to one or more parameters corresponding to one or more of: bumpiness; smoothness; roughness; grip; slip; friction; one or more gradients; one or more inclines; one or more materials. The one or more parameters comprise a magnitude and/or a direction.

In some examples, in addition, or an alternative, to dependence on the terrain signal, the control means 6210 is arranged to control the output means 6240 in dependence on a topography signal indicative of a topography in the vicinity of the vehicle 6110.

Here, the ambient condition 6136 is shown as being rain, such as rain. In other examples, the ambient condition 6136 may include, for example, a temperature; an air temperature; a surface temperature, such as a road temperature; precipitation, such as rain, snow, hail; moisture; humidity; fog; mist; particles, such as airborne particles; light level; wind; wind speed; wind direction.

Figure 36:
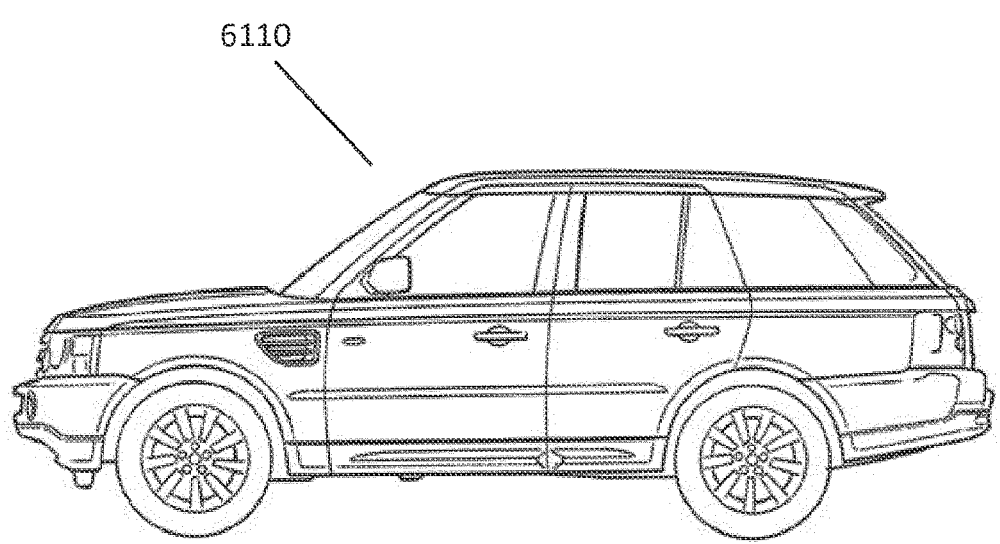
FIG. 36 is a vehicle according to an embodiment of the invention.

FIG. 36 shows a side view of an example vehicle according to an embodiment of the invention, being a car (private, passenger, non-service vehicle) as shown here.

As a result of the method 6400 the vehicle may be more advantageously positioned or configured following performance of a defined manoeuvre. It will also be appreciated that embodiments of the present invention are not limited to being useful in association with a defined manoeuvre. For example, it may be useful to adapt or provide performance, such as of a portion of a defined manoeuvre, in dependence on a terrain even when being driven by a human driver.

Seventh Technique

Figure 37A:
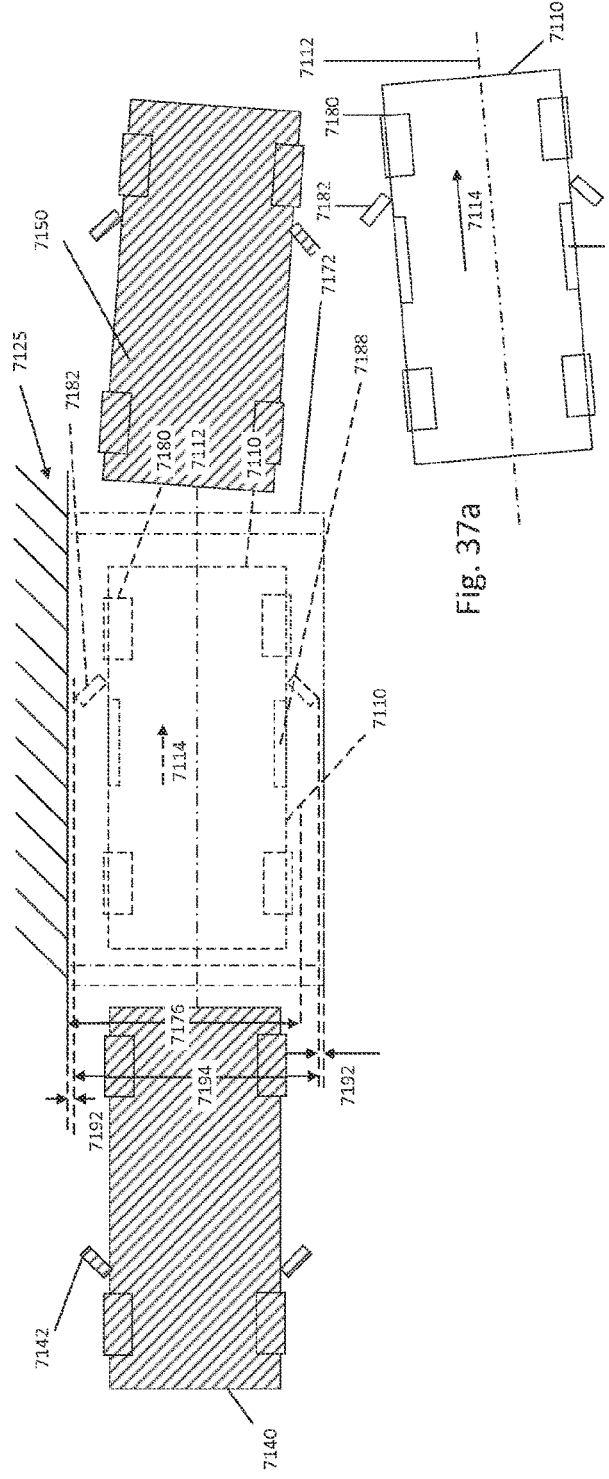
FIG. 37a shows a vehicle in relation to a feature in a vicinity of the vehicle.
Figure 37B:
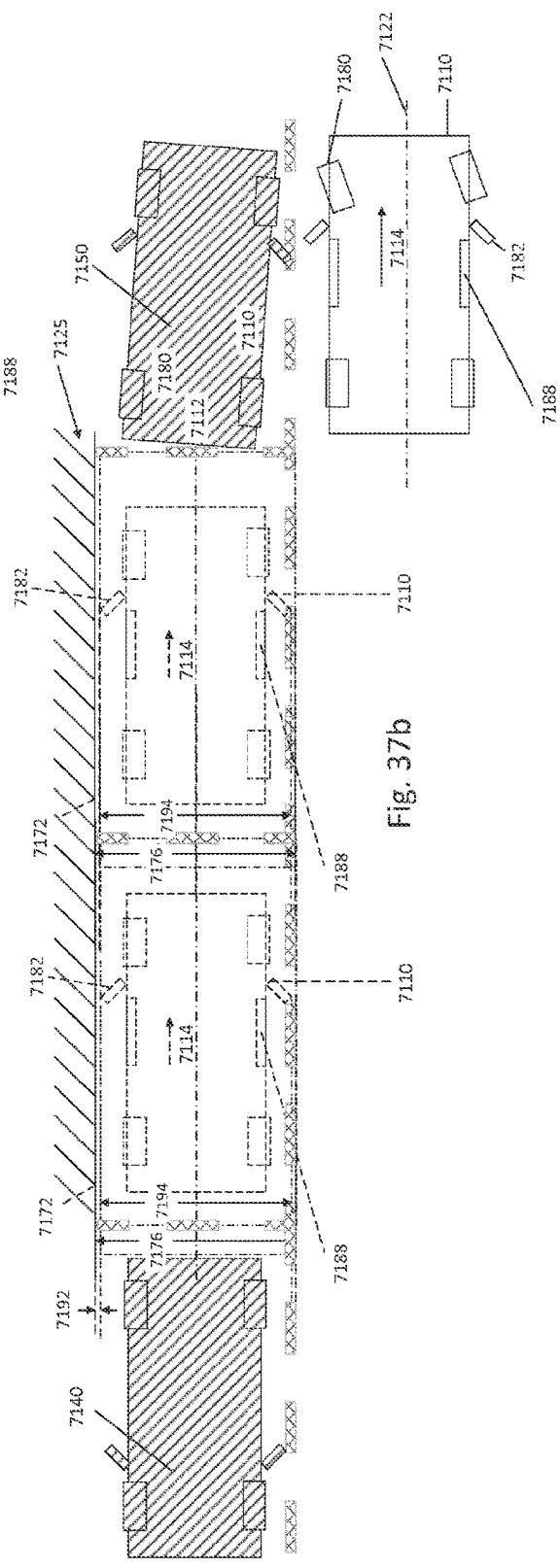
FIG. 37b shows the vehicle in relation to the feature in the vicinity of the vehicle in another scenario.

FIGS. 37a and 37b illustrate a vehicle 7110 according to an embodiment of the invention in two different scenarios. In FIGS. 37a and 37b, the vehicle 7110 is illustrated as having a vehicle forward direction, indicated by arrow 7114, shown parallel to a central longitudinal axis 7112 of the vehicle 7110. In both scenarios, the vehicle 7110 is illustrated at a defined manoeuvre start position with a defined manoeuvre completed position of the vehicle 7110 shown in broken lines. In both particular scenarios shown in FIGS. 37a and 37b, it may be desirable to perform a defined manoeuvre to park the vehicle 7110 in the defined manoeuvre completed position in a vacancy 7172.

In FIG. 37(a) the vehicle 7110 is shown in broken line at a target or desired defined manoeuvre completed position in a vehicle envelope 7174 in the vacancy 7172, where the defined manoeuvre would have been performed with the vehicle performing a streetside or parallel parking defined manoeuvre to enter the vacancy 7172 with the vehicle 7110 moving in a number of consecutive trajectory parts in a forward direction 7114 and a rearward direction respectively. The vehicle 7110 is shown in relation to a feature 7125 in a vicinity of the vehicle 7110. The feature 7125 is, in this example, an object which is a wall that is parallel to the longitudinal axis 7112 of the vehicle 7110 i.e. generally parallel to a side of the vehicle 7110, such as a left side here—in the defined manoeuvre completed position. The object is not limited to being a wall 7125 and may be, for example, a bollard, fence, barrier, or other object at or adjacent the vacancy 7172. As shown here, other features 7140, 7150 in the form of stationary vehicles bound each opposite longitudinal end of the vacancy 7172.

In FIG. 37a, a dimension of the vehicle, being a width 7194 as shown here, is such that the vehicle 7110 can be manoeuvred into the apparent vehicle envelope 7174 in the vacancy 7172, with a corresponding dimension, shown here as a width 7176, of the vacancy's vehicle envelope 7174 being sufficient, wider as shown here. Accordingly, the vehicle 7110 as such would fit into the vacancy 7172, with a clearance, such as indicated by the separation 7192 from the vehicle's moveable projection 7182 to the wall feature 7125. It will be appreciated that although shown here in plan view, the scenarios depicted are three dimensional.

Similarly, the vacancy 7172 of the scenario of FIG. 37b may be such that the vehicle envelope 7174 appears suitable for receiving the vehicle 7110 therein, with a clearance 7192 between the vehicle 7110 in the closed configuration at the defined manoeuvre completed position, shown in broken lines, and the adjacent feature 7125. In the scenario of FIG. 37b, two target or desired defined manoeuvre completed positions are shown in broken lines, indicative of a possibility of positioning the vehicle 7110 in either one of at least two vehicle envelopes 7172 for the scenario shown. As shown here, the two vehicle envelopes 7172 correspond to two respective pre-defined parking lots or spaces, such as may be designated by markings on the road surface. It will be appreciated that a different number of trajectory parts may be performed to reach the defined manoeuvre completed position, in dependence on the desired parking space or lot (e.g. left or right defined manoeuvre completed position as shown).

Accordingly, in both scenarios there may be a trade-off between: a defined manoeuvre completed position or an accuracy or neatness of the vehicle in the defined manoeuvre completed position; and the number of trajectory parts performed to reach the defined manoeuvre completed position.

Embodiments of the present invention aim to ameliorate such problems.

It will be understood in both cases shown in FIGS. 37(a) and (b) that the defined manoeuvre may be a manoeuvre of the vehicle 7110 which is performed automatically by the vehicle 7110 i.e. under control of one or more systems of the vehicle 7110. The defined manoeuvre may be considered to be performed automatically by the vehicle 7110, or at least semi autonomously. As shown, in FIGS. 37a and 1b the defined manoeuvre may be a parking manoeuvre to control the vehicle 7110 to drive into a parking place.

In both situations, it may be advantageous for the manoeuvre to be performed whilst a person in control of the vehicle 7110 is external to the vehicle 7110. For example, access to the vehicle 7110 may be limited in FIG. 37(a) or 1(b) after performing the defined manoeuvre (e.g. where the feature 7125 forms a hindrance to opening a vehicle door 7188).

To perform the defined manoeuvre, the vehicle 7110 comprises environment sensing means for determining a location of features 7125 in the vicinity of the vehicle 7110. The environment sensing means may comprise one or more sensing devices or imaging devices. The one or more sensing devices may emit radiation and receive radiation reflected from the features in the vicinity of the vehicle, such as ultrasonic sensing devices, although it will be appreciated that the present invention is not limited in this respect. Such environment sensing means have a minimum distance to which accuracy the location of the features 7125 may be determined due to, for example, a resolution of an imaging device or a signal-to-noise ratio of a sensing device.

In the particular examples shown here, the vehicle 7110 comprises a portion of the environment sensing means in or on the vehicle moveable projection 7182. For example, each side or wing mirror of the vehicle 7110 can have a camera or the like mounted thereto or thereon.

Figure 38:
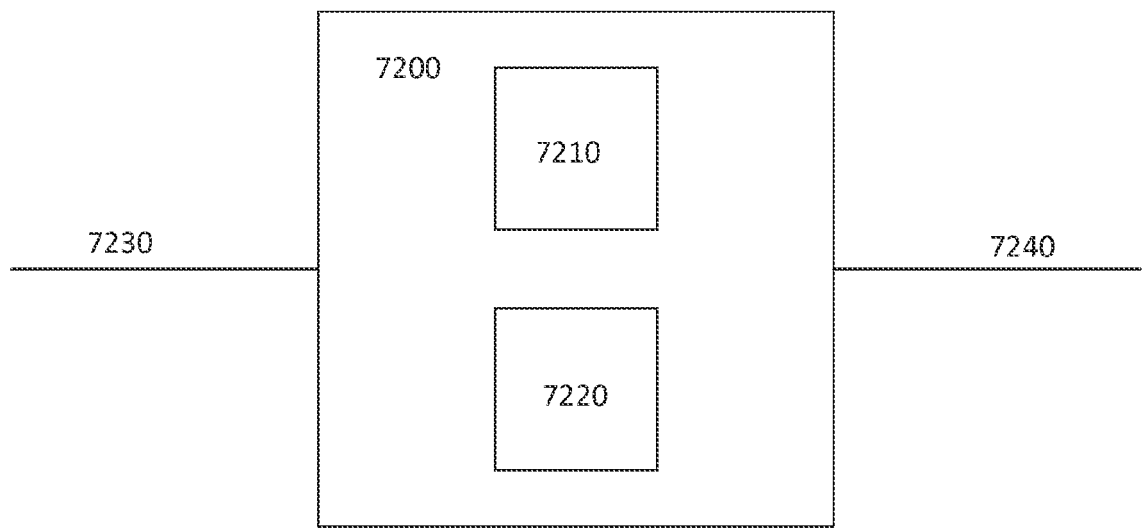
FIG. 38 shows a controller according to an embodiment of the invention.
Figure 42:
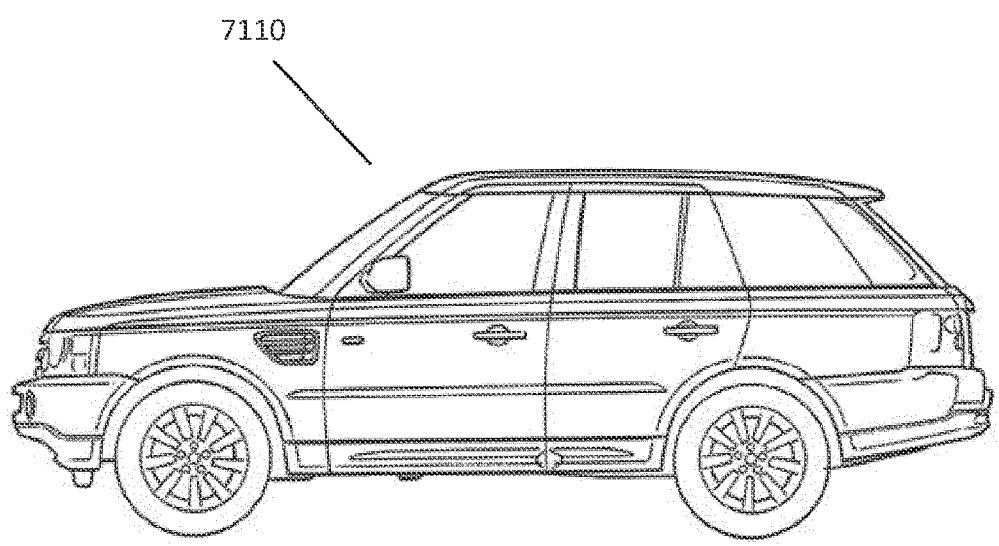
FIG. 42 is a vehicle according to an embodiment of the invention.

FIG. 38 illustrates a controller 7200 or control unit 7200 according to an embodiment of the invention, such as comprised in the vehicle 7110 of FIGS. 37(a) and 37(b).

The controller 7200 comprises a control means 7210, input means 7230 and output means 7240. In some embodiments the controller comprises a memory means 7220 such as one or more memory devices 7220 for storing data therein. The output means 7240 may comprise an electrical output for outputting a manoeuvre signal. The manoeuvre signal represents an instruction for the vehicle 7110 to move. The instruction provided by the manoeuvre signal is provided to cause the vehicle 7110 to perform the defined manoeuvre. Here, the controller 7200 may determine that one or more of the features 7125, 7140, 7150 are such that a planned trajectory to perform the defined manoeuvre can be performed within a number of trajectory parts to the defined manoeuvre completed position within a defined manoeuvre completed position tolerance range. The control means 7210 here is arranged to determine the defined manoeuvre completed position tolerance range in dependence on the environment signal. The control means 7210 may determine that the defined manoeuvre can be performed with a different number of trajectory parts to a different defined manoeuvre completed position tolerance range. Advantageously the vehicle 7110 can be caused to perform the defined manoeuvre within a number of trajectory parts that is adaptable, such as for features in the vicinity of the vehicle. For example, there can be a larger vehicle position tolerance range for a smaller vacancy 7172 for receiving the vehicle 7110, such as where it may be more acceptable or desirable for the vehicle to have a less precise angle or relative position in or to the vacancy 7172, such as to allow the vehicle 7110 to perform the defined manoeuvre in a smaller number of trajectory parts. Alternatively, there can be a larger vehicle position tolerance range for a large vacancy 7172 for receiving the vehicle 7110, such as where a less precise angle or relative position in or to the vacancy 7172 may be less noticeable, such as to allow the vehicle 7110 to perform the defined manoeuvre in a smaller number of trajectory parts.

The control means 7210 may be formed by one or more electronic processing devices such as an electronic processor. The processor may operably execute computer readable instructions stored in the one or more memory devices 7220. The control means 7210 is arranged to control the output means 7240 to output the manoeuvre signal in dependence on the environment signal, as will be explained. In some embodiments the input means 7230 and output means 7240 may be combined such as by being formed by an I/O unit or interface unit. For example, the controller 7210 may comprise an interface to a network forming a communication bus of a vehicle. The interface bus may be an Internet Protocol (IP) based communication bus such as Ethernet, although embodiments of the invention are not limited in this respect.

The input means 7230 may comprise an electrical input for receiving an environment signal. The input means 7230 may comprise an electrical input for receiving a request signal. Here, the request signal is indicative of a wirelessly received signal representing a user request for movement of the vehicle 7110.

As shown here, the memory means 7220 can be used to store data from the input means 7230. In particular, the memory means can store data about the features 7125, 7140, 7150 or the vacancy 7172 for future use. For example, where an occupant or user of the vehicle 7110 has actively selected (e.g. by inputting one or more parameter inputs) or implicitly shown (e.g. through a repeated behavioural or use pattern) a preference for a defined manoeuvre completed position tolerance range and/or a number of trajectory parts for one or more scenarios, the memory means can store data corresponding to the preference to provide a default and/or automatic tolerance range and/or number of trajectory parts in dependence on the input (e.g. environment signal and/or location signal, etc) being indicative of a such or similar scenario for the preference or preferences.

The data may be stored prior to and during performance of the defined manoeuvre, for use during the performance of the defined manoeuvre. In addition, or alternatively, the data may be stored for use during a subsequent defined manoeuvre. For example, where the data is stored prior to or during the performance of the defined manoeuvre to arrive at the defined manoeuvre completed position of FIG. 37*a* or 37*b* as shown in broken lines, then the stored data may be used for or during a subsequent defined manoeuvre, such as an unparking manoeuvre from the defined manoeuvre completed position of FIG. 37*a* or 37*b*. Where stored data, such as of the features 7125, 7140, is used for the performance of at least a portion of the defined manoeuvre, the controller 7200 may perform a check, such as to the validity or continued validity of the data. For example, the controller may corroborate the data with another input, such as with input from another portion of the environment sensing means (e.g. another sensor or camera located at another portion of the vehicle 7110, the another sensor or camera able to confirm the continued presence and/or position of the one or more features 7125, 7140).

In at least some examples, the controller 7210 may comprise a second input means for receiving a request signal indicative of a received signal indicative of a user request, such as a wirelessly received signal.

It will be appreciated that the controller 7200 may be arranged to perform a portion of the defined manoeuvre. For example, the user may initiate the manoeuvre with control being transferred to the controller 7210 thereafter to perform the defined manoeuvre to the defined manoeuvre completed position. The number of trajectory parts may be determined from an initiation of the defined manoeuvre, such as from outside the vacancy 7172 prior to a start of a manoeuvre or wherever and whenever a user transfers control to the controller.

Figure 39:
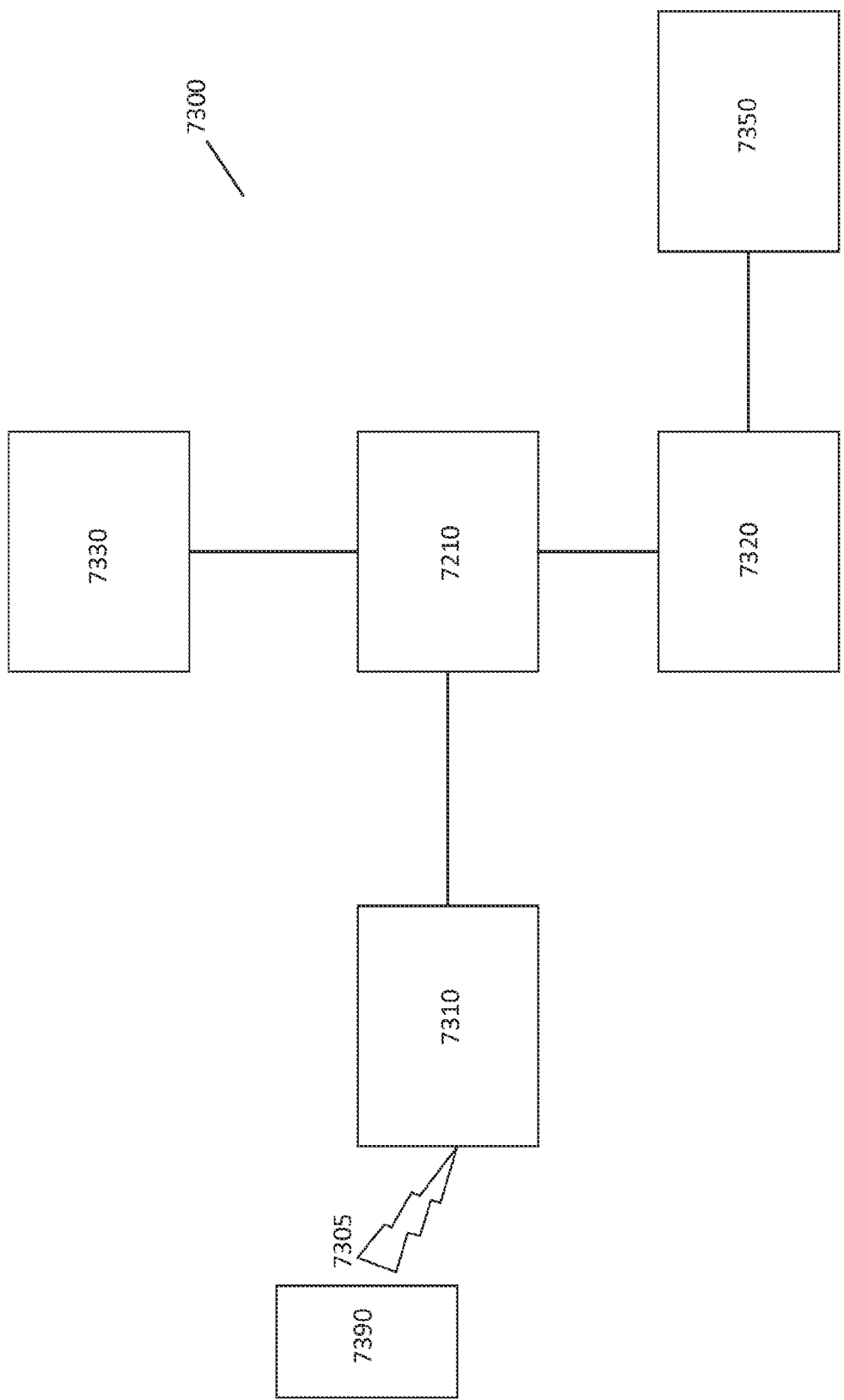
FIG. 39 shows a system according to an embodiment of the invention.

FIG. 39 illustrates a system 7300 according to an embodiment of the invention. The system 7300 comprises the controller 7210 described above and shown in FIG. 38.

The system 7300 comprises environment sensing means 7330 for determining information about an environment of the vehicle 7110. In particular, the environment sensing means 7330 is provided for determining a location of one or more features in a vicinity of the vehicle 7110. In at least some examples, a portion of the environment sensing means is associated with the one or more moveable projections 7182, such as one or more sensors or cameras mounted in or on a vehicle wing mirror. The environment sensing means 7330 is arranged to output an environment signal indicative of the determined features. The environment signal may be environment data which may be stored in a memory. The environment sensing means may comprise one or more sensing devices such as imaging devices, such as cameras, or other sensing devices such as LI DAR, radar. ultrasonic devices, sonar devices etc. Signals output by each of the sensing devices may be used to form a representation of the environment of the vehicle 7110 which is stored in the memory for use by other systems of the vehicle 7110.

Here, the environment sensing means 7330 is arranged to determine a location of features such as surface markings, which may be painted lines denoting a perimeter of a parking bay, for example, or objects such as walls, posts or other vehicles in relation to which the vehicle is required to manoeuvre. The control means is arranged to determine an absence of features, such as a separation between obstructive features, such as the adjacent features 7140, 7150 shown here, in dependence on the environment signal. Accordingly, the control means is arranged to determine a vacancy 7172 where no features, such as no obstructive features, are located. Where the vacancy 7172 is sufficiently great, the control means is arranged to determine a vehicle envelope 7174 suitable for receiving the vehicle 7110 in the defined manoeuvre completed position. The vehicle envelope 7174 comprises a target position suitable for receiving the vehicle 7110 in the defined manoeuvre completed position. As such, the vehicle envelope 7174 here comprises a target defined manoeuvre completed position. In at least this example, the vehicle envelope 7174 is determined in dependence on a one-dimensional property and/or measurement and/or estimation. In particular, here, the vehicle envelope 7174 is determined in dependence on the environment signal being indicative of a length, such as an unobstructed length between features 7140, 7150. The unobstructed length is sufficiently long for receiving the vehicle 7110 in the defined manoeuvre completed position, the length here being a separation between features 7140, 7150 that is greater than the vehicle length in the defined manoeuvre completed position. As shown here vacancy 7172 is sufficiently great to provide multiple possible vehicle envelopes 7174 for receiving the vehicle 7110 in respective defined manoeuvre completed positions The defined manoeuvre may comprise, for example, parking in a parked position.

The controller 7210 of the system 7300 here comprises defined manoeuvre means. The control means is arranged to control the vehicle 7110 to perform at least one defined manoeuvre. The controller 7210 may comprise a defined manoeuvre controller for controlling one or more systems of the vehicle 7110 to perform one or more defined manoeuvres. The defined manoeuvre means may be associated with one or more actuators 7350 of the vehicle 7110. The one or more actuators 7350 are provided for effecting movement of the vehicle 110. The actuators may comprise one or more of a power steering mechanism arranged to provide steering of wheels of the vehicle 110 in dependence on signals received from the controller 7210. A second actuator may comprise a powered braking mechanism of the vehicle 7110 which is arranged to actuate brakes of the vehicle in dependence on signals received from the controller 7210. A third actuator comprises the powertrain of the vehicle. The controller 7210 is arranged to control the steering of the vehicle wheel 7180 relative to the feature 7125. A fourth actuator 7350 comprises one or more mechanisms for altering the position of the one or more moveable projections 7182.

The system 7300 shown here comprises a motive control means 7320. The motive control means 7320 may be a motive control unit. The motive control means 7320 is arranged to receive the manoeuvre signal output by the controller 7210. The motive control means 7320 is associated with one or more motive units of the vehicle 7110 which may form part of a powertrain (not shown) of the vehicle 7110. The motive units may comprise one or more of an internal combustion engine and one or more electric machines of the vehicle 7110. The powertrain is arranged to provide power, or torque, to cause movement in the longitudinal axis of the vehicle 7110 i.e. forward or backward movement of the vehicle 7100 in dependence on the manoeuvre signal received from the controller 7210. The motive control means 7320 is arranged to control the application of torque to one or more wheels of the vehicle 7110 to move the vehicle 7110 in the longitudinal axis of the vehicle i.e. to move the vehicle generally forwards or backwards. The torque may comprise driving torque i.e. applied in a direction of desired movement, such as forwards. The torque may also comprise braking torque i.e. applied to resist the driving torque. In at least some embodiments both driving torque and braking torque may be applied simultaneously in order to provide low-speed movement of the vehicle 7110. The braking torque may also be applied at least partly after the driving torque in order to effect accurate movement of the vehicle 7110. To achieve control of the steering, the controller 7210 may communicate with the motive control means 7320. Thus the one or more actuators 7350 can control a direction and movement of the vehicle to perform the defined manoeuvre. The defined manoeuvre is performed in dependence on the environment signal provided by the environment sensing means 7330.

The one or more defined manoeuvres which may be performed by the vehicle 7110 under control of the controller 7210 may comprise a parking manoeuvre, such as shown in FIGS. 37(*a*) and 37(*b*) wherein the vehicle 7110 is controlled to arrive at a parked position.

As shown here, the system 7300 comprises a receiver means 7310 for receiving a signal 7305. The signal 7305 may be wirelessly received from a mobile device 7390 associated with a person responsible for the vehicle 7110. The signal 7305 is indicative of a user request for vehicle movement of the vehicle 7110, as noted above. The receiver means 7310 is arranged to output the request signal to the input means 7230 of the controller 7210 as described above. The request signal may be output by the receiver means 7310 onto a communication bus of the vehicle 7110 which may communicably couple the components of the system 7300.

The receiver means 7310 may be in the form of a radio unit 7310. The radio unit 7310 may comprise a receiver for receiving radio signals 7305 from the mobile device 7390. In some embodiments the radio unit 7310 may also comprise a transmitter, or may be a transceiver 7310 configured to receive radio signals 7305 transmitted from the mobile device 7390 and transmit signals to the mobile device 7390. The radio unit 7103 and the mobile device 7390 may be arranged to provide a wireless local area network, via which two-way communication may take place between the radio unit 7103 and the mobile device 7390. For example, the radio unit 7103 may be arranged to communicate by WiFi® with the mobile device 7390. In alternative embodiments other radio communication standards may be used for the communication. In one example, communication between the radio unit 7103 and the mobile device 7390 is provided via Bluetooth®, although other protocols or standards may be envisaged.

The mobile device 7390 may be an electronic key fob associated with the vehicle 7110, such as may be used to gain entry and to activate or power up the vehicle 7110. The mobile device 7390 may, in other embodiments, be an electronic device associated with the person responsible for the vehicle 7100 such as a mobile telephone, tablet, watch, wearable electronic device or other computing device associated with the person. The mobile device 7390 is capable of receiving a user input indicating the person's desire to move the vehicle 7110. The user input may be provided in the form of a button or key press, activation of a graphically displayed icon, a gesture or voice command. Other forms of user input may also be envisaged.

Figure 40:
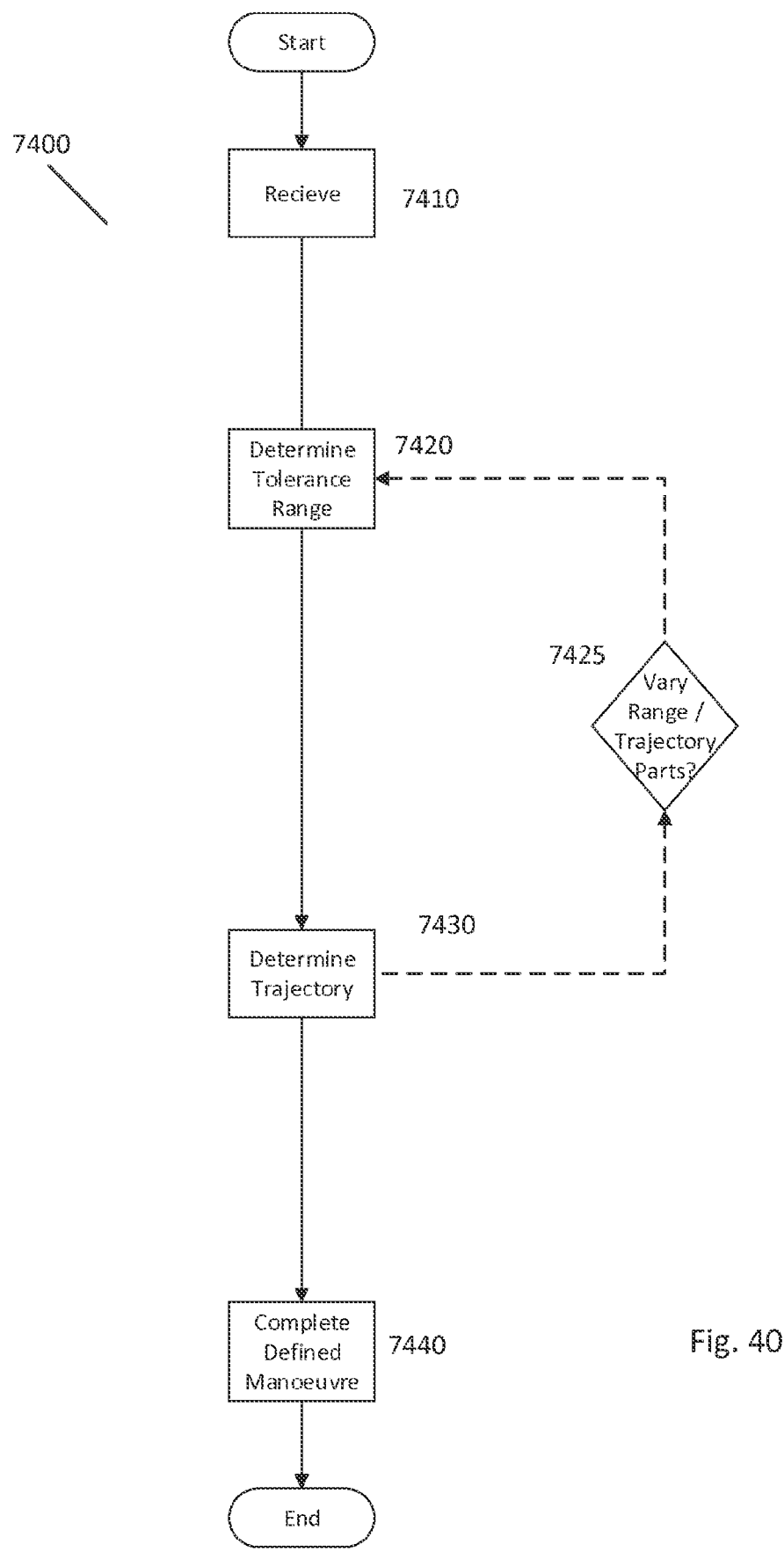
FIG. 40 shows a method according to an embodiment of the invention.

FIG. 40 illustrates a method 7400 according to an embodiment of the invention. The method 7400 is a method of controlling movement of the vehicle 7110. The method 7400 may be formed by the controller 7210 and system 7300 described above with reference to FIGS. 38 and 39. The method 7400 will be described with reference to FIGS. 41(*a*) to 41(*h*) as examples which correspond to the scenarios shown in FIGS. 37(*a*) and 37(*b*) respectively; and with respect to FIGS. 41(*i*) and 41(*j*).

The method 7400 broadly comprises steps of receiving 7410 the environment signal from the environment sensing means 7330 which is indicative of a feature 7125, 7140, 7150 in a vicinity of the vehicle 7110 and, in dependence thereon, determining a planned trajectory to perform the defined manoeuvre within a number of trajectory parts to the defined manoeuvre completed position within a defined manoeuvre completed position tolerance range relative to the feature 7125, 7140, 7150 in the vicinity of the vehicle 7110. Here, the defined manoeuvre completed position tolerance range is determined by the controller 7200 in dependence on the environment signal.

Referring to FIG. 40, the illustrated embodiment of the method 7400 comprises a step of receiving 7410 the environment signal from the environment sensing means 7330. The controller 7210 determines 7420 whether the environment signal is indicative of one or more features 7125, 7140, 7150 in the vicinity of the vehicle 7110 corresponding to a vacancy 7172 for which a planned trajectory can be determined to a defined manoeuvre completed position with a tolerance range, within a defined number of trajectory parts. In at least some examples, the method includes an optional step 7425 of varying either or both the number of trajectory parts and/or the defined manoeuvre completed position tolerance range. For example, where a defined manoeuvre could be performed to a less precise defined manoeuvre completed position, such as with a larger tolerance range, in a fewer number of trajectory parts, such an option may be offered to a user. In at least some examples, a defined manoeuvre may be performable with different discrete (e.g. two, three or more distinct) defined numbers of trajectory parts and/or tolerance ranges. For example, for a detected vacancy 7172, a defined manoeuvre may be performable to a defined manoeuvre completed position with a first tolerance range within six trajectory parts; or performed to a defined manoeuvre completed position with a second (larger tolerance range) within five trajectory parts; or performed to a defined manoeuvre completed position with a third (yet larger) tolerance range within four trajectory parts. The defined manoeuvre may be performable with different trajectories, each trajectory comprising a different number of trajectory parts (e.g. a first trajectory with six trajectory parts; a second trajectory with five trajectory parts; a third trajectory with four trajectory parts; etc.).

In FIGS. 41(*e*), 41(*f*) and 41(*g*), 41(*h*) respectively, the vehicle 7110 is illustrated as being located in a defined manoeuvre completed position in a vehicle envelope 7174 defined in a vacancy 7172 bounded by adjacent features 7125, 7140, 7150 similar to FIGS. 37(*a*) and 37(*b*). FIGS. 35*a* to 35*e* illustrate sequentially the vehicle performing a defined manoeuvre according to an embodiment of the invention. FIG. 35(*a*) shows the vehicle 7110 at or near a start of a first trajectory part of the defined manoeuvre, with the vehicle 7110 reversing, moving in a direction opposite to the forward direction 7114 of the vehicle 7110, into the vacancy 7172. FIG. 41(*b*) shows the vehicle 7110 at or near an end of the first trajectory part of the defined manoeuvre, shortly prior to changing longitudinal direction to start a second trajectory part of the defined manoeuvre with the vehicle 7110 to move in the forward direction 7110. FIG. 41(*c*) shows the vehicle at or near an end of the second trajectory part of the defined manoeuvre, shortly prior to changing longitudinal direction to start a third trajectory part of the defined manoeuvre with the vehicle 7110 to move in the reverse direction. FIG. 41(*d*) shows the vehicle 7110 at or near an end of the third trajectory part of the defined manoeuvre, shortly prior to changing longitudinal direction to start a fourth trajectory part of the defined manoeuvre with the vehicle 7110 to move in the forward direction 7114. FIG. 41 shows the vehicle 7110 in the defined manoeuvre completed position having completed the fourth trajectory part of the defined manoeuvre. Here, the vehicle 7110 is shown having completed the defined manoeuvre within four trajectory parts to a defined manoeuvre completed position with a small tolerance range, such as determined in dependence on the environment signal—and optionally on another parameter or input (e.g. a user selection).

FIG. 41(*f*) shows an alternative defined manoeuvre completed position to that of FIG. 41(*e*), with the vehicle 7110 having performed a defined manoeuvre in fewer trajectory parts to a defined manoeuvre completed position with a larger tolerance range relative to that of FIG. 41(*e*). For example, the defined manoeuvre to reach the defined manoeuvre completed position of FIG. 41(*f*) could have been performed with a similar first trajectory part between positions similar to those of FIGS. 41(*a*) and 41(*b*) and a second trajectory part from a position similar to that of FIG. 41(*b*) to that of FIG. 41(*f*). Accordingly, it will be appreciated that the controller 7200 is arranged to allow performance of defined manoeuvres with different numbers of trajectory parts to defined manoeuvre completed positions with different tolerance ranges. The controller 7200 may be arranged to offer and/or select the different numbers of trajectory parts and/or tolerance ranges in dependence on the environment signal, such as the properties of the vacancy 7172. For example, the controller 7200 may be arranged to offer and/or select the different numbers of trajectory parts and/or tolerance ranges in dependence on the size of the vacancy 7172, the alignment of the adjacent objects 7140, 7150, or other parameters associated with the vacancy. Additionally, or alternatively, the controller 7200 may be arranged to offer and/or select the different numbers of trajectory parts and/or tolerance ranges in dependence on other parameters, such as one or more of: an ambient environmental condition (e.g. rain, temperature, lightness, darkness, time of day, day of week, etc); a terrain condition (e.g. road surface condition, off-road surface condition, gradient, etc); a presence of an occupant in a vehicle.

FIG. 41*g* illustrates a position of the vehicle 7110 following a movement of the vehicle according to an embodiment of the invention in a scenario similar to FIG. 37*b*. Here, the vehicle 7110 has performed a defined manoeuvre with a single trajectory part, such as in a reverse direction from the position of FIG. 37(*b*) to the defined manoeuvre completed position of FIG. 41(*g*) with a defined manoeuvre completed position tolerance range. Similarly, FIG. 41*h* illustrates a position of the vehicle 7110 following another movement of the vehicle 7110 in a scenario similar to FIG. 37*b*, with the vehicle 7110 having performed a defined manoeuvre with two trajectory parts, first in reverse then in the forward direction 7114, from the position of FIG. 37(*b*) to the defined manoeuvre completed position of FIG. 41(*h*) with a defined manoeuvre completed position tolerance range. For example, an intermediate position between a first trajectory part from the position of FIG. 37(*b*) and a second trajectory part to the defined manoeuvre completed position of FIG. 41(*h*) may be similar to the position shown as a defined manoeuvre completed position in FIG. 41(*g*). Here, it will be appreciated that the controller 7200, possibly with input from the user, may have selected a particular vehicle envelope 7174 from the vacancy 7172 for a target defined manoeuvre completed position for the vehicle 7110 (e.g. a left hand parking space or a right hand parking space when viewing FIGS. 41(*g*) and 35(*h*)).

FIG. 41*i* illustrates a position of the vehicle 7110 according to an embodiment of the invention following a defined manoeuvre in another scenario. Here, the vacancy 7172 is smaller than that shown in FIG. 37(*a*), also with the adjacent vehicles 7140, 7150 being closer together such that the vehicle envelope 7174 for receiving the vehicle 7110 is shorter. Accordingly, to perform a defined manoeuvre to a defined manoeuvre completed position with a similar tolerance range as that shown in FIG. 41(*e*), as illustrated in FIG. 41(*i*), then a defined manoeuvre with a greater number of trajectory parts (than from FIGS. 41(*a*) to 41(*e*)) must be performed. If, for example, the number of trajectory parts is determined to be too great (e.g. by the controller 7200 and/or a user), then the controller may determine a trajectory to a defined manoeuvre completed position with a greater tolerance range, such as illustrated in FIG. 41(*j*), to decrease the number of trajectory parts. For example, the controller may determine that there would be nine trajectory parts to reach the precise, aligned defined manoeuvre completed position of FIG. 41(*i*), which may be considered to be above a threshold for number of trajectory parts and/or time for completion of performance of the defined manoeuvre. Accordingly, the controller 7210 may determine a trajectory to the less precise defined manoeuvre completed position of FIG. 41(*i*) with a greater tolerance range, to allow the manoeuvre to be performed in a number of trajectory parts at or below the threshold (e.g. six parts).

Once in the defined manoeuvre completed position, being parked positions in FIGS. 41(*e*), 41(*f*), 41(*g*), 41(*h*), 41(*i*) and 41(*i*), the user typically applies a parking brake, to leave the vehicle 7110 stationary with the engine switched off.

The controller 7210 may be arranged to allow for user adaptation. For example, the user may be able to at least partially override, program or adjust the controller 7210 such that one or more of the following: the tolerance range, a threshold for the number of trajectory parts; a separation or clearance threshold from one or more features 7125, 7140, 7150 for a defined manoeuvre completed position tolerance range; which one or more moveable projections 7182 is/are repositionable; a parameter for determining a tolerance range (e.g. a type of feature detected; a location; a user; a location of an occupant). The controller 7210 may be arranged to be manually overridden, programmed or adjusted, such as to adjust the output of the manoeuvre signal. Additionally, or alternatively, the controller 7210 may be arranged to automatically, or semi-automatically, override, program or adjust the output of the manoeuvre signal, such as by learning from a user behaviour, such as a repeated user behaviour, associated with one or more of: an input pattern; a geographic location; a user identity (e.g. where the vehicle 7110 is used noncontemporaneously by multiple users). For example, the controller 7210 may be arranged to automatically select a default tolerance range and/or trajectory or number of trajectory parts when the vehicle is positioned at a particular location, such as a home or garage where the user has previously performed a defined manoeuvre into a known vacancy.

It will be appreciated that other defined manoeuvres than illustrated may be performed. For example, the vehicle 7110 may have steerable rear wheels; or the vacancy may comprise a fishbone (diagonal) vacancy 7172 or a perpendicular vacancy (e.g. with the vehicle 7110 parked end on).

As a result of the method 7400 the vehicle may be more advantageously positioned or configured following performance of a defined manoeuvre. It will also be appreciated that embodiments of the present invention are not limited to being useful in association with a defined manoeuvre. It may be useful to determine, offer and/or display defined manoeuvre completed positions with tolerance ranges and/or trajectories with numbers of trajectory parts even when at least partially parked or when being driven by a human driver.

Eighth Technique

Figure 43:
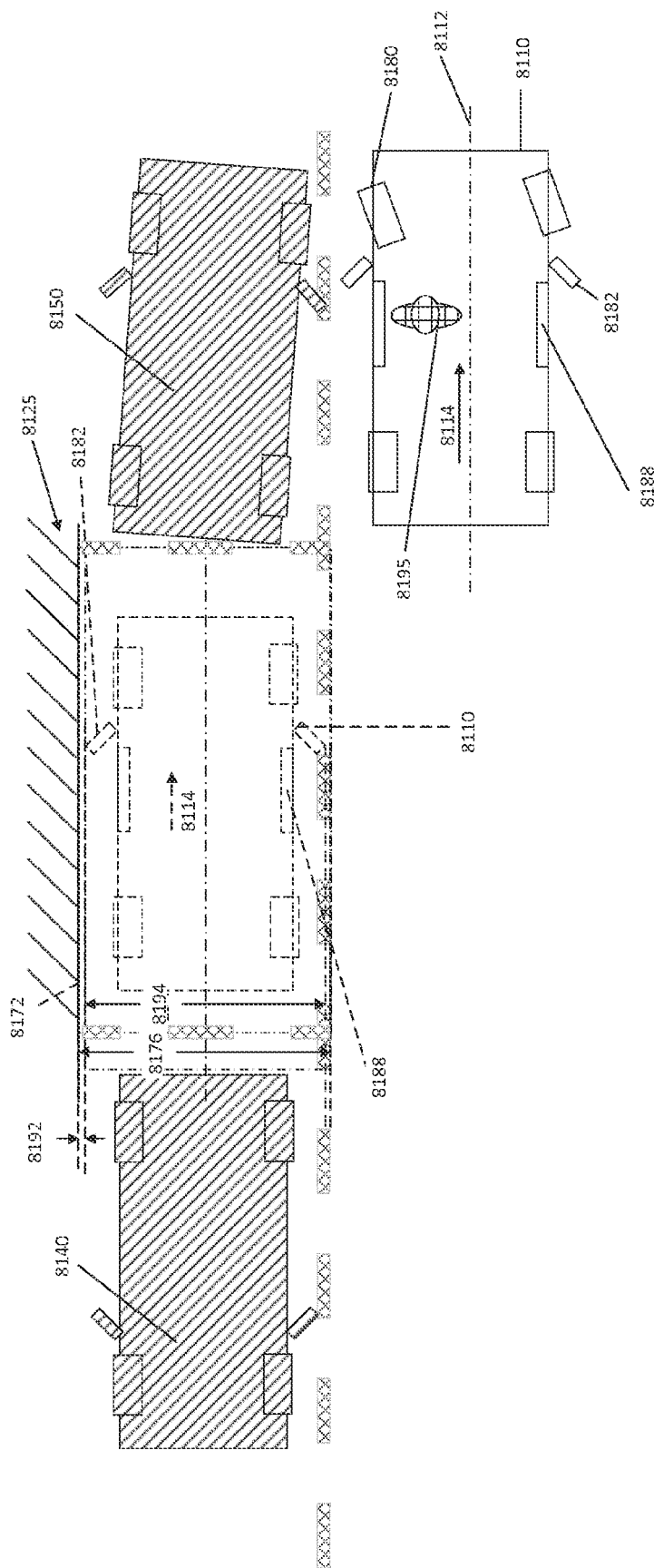
FIG. 43 shows a vehicle in relation to a feature in a vicinity of the vehicle.

FIG. 43 illustrates a vehicle 8110 according to an embodiment of the invention in a scenario. In FIGS. 43*a* and 43*b*, the vehicle 8110 is illustrated as having a vehicle forward direction, indicated by arrow 8114, shown parallel to a central longitudinal axis 8112 of the vehicle 8110. In the illustrated scenario, the vehicle 8110 is shown at a defined manoeuvre start position with a defined manoeuvre completed position of the vehicle 8110 shown in broken lines. In the particular scenario shown in FIG. 43, it may be desirable to perform a defined manoeuvre to park the vehicle 8110 in the defined manoeuvre completed position in a vacancy 8172.

In FIG. 43 the vehicle 8110 is shown in broken line at a target or desired defined manoeuvre completed position in a vehicle envelope 8174 in the vacancy 8172, where the defined manoeuvre would have been performed with the vehicle performing a streetside or parallel parking defined manoeuvre to enter the vacancy 8172 with the vehicle 8110 moving in a number of consecutive trajectory parts in a forward direction 8114 and a rearward direction respectively. The vehicle 8110 is shown in relation to a feature 8125 in a vicinity of the vehicle 8110. The feature 8125 is, in this example, an object which is a wall that is parallel to the longitudinal axis 8112 of the vehicle 8110 i.e. generally parallel to a side of the vehicle 8110, such as a left side here—in the defined manoeuvre completed position. The object is not limited to being a wall 8125 and may be, for example, a bollard, fence, barrier, or other object at or adjacent the vacancy 8172. As shown here, other features 8140, 8150 in the form of stationary vehicles bound each opposite longitudinal end of the vacancy 8172.

In FIG. 43, a dimension of the vehicle, being a width 8194 as shown here, is such that the vehicle 8110 can be manoeuvred into the apparent vehicle envelope 8174 in the vacancy 8172, with a corresponding dimension, shown here as a width 8176, of the vacancy's vehicle envelope 8174 being sufficient, wider as shown here. Accordingly, the vehicle 8110 as such can fit into the vacancy 8172, with a clearance, such as indicated by the separation 8192 from the vehicle's moveable projection 8182 to the wall feature 8125. It will be appreciated that although shown here in plan view, the scenario depicted is three dimensional.

A vehicle occupant 8195 is shown located in an in-vehicle location in FIG. 43, which may correspond to a drivers position here. As will be appreciated from the defined manoeuvre completed position illustrated in broken lines in FIG. 43, the occupant 8195 may have difficulty in exiting the vehicle 8110, such as via a vehicle door 8188 nearest the occupant 8195 as shown in FIG. 43. Similarly, if the occupant 8195 subsequently returns to the vehicle at a later junction following completion of the defined manoeuvre (e.g. to unpark the vehicle 8110), the occupant 8195 may have difficulty in entering or accessing the vehicle 8110 (e.g. where the feature 8125 forms a hindrance to opening the vehicle door 8188 adjacent the wall feature 8125).

Embodiments of the present invention aim to ameliorate such problems.

It will be understood in the scenario shown in FIG. 43 that the defined manoeuvre may be a manoeuvre of the vehicle 8110 which is performed automatically by the vehicle 8110 i.e. under control of one or more systems of the vehicle 8110. The defined manoeuvre may be considered to be performed automatically by the vehicle 8110, or at least semi autonomously. As shown, in FIG. 43 the defined manoeuvre may be a parking manoeuvre to control the vehicle 8110 to drive into a parking place.

As will be further explained, it may be advantageous for at least a portion of the manoeuvre to be performed whilst a person in control of the vehicle 8110 is external to the vehicle 8110. For example, access to the vehicle 8110 may be limited in FIG. 43 after performing the defined manoeuvre.

To perform the defined manoeuvre, the vehicle 8110 comprises environment sensing means for determining a location of features 8125 in the vicinity of the vehicle 8110. The environment sensing means may comprise one or more sensing devices or imaging devices. The one or more sensing devices may emit radiation and receive radiation reflected from the features in the vicinity of the vehicle, such as ultrasonic sensing devices, although it will be appreciated that the present invention is not limited in this respect. Such environment sensing means have a minimum distance to which accuracy the location of the features 8125 may be determined due to, for example, a resolution of an imaging device or a signal-to-noise ratio of a sensing device.

In the particular examples shown here, the vehicle 8110 comprises a portion of the environment sensing means in or on the vehicle moveable projection 8182. For example, each side or wing mirror of the vehicle 8110 can have a camera or the like mounted thereto or thereon.

Figure 44:
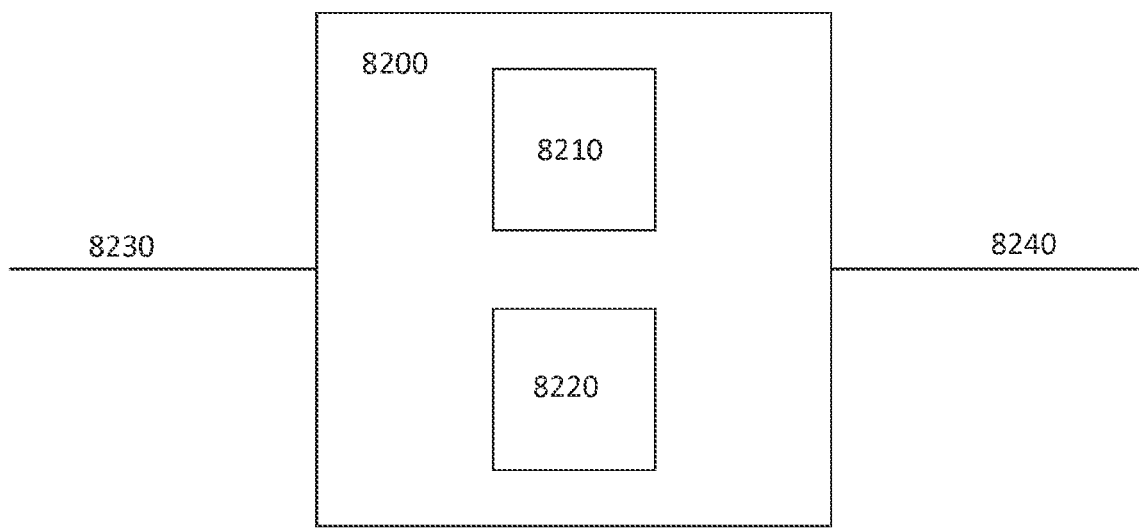
FIG. 44 shows a controller according to an embodiment of the invention.
Figure 48:
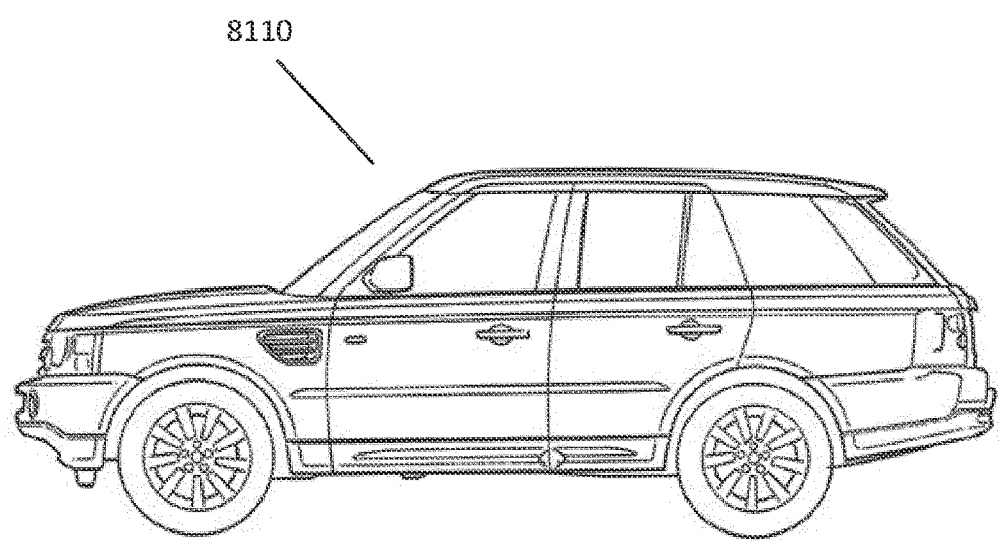
FIG. 48 is a vehicle according to an embodiment of the invention.

FIG. 44 illustrates a controller 8200 or control unit 8200 according to an embodiment of the invention, such as comprised in the vehicle 8110 of FIGS. 43(*a*) and 43(*b*).

The controller 8200 comprises a control means 8210, input means 8230 and output means 8240. In some embodiments, the controller comprises a memory means 8220 such as one or more memory devices 8220 for storing data therein. The output means 8240 may comprise an electrical output for outputting a manoeuvre signal. The manoeuvre signal represents an instruction for the vehicle 8110 to move. The instruction provided by the manoeuvre signal is provided to cause the vehicle 8110 to perform the defined manoeuvre. Here, the controller 8200 may determine that one or more of the features 8125, 8140, 8150 are such that the defined manoeuvre is performable in one or more modes. For example, where there is no restriction or impediment to access to or from the vehicle 8110 (e.g. in an absence of any lateral features such as the wall feature 8125 shown in FIG. 43), the controller 8200 may determine that all modes of performance of the defined manoeuvre are selectable. As shown here, the mode for performing the defined manoeuvre is selectable from a plurality of modes including at least one mode corresponding to an occupant-in-vehicle mode and at least one mode corresponding to an occupant-out-of-vehicle mode. The controller 8200 here is arranged for a change in the mode changing during the defined manoeuvre, without terminating or cancelling the defined manoeuvre. Accordingly, the defined manoeuvre can be continued in a different mode of performance.

The control means 8210 may be formed by one or more electronic processing devices such as an electronic processor. The processor may operably execute computer readable instructions stored in the one or more memory devices 8220. The control means 8210 is arranged to control the output means 8240 to output the manoeuvre signal in dependence on the environment signal, as will be explained. In some embodiments, the input means 8230 and output means 8240 may be combined such as by being formed by an I/O unit or interface unit. For example, the controller 8210 may comprise an interface to a network forming a communication bus of a vehicle. The interface bus may be an Internet Protocol (IP) based communication bus such as Ethernet, although embodiments of the invention are not limited in this respect.

The input means 8230 may comprise an electrical input for receiving an environment signal. The input means 8230 may comprise an electrical input for receiving a request signal. Here, the request signal is indicative of a wirelessly received signal representing a user request for movement of the vehicle 8110.

As shown here, the memory means 8220 can be used to store data from the input means 8230. For example, the memory means can store data about the features 8125, 8140, 8150 or the vacancy 8172 for future use. For example, where an occupant or user of the vehicle 8110 has actively selected (e.g. by inputting one or more parameter inputs) or implicitly shown (e.g. through a repeated behavioural or use pattern) at least one preference for a mode of performance for one or more scenarios, the memory means can store data corresponding to the preference to provide a default and/or automatic mode in dependence on the input (e.g. environment signal and/or location signal, etc) being indicative of a such or similar scenario for the one or more preferences.

The data may be stored prior to and during performance of the defined manoeuvre, for use during the performance of the defined manoeuvre. In addition, or alternatively, the data may be stored for use during a subsequent defined manoeuvre. For example, where the data is stored prior to or during the performance of the defined manoeuvre to arrive at the defined manoeuvre completed position of FIG. 43 as shown in broken lines, then the stored data may be used for or during a subsequent defined manoeuvre, such as an unparking manoeuvre from the defined manoeuvre completed position of FIG. 43. Where stored data, such as of the features 8125, 8140, 8150 is used for the performance of at least a portion of the defined manoeuvre, the controller 8200 may perform a check, such as to the validity or continued validity of the data. For example, the controller may corroborate the data with another input, such as with input from another portion of the environment sensing means (e.g. another sensor or camera located at another portion of the vehicle 8110, the another sensor or camera able to confirm the continued presence and/or position of the one or more features 8125, 8140).

In at least some examples, the controller 8210 may comprise a second input means for receiving a request signal indicative of a received signal indicative of a user request, such as a wirelessly received signal. The user request may be for the performance of the defined manoeuvre in a selected mode.

It will be appreciated that the controller 8200 may be arranged to perform a portion of the defined manoeuvre in a particular mode. For example, the user may initiate the manoeuvre with control being transferred to the controller 8210 thereafter to perform the defined manoeuvre to the defined manoeuvre completed position, with the mode of performance being variable during the performance of the portion of the defined manoeuvre.

Figure 45:
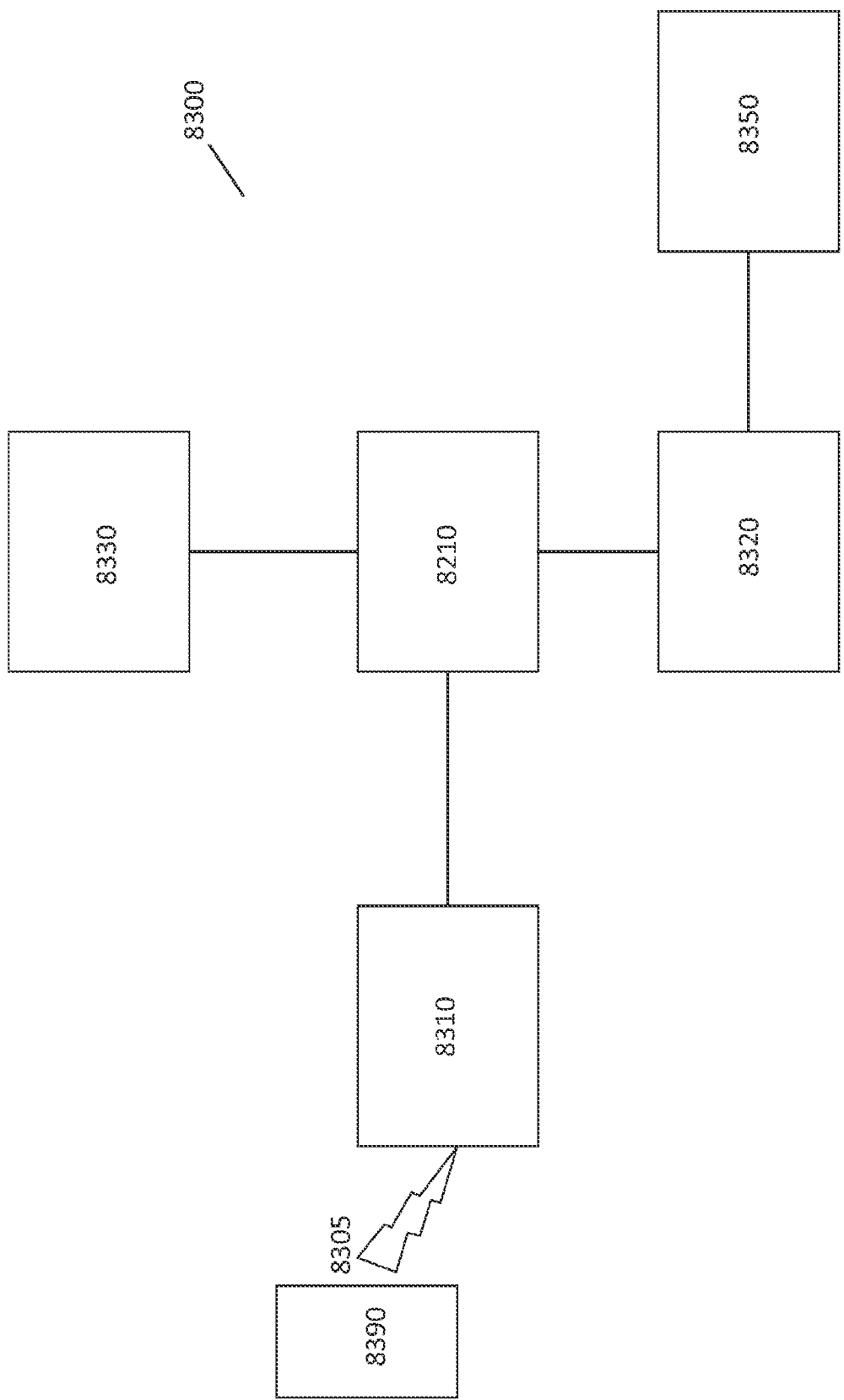
FIG. 45 shows a system according to an embodiment of the invention.

FIG. 45 illustrates a system 8300 according to an embodiment of the invention. The system 8300 comprises the controller 8210 described above and shown in FIG. 44.

The system 8300 comprises environment sensing means 8330 for determining information about an environment of the vehicle 8110. In particular, the environment sensing means 8330 is provided for determining a location of one or more features in a vicinity of the vehicle 8110. In at least some examples, a portion of the environment sensing means is associated with the one or more moveable projections 8182, such as one or more sensors or cameras mounted in or on a vehicle wing mirror. The environment sensing means 8330 is arranged to output an environment signal indicative of the determined features. The environment signal may be environment data which may be stored in a memory. The environment sensing means may comprise one or more sensing devices such as imaging devices, such as cameras, or other sensing devices such as LI DAR, radar, ultrasonic devices, sonar devices etc. Signals output by each of the sensing devices may be used to form a representation of the environment of the vehicle 110 which is stored in the memory for use by other systems of the vehicle 8110.

Here, the environment sensing means 8330 is arranged to determine a location of features such as surface markings, which may be painted lines denoting a perimeter of a parking bay, for example, or objects such as walls, posts or other vehicles in relation to which the vehicle is required to manoeuvre. The control means is arranged to determine an absence of features, such as a separation between obstructive features, such as the adjacent features 8140, 8150 shown here, in dependence on the environment signal. Accordingly, the control means is arranged to determine a vacancy 8172 where no features, such as no obstructive features, are located. Where the vacancy 8172 is sufficiently great, the control means is arranged to determine a vehicle envelope 8174 suitable for receiving the vehicle 8110 in the defined manoeuvre completed position. The vehicle envelope 8174 comprises a target position suitable for receiving the vehicle 8110 in the defined manoeuvre completed position. As such, the vehicle envelope 8174 here comprises a target defined manoeuvre completed position. In at least this example, the vehicle envelope 8174 is determined in dependence on a one-dimensional property and/or measurement and/or estimation. In particular, here, the vehicle envelope 8174 is determined in dependence on the environment signal being indicative of a length, such as an unobstructed length between features 8140, 8150. The unobstructed length is sufficiently long for receiving the vehicle 8110 in the defined manoeuvre completed position, the length here being a separation between features 8140, 8150 that is greater than the vehicle length in the defined manoeuvre completed position. The defined manoeuvre may comprise, for example, parking in a parked position.

The controller 8210 of the system 8300 here comprises defined manoeuvre means. The control means is arranged to control the vehicle 8110 to perform at least one defined manoeuvre. The controller 8210 may comprise a defined manoeuvre controller for controlling one or more systems of the vehicle 8110 to perform one or more defined manoeuvres. The defined manoeuvre means may be associated with one or more actuators 8350 of the vehicle 8110. The one or more actuators 8350 are provided for effecting movement of the vehicle 8110. The actuators may comprise one or more of a power steering mechanism arranged to provide steering of wheels of the vehicle 8110 in dependence on signals received from the controller 8210. A second actuator may comprise a powered braking mechanism of the vehicle 8110 which is arranged to actuate brakes of the vehicle in dependence on signals received from the controller 8210. A third actuator comprises the powertrain of the vehicle. The controller 8210 is arranged to control the steering of the vehicle wheel 8180 relative to the feature 8125. A fourth actuator 8350 comprises one or more mechanisms for altering the position of the one or more moveable projections 8182.

The system 8300 shown here comprises a motive control means 8320. The motive control means 8320 may be a motive control unit. The motive control means 8320 is arranged to receive the manoeuvre signal output by the controller 8210. The motive control means 8320 is associated with one or more motive units of the vehicle 8110 which may form part of a powertrain (not shown) of the vehicle 8110. The motive units may comprise one or more of an internal combustion engine and one or more electric machines of the vehicle 8110. The powertrain is arranged to provide power, or torque, to cause movement in the longitudinal axis of the vehicle 8110 i.e. forward or backward movement of the vehicle 8100 in dependence on the manoeuvre signal received from the controller 8210. The motive control means 8320 is arranged to control the application of torque to one or more wheels of the vehicle 8110 to move the vehicle 8110 in the longitudinal axis of the vehicle i.e. to move the vehicle generally forwards or backwards. The torque may comprise driving torque i.e. applied in a direction of desired movement, such as forwards. The torque may also comprise braking torque i.e. applied to resist the driving torque. In at least some embodiments both driving torque and braking torque may be applied simultaneously in order to provide low-speed movement of the vehicle 8110. The braking torque may also be applied at least partly after the driving torque in order to effect accurate movement of the vehicle 8110. To achieve control of the steering, the controller 8210 may communicate with the motive control means 8320. Thus, the one or more actuators 8350 can control a direction and movement of the vehicle to perform the defined manoeuvre. The defined manoeuvre is performed in dependence on the environment signal provided by the environment sensing means 8330.

The one or more defined manoeuvres which may be performed by the vehicle 8110 under control of the controller 8210 may comprise a parking manoeuvre, such as shown in FIG. 43 wherein the vehicle 8110 is controlled to arrive at a parked position.

As shown here, the system 8300 comprises a receiver means 8310 for receiving a signal 8305. The signal 8305 may be wirelessly received from a mobile device 390 associated with a person responsible for the vehicle 8110. The signal 8305 is indicative of a user request for vehicle movement of the vehicle 8110, as noted above. The receiver means 8310 is arranged to output the request signal to the input means 8230 of the controller 8210 as described above. The request signal may be output by the receiver means 8310 onto a communication bus of the vehicle 8110 which may communicably couple the components of the system 8300.

The receiver means 8310 may be in the form of a radio unit 8310. The radio unit 8310 may comprise a receiver for receiving radio signals 8305 from the mobile device 8390. In some embodiments, the radio unit 8310 may also comprise a transmitter, or may be a transceiver 8310 configured to receive radio signals 8305 transmitted from the mobile device 8390 and transmit signals to the mobile device 8390. The radio unit 8103 and the mobile device 8390 may be arranged to provide a wireless local area network, via which two-way communication may take place between the radio unit 8103 and the mobile device 8390. For example, the radio unit 8103 may be arranged to communicate by WiFi® with the mobile device 8390. In alternative embodiments, other radio communication standards may be used for the communication. In one example, communication between the radio unit 8103 and the mobile device 8390 is provided via Bluetooth®, although other protocols or standards may be envisaged.

The mobile device 8390 may be an electronic key fob associated with the vehicle 8110, such as may be used to gain entry and to activate or power up the vehicle 8110. The mobile device 8390 may, in other embodiments, be an electronic device associated with the person responsible for the vehicle 8100 such as a mobile telephone, tablet, watch, wearable electronic device or other computing device associated with the person. The mobile device 8390 is capable of receiving a user input indicating the person's desire to move the vehicle 8110. The user input may be provided in the form of a button or key press, activation of a graphically displayed icon, a gesture or voice command. Other forms of user input may also be envisaged.

Figure 46:
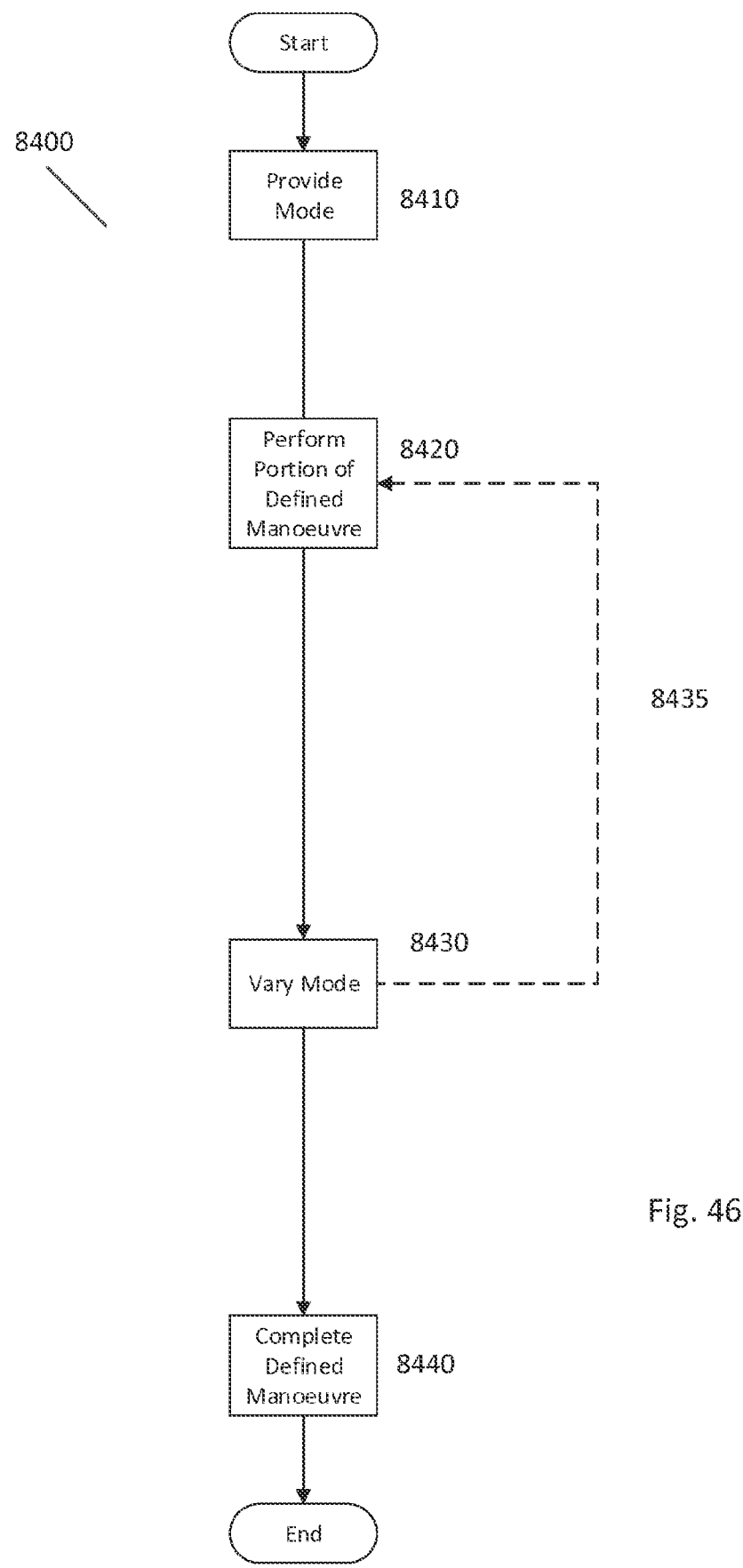
FIG. 46 shows a method according to an embodiment of the invention.

FIG. 46 illustrates a method 8400 according to an embodiment of the invention. The method 8400 is a method of controlling movement of the vehicle 8110. The method 8400 may be formed by the controller 8210 and system 8300 described above with reference to FIGS. 44 and 45. The method 8400 will be described with reference to FIGS. 47(*a*) to 47(*d*) as an example which corresponds to the scenario shown in FIG. 43.

The method 8400 broadly comprises steps of providing 8410 at least one mode for performing the defined manoeuvre; performing 8420 a portion of the defined manoeuvre in a first mode; varying 8430 the mode of performance to a second mode of performance; and completing 8440 the defined manoeuvre.

Referring to FIG. 46, the illustrated embodiment of the method 8400 comprises a step of providing 8410 at least one mode for performing the defined manoeuvre. The controller 8210 determines which mode or modes are appropriate for the performance of the defined manoeuvre and provides at least one mode, optionally offering selection of the mode from a plurality. For example, the controller determines in dependence on the environmental signal and/or the location of the occupant which modes are suitable or best-suited for performing the defined manoeuvre. Either with an automatically-selected default mode or a user-selected mode, performance of the defined manoeuvre is initiated to perform 8420 a portion of the defined manoeuvre. During the performance of the defined manoeuvre, the mode of performance is varied from the first mode. For example, where the occupant transitions between locations in and out of the vehicle, the mode transitions between corresponding modes. As will be appreciated from the broken line 8435 of FIG. 46, the mode may be varied more than once during the performance of the defined manoeuvre, to perform multiple portions of the defined manoeuvre each with a different mode.

In FIGS. 47(*a*) to 47(*d*) respectively, the vehicle 8110 is illustrated during the performance of the defined manoeuvre from the start position of FIG. 43 to the defined manoeuvre completed position of FIG. 47(*d*). FIGS. 47(*a*) to 47(*d*) illustrate sequentially the vehicle performing a defined manoeuvre according to an embodiment of the invention. FIG. 47(*a*) shows the vehicle 8110 during a first portion of the defined manoeuvre, performing a first trajectory part of the defined manoeuvre, with the vehicle 8110 reversing, moving in a direction opposite to the forward direction 8114 of the vehicle 8110, towards the vacancy 8172. Here, the defined manoeuvre has been initiated in a first mode being an occupant-in-vehicle mode, with the occupant 8195 located in the vehicle 8110. FIG. 47(*b*) shows a similar position of the vehicle 8110 to FIG. 47(*a*) with the occupant 8195 having transitioned to an out of vehicle position. Here, the controller 8200 has automatically varied the mode of performance to an occupant out-of-vehicle mode. Subsequently, the vehicle 8110 continues performance of the defined manoeuvre in a second mode of performance, being an occupant out-of-vehicle mode, to the position of FIG. 47(*c*) and the defined manoeuvre completed position of FIG. 47(*d*).

The controller 8200 may be arranged to offer and/or select the different modes of performance in dependence on the environment signal, such as the properties of the vacancy 8172. For example, the controller 8200 may be arranged to offer and/or select the one or more modes of performance in dependence on the size of the vacancy 8172, the alignment of the adjacent objects 8140, 8150, or other parameters associated with the vacancy. In at least some examples, the available mode or modes of performance may be limited (e.g. by a vacancy 8172 comprising dimensions unsuitable for access to/from one or more vehicle openings). Additionally, or alternatively, the controller 8200 may be arranged to offer and/or select the mode or modes of performance in dependence on other parameters, such as one or more of: an ambient environmental condition (e.g. rain, temperature, lightness, darkness, time of day, day of week, etc); a terrain condition (e.g. road surface condition, off-road surface condition, gradient, etc); a location or locations of multiple vehicle occupants, such as a location of each vehicle occupant.

Once in the defined manoeuvre completed position, being parked positions in FIG. 47(*d*), the user 8195 typically applies a parking brake, to leave the vehicle 8110 stationary with the engine switched off.

The controller 8210 may be arranged to allow for user adaptation. For example, the user may be able to at least partially override, program or adjust the controller 8210 for one or more of the following: the available mode or modes; the one or more inputs for determination of the available modes; a selection means for selecting the mode. The controller 8210 may be arranged to be manually overridden, programmed or adjusted, such as to adjust the output of the manoeuvre signal. Additionally, or alternatively, the controller 8210 may be arranged to automatically, or semi-automatically, override, program or adjust the output of the manoeuvre signal, such as by learning from a user behaviour, such as a repeated user behaviour, associated with one or more of: an input pattern; a geographic location; a user identity (e.g. where the vehicle 8110 is used noncontemporaneously by multiple users). For example, the controller 8210 may be arranged to automatically select a default mode when the occupant 8195 is located at a particular location (e.g. relative to the vehicle 8110); or when the vehicle 8110 is positioned at a particular location, such as a home or garage where the user has previously performed a defined manoeuvre into a known vacancy.

It will be appreciated that other defined manoeuvres than illustrated may be performed. For example, the defined manoeuvre may comprise an unparking manoeuvre from the position of FIG. 47(*d*), such as with the occupant 8195 out of the vehicle 8110 and initiating the defined manoeuvre in an occupant out-of-vehicle mode, entering the vehicle 8110 at an interim juncture of the performance of the defined manoeuvre and continuing the performance of the defined manoeuvre in an occupant-in-vehicle mode. It will be appreciated that the controller 8200 may be arranged to allow occupant transitioning between in and out of vehicle locations during the performance of the defined manoeuvre. For example, the controller 8200 may be arranged to allow interruption or pausing of the defined manoeuvre, such as to allow the occupant 8195 to transition into or out of the vehicle 8110 whilst the vehicle 8110 is stationary. In at least some examples, the vehicle 8110 may have steerable rear wheels; or the vacancy may comprise a fishbone (diagonal) vacancy 8172 or a perpendicular vacancy (e.g. with the vehicle 8110 parked end on).

As a result of the method 8400 the vehicle may be more advantageously positioned or configured following performance of a defined manoeuvre. It will also be appreciated that embodiments of the present invention are not limited to being useful in association with a defined manoeuvre. It may be useful to provide a selectable mode for performing a portion of a defined manoeuvre even when parked or when having being driven by a human driver. For example, indicating or displaying which modes of performance are available or suitable may assist a user in selecting a performance of a user-performed manoeuvre.

Ninth Technique

FIGS. 49*a* and 49*b* illustrate a vehicle 9110 according to an embodiment of the invention in two example scenarios. In FIGS. 49*a* and 49*b*, the vehicle 9110 is illustrated as having a vehicle forward direction, indicated by arrow 9114, shown parallel to a central longitudinal axis 9112 of the vehicle 9110. In the illustrated scenarios, the vehicle 9110 is shown at a position from a previous manoeuvre (controlled or user-controlled). In FIG. 49*a*, the vehicle 9110 is shown at a parked position where a user may be about to attempt, or attempting, to exit a vacancy 9172 in an unparking manoeuvre. In the particular scenario shown in FIG. 49*a*, it may be desirable to perform a defined manoeuvre to unpark the vehicle 9110 to a defined manoeuvre completed position outside the vacancy 9172. In FIG. 49*b*, the vehicle 9110 is shown at a position from a previous manoeuvre (controlled or user-controlled) where the user may wish to attempt to, or be attempting to, enter the vacancy 9172 in a parking manoeuvre. In the particular scenario shown in FIG. 49*b*, it may be desirable to perform a defined manoeuvre to park the vehicle 9110 to a defined manoeuvre completed position inside the vacancy 9172. In each of the scenarios shown in FIGS. 49*a* and 49*b*, the user may be unaware of a possibility for a performance of a defined manoeuvre. The user may have difficulty or not wish to perform a user-controlled manoeuvre from the positions shown in FIGS. 49*a* and 49*b*. Similarly, the user may not wish to re-position the vehicle to a predetermined or prescribed defined manoeuvre start position for a performance of a defined manoeuvre.

Embodiments of the present invention aim to ameliorate such problems.

It will be understood in the scenarios shown in FIGS. 49*a* and 49*b* that the shown vehicle positions may correspond to defined manoeuvre start positions. The defined manoeuvre start position or positions may not be prescribed (e.g. the user may not be required to position the vehicle at a particular predetermined position relative to the vacancy 9172). The defined manoeuvres performed from the positions of FIGS. 49*a* and 49*b* may be manoeuvres of the vehicle 9110 which are performed automatically by the vehicle 9110 i.e. under control of one or more systems of the vehicle 9110. The defined manoeuvre may be considered to be performed automatically by the vehicle 9110, or at least semi autonomously. As shown, in FIG. 49*a* the defined manoeuvre may be an unparking manoeuvre to control the vehicle 9110 to drive out of a parking place. As shown, in FIG. 49*b* the defined manoeuvre may be a parking manoeuvre to control the vehicle 9110 to drive into a parking place.

As will be further explained, it may be advantageous for at least a portion of the defined manoeuvre to be performed whilst a person in control of the vehicle 9110 is external to the vehicle 9110. For example, access from the vehicle 9110 may be limited in FIG. 49*b* after performing or at least completing the defined manoeuvre.

To perform the defined manoeuvre, the vehicle 9110 comprises environment sensing means for determining a location of features 9125, 9140, 9150 in the vicinity of the vehicle 9110. The environment sensing means may comprise one or more sensing devices or imaging devices. The one or more sensing devices may emit radiation and receive radiation reflected from the features in the vicinity of the vehicle, such as ultrasonic sensing devices, although it will be appreciated that the present invention is not limited in this respect. Such environment sensing means have a minimum distance to which accuracy the location of the features 9125 may be determined due to, for example, a resolution of an imaging device or a signal-to-noise ratio of a sensing device.

In the particular example shown here, the vehicle 9110 comprises a portion of the environment sensing means in or on a vehicle moveable projection 9182. For example, each side or wing mirror of the vehicle 9110 can have a camera or the like mounted thereto or thereon.

Figure 50:
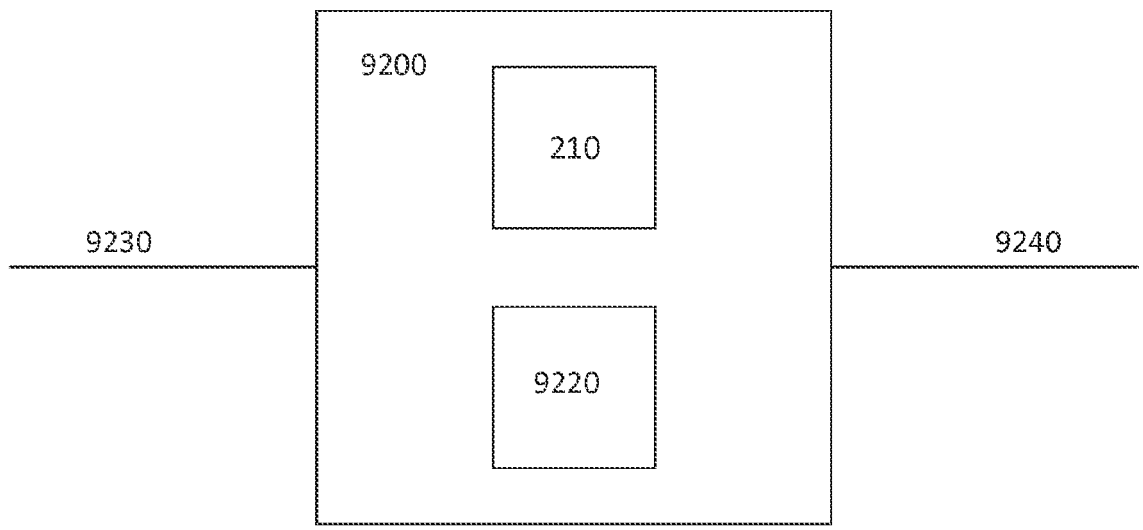
FIG. 50 shows a controller according to an embodiment of the invention.
Figure 54:
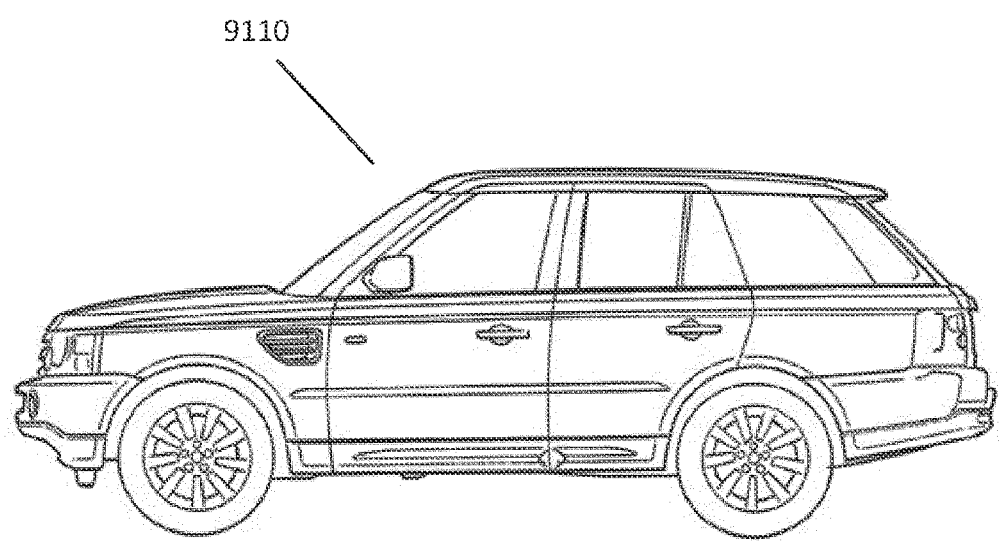
FIG. 54 is a vehicle according to an embodiment of the invention.

FIG. 50 illustrates a controller 9200 or control unit 9200 according to an embodiment of the invention, such as comprised in the vehicle 9110 of FIGS. 49(*a*) and 49(*b*).

The controller 9200 comprises a control means 9210, input means 9230 and output means 9240. Here the output means 9240 comprises a notification means and an output means for outputting a manoeuvre signal.

The controller's 9200 input means is arranged to receive the input signal from at least one of a plurality of input sources.

The control means 9210 is arranged to control the notification means to output a notification signal indicative of the determination by the control means 9210 of a defined manoeuvre opportunity, in dependence on the input signal. The input signal comprises at least one of:
   an environment signal indicative of a location of at least one feature in a vicinity of the vehicle;
   a motion signal indicative of a motion of the vehicle;
   a steering signal indicative of a steering input;
   an event signal indicative of a vehicle event; and
   a location signal indicative of a vehicle location.

Here, the input means 9230 is for receiving at least the environment signal indicative of the features 9125, 9140, 9150 in the vicinity of the vehicle 9110. The controller 9200 also includes a request input means for receiving a request signal indicative of a user request.

The control means 9210 is arranged to control the output means 9240 to cause the vehicle 9110 to perform at least a portion of the defined manoeuvre in dependence on the environment signal.

In some embodiments, the controller comprises a memory means 9220 such as one or more memory devices 9220 for storing data therein. The output means 9240 may comprise an electrical output for outputting the manoeuvre signal. The manoeuvre signal represents an instruction for the vehicle 9110 to move. The instruction provided by the manoeuvre signal is provided to cause the vehicle 9110 to perform the defined manoeuvre.

The control means 9210 may be formed by one or more electronic processing devices such as an electronic processor. The processor may operably execute computer readable instructions stored in the one or more memory devices 9220. The control means 9210 is arranged to control the output means 9240 to output the manoeuvre signal in dependence on the environment signal, as will be explained. In some embodiments, the input means 9230 and output means 9240 may be combined such as by being formed by an I/O unit or interface unit. For example, the controller 9210 may comprise an interface to a network forming a communication bus of a vehicle. The interface bus may be an Internet Protocol (IP) based communication bus such as Ethernet, although embodiments of the invention are not limited in this respect.

The input means 9230 may comprise an electrical input for receiving the environment signal. The input means 9230 may comprise an electrical input for receiving the request signal. Here, the request signal is indicative of a wired or wirelessly received signal representing a user request for movement of the vehicle 9110.

As shown here, the memory means 9220 can be used to store data from the input means 9230. For example, the memory means can store data about the features 9125, 9140, 9150, or the vacancy 9172 for future use. For example, where an occupant or user of the vehicle 9110 has actively selected (e.g. by inputting one or more parameter inputs) or implicitly shown (e.g. through a repeated behavioural or use pattern) at least one preference for a performance of a defined manoeuvre for one or more scenarios, the memory means can store data corresponding to the preference to provide a default and/or automatic parameter of the defined manoeuvre in dependence on the input (e.g. environment signal and/or location signal, etc) being indicative of a such or similar scenario for the one or more preferences. For example, where a user in a particular scenario repeatedly performs a user-initiated manoeuvre to a user-initiated manoeuvre end position prior to performance of a defined manoeuvre from the user-initiated manoeuvre end position, then the control means may be arranged to notify the user of the possibility of the performance of the defined manoeuvre in advance and/or during and/or upon completion of the user-initiated manoeuvre. Alternatively, the control means may be arranged to suppress notification of the possible defined manoeuvre—for example, where a user may appear to prefer only initiating the defined manoeuvre from the user-initiated manoeuvre end position and not a position prior thereto, then the notification of the possibility of the defined manoeuvre may be supressed, such as until the vehicle is at or near the user-initiated manoeuvre end position.

The data may be stored prior to and during performance of the defined manoeuvre, for use during the performance of the defined manoeuvre. In addition, or alternatively, the data may be stored for use during a subsequent defined manoeuvre. For example, where the data is stored prior to or during the performance of the manoeuvre to arrive at the position of FIG. 49*a* or 49*b*, or the defined manoeuvre completed position of either of FIG. 53*a* or 53*b*, then the stored data may be used for or during a subsequent defined manoeuvre, such as an unparking manoeuvre from the defined manoeuvre completed position of FIG. 53*b*. Where stored data, such as of the features 9125, 9140, 9150 is used for the performance of at least a portion of the defined manoeuvre, the controller 9200 may perform a check, such as to the validity or continued validity of the data. For example, the controller 9200 may corroborate the data with another input, such as with a later input from the environment sensing means, or input from another portion of the environment sensing means (e.g. another sensor or camera located at another portion of the vehicle 9110, the another sensor or camera able to confirm the continued presence and/or position of the one or more features 9125, 9140).

In at least some examples, as here, the controller 9210 comprises a second input means for receiving the request signal indicative of the received signal indicative of the user request, such as a wirelessly received signal. The user request may be for the performance of the defined manoeuvre to a target defined manoeuvre completed position.

It will be appreciated that the controller 9200 may be arranged to perform a portion of the defined manoeuvre in a particular mode. For example, the user may initiate the manoeuvre with control in a first mode to perform a first portion of the manoeuvre, with control thereafter being in a different mode with the mode of performance being variable during the performance of the portion of the defined manoeuvre (e.g. between an occupant-in-vehicle mode and an occupant-out-of-vehicle mode).

Figure 51:
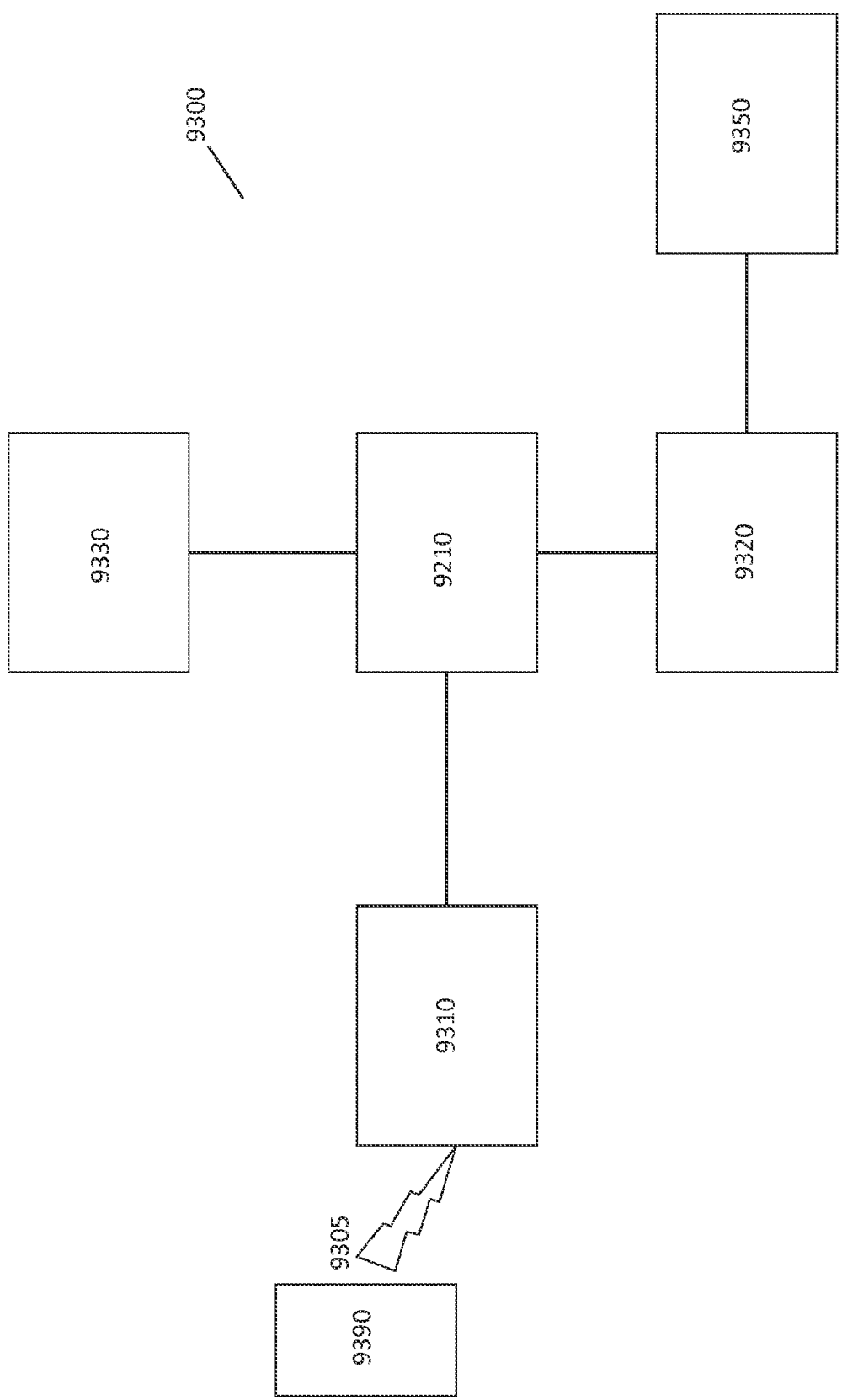
FIG. 51 shows a system according to an embodiment of the invention.

FIG. 51 illustrates a system 9300 according to an embodiment of the invention. The system 9300 comprises the controller 9210 described above and shown in FIG. 50.

The system 9300 here comprises notification means for notifying the user of the defined manoeuvre opportunity. The system 9300 comprises environment sensing means 9330 for determining information about an environment of the vehicle 9110. In particular, the environment sensing means 9330 is provided for determining a location of one or more features in a vicinity of the vehicle 9110. In at least some examples, a portion of the environment sensing means is associated with the one or more moveable projections 9182, such as at least one sensor or camera mounted in or on a vehicle wing mirror. The environment sensing means 9330 is arranged to output an environment signal indicative of the determined features. The environment signal may be environment data which may be stored in the memory. The environment sensing means may comprise one or more sensing devices such as imaging devices, such as cameras, or other sensing devices such as LIDAR, radar, ultrasonic devices, sonar devices etc. Signals output by each of the sensing devices may be used to form a representation of the environment of the vehicle 9110 which is stored in the memory for use by other systems of the vehicle 9110.

Here, the environment sensing means 9330 is arranged to determine a location of features such as surface markings, which may be painted lines denoting a perimeter of a parking bay, for example, or objects such as walls, posts or other vehicles in relation to which the vehicle is required to manoeuvre. The control means is arranged to determine an absence of features, such as a separation between obstructive features, such as the adjacent features 9140, 9150 shown here, in dependence on the environment signal. Accordingly, the control means is arranged to determine a vacancy 9172 where no features, such as no obstructive features, are located. Where the vacancy 9172 is sufficiently great, the control means is arranged to determine a vehicle envelope suitable for receiving the vehicle 9110 in the defined manoeuvre completed position. The vehicle envelope comprises a target position suitable for receiving the vehicle 9110 in the defined manoeuvre completed position. As such, the vehicle envelope here comprises a target defined manoeuvre completed position. In at least this example, the vehicle envelope is determined in dependence on a one-dimensional property and/or measurement and/or estimation. In particular, here, the vehicle envelope is determined in dependence on the environment signal being indicative of a length, such as an unobstructed length between features 9140, 9150. The unobstructed length is sufficiently long for receiving the vehicle 9110 in the defined manoeuvre completed position, the length here being a separation between features 9140, 9150 that is greater than the vehicle length in the defined manoeuvre completed position. The defined manoeuvre may comprise, for example, parking in a parked position.

The controller 9210 of the system 9300 here comprises defined manoeuvre means. The control means is arranged to control the vehicle 9110 to perform at least one defined manoeuvre. The controller 9210 may comprise a defined manoeuvre controller for controlling one or more systems of the vehicle 9110 to perform one or more defined manoeuvres. The defined manoeuvre means may be associated with one or more actuators 9350 of the vehicle 9110. The one or more actuators 9350 are provided for effecting movement of the vehicle 9110. The actuators may comprise one or more of a power steering mechanism arranged to provide steering of wheels of the vehicle 9110 in dependence on signals received from the controller 9210. A second actuator may comprise a powered braking mechanism of the vehicle 9110 which is arranged to actuate brakes of the vehicle in dependence on signals received from the controller 9210. A third actuator comprises the powertrain of the vehicle. The controller 9210 is arranged to control the steering of the vehicle wheel 9180 relative to the feature 9125. A fourth actuator 9350 comprises one or more mechanisms for altering the position of the one or more moveable projections 9182.

The system 9300 shown here comprises a motive control means 9320. The motive control means 9320 may be a motive control unit. The motive control means 9320 is arranged to receive the manoeuvre signal output by the controller 9210. The motive control means 9320 is associated with one or more motive units of the vehicle 9110 which may form part of a powertrain (not shown) of the vehicle 9110. The motive units may comprise one or more of an internal combustion engine and one or more electric machines of the vehicle 9110. The powertrain is arranged to provide power, or torque, to cause movement in the longitudinal axis of the vehicle 9110 i.e. forward or backward movement of the vehicle 9100 in dependence on the manoeuvre signal received from the controller 9210. The motive control means 9320 is arranged to control the application of torque to one or more wheels of the vehicle 9110 to move the vehicle 9110 in the longitudinal axis of the vehicle i.e. to move the vehicle generally forwards or backwards. The torque may comprise driving torque i.e. applied in a direction of desired movement, such as forwards. The torque may also comprise braking torque i.e. applied to resist the driving torque. In at least some embodiments both driving torque and braking torque may be applied simultaneously in order to provide low-speed movement of the vehicle 9110. The braking torque may also be applied at least partly after the driving torque in order to effect accurate movement of the vehicle 9110. To achieve control of the steering, the controller 9210 may communicate with the motive control means 9320. Thus, the one or more actuators 9350 can control a direction and movement of the vehicle to perform the defined manoeuvre. The defined manoeuvre is performed in dependence on the environment signal provided by the environment sensing means 9330.

The one or more defined manoeuvres which may be performed by the vehicle 9110 under control of the controller 9210 may comprise a parking manoeuvre, such as shown in FIG. 53b wherein the vehicle 9110 is controlled to arrive at a parked position.

As shown here, the system 9300 comprises a receiver means 9310 for receiving a signal 9305. The signal 9305 may be wirelessly received from a mobile device 9390 associated with a person responsible for the vehicle 9110. The signal 9305 is indicative of a user request for vehicle movement of the vehicle 9110, as noted above. The receiver means 9310 is arranged to output the request signal to the input means 9230 of the controller 9210 as described above. The request signal may be output by the receiver means 9310 onto a communication bus of the vehicle 9110 which may communicably couple the components of the system 9300.

The receiver means 9310 may be in the form of a radio unit 9310. The radio unit 9310 may comprise a receiver for receiving radio signals 9305 from the mobile device 9390. In some embodiments, the radio unit 9310 may also comprise a transmitter, or may be a transceiver 9310 configured to receive radio signals 9305 transmitted from the mobile device 9390 and transmit signals to the mobile device 9390. The radio unit 9103 and the mobile device 9390 may be arranged to provide a wireless local area network, via which two-way communication may take place between the radio unit 9103 and the mobile device 9390. For example, the radio unit 9103 may be arranged to communicate by WiFi® with the mobile device 9390. In alternative embodiments, other radio communication standards may be used for the communication. In one example, communication between the radio unit 9103 and the mobile device 9390 is provided via Bluetooth®, although other protocols or standards may be envisaged.

The mobile device 9390 may be an electronic key fob associated with the vehicle 9110, such as may be used to gain entry and to activate or power up the vehicle 9110. The mobile device 9390 may, in other embodiments, be an electronic device associated with the person responsible for the vehicle 9100 such as a mobile telephone, tablet, watch, wearable electronic device or other computing device associated with the person. The mobile device 9390 is capable of receiving a user input indicating the person's desire to move the vehicle 9110. The user input may be provided in the form of a button or key press, activation of a graphically displayed icon, a gesture or voice command. Other forms of user input may also be envisaged.

Figure 52:
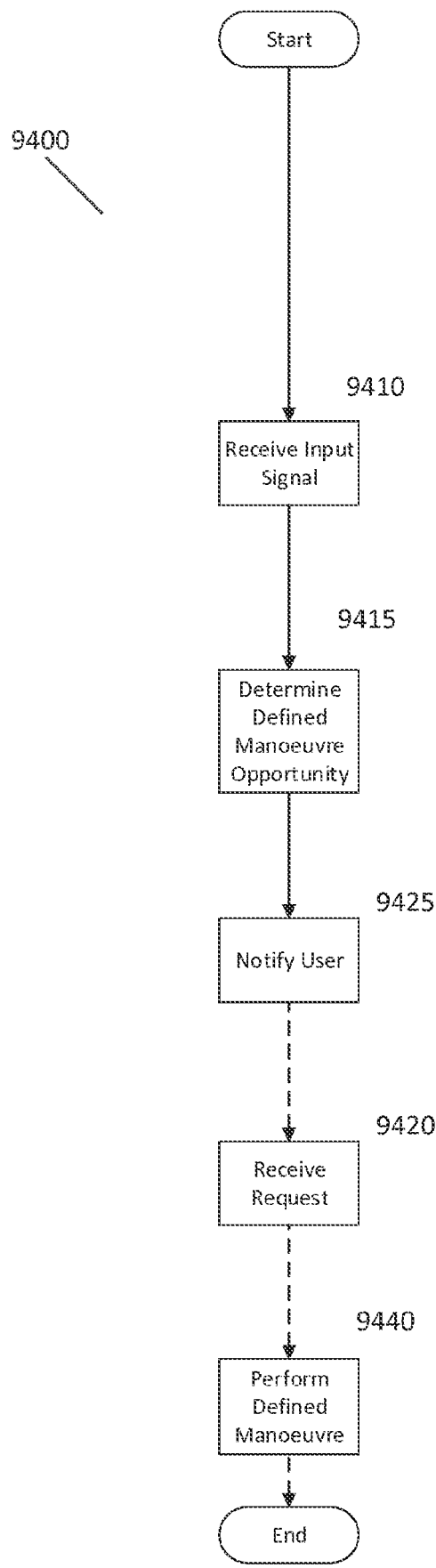
FIG. 52 shows a method according to an embodiment of the invention.

FIG. 52 illustrates a method 9400 according to an embodiment of the invention. The method 9400 is a method of controlling movement of the vehicle 9110. The method 9400 may be formed by the controller 9210 and system 9300 described above with reference to FIGS. 50 and 51. The method 9400 will be described with reference to FIGS. 53a and 53b as examples which correspond to the scenarios shown in FIGS. 49a and 49b respectively.

The method 9400 broadly comprises steps of receiving 9410 the input signal, and, in dependence thereon, determining 9415 a defined manoeuvre opportunity; and notifying 9425 the user of the opportunity. Thereafter, the user has the option to request the performance of the defined manoeuvre. Upon receipt 9420 of the user request, the control means 9220 controls the manoeuvre output means 9240 to move the vehicle 9110 to the defined manoeuvre completed position. In the example shown in FIG. 53a, following completion of the defined manoeuvre 9440, normal driving can be performed. For example, the user can perform manually-controlled driving to drive the vehicle 9110 away from the scenario of FIG. 53a entirely.

Referring to FIG. 52, the illustrated embodiment of the method 9400 comprises a step of receiving 9410 the input signal from the input means, such as from the environment sensing means 9330. For example, the input signal may be indicative of a feature 9125, 9140, 9150 in the vicinity of the vehicle 9110. The controller 9210 determines 9415 whether the environment signal is indicative of one or more features 9125, 9140, 9150 in the vicinity of the vehicle 9110 corresponding to whether the vehicle 9110 can perform the defined manoeuvre. Accordingly, the vehicle 9110 can be moved out of the vacancy 9172 of FIGS. 49a and 53a. In at least some examples, the defined manoeuvre opportunity is notified 9425 automatically to the user, explicitly alerting the user to the availability of the defined manoeuvre opportunity without requiring any request or instruction from the user to seek such opportunity. Here, the control means 9410 is arranged to control the notification output means to output the notification signal independently of a user request for the manoeuvre output means 9440 to be controlled by the control means 9410. In at least some examples, the controller 9200 is configured to automatically output the notification signal without requiring an activation of the control means 9210 by the vehicle user. In at least some scenarios, the user may otherwise be unaware of the possibility of the performance of a defined manoeuvre, such that allowing the notification signal to be output independently of the user request may allow the user to be offered the possibility of more or more useful defined manoeuvres (e.g. compared to only those expressly sought by the user in advance).

FIG. 53a shows the vehicle 9110 following an unparking defined manoeuvre from the position of FIG. 49a, the position of FIG. 1a shown in FIG. 5a in broken lines. The vehicle 9110 is shown as having moved in a rearwards direction, opposite to the forward longitudinal direction 9114, and also in the forward direction 9114, with controlled operation of steerable wheels 9180 to angle the vehicle 9110 to perform sequential trajectory parts (not shown) of the unparking defined manoeuvre from the position of FIG. 49a to the defined manoeuvre completed position of FIG. 53a. It will be appreciated, although not shown here, the vehicle may comprise steerable rear wheels in at least some examples.

In FIG. 53a the vehicle 9110 is shown at the defined manoeuvre completed position outside the vacancy 9172, where the defined manoeuvre would be performed with the vehicle performing an unparking defined manoeuvre to exit the vacancy 9172 with multiple trajectory portions to perform the defined manoeuvre. The vehicle 9110 is shown in relation to a feature 9125 in a vicinity of the vehicle 9110. The feature 9125 is, in this example, an object which is a wall that is parallel to the longitudinal axis 9112 of the vacancy 9172. The object is not limited to being a wall 9125 and may be, for example, a bollard, fence, barrier, or other object at or adjacent the vacancy 9172, such as to form a boundary thereof. As shown in FIGS. 49a and 53a, another feature 9140, in the form of a stationary vehicle is located at an end of the vacancy 9172, to the rear of the vehicle 9110 as shown in FIG. 49a. As shown in FIGS. 49a and 53a, another stationary vehicle 9150 is located at an opposite end of the vacancy, in front of the vehicle 9110 in the position as shown in FIG. 49a.

It will be appreciated that in at least some such scenarios, multiple trajectory parts may be required to iteratively transition the vehicle 9110 out of the vacancy 9172. It will be appreciated that although shown here in plan view, the scenarios depicted are three dimensional.

As can be seen in FIG. 53a, the vehicle 9110 in the defined manoeuvre completed position (on the right, outside the vacancy 9172 as shown in FIG. 53a) is positioned adjacent the foremost stationary vehicle 9150, with a clearance therebetween. From the defined manoeuvre completed position of FIG. 53a, the vehicle 9110 may be driven normally, such as manually. It will be appreciated that the particular scenario of FIG. 53a may correspond to a scenario whereby the vehicle 9110 in the defined manoeuvre completed position is correctly positioned for driving off normally, such as with a direction or a flow of traffic. For example, the vehicle 9110 may be positioned on a road where vehicles drive on the left-hand side of the road (e.g. in the UK), such that the vehicle 9110 is not pointed into oncoming traffic in the particular scenario shown in FIG. 53a. From the defined manoeuvre completed position, a user may have or take control of the vehicle 9110, following completion of the defined manoeuvre.

FIG. 53b shows the vehicle 9110 following the parking defined manoeuvre from the position of FIG. 49b, the position of FIG. 1b shown in FIG. 5b in broken lines. In FIG. 5b the vehicle 9110 is shown at the defined manoeuvre completed position inside the vacancy 9172, where the defined manoeuvre would be performed with the vehicle performing a parking defined manoeuvre to enter the vacancy 9172. The vehicle 9110 is shown in relation to the feature 9125 in the vicinity of the vehicle 9110. It will be appreciated that in at least some such scenarios, multiple trajectory parts may be required to iteratively transition the vehicle 9110 to the defined manoeuvre completed position in the vacancy 9172. It will also be appreciated, that the defined manoeuvre performed may involve correcting or reversing at least some of a user-initiated manoeuvre. For example, performing the defined manoeuvre from the position of FIG. 49b to the position of FIG. 5b may include positioning the vehicle 9110 alongside the foremost vehicle 150 (e.g. positioning the vehicle 9110 in a defined manoeuvre intermediate position corresponding to the defined manoeuvre completed position of FIG. 53a), prior to entering the vacancy 9172.

Accordingly, from the positions of FIGS. 49a and 49b the vehicle 9110 has been moved with defined manoeuvres to the defined manoeuvre completed positions of FIGS. 53a and 53b respectively.

In at least some examples, the user can request the defined manoeuvre performance by an explicit selection or by performing one or more predetermined actions, such as selected from one or more of: touching or putting a hand on a steering wheel; activating an accelerator control (e.g. pressing a pedal);

The controller 9200 may be arranged to notify and/or define a trajectory for the performance of the defined manoeuvre in dependence on the environment signal, such as the properties of the vacancy 9172 and/or the features 9125, 9140, 9150. For example, the controller 9200 may be arranged to notify and/or define the trajectory in dependence on the size of the vacancy 9172, the alignment or proximity of the adjacent objects 9140, 9150, or other parameters associated with the vacancy 9172. Additionally, or alternatively, the controller 9200 may be arranged to notify and/or define the trajectory in dependence on other parameters, such as one or more of: an ambient environmental condition (e.g. rain, temperature, lightness, darkness, time of day, day of week, etc); a terrain condition (e.g. road surface condition, off-road surface condition, gradient, etc); a location or locations of multiple vehicle occupants, such as the location of each vehicle occupant.

The controller 9210 may be arranged to allow for user adaptation. For example, the user may be able to at least partially override, program or adjust the controller 9210 for one or more of the following: a parameter of the defined manoeuvre; a scenario whereby the defined manoeuvre or at least notification thereof is suppressed; the available mode or modes; the one or more inputs for determination of the available modes; a selection means for selecting the mode. The controller 9210 may be arranged to be manually overridden, programmed or adjusted, such as to adjust the output of the manoeuvre and/or notification signal. Additionally, or alternatively, the controller 9210 may be arranged to automatically, or semi-automatically, override, program or adjust the output of the manoeuvre and/or notification signal, such as by learning from a user behaviour, such as a repeated user behaviour, associated with one or more of: an input pattern; a geographic location; a user identity (e.g. where the vehicle 9110 is used noncontemporaneously by multiple users). For example, the controller 9210 may be arranged to automatically select a default mode or parameter when the occupant 9195 is located at a particular location (e.g. relative to the vehicle 9110); or when the vehicle 9110 is positioned at a particular location, such as a home or garage where the user has previously performed a defined manoeuvre out of a known vacancy.

It will be appreciated that other defined manoeuvres than illustrated may be performed. For example, the defined manoeuvre may comprise an unparking manoeuvre from a perpendicular parking lot space (in contrast to the illustrated parallel, on-street unparking manoeuvre). It will be appreciated that the controller 9200 may be arranged to allow occupant movement between in and out of vehicle locations during the performance of the defined manoeuvre. For example, the controller 9200 may be arranged to allow interruption or pausing of the defined manoeuvre, such as to allow the occupant 9195 to move into or out of the vehicle 9110 whilst the vehicle 9110 is stationary. In at least some examples, the vehicle 9110 may have steerable rear wheels; or the vacancy may comprise a fishbone (diagonal) vacancy 9172 or a perpendicular vacancy (e.g. with the vehicle 9110 parked end on).

As a result of the method 9400 the vehicle may be more advantageously positioned or configured following performance of a defined manoeuvre. It will also be appreciated that embodiments of the present invention are not limited to being useful in association with a defined manoeuvre. It may be useful to notify the user of the possibility of the defined manoeuvre, even where the user may not request or wish performance of the defined manoeuvre. For example, notifying the user of such a possibility may alert the user to a possibility of performing a user-initiated manoeuvre along a trajectory similar to the indicated possible defined manoeuvre (e.g. that parking is possible into the vacancy 9172 shown in FIG. 49*b*).

Tenth Technique

FIGS. 55*a* and 55*b* illustrate a vehicle 10110 according to an embodiment of the invention in two scenarios. In FIGS. 55*a* and 55*b*, the vehicle 10110 is illustrated as having a vehicle forward direction, indicated by arrow 10114, shown parallel to a central longitudinal axis 10112 of the vehicle 10110. In the illustrated scenarios, the vehicle 10110 is shown at a defined manoeuvre start position with a defined manoeuvre completed position of the vehicle 10110 shown in broken lines. In the particular scenarios shown in FIGS. 55*a* and 55*b*, it may be desirable to perform a defined manoeuvre to park the vehicle 10110 in the defined manoeuvre completed position in a vacancy 10172.

In FIGS. 55*a* and 55*b* the vehicle 10110 is shown in broken lines at a target or desired defined manoeuvre completed position in a vehicle envelope 10174 in the vacancy 10172, where the defined manoeuvre would be performed with the vehicle performing an in-parking defined manoeuvre to enter the vacancy 10172 with the vehicle 10110 moving in the forward direction 10114 as shown here. The vehicle 10110 is shown in relation to a feature 10125 in a vicinity of the vehicle 10110. The feature 10125 is, in this example, an object which is a wall that is parallel to the longitudinal axis 10112 of the vehicle 10110 i.e. generally parallel to a side of the vehicle 10110, such as a left side here—in the defined manoeuvre completed position. The object is not limited to being a wall 10125 and may be, for example, a bollard, fence, barrier, or other object at or adjacent the vacancy 10172, such as to form a boundary thereof. As shown in FIG. 55*a*, another feature 10140, in the form of a stationary vehicle bounds an opposite lateral side of the vacancy 10172 from the wall feature 10125. As shown in FIG. 55*b*, the wall feature 10125 extends to provide a boundary of the vacancy 10172 on each opposite lateral side of the vacancy 10172, such as may be found in a garage, by way of example. It will be appreciated that in each scenario, although not shown, there may be a further boundary or limitation to the vacancy 10172, such as an end boundary (e.g. a portion of the wall feature 10125 defining an end garage wall).

In FIGS. 55*a* and 55*b*, a dimension of the vehicle 10110, being a width 10194 as shown here, is such that the vehicle 10110 can be manoeuvred into the apparent vehicle envelopes 10174 in the vacancies 10172, with a corresponding dimension, shown here as a width 176, of the vacancy's vehicle envelopes 10174 being sufficient, wider as shown here. Accordingly, the vehicle 10110 as such can fit into the vacancy 10172, with a clearance, such as indicated by the separation 192 from the vehicle's moveable projection 10182 to the wall feature 10125. It will be appreciated that although shown here in plan view, the scenarios depicted are three dimensional.

As can be seen in both FIGS. 55*a* and 55*b*, the vehicle 10110 in the defined manoeuvre completed position (on the right, occupying the vacancy 10172 as shown in both Figures) is centrally positioned with the central longitudinal axis 10112 of the vehicle 10110 being collinear with a central longitudinal axis 10197 of the vacancy 10172. Accordingly, the vehicle 10110 in the defined manoeuvre completed position is equidistant from the features 10125, 10140 on each lateral side in the respective scenarios, indicated by the separation 192 of the vehicle in the closed configuration in the defined manoeuvre completed position being the same on each side.

Embodiments of the present invention aim to ameliorate such problems.

It will be understood in the scenarios shown in FIGS. 55*a* and 55*b* that the defined manoeuvre may be a manoeuvre of the vehicle 10110 which is performed automatically by the vehicle 10110 i.e. under control of one or more systems of the vehicle 10110. The defined manoeuvre may be considered to be performed automatically by the vehicle 10110, or at least semi autonomously. As shown, in FIGS. 55*a* and 55*b* the defined manoeuvre may be a parking manoeuvre to control the vehicle 10110 to drive into a parking place.

As will be further explained, it may be advantageous for at least a portion of the manoeuvre to be performed whilst a person in control of the vehicle 10110 is external to the vehicle 10110. For example, access to the vehicle 10110 may be limited in FIG. 55*a* after performing the defined manoeuvre.

To perform the defined manoeuvre, the vehicle 10110 comprises environment sensing means for determining a location of features 10125, 10140 in the vicinity of the vehicle 10110. The environment sensing means may comprise one or more sensing devices or imaging devices. The one or more sensing devices may emit radiation and receive radiation reflected from the features in the vicinity of the vehicle, such as ultrasonic sensing devices, although it will be appreciated that the present invention is not limited in this respect. Such environment sensing means have a minimum distance to which accuracy the location of the features 10125 may be determined due to, for example, a resolution of an imaging device or a signal-to-noise ratio of a sensing device.

In the particular examples shown here, the vehicle 10110 comprises a portion of the environment sensing means in or on the vehicle moveable projection 10182. For example, each side or wing mirror of the vehicle 110 can have a camera or the like mounted thereto or thereon.

Figure 56:
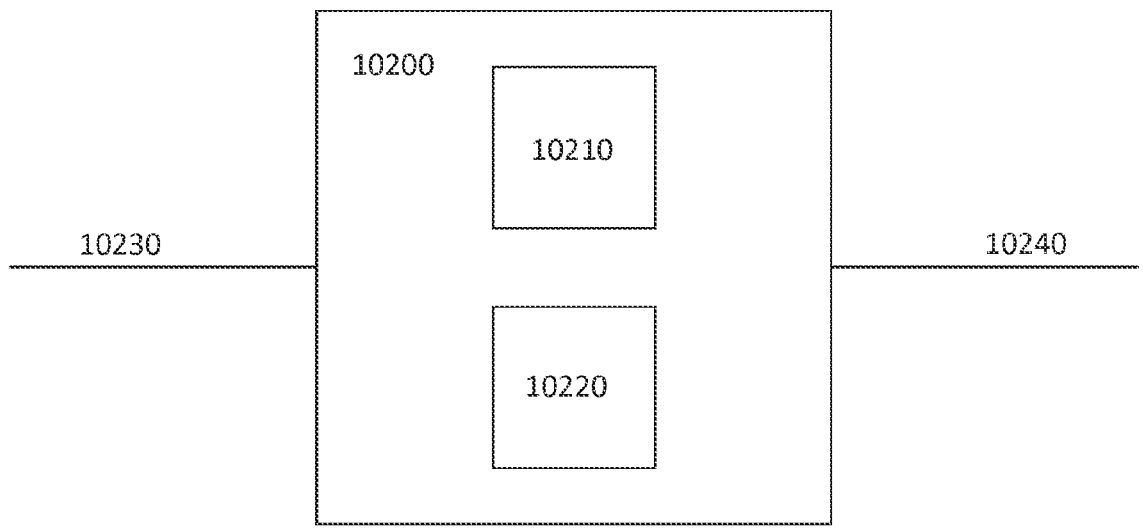
FIG. 56 shows a controller according to an embodiment of the invention.
Figure 60:
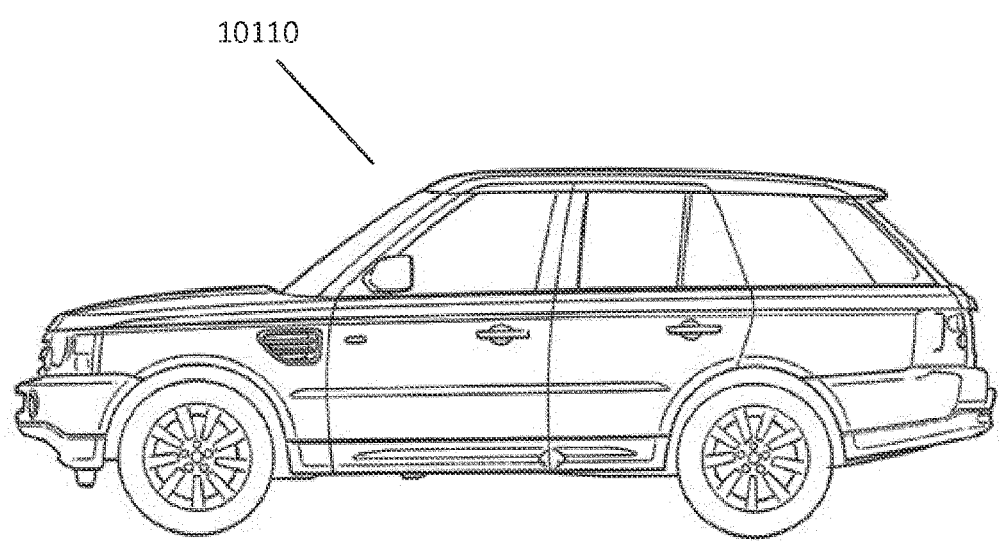
FIG. 60 is a vehicle according to an embodiment of the invention.

FIG. 56 illustrates a controller 10200 or control unit 10200 according to an embodiment of the invention, such as comprised in the vehicle 10110 of FIGS. 55(*a*) and 55(*b*).

The controller 10200 comprises a control means 10210, input means 10230 and output means 10240. In some embodiments, the controller comprises a memory means 10220 such as one or more memory devices 10220 for storing data therein. The output means 10240 may comprise an electrical output for outputting a manoeuvre signal. The manoeuvre signal represents an instruction for the vehicle 10110 to move. The instruction provided by the manoeuvre signal is provided to cause the vehicle 10110 to perform the defined manoeuvre. Here, the input means 10230 is for receiving an environment signal indicative of the features 10125, 10140 in the vicinity of the vehicle 10110. The control means 10210 is arranged to control the output means 10240 to cause the vehicle 10110 to perform at least a portion of the defined manoeuvre in dependence on the environment signal. Here, the controller 10200 comprises a second output means for outputting an envelope signal indicative of target defined manoeuvre completed positions or selectable envelopes. The control means 10210 is arranged to output the envelope signal indicative of a plurality of possible target defined manoeuvre completed positions or envelopes. The target defined manoeuvre completed position or envelope is selectable from the plurality of selectable target defined manoeuvre completed positions or envelopes by a user in dependence upon the envelope signal. In at least some examples, the second output means comprises a notification output means (not shown). Advantageously, the user can be notified of the availability of one or more target defined manoeuvre completed positions or envelopes, allowing the user to select their preferred target defined manoeuvre completed position or envelope where available. For example, prior to, or even during, performing the defined manoeuvre to the defined manoeuvre completed positions of FIG. 55(*a*) or 55(*b*), the user can be notified of one or more target defined manoeuvre completed positions or envelopes, not necessarily those indicated in broken lines in FIGS. 55(*a*) and 55(*b*), as explained further below with reference to FIGS. 59(*a*) to 59(*d*).

Here, the control means 10210 is arranged to provide a notification signal indicative of no vehicle envelope being selectable, corresponding to the vehicle envelope 10174 being unsuitable for receiving the vehicle 10110 on performance of a defined manoeuvre. Accordingly, the user is made aware by notification that a vehicle envelope or vacancy has been identified, but that it is unsuitable for performance of the defined manoeuvre—for example, where a vehicle envelope is too small for the performance of a defined manoeuvre (e.g. whereby the adjacent feature 10125 and object 10140 are significantly closer together than in FIG. 55(*b*) with insufficient dimensions for receiving or accommodating the vehicle 10110 even in the closed configuration).

The control means 10210 may be formed by one or more electronic processing devices such as an electronic processor. The processor may operably execute computer readable instructions stored in the one or more memory devices 10220. The control means 10210 is arranged to control the output means 10240 to output the manoeuvre signal in dependence on the environment signal, as will be explained. In some embodiments, the input means 10230 and output means 10240 may be combined such as by being formed by an I/O unit or interface unit. For example, the controller 10210 may comprise an interface to a network forming a communication bus of a vehicle. The interface bus may be an Internet Protocol (I P) based communication bus such as Ethernet, although embodiments of the invention are not limited in this respect.

The input means 10230 may comprise an electrical input for receiving an environment signal. The input means 10230 may comprise an electrical input for receiving a request signal. Here, the request signal is indicative of a wirelessly received signal representing a user request for movement of the vehicle 10110.

As shown here, the memory means 10220 can be used to store data from the input means 10230. For example, the memory means can store data about the features 10125, 10140, or the vacancy 10172 for future use. For example, where an occupant or user of the vehicle 10110 has actively selected (e.g. by inputting one or more parameter inputs) or implicitly shown (e.g. through a repeated behavioural or use pattern) at least one preference for a target defined manoeuvre completed position or envelope for one or more scenarios, the memory means can store data corresponding to the preference to provide a default and/or automatic target defined manoeuvre completed position or envelope in dependence on the input (e.g. environment signal and/or location signal, etc) being indicative of a such or similar scenario for the one or more preferences.

The data may be stored prior to and during performance of the defined manoeuvre, for use during the performance of the defined manoeuvre. In addition, or alternatively, the data may be stored for use during a subsequent defined manoeuvre. For example, where the data is stored prior to or during the performance of the defined manoeuvre to arrive at the defined manoeuvre completed position of FIG. 55*a* or 55*b*, or of any of FIGS. 59(*a*) to 59(*d*), as shown in broken lines, then the stored data may be used for or during a subsequent defined manoeuvre, such as an unparking manoeuvre from the defined manoeuvre completed position of FIG. 55*a* or 55*b*, or any of FIGS. 59*a* to 59*d*. Where stored data, such as of the features 10125, 10140, is used for the performance of at least a portion of the defined manoeuvre, the controller 200 may perform a check, such as to the validity or continued validity of the data. For example, the controller 10200 may corroborate the data with another input, such as with a later input from the environment sensing means, or input from another portion of the environment sensing means (e.g. another sensor or camera located at another portion of the vehicle 10110, the another sensor or camera able to confirm the continued presence and/or position of the one or more features 10125, 10140).

In at least some examples, the controller 10210 may comprise a second input means for receiving a request signal indicative of a received signal indicative of a user request, such as a wirelessly received signal. The user request may be for the performance of the defined manoeuvre to a selected target defined manoeuvre completed position or envelope.

It will be appreciated that the controller 10200 may be arranged to perform a portion of the defined manoeuvre in a particular mode. For example, the user may initiate the manoeuvre with control being transferred to the controller 10210 thereafter to perform the defined manoeuvre to the defined manoeuvre completed position, with the mode of performance being variable during the performance of the portion of the defined manoeuvre (e.g. between an occupant-in-vehicle mode and an occupant-out-of-vehicle mode).

Figure 57:
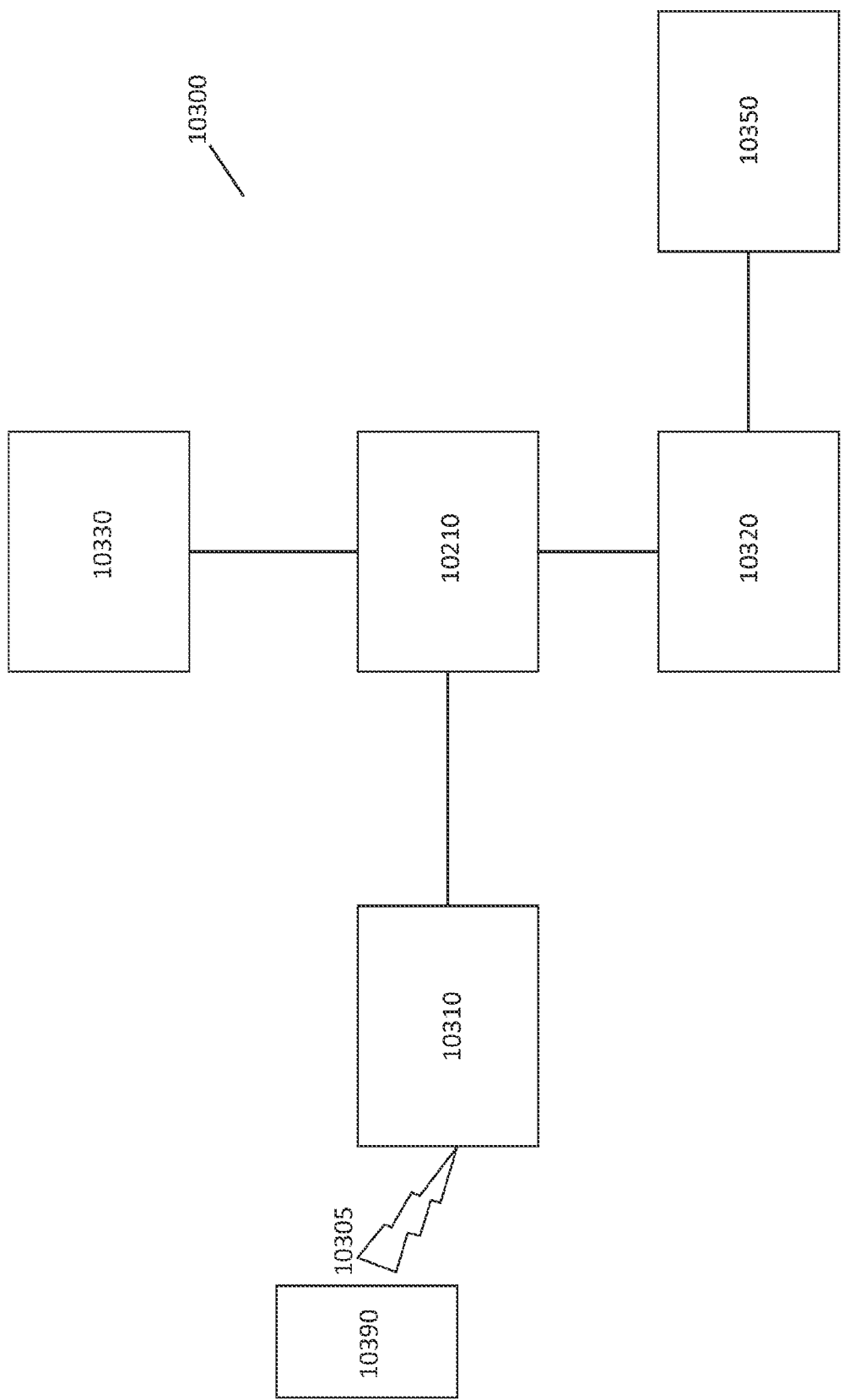
FIG. 57 shows a system according to an embodiment of the invention.

FIG. 57 illustrates a system 10300 according to an embodiment of the invention. The system 10300 comprises the controller 10210 described above and shown in FIG. 56.

The system 10300 comprises environment sensing means 10330 for determining information about an environment of the vehicle 10110. In particular, the environment sensing means 10330 is provided for determining a location of one or more features in a vicinity of the vehicle 10110.

In at least some examples, a portion of the environment sensing means is associated with the one or more moveable projections 10182, such as one or more sensors or cameras mounted in or on a vehicle wing mirror. The environment sensing means 10330 is arranged to output an environment signal indicative of the determined features. The environment signal may be environment data which may be stored in the memory. The environment sensing means may comprise one or more sensing devices such as imaging devices, such as cameras, or other sensing devices such as LIDAR, radar. ultrasonic devices, sonar devices etc. Signals output by each of the sensing devices may be used to form a representation of the environment of the vehicle 10110 which is stored in the memory for use by other systems of the vehicle 10110.

Here, the environment sensing means 10330 is arranged to determine a location of features such as surface markings, which may be painted lines denoting a perimeter of a parking bay, for example, or objects such as walls, posts or other vehicles in relation to which the vehicle is required to manoeuvre. The control means is arranged to determine an absence of features, such as a separation between obstructive features, such as the adjacent feature 10125 and object 10140 shown in FIGS. 55*a* and 59*a*, or the two adjacent features 10125 shown in FIGS. 55*b* and 59*b*, in dependence on the environment signal. Accordingly, the control means is arranged to determine a vacancy 10172 where no features, such as no obstructive features, are located. Where the vacancy 172 is sufficiently great, the control means is arranged to determine at least one vehicle envelope 10174 suitable for receiving the vehicle 10110 in the defined manoeuvre completed position. The vehicle envelope 10174 comprises a target position suitable for receiving the vehicle 10110 in the defined manoeuvre completed position. As such, the vehicle envelope 10174 here comprises a target defined manoeuvre completed position. In at least this example, the vehicle envelope 10174 is determined in dependence on a one-dimensional property and/or measurement and/or estimation. In particular here, the vehicle envelope 10174 is determined in dependence on the environment signal being indicative of a length, such as an unobstructed length between features 10125, 10140. The unobstructed length is sufficiently long for receiving the vehicle 110 in the defined manoeuvre completed position, the length here being the separation 10176 between features 10125, 10140 that is greater than the vehicle width 10194 in the defined manoeuvre completed position. The defined manoeuvre may comprise, for example, parking in a parked position.

The controller 10210 of the system 10300 here comprises defined manoeuvre means. The control means is arranged to control the vehicle 10110 to perform at least one defined manoeuvre. The controller 10210 may comprise a defined manoeuvre controller for controlling one or more systems of the vehicle 10110 to perform one or more defined manoeuvres. The defined manoeuvre means may be associated with one or more actuators 10350 of the vehicle 10110. The one or more actuators 10350 are provided for effecting movement of the vehicle 110. The actuators may comprise one or more of a power steering mechanism arranged to provide steering of wheels of the vehicle 10110 in dependence on signals received from the controller 10210. A second actuator may comprise a powered braking mechanism of the vehicle 10110 which is arranged to actuate brakes of the vehicle in dependence on signals received from the controller 10210. A third actuator comprises the powertrain of the vehicle. The controller 10210 is arranged to control the steering of the vehicle wheel 10180 relative to the feature 10125. A fourth actuator 10350 comprises one or more mechanisms for altering the position of the one or more moveable projections 10182.

The system 10300 shown here comprises a motive control means 10320. The motive control means 10320 may be a motive control unit. The motive control means 10320 is arranged to receive the manoeuvre signal output by the controller 10210. The motive control means 10320 is associated with one or more motive units of the vehicle 10110 which may form part of a powertrain (not shown) of the vehicle 10110. The motive units may comprise one or more of an internal combustion engine and one or more electric machines of the vehicle 10110. The powertrain is arranged to provide power, or torque, to cause movement in the longitudinal axis of the vehicle 10110 i.e. forward or backward movement of the vehicle 10100 in dependence on the manoeuvre signal received from the controller 10210. The motive control means 10320 is arranged to control the application of torque to one or more wheels of the vehicle 10110 to move the vehicle 10110 in the longitudinal axis of the vehicle i.e. to move the vehicle generally forwards or backwards. The torque may comprise driving torque i.e. applied in a direction of desired movement, such as forwards. The torque may also comprise braking torque i.e. applied to resist the driving torque. In at least some embodiments both driving torque and braking torque may be applied simultaneously in order to provide low-speed movement of the vehicle 10110. The braking torque may also be applied at least partly after the driving torque in order to effect accurate movement of the vehicle 10110. To achieve control of the steering, the controller 10210 may communicate with the motive control means 10320. Thus, the one or more actuators 10350 can control a direction and movement of the vehicle to perform the defined manoeuvre. The defined manoeuvre is performed in dependence on the environment signal provided by the environment sensing means 10330.

The one or more defined manoeuvres which may be performed by the vehicle 10110 under control of the controller 10210 may comprise a parking manoeuvre, such as shown in FIG. 55*a* or 55*b* wherein the vehicle 10110 is controlled to arrive at a parked position.

As shown here, the system 10300 comprises a receiver means 10310 for receiving a signal 10305. The signal 10305 may be wirelessly received from a mobile device 10390 associated with a person responsible for the vehicle 10110. The signal 10305 is indicative of a user request for vehicle movement of the vehicle 10110, as noted above. The receiver means 10310 is arranged to output the request signal to the input means 10230 of the controller 10210 as described above. The request signal may be output by the receiver means 10310 onto a communication bus of the vehicle 10110 which may communicably couple the components of the system 10300.

The receiver means 10310 may be in the form of a radio unit 10310. The radio unit 10310 may comprise a receiver for receiving radio signals 10305 from the mobile device 10390. In some embodiments, the radio unit 10310 may also comprise a transmitter, or may be a transceiver 10310 configured to receive radio signals 10305 transmitted from the mobile device 10390 and transmit signals to the mobile device 10390. The radio unit 10103 and the mobile device 10390 may be arranged to provide a wireless local area network, via which two-way communication may take place between the radio unit 10103 and the mobile device 10390. For example, the radio unit 10103 may be arranged to communicate by WiFi® with the mobile device 10390. In alternative embodiments, other radio communication standards may be used for the communication. In one example, communication between the radio unit 10103 and the mobile device 10390 is provided via Bluetooth®, although other protocols or standards may be envisaged.

The mobile device 10390 may be an electronic key fob associated with the vehicle 10110, such as may be used to gain entry and to activate or power up the vehicle 10110. The mobile device 10390 may, in other embodiments, be an electronic device associated with the person responsible for the vehicle 10100 such as a mobile telephone, tablet, watch, wearable electronic device or other computing device associated with the person. The mobile device 10390 is capable of receiving a user input indicating the person's desire to move the vehicle 10110. The user input may be provided in the form of a button or key press, activation of a graphically displayed icon, a gesture or voice command. Other forms of user input may also be envisaged.

Figure 58:
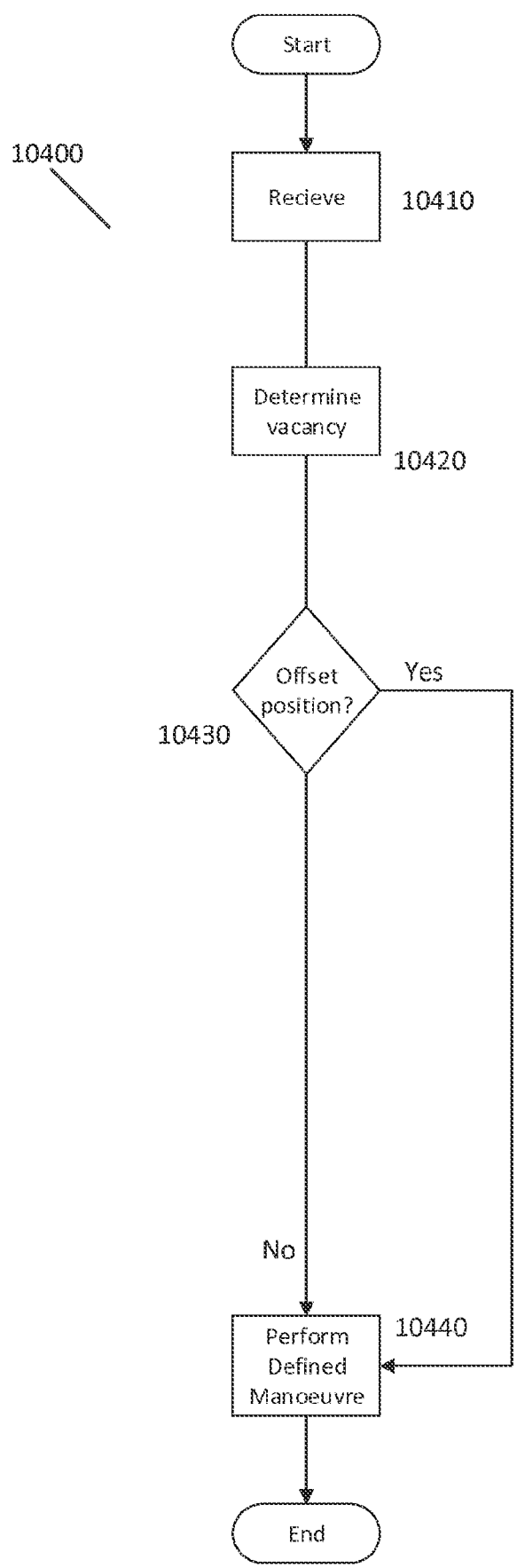
FIG. 58 shows a method according to an embodiment of the invention.

FIG. 58 illustrates a method 10400 according to an embodiment of the invention. The method 10400 is a method of controlling movement of the vehicle 10110. The method 10400 may be formed by the controller 10210 and system 10300 described above with reference to FIGS. 56 and 57. The method 10400 will be described with reference to FIGS. 59(*a*) and 59(*b*) to 59(*d*) as examples which correspond to the scenarios shown in FIGS. 55(*a*) and 55(*b*) respectively.

The method 10400 broadly comprises steps of receiving 10410 the environment signal from the environment sensing means 10330 which is indicative of a feature 10125, 10140 in a vicinity of the vehicle 10110 and, in dependence thereon, determining 10420 a presence of a suitable vacancy 10172 for receiving the vehicle in one or more target defined manoeuvre completed positions or envelopes following performance of a defined manoeuvre. The control means identifies 10430 whether the vehicle 10110 could be offset within the vacancy 10172; such as where multiple target defined manoeuvre completed positions or envelopes are possible. Where an offset target defined manoeuvre completed position is suitable, an envelope signal is output indicative of in which direction offsetting is possible (e.g. to a left or a right lateral side), thereby offering a choice of target defined manoeuvre completed positions or envelopes suitable for receiving the vehicle upon performance of the defined manoeuvre. Upon selection 10435 of an offset, the control means controls the performance of the defined manoeuvre 10440.

Referring to FIG. 58, the illustrated embodiment of the method 10400 comprises a step of receiving 10410 the environment signal from the environment sensing means 10330. The controller 10210 determines 10420 whether the environment signal is indicative of one or more features 10125 in the vicinity of the vehicle 10110 corresponding to suitable vacancy 10172. If there is no suitable vacancy, then no defined manoeuvre is performed. In at least some examples, such non-performance or unavailability is communicated to the user (e.g. the user is notified that no suitable vehicle envelope or vacancy or only an unsuitable vehicle envelope or vacancy has been detected).

It will be appreciated that in at least some examples, the defined manoeuvre can be performed without an explicit or discrete selection by the user. For example, where only a single target defined manoeuvre completed position is available or suitable with no room for offsetting, performance of the defined manoeuvre 10440 may be performed to the defined manoeuvre completed position without any express offset. Likewise, in at least some examples, there may be a general default offset provided for performing one or more defined manoeuvres, such as a preferred offset direction where multiple offsets may be available. The default may be adaptable, such as programmable by a user and/or self-learning such as to evolve or adapt (e.g. with user behaviour over a period of time). In at least some examples, there may be a default mode to perform the defined manoeuvre without any offset, to a central target defined manoeuvre completed position. In other examples, the default mode may be to a particular offset, such as by a predetermined amount to a particular lateral direction (e.g. offset away from a feature laterally proximal to a driver's lateral side of the vehicle 10110).

The offset may be selected explicitly via a user input, such as selection via an interface. In at least some examples, the offset selection may be via a user action. For example, where an offset is available, selection of an offset direction may be at least partially achieved by user positioning the vehicle 10110 in an offset manoeuvre start position with the vehicle 10110 offset towards the preferred direction of offsetting for the defined manoeuvre completed position. Additionally, or alternatively, selection may be via another system or interface, such as activation of a left/right signal indicator; a steering wheel, touchscreen, voice command, or a location of an occupant (e.g. an occupant opening a vehicle door, exiting a vehicle seat, etc.).

In FIG. 59(*a*), the vehicle 10110 is illustrated after the performance of the defined manoeuvre from the start position of FIG. 55(*a*) to the defined manoeuvre completed position of FIG. 59(*a*), according to an embodiment of the invention. Here, the defined manoeuvre has been performed to a target defined manoeuvre completed position offset to the vehicle's 10110 left (top as viewed in FIG. 57), spaced from the central longitudinal axis 10197 of the vacancy 10172 by an offset separation 10199. Accordingly, the vehicle 10110 has a shorter separation 10192 from the wall feature 10125 on the vehicle's 10110 left lateral side than the separation 10192 from the stationary vehicle feature 10140 on the vehicle's 10110 right lateral side, with the vehicle 10110 in the closed configuration at the defined manoeuvre completed position of FIG. 59(*a*). As shown here, the offset defined manoeuvre completed position can allow an occupant 10195 to more easily exit the vehicle 10110 via a vehicle door 10188 in the particular scenario depicted. As will be appreciated from the defined manoeuvre completed position illustrated in broken lines in FIG. 55a, the occupant 10195 may otherwise have difficulty in accessing the vehicle 10110, such as via the vehicle door 10188 nearest the occupant 10195 as shown in FIG. 59a—particularly, if for example, the stationary vehicle 10140 leaves and is replaced by another vehicle parked closer to the vehicle 10110. Accordingly, if the occupant 10195 subsequently returns to the vehicle at a later junction following completion of the defined manoeuvre (e.g. to unpark the vehicle 10110), the occupant 10195 may find it easier to access the vehicle 10110 in the defined manoeuvre completed position of FIG. 59a compared to that of FIG. 55a—where the occupant 10195 in FIG. 55a may have more difficulty in entering or accessing the vehicle 10110 (e.g. where the later stationary vehicle forms a hindrance to opening the vehicle door 10188 adjacent thereto).

FIG. 59(b) shows a scenario generally similar to that shown in FIG. 55(b). However, in FIG. 59(b) the control means has identified a possibility of offsetting the vehicle 10110 within the vacancy 10172. As shown here, two example vehicle envelopes 10174 are indicated with respective offset separations 10199 from the central longitudinal axis 10197 of the vacancy. The user (not shown) is offered selection of the direction of offset (e.g. left or right); and, upon the users selection, the defined manoeuvre is performed to the desired defined manoeuvre completed position, shown as offset to the right, parked in the right-hand vehicle envelope 10172, as shown in FIG. 59(c).

It will be appreciated that the scenario as depicted in FIG. 59(c) now presents a further scenario for a possible defined manoeuvre. For example, as indicated in FIG. 59(d) a further vehicle 10110b may now be able to perform a defined manoeuvre into a vacancy 10172 between the already-parked vehicle 10110 and the left-hand wall feature 10125. Such an opportunity would not have been possible in the scenario of FIG. 55(b). As shown in broken line in FIG. 59(d), the vehicle 10110b can perform a defined manoeuvre to a defined manoeuvre completed position adjacent the already-parked vehicle 10110. As shown here, by way of example, the second vehicle 10110b can also perform the defined manoeuvre to an offset defined manoeuvre completed position, with a small offset 10199 between the vehicle's 10110b longitudinal axis and the longitudinal axis 10197 of the vacancy defined between the already-parked vehicle 10110 and the left-hand wall feature 10125. Accordingly, a slightly greater separation is provided between the two parked vehicles 10110, 10110b in their respective defined manoeuvre completed positions, than between each vehicle 10110, 10110b and its respective nearest adjacent wall feature 10125. It will also be appreciated that the vehicle 10110b could be positioned without an offset in the defined manoeuvre completed position (e.g. centrally between the already-parked vehicle 10110 and the left-hand wall feature 10125). It will be appreciated that the performance of the defined manoeuvre to the offset defined manoeuvre completed position as shown in FIGS. 59(b) and 59(c) has allowed the vacancy of FIGS. 55(b) and 59(b) to be used for receiving two vehicles 10110, 10110b, which may not otherwise have been possible (e.g. as shown in FIG. 55(b)).

Once in the defined manoeuvre completed position, being parked positions in each of FIGS. 59(a), 59(b), 59(c) and 59(d), the user 10195 typically applies a parking brake, to leave the vehicle 110 stationary with the engine switched off.

The controller 10200 may be arranged to offer and/or select the offset in dependence on the environment signal, such as the properties of the vacancy 10172. For example, the controller 10200 may be arranged to offer and/or select the offset in dependence on the size of the vacancy 10172, the alignment of the adjacent objects 10140, 10150, or other parameters associated with the vacancy 10172. In at least some examples, the available offset or offsets may be limited (e.g. by a vacancy 10172 comprising dimensions unsuitable for access to/from one or more vehicle openings when offset to a particular direction and/or by a particular offset distance). Additionally, or alternatively, the controller 10200 may be arranged to offer and/or select the offset in dependence on other parameters, such as one or more of: an ambient environmental condition (e.g. rain, temperature, lightness, darkness, time of day, day of week, etc); a terrain condition (e.g. road surface condition, off-road surface condition, gradient, etc); a location or locations of multiple vehicle occupants, such as the location of each vehicle occupant.

The controller 10210 may be arranged to allow for user adaptation. For example, the user may be able to at least partially override, program or adjust the controller 10210 for one or more of the following: the available mode or modes; the one or more inputs for determination of the available modes; a selection means for selecting the mode. The controller 10210 may be arranged to be manually overridden, programmed or adjusted, such as to adjust the output of the manoeuvre signal. Additionally, or alternatively, the controller 10210 may be arranged to automatically, or semi-automatically, override, program or adjust the output of the manoeuvre signal, such as by learning from a user behaviour, such as a repeated user behaviour, associated with one or more of: an input pattern; a geographic location; a user identity (e.g. where the vehicle 10110 is used noncontemporaneously by multiple users). For example, the controller 10210 may be arranged to automatically select a default mode when the occupant 10195 is located at a particular location (e.g. relative to the vehicle 10110); or when the vehicle 10110 is positioned at a particular location, such as a home or garage where the user has previously performed a defined manoeuvre into a known vacancy.

It will be appreciated that other defined manoeuvres than illustrated may be performed. For example, the defined manoeuvre may comprise an unparking manoeuvre from the position of FIG. 59(d), such as with the occupant 10195 out of the vehicle 10110 and initiating the defined manoeuvre in an occupant out-of-vehicle mode, entering the vehicle 10110 at an interim juncture of the performance of the defined manoeuvre and continuing the performance of the defined manoeuvre in an occupant-in-vehicle mode. It will be appreciated that the controller 10200 may be arranged to allow occupant transitioning between in and out of vehicle locations during the performance of the defined manoeuvre. For example, the controller 10200 may be arranged to allow interruption or pausing of the defined manoeuvre, such as to allow the occupant 10195 to transition into or out of the vehicle 10110 whilst the vehicle 110 is stationary. In at least some examples, the vehicle 10110 may have steerable rear wheels; or the vacancy may comprise a fishbone (diagonal) vacancy 10172 or a perpendicular vacancy (e.g. with the vehicle 10110 parked end on).

As a result of the method 10400 the vehicle may be more advantageously positioned or configured following performance of a defined manoeuvre. It will also be appreciated that embodiments of the present invention are not limited to being useful in association with a defined manoeuvre. It may be useful to provide or indicate an offset defined manoeuvre completed position, even when parked or when being driven by a human driver.

Eleventh Technique

Figure 61:
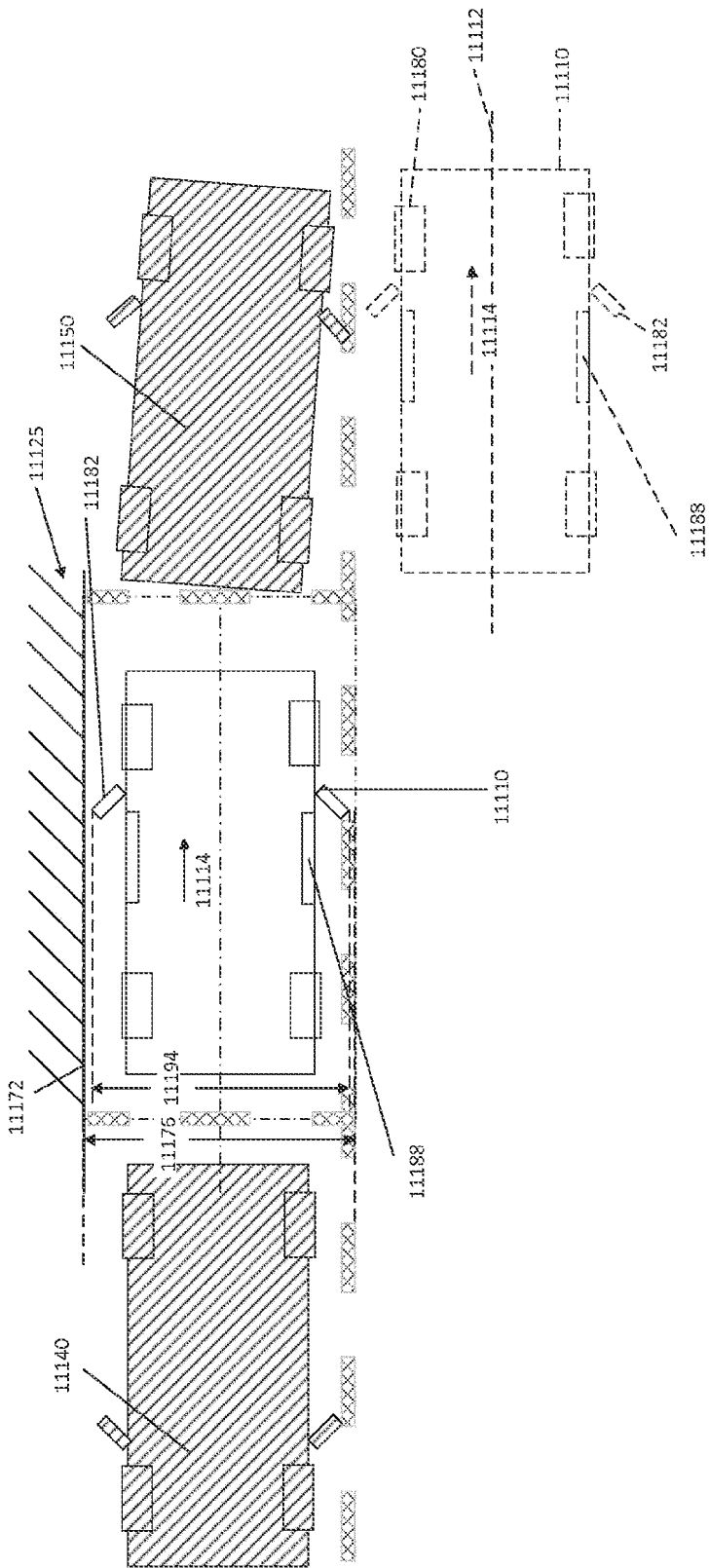
FIG. 61 shows a vehicle in relation to a feature in a vicinity of the vehicle.

FIG. 61 illustrates a vehicle 11110 according to an embodiment of the invention in an example scenario. In FIG. 61, the vehicle 11110 is illustrated as having a vehicle forward direction, indicated by arrow 11114, shown parallel to a central longitudinal axis 11112 of the vehicle 11110. In the illustrated scenario, the vehicle 11110 is shown at a defined manoeuvre start position with a defined manoeuvre completed position of the vehicle 11110 shown in broken lines. In the particular scenario shown in FIG. 61, it may be desirable to perform a defined manoeuvre to unpark the vehicle 11110 to the defined manoeuvre completed position outside a vacancy 11172.

In FIG. 61 the vehicle 11110 is shown in broken lines at a target or desired defined manoeuvre completed position outside the vacancy 11172, where the defined manoeuvre would be performed with the vehicle performing an unparking defined manoeuvre to exit the vacancy 11172 with the vehicle 11110 moving in the forward direction 11114 as shown here; and possibly additionally also in an opposite, reverse direction where multiple trajectory portions are required or desired to perform the defined manoeuvre. The vehicle 11110 is shown in relation to a feature 11125 in a vicinity of the vehicle 11110. The feature 11125 is, in this example, an object which is a wall that is parallel to the longitudinal axis 11112 of the vehicle 11110 i.e. generally parallel to a side of the vehicle 11110, such as a left side here—in the start position. The object is not limited to being a wall 11125 and may be, for example, a bollard, fence, barrier, or other object at or adjacent the vacancy 11172, such as to form a boundary thereof. As shown in FIG. 61, another feature 11140, in the form of a stationary vehicle is located at an end of the vacancy 11172, to the rear of the vehicle 11110. As shown in FIG. 61, another stationary vehicle 11150 is located at an opposite end of the vacancy, in front of the vehicle 11110 in the start position as shown in FIG. 61.

In FIG. 61, a dimension of the vehicle 11110, being a width 11194 as shown here, is such that the vehicle 11110 is positioned in the vacancy 11172, with a corresponding dimension, shown here as a width 11176, of the vacancy 11172 being sufficient, wider as shown here. It will be appreciated that in at least some such scenarios, multiple trajectory parts may be required to iteratively transition the vehicle 11110 out of the vacancy 11172. It will be appreciated that although shown here in plan view, the scenarios depicted are three dimensional.

As can be seen in FIG. 61, the vehicle 11110 in the defined manoeuvre completed position (on the right, outside the vacancy 11172 as shown in FIG. 61) is positioned adjacent foremost stationary vehicle 11150, with a clearance therebetween. From the defined manoeuvre completed position of FIG. 61 (shown in broken lines), the vehicle 11110 may be driven normally, such as manually. It will be appreciated that the particular scenario of FIG. 61 may correspond to a scenario whereby the vehicle 11110 in the defined manoeuvre completed position is correctly positioned for driving off normally, such as with a direction or a flow of traffic. For example, the vehicle 11110 may be positioned on a road where vehicles drive on the left-hand side of the road (e.g. in the UK), such that the vehicle 11110 is not pointed into oncoming traffic in the particular scenario shown in FIG. 61. From the defined manoeuvre completed position, a user may have or take control of the vehicle 11110, following completion of the defined manoeuvre.

Embodiments of the present invention aim to ameliorate such problems.

It will be understood in the scenario shown in FIG. 61 that the defined manoeuvre may be a manoeuvre of the vehicle 11110 which is performed automatically by the vehicle 11110 i.e. under control of one or more systems of the vehicle 11110. The defined manoeuvre may be considered to be performed automatically by the vehicle 11110, or at least semi autonomously. As shown, in FIG. 61 the defined manoeuvre may be an unparking manoeuvre to control the vehicle 11110 to drive out of a parking place.

As will be further explained, it may be advantageous for at least a portion of the manoeuvre to be performed whilst a person in control of the vehicle 11110 is external to the vehicle 11110. For example, access to the vehicle 11110 may be limited in FIG. 61 prior to performing or at least starting the defined manoeuvre.

To perform the defined manoeuvre, the vehicle 11110 comprises environment sensing means for determining a location of features 11125, 11140 in the vicinity of the vehicle 11110. The environment sensing means may comprise one or more sensing devices or imaging devices. The one or more sensing devices may emit radiation and receive radiation reflected from the features in the vicinity of the vehicle, such as ultrasonic sensing devices, although it will be appreciated that the present invention is not limited in this respect. Such environment sensing means have a minimum distance to which accuracy the location of the features 11125 may be determined due to, for example, a resolution of an imaging device or a signal-to-noise ratio of a sensing device.

In the particular example shown here, the vehicle 11110 comprises a portion of the environment sensing means in or on a vehicle moveable projection 11182. For example, each side or wing mirror of the vehicle 11110 can have a camera or the like mounted thereto or thereon.

Figure 62:
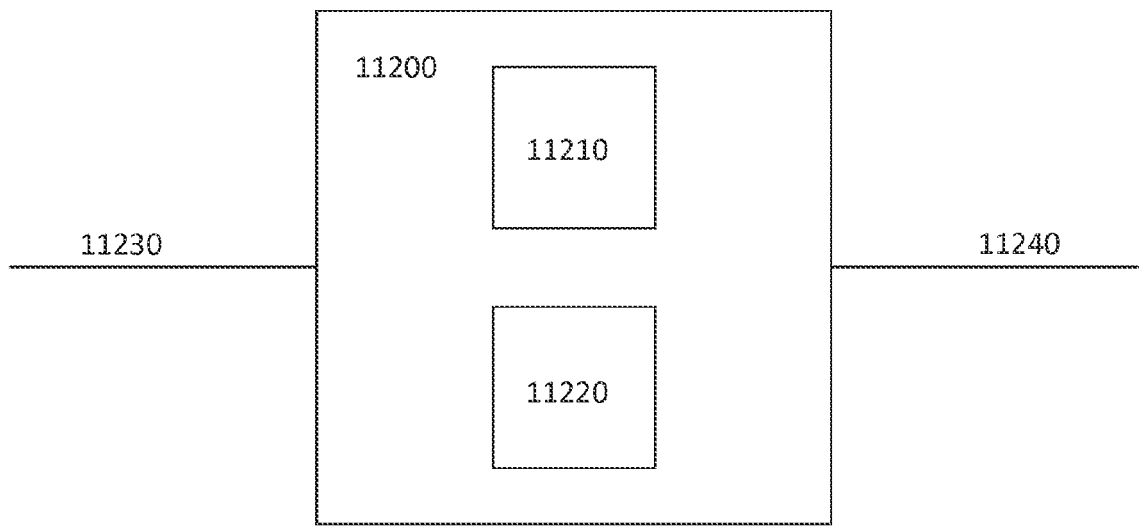
FIG. 62 shows a controller according to an embodiment of the invention.
Figure 66:
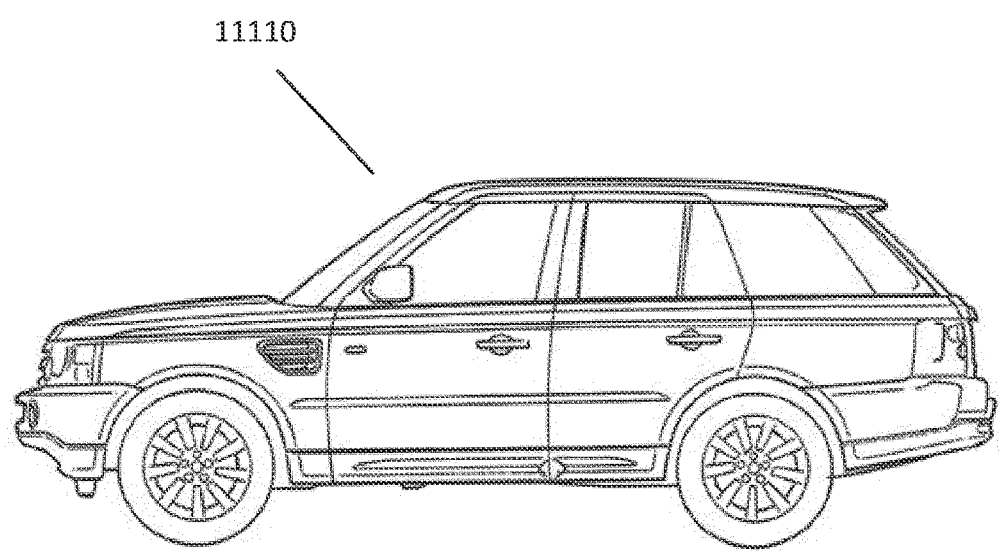
FIG. 66 is a vehicle according to an embodiment of the invention.

FIG. 62 illustrates a controller 11200 or control unit 11200 according to an embodiment of the invention, such as comprised in the vehicle 11110 of FIGS. 61(a) and 61(b).

The controller 11200 comprises a control means 11210, input means 11230 and output means 11240. In some embodiments, the controller comprises a memory means 11220 such as one or more memory devices 11220 for storing data therein. The output means 11240 may comprise an electrical output for outputting a manoeuvre signal. The manoeuvre signal represents an instruction for the vehicle 11110 to move. The instruction provided by the manoeuvre signal is provided to cause the vehicle 11110 to perform the defined manoeuvre. Here, the input means 11230 is for receiving an environment signal indicative of the features 11125, 11140, 11150 in the vicinity of the vehicle 11110. The control means 11210 is arranged to control the output means 11240 to cause the vehicle 11110 to perform at least a portion of the defined manoeuvre in dependence on the environment signal. Here, the controller 11200 comprises a second output in the form of a notification output means for outputting a notification signal for notifying the user of commencement of the transition phase. The control means 11210 is arranged to output the notification signal indicative of the commencement of the transition phase simultaneously with the commencement of the transition phase. Accordingly, a user can be contemporaneously alerted to the commencement of the transition phase. For example, during the performance of the defined manoeuvre to the defined manoeuvre completed position of FIG. 61, the user can be notified of the possibility of transferring control from the controller 11200 to the user, as explained further below with reference to FIGS. 65(a) to 65(d).

The control means 11210 may be formed by one or more electronic processing devices such as an electronic processor. The processor may operably execute computer readable instructions stored in the one or more memory devices 11220. The control means 210 is arranged to control the output means 11240 to output the manoeuvre signal in dependence on the environment signal, as will be explained. In some embodiments, the input means 11230 and output means 11240 may be combined such as by being formed by an I/O unit or interface unit. For example, the controller 11210 may comprise an interface to a network forming a communication bus of a vehicle. The interface bus may be an Internet Protocol (I P) based communication bus such as Ethernet, although embodiments of the invention are not limited in this respect.

The input means 11230 may comprise an electrical input for receiving an environment signal. The input means 11230 may comprise an electrical input for receiving a request signal. Here, the request signal is indicative of a wirelessly received signal representing a user request for movement of the vehicle 11110.

As shown here, the memory means 11220 can be used to store data from the input means 11230. For example, the memory means can store data about the features 11125, 11140, 11150, or the vacancy 11172 for future use. For example, where an occupant or user of the vehicle 110 has actively selected (e.g. by inputting one or more parameter inputs) or implicitly shown (e.g. through a repeated behavioural or use pattern) a preference for one or more parameters of the transition phase for one or more scenarios, the memory means can store data corresponding to the preference to provide a default and/or automatic parameter of the transition phase in dependence on the input (e.g. environment signal and/or location signal, etc) being indicative of a such or similar scenario for the one or more preferences. For example, where a user in a particular scenario does not wish to be offered control transfer prior to completing the defined manoeuvre to the defined manoeuvre completed position, then the transition phase, or at least notification thereof, may be suppressed.

The data may be stored prior to and during performance of the defined manoeuvre, for use during the performance of the defined manoeuvre. In addition, or alternatively, the data may be stored for use during a subsequent defined manoeuvre. For example, where the data is stored prior to or during the performance of the defined manoeuvre to arrive at the defined manoeuvre completed position of FIG. 61, or of any of FIGS. 65(a) to 65(d), as shown in broken lines, then the stored data may be used for or during a subsequent defined manoeuvre, such as an unparking manoeuvre from the defined manoeuvre completed position of FIG. 61, or any of FIGS. 65a to 65d. Where stored data, such as of the features 11125, 11140, is used for the performance of at least a portion of the defined manoeuvre, the controller 11200 may perform a check, such as to the validity or continued validity of the data. For example, the controller 11200 may corroborate the data with another input, such as with a later input from the environment sensing means, or input from another portion of the environment sensing means (e.g. another sensor or camera located at another portion of the vehicle 11110, the another sensor or camera able to confirm the continued presence and/or position of the one or more features 11125, 11140).

In at least some examples, the controller 11210 may comprise a second input means for receiving a request signal indicative of a received signal indicative of a user request, such as a wirelessly received signal. The user request may be for the performance of the defined manoeuvre to a target defined manoeuvre completed position.

It will be appreciated that the controller 11200 may be arranged to perform a portion of the defined manoeuvre in a particular mode. For example, the user may initiate the manoeuvre with control in a first mode to perform a first portion of the manoeuvre, with control thereafter being in a different mode with the mode of performance being variable during the performance of the portion of the defined manoeuvre (e.g. between an occupant-in-vehicle mode and an occupant-out-of-vehicle mode).

FIG. 63 illustrates a system 11300 according to an embodiment of the invention. The system 11300 comprises the controller 11210 described above and shown in FIG. 62.

The system 11300 comprises environment sensing means 11330 for determining information about an environment of the vehicle 11110. In particular, the environment sensing means 11330 is provided for determining a location of one or more features in a vicinity of the vehicle 11110. In at least some examples, a portion of the environment sensing means is associated with the one or more moveable projections 11182, such as one or more sensors or cameras mounted in or on a vehicle wing mirror. The environment sensing means 11330 is arranged to output an environment signal indicative of the determined features. The environment signal may be environment data which may be stored in the memory. The environment sensing means may comprise one or more sensing devices such as imaging devices, such as cameras, or other sensing devices such as LIDAR, radar, ultrasonic devices, sonar devices etc. Signals output by each of the sensing devices may be used to form a representation of the environment of the vehicle 11110 which is stored in the memory for use by other systems of the vehicle 11110.

Here, the environment sensing means 11330 is arranged to determine a location of features such as surface markings, which may be painted lines denoting a perimeter of a parking bay, for example, or objects such as walls, posts or other vehicles in relation to which the vehicle is required to manoeuvre. The control means is arranged to determine an absence of features, such as a separation between obstructive features, such as the adjacent features 11140, 11150 shown here, in dependence on the environment signal. Accordingly, the control means is arranged to determine a vacancy 11172 where no features, such as no obstructive features, are located. Where the vacancy 11172 is sufficiently great, the control means is arranged to determine a vehicle envelope suitable for receiving the vehicle 11110 in the defined manoeuvre completed position. The vehicle envelope comprises a target position suitable for receiving the vehicle 11110 in the defined manoeuvre completed position. As such, the vehicle envelope here comprises a target defined manoeuvre completed position. In at least this example, the vehicle envelope is determined in dependence on a one-dimensional property and/or measurement and/or estimation. In particular, here, the vehicle envelope is determined in dependence on the environment signal being indicative of a length, such as an unobstructed length between features 11140, 11150. The unobstructed length is sufficiently long for receiving the vehicle 11110 in the defined manoeuvre completed position, the length here being a separation between features 11140, 11150 that is greater than the vehicle length in the defined manoeuvre completed position. The defined manoeuvre may comprise, for example, parking in a parked position.

The controller 11210 of the system 11300 here comprises defined manoeuvre means. The control means is arranged to control the vehicle 11110 to perform at least one defined manoeuvre. The controller 11210 may comprise a defined manoeuvre controller for controlling one or more systems of the vehicle 11110 to perform one or more defined manoeuvres. The defined manoeuvre means may be associated with one or more actuators 11350 of the vehicle 11110. The one or more actuators 11350 are provided for effecting movement of the vehicle 11110. The actuators may comprise one or more of a power steering mechanism arranged to provide steering of wheels of the vehicle 11110 in dependence on signals received from the controller 11210. A second actuator may comprise a powered braking mechanism of the vehicle 11110 which is arranged to actuate brakes of the vehicle in dependence on signals received from the controller 11210. A third actuator comprises the powertrain of the vehicle. The controller 11210 is arranged to control the steering of the vehicle wheel 11180 relative to the feature 11125. A fourth actuator 11350 comprises one or more mechanisms for altering the position of the one or more moveable projections 11182.

The system 11300 shown here comprises a motive control means 11320. The motive control means 11320 may be a motive control unit. The motive control means 320 is arranged to receive the manoeuvre signal output by the controller 11210. The motive control means 11320 is associated with one or more motive units of the vehicle 110 which may form part of a powertrain (not shown) of the vehicle 11110. The motive units may comprise one or more of an internal combustion engine and one or more electric machines of the vehicle 11110. The powertrain is arranged to provide power, or torque, to cause movement in the longitudinal axis of the vehicle 11110 i.e. forward or backward movement of the vehicle 11100 in dependence on the manoeuvre signal received from the controller 11210. The motive control means 11320 is arranged to control the application of torque to one or more wheels of the vehicle 11110 to move the vehicle 11110 in the longitudinal axis of the vehicle i.e. to move the vehicle generally forwards or backwards. The torque may comprise driving torque i.e. applied in a direction of desired movement, such as forwards. The torque may also comprise braking torque i.e. applied to resist the driving torque. In at least some embodiments both driving torque and braking torque may be applied simultaneously in order to provide low-speed movement of the vehicle 11110. The braking torque may also be applied at least partly after the driving torque in order to effect accurate movement of the vehicle 11110. To achieve control of the steering, the controller 11210 may communicate with the motive control means 11320. Thus, the one or more actuators 11350 can control a direction and movement of the vehicle to perform the defined manoeuvre. The defined manoeuvre is performed in dependence on the environment signal provided by the environment sensing means 11330.

The one or more defined manoeuvres which may be performed by the vehicle 11110 under control of the controller 11210 may comprise a parking manoeuvre, such as shown in FIG. 61 wherein the vehicle 11110 is controlled to arrive at a parked position.

As shown here, the system 11300 comprises a receiver means 11310 for receiving a signal 11305. The signal 11305 may be wirelessly received from a mobile device 390 associated with a person responsible for the vehicle 11110. The signal 11305 is indicative of a user request for vehicle movement of the vehicle 11110, as noted above. The receiver means 11310 is arranged to output the request signal to the input means 11230 of the controller 11210 as described above. The request signal may be output by the receiver means 11310 onto a communication bus of the vehicle 11110 which may communicably couple the components of the system 11300.

The receiver means 11310 may be in the form of a radio unit 11310. The radio unit 11310 may comprise a receiver for receiving radio signals 11305 from the mobile device 11390. In some embodiments, the radio unit 11310 may also comprise a transmitter, or may be a transceiver 11310 configured to receive radio signals 11305 transmitted from the mobile device 11390 and transmit signals to the mobile device 11390. The radio unit 11103 and the mobile device 11390 may be arranged to provide a wireless local area network, via which two-way communication may take place between the radio unit 103 and the mobile device 11390. For example, the radio unit 11103 may be arranged to communicate by WiFi® with the mobile device 11390. In alternative embodiments, other radio communication standards may be used for the communication. In one example, communication between the radio unit 11103 and the mobile device 11390 is provided via Bluetooth®, although other protocols or standards may be envisaged.

The mobile device 11390 may be an electronic key fob associated with the vehicle 11110, such as may be used to gain entry and to activate or power up the vehicle 11110. The mobile device 11390 may, in other embodiments, be an electronic device associated with the person responsible for the vehicle 11100 such as a mobile telephone, tablet, watch, wearable electronic device or other computing device associated with the person. The mobile device 11390 is capable of receiving a user input indicating the person's desire to move the vehicle 11110. The user input may be provided in the form of a button or key press, activation of a graphically displayed icon, a gesture or voice command. Other forms of user input may also be envisaged.

Figure 64:
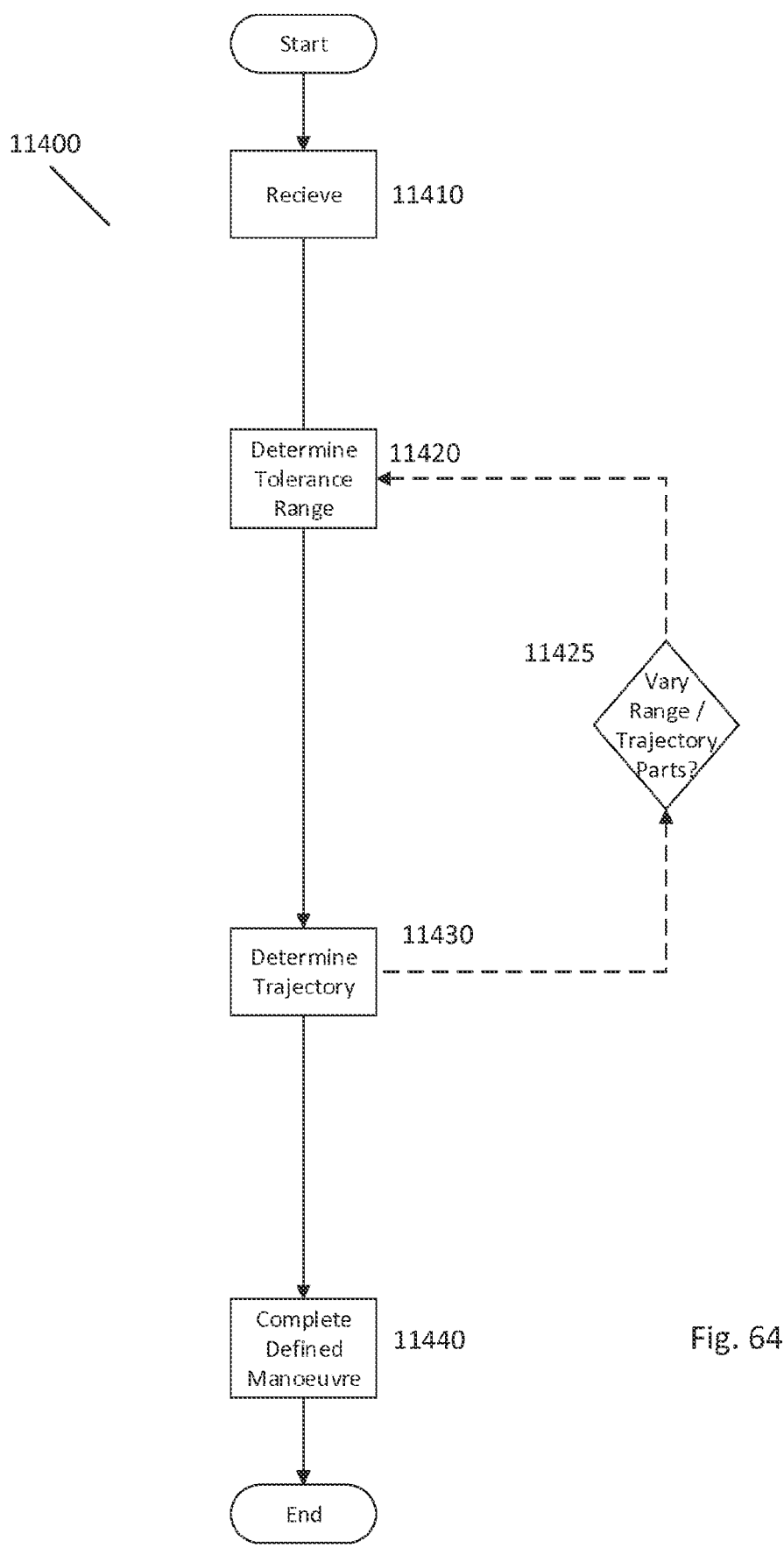
FIG. 64 shows a method according to an embodiment of the invention.

FIG. 64 illustrates a method 11400 according to an embodiment of the invention. The method 400 is a method of controlling movement of the vehicle 11110. The method 11400 may be formed by the controller 11210 and system 11300 described above with reference to FIGS. 62 and 63. The method 11400 will be described with reference to FIGS. 65(*a*) to 65(*d*) as an example which corresponds to the scenario shown in FIG. 61.

The method 11400 broadly comprises steps of receiving 11410 the environment signal from the environment sensing means 11330 which is indicative of a feature 11125, 11140, 11150 in a vicinity of the vehicle 11110 and, in dependence thereon, determining 11420 a transition phase, in particular a start thereof, during which control can be transferable from the controller 11200 to a user. Thereafter, the user has the option to take over control of the vehicle 11110 from the controller 11200 during the transition phase. In an absence of takeover of control by the user, the controller 11200 continues control to move the vehicle 11110 to the complete the defined manoeuvre 11440 to the completed position of the defined manoeuvre. Here, following completion of the defined manoeuvre 11440, or following takeover by the user, normal driving 11450 can be performed. For example, the user can perform manually-controlled driving to drive the vehicle 11110 away from the scenario of FIG. 65(*d*) entirely.

Referring to FIG. 64, the illustrated embodiment of the method 11400 comprises a step of receiving 11410 the environment signal from the environment sensing means 11330. The controller 11210 determines 11420 whether the environment signal is indicative of one or more features 11125, 11140, 11150 in the vicinity of the vehicle 11110 corresponding to whether the vehicle 11110 can complete the defined manoeuvre without requiring any change in longitudinal direction, or any change in gear. Accordingly, the vehicle 11110 can be moved out of the vacancy 11172 in a single continuance longitudinal direction or movement upon commencement of the transition phase. In at least some examples, such commencement of the transition phase is notified to the user, explicitly alerting the user to the availability of control transfer.

FIG. 65(*a*) shows the vehicle 11110 following an initial trajectory part of an unparking defined manoeuvre from the solid line position of FIG. 61. The vehicle 11110 is shown as having moved in the forward longitudinal direction 11114, with controlled operation of steerable wheels 11180 to angle the vehicle 110. FIG. 65(*b*) shows the vehicle 11110 following a second trajectory part of the unparking defined manoeuvre from the position of FIG. 65(*a*). The vehicle 11110 is shown as having moved in the rearward direction, again with controlled operation of the steerable wheels 11180 to angle the vehicle 11110. In at least some examples, the steerable wheels may be or include steerable rear wheels. The vehicle 11110 is shown in FIG. 65(*b*) ready to commence a final unparking trajectory part, to exit the vacancy 11172. FIG. 65(*c*) shows the vehicle 11110 during the final unparking trajectory part, with the vehicle 11110 having cleared the stationary vehicle 11150 in front of the vacancy 11172. In the position shown in FIG. 65(*c*) control has been transferred from the control means to the user. In the particular scenario and embodiment shown, the position of FIG. 65(*b*) represents a transition start position, from which control is transferable from the control means without cancelling or interrupting the manoeuvre. As shown in FIG. 65(*d*), the transition phase here corresponds to the final trajectory part represented by an example path 11193. Accordingly, the user is able to take over control of the vehicle at any juncture or point during the transition phase, between the positions of FIGS. 65(*c*) and 65(*d*).

In at least some examples, the user can take over or assume control by an explicit selection or by performing one or more predetermined actions, such as selected from one or more of: touching or putting a hand on a steering wheel; activating an accelerator control (e.g. pressing a pedal);

Following commencement of the transition phase, the vehicle 11110 may respond to driver accelerator requests. In at least some examples, the control means is arranged to affect vehicle performance at least during the transition phase, even after transfer of control to the user. For example, the control means may be arranged to provide or continue to provide steering support, such as until the vehicle 11110 is clear of the vacancy and parallel to the initial parked orientation (e.g. the vehicle 11110 is in a position similar to that of solid line in FIG. 65(*d*)). In at least some examples, the control means is arranged to limit an acceleration profile during at least a portion of the transition phase, such as until the vehicle 11110 is clear of the vacancy and parallel to the initial parked orientation. In at least some examples, when the vehicle 11110 is clear and parallel to initial orientation then the driver resumes full control without any assistance. In at least some examples, the control means may be arranged to provide full control of at least one element of. For example, activating a manual speed control (e.g. depressing an accelerator pedal) may be considered as a handover request for full control of the vehicle speed and acceleration.

The control means 11210 may be arranged to provide a timeout at the defined manoeuvre completed position, or even during the transition phase. During the timeout, the driver can take or resume control similar to that described above (e.g. by putting hands on steering wheel and pressing accelerator); and the manoeuvre is completed to the defined manoeuvre completed position (e.g. with assisted steering and/or the acceleration limit profile). The driver then retakes or undertakes normal driving. In other examples where a timeout is provided, the driver restarts with full manual driving.

It will be appreciated that in at least some examples, the defined manoeuvre can be performed without a transfer of control to the user. For example, a user may prefer for the defined manoeuvre to be completed to the defined manoeuvre completed position of FIG. 61 and FIG. 65(*d*) with control fully by the controller in at least some scenarios. In at least some examples, if the user has not transferred control before completion of the defined manoeuvre, then the vehicle 11110 stops in the defined manoeuvre completed position of FIG. 65(*d*). In at least some such examples, the vehicle 11110 reaches the defined manoeuvre completed position of FIG. 65(*d*) and holds stationary for a timeout. During the timeout, if the driver presses the accelerator then the acceleration request is responded to, and the vehicle 11110 returns control to the driver for normal driving. If a timeout limit is reached, the vehicle 11110 can secure a stationary position in the defined manoeuvre completed position of FIG. 65(*d*). such as by applying a park brake and optionally engaging or disengaging a gear appropriately. Thereafter the vehicle 11110 responds to normal driving requests from the driver.

The controller 11200 may be arranged to notify and/or define the commencement of the transition phase in dependence on the environment signal, such as the properties of the vacancy 11172 and/or the features 11125, 11140, 11150. For example, the controller 11200 may be arranged to notify and/or define the commencement of the transition phase in dependence on the size of the vacancy 11172, the alignment or proximity of the adjacent objects 11140, 11150, or other parameters associated with the vacancy 11172. Additionally, or alternatively, the controller 11200 may be arranged to notify and/or define the commencement of the transition phase in dependence on other parameters, such as one or more of: an ambient environmental condition (e.g. rain, temperature, lightness, darkness, time of day, day of week, etc); a terrain condition (e.g. road surface condition, off-road surface condition, gradient, etc); a location or locations of multiple vehicle occupants, such as the location of each vehicle occupant. The other parameters may be one or more of: measured; determined; estimated. For example, a status or condition may be dependent at least partially on an estimated condition. For example, where a vehicle is in a geographic location (e.g. not in a tunnel, shadow, etc) at a daytime for that location, then a low light level indication may be taken as indicative of an overcast or cloudy ambient condition.

The controller 11210 may be arranged to allow for user adaptation. For example, the user may be able to at least partially override, program or adjust the controller 11210 for one or more of the following: a parameter of the transition phase; a scenario whereby the transition phase or at least notification thereof is suppressed; the available mode or modes; the one or more inputs for determination of the available modes; a selection means for selecting the mode. The controller 11210 may be arranged to be manually overridden, programmed or adjusted, such as to adjust the output of the manoeuvre and/or notification signal. Additionally, or alternatively, the controller 11210 may be arranged to automatically, or semi-automatically, override, program or adjust the output of the manoeuvre and/or notification signal, such as by learning from a user behaviour, such as a repeated user behaviour, associated with one or more of: an input pattern; a geographic location; a user identity (e.g. where the vehicle 11110 is used noncontemporaneously by multiple users). For example, the controller 11210 may be arranged to automatically select a default mode or transition phase parameter when the occupant 11195 is located at a particular location (e.g. relative to the vehicle 11110); or when the vehicle 11110 is positioned at a particular location, such as a home or garage where the user has previously performed a defined manoeuvre out of a known vacancy.

It will be appreciated that other defined manoeuvres than illustrated may be performed. For example, the defined manoeuvre may comprise an unparking manoeuvre from a perpendicular parking lot space (in contrast to the illustrated parallel, on-street unparking manoeuvre). It will be appreciated that the controller 11200 may be arranged to allow occupant movement between in and out of vehicle locations during the performance of the defined manoeuvre. For example, the controller 11200 may be arranged to allow interruption or pausing of the defined manoeuvre, such as to allow the occupant 11195 to move into or out of the vehicle 11110 whilst the vehicle 11110 is stationary. In at least some examples, the vehicle 11110 may have steerable rear wheels; or the vacancy may comprise a fishbone (diagonal) vacancy 11172 or a perpendicular vacancy (e.g. with the vehicle 11110 parked end on).

As a result of the method 11400 the vehicle may be more advantageously positioned or configured following performance of a defined manoeuvre. It will also be appreciated that embodiments of the present invention are not limited to being useful in association with a defined manoeuvre. It may be useful to provide or determine a transition phase when control is transferable between a user and a controller even when being driven by a human driver. For example, particularly where a mode of performing a defined manoeuvre may be varied during the performance of the defined manoeuvre, it may be useful to already identify the transition phase prior to a change of mode.

Twelfth Technique

Figure 67A:
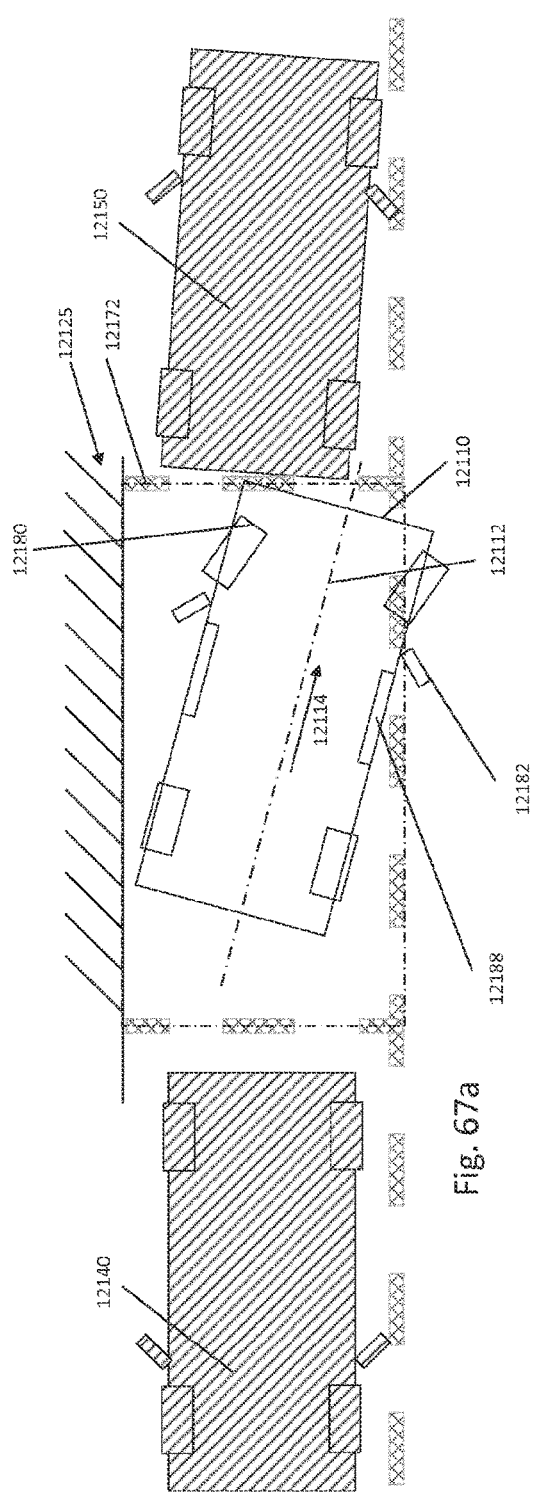
FIG. 67a shows a vehicle in relation to a feature in a vicinity of the vehicle.
Figure 67B:
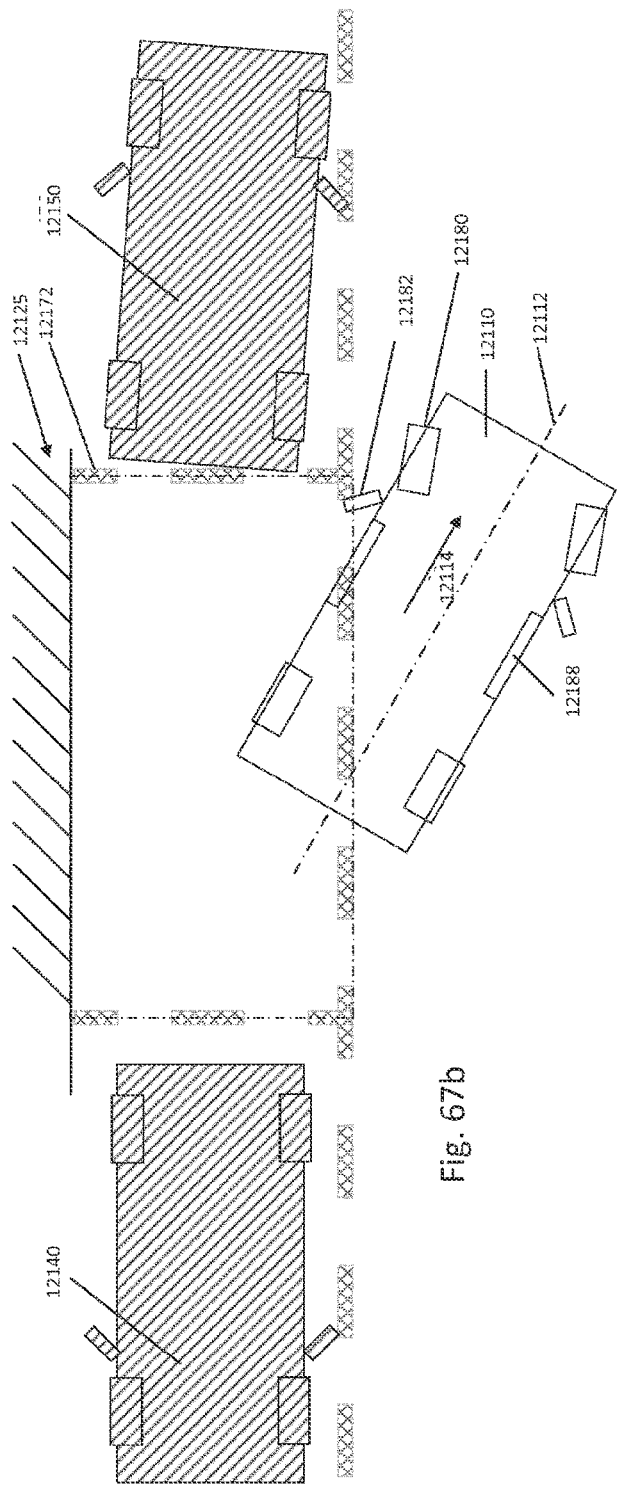
FIG. 67b shows the vehicle in relation to the feature in the vicinity of the vehicle in another scenario.

FIGS. 67*a* and 67*b* illustrate a vehicle 12110 according to an embodiment of the invention in two example scenarios. In FIGS. 67*a* and 67*b*, the vehicle 12110 is illustrated as having a vehicle forward direction, indicated by arrow 12114, shown parallel to a central longitudinal axis 12112 of the vehicle 12110. In the illustrated scenarios, the vehicle 12110 is shown at a user-initiated manoeuvre end position. In FIG. 67*a*, the vehicle 12110 is shown at a user-initiated manoeuvre end position where the user-initiated manoeuvre has been a manoeuvre to attempt to exit a vacancy 12172 in an unparking manoeuvre. In FIG. 67*b*, the vehicle 12110 is shown at a user-initiated manoeuvre end position where the user-initiated manoeuvre has been a manoeuvre to attempt to enter the vacancy 12172 in a parking manoeuvre. In each of the scenarios shown in FIGS. 67*a* and 67*b*, the user-initiated manoeuvre end positions may not correspond to positions where the user desires the vehicle to be ultimately positioned. The user may have difficulty or not wish to perform any further user-initiated manoeuvres from the positions shown in FIGS. 67*a* and 67*b*. Similarly, the user may not wish to re-position the vehicle to a predetermined or prescribed defined manoeuvre start position for a performance of a defined manoeuvre.

Embodiments of the present invention aim to ameliorate such problems.

In the particular scenario shown in FIG. 67*a*, it may be desirable to perform a defined manoeuvre to unpark the vehicle 12110 to a defined manoeuvre completed position outside the vacancy 12172. In the particular scenario shown in FIG. 67*b*, it may be desirable to perform a defined manoeuvre to park the vehicle 12110 to a defined manoeuvre completed position inside the vacancy 12172.

It will be understood in the scenarios shown in FIGS. 67*a* and 67*b* that the user-initiated manoeuvre end positions may correspond to defined manoeuvre start positions. The defined manoeuvres performed from the positions of FIGS. 67*a* and 67*b* may be manoeuvres of the vehicle 12110 which are performed automatically by the vehicle 12110 i.e. under control of one or more systems of the vehicle 12110. The defined manoeuvre may be considered to be performed automatically by the vehicle 12110, or at least semi autonomously. As shown, in FIG. 67*a* the defined manoeuvre may be an unparking manoeuvre to control the vehicle 12110 to drive out of a parking place. As shown, in FIG. 67*b* the defined manoeuvre may be a parking manoeuvre to control the vehicle 12110 to drive into a parking place.

As will be further explained, it may be advantageous for at least a portion of the defined manoeuvre to be performed whilst a person in control of the vehicle 12110 is external to the vehicle 12110. For example, access from the vehicle 12110 may be limited in FIG. 67*b* after performing or at least completing the defined manoeuvre.

To perform the defined manoeuvre, the vehicle 12110 comprises environment sensing means for determining a location of features 12125, 12140, 12150 in the vicinity of the vehicle 12110. The environment sensing means may comprise one or more sensing devices or imaging devices. The one or more sensing devices may emit radiation and receive radiation reflected from the features in the vicinity of the vehicle, such as ultrasonic sensing devices, although it will be appreciated that the present invention is not limited in this respect. Such environment sensing means have a minimum distance to which accuracy the location of the features 12125 may be determined due to, for example, a resolution of an imaging device or a signal-to-noise ratio of a sensing device.

In the particular example shown here, the vehicle 12110 comprises a portion of the environment sensing means in or on a vehicle moveable projection 12182. For example, each side or wing mirror of the vehicle 12110 can have a camera or the like mounted thereto or thereon.

Figure 68:
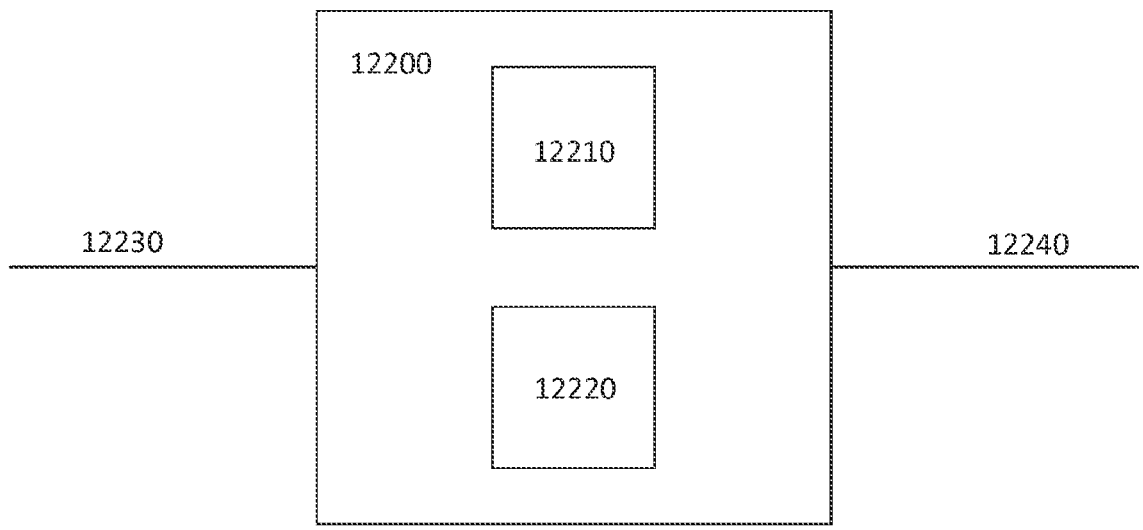
FIG. 68 shows a controller according to an embodiment of the invention.
Figure 72:
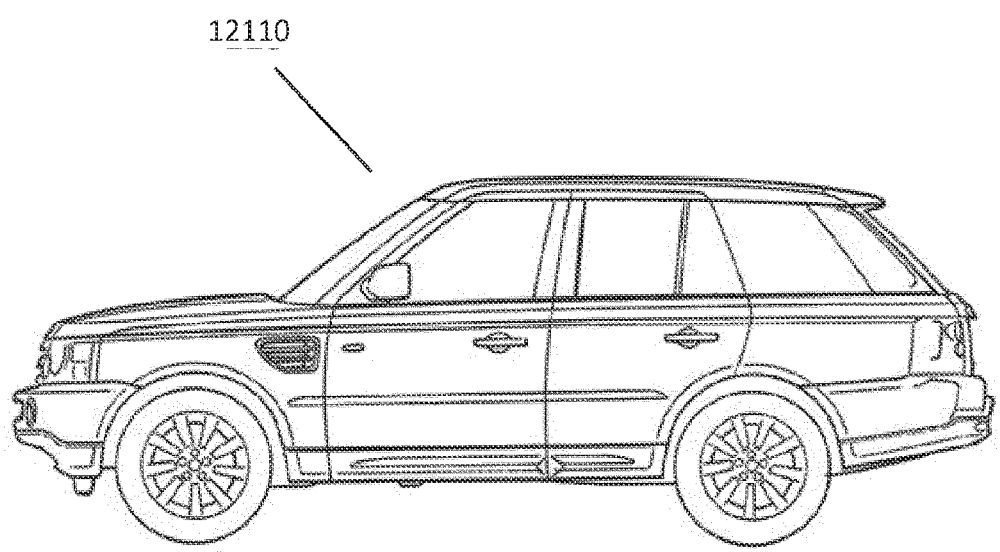
FIG. 72 is a vehicle according to an embodiment of the invention.

FIG. 68 illustrates a controller 12200 or control unit 12200 according to an embodiment of the invention, such as comprised in the vehicle 12110 of FIGS. 67(*a*) and 67(*b*).

The controller 12200 comprises a control means 12210, input means 12230 and output means 12240. In some embodiments, the controller comprises a memory means 12220 such as one or more memory devices 12220 for storing data therein. The output means 12240 may comprise an electrical output for outputting a manoeuvre signal. The manoeuvre signal represents an instruction for the vehicle 12110 to move. The instruction provided by the manoeuvre signal is provided to cause the vehicle 12110 to perform the defined manoeuvre. Here, the input means 12230 is for receiving an environment signal indicative of the features 12125, 12140, 12150 in the vicinity of the vehicle 12110.

The control means 12210 is arranged to control the output means 12240 to cause the vehicle 12110 to perform at least a portion of the defined manoeuvre in dependence on the environment signal. Here, the controller 12200 comprises a second output in the form of a notification output means for outputting a notification signal for notifying the user of a possibility of performance of a defined manoeuvre.

The control means 12210 may be formed by one or more electronic processing devices such as an electronic processor. The processor may operably execute computer readable instructions stored in the one or more memory devices 12220. The control means 12210 is arranged to control the output means 12240 to output the manoeuvre signal in dependence on the environment signal, as will be explained. In some embodiments, the input means 12230 and output means 12240 may be combined such as by being formed by an I/O unit or interface unit. For example, the control means 12200 may comprise an interface to a network forming a communication bus of a vehicle. The interface bus may be an Internet Protocol (IP) based communication bus such as Ethernet, although embodiments of the invention are not limited in this respect.

The input means 12230 may comprise an electrical input for receiving an environment signal. The input means 12230 may comprise an electrical input for receiving a request signal. Here, the request signal is indicative of a wirelessly received signal representing a user request for movement of the vehicle 12110.

As shown here, the memory means 12220 can be used to store data from the input means 12230. For example, the memory means can store data about the features 12125, 12140, 12150, or the vacancy 12172 for future use. For example, where an occupant or user of the vehicle 110 has actively selected (e.g. by inputting one or more parameter inputs) or implicitly shown (e.g. through a repeated behavioural or use pattern) a preference for a performance of a defined manoeuvre for one or more scenarios, the memory means can store data corresponding to the preference to provide a default and/or automatic parameter of the defined manoeuvre in dependence on the input (e.g. environment signal and/or location signal, etc) being indicative of a such or similar scenario for the preference or preferences. For example, where a user in a particular scenario repeatedly performs a user-initiated manoeuvre to a user-initiated manoeuvre end position prior to performance of a defined manoeuvre from the user-initiated manoeuvre end position, then the control means may be arranged to notify the user of the possibility of the performance of the defined manoeuvre in advance and/or during and/or upon completion of the user-initiated manoeuvre. Alternatively, the control means may be arranged to suppress notification of the possible defined manoeuvre—for example, where a user may appear to prefer only initiating the defined manoeuvre from the user-initiated manoeuvre end position and not a position prior thereto, then the notification of the possibility of the defined manoeuvre may be suppressed, such as until the vehicle is at or near the user-initiated manoeuvre end position.

The data may be stored prior to and during performance of the defined manoeuvre, for use during the performance of the defined manoeuvre. In addition, or alternatively, the data may be stored for use during a subsequent defined manoeuvre. For example, where the data is stored prior to or during the performance of the user-initiated manoeuvre to arrive at the user-initiated manoeuvre end position of FIG. 67*a* or 67*b*, or the defined manoeuvre completed position of either of FIG. 71*a* or 71*b*, then the stored data may be used for or during a subsequent defined manoeuvre, such as an unparking manoeuvre from the defined manoeuvre completed position of FIG. 71*b*. Where stored data, such as of the features 12125, 12140, 12150 is used for the performance of at least a portion of the defined manoeuvre, the controller 12200 may perform a check, such as to the validity or continued validity of the data. For example, the controller 12200 may corroborate the data with another input, such as with a later input from the environment sensing means, or input from another portion of the environment sensing means (e.g. another sensor or camera located at another portion of the vehicle 12110, the another sensor or camera able to confirm the continued presence and/or position of the one or more features 12125, 12140).

In at least some examples, the control means 12200 may comprise a second input means for receiving a request signal indicative of a received signal indicative of a user request, such as a wirelessly received signal. The user request may be for the performance of the defined manoeuvre to a target defined manoeuvre completed position.

It will be appreciated that the controller 12200 may be arranged to perform a portion of the defined manoeuvre in a particular mode. For example, the user may initiate the manoeuvre with control in a first mode to perform a first portion of the manoeuvre, with control thereafter being in a different mode with the mode of performance being variable during the performance of the portion of the defined manoeuvre (e.g. between an occupant-in-vehicle mode and an occupant-out-of-vehicle mode).

Figure 69:
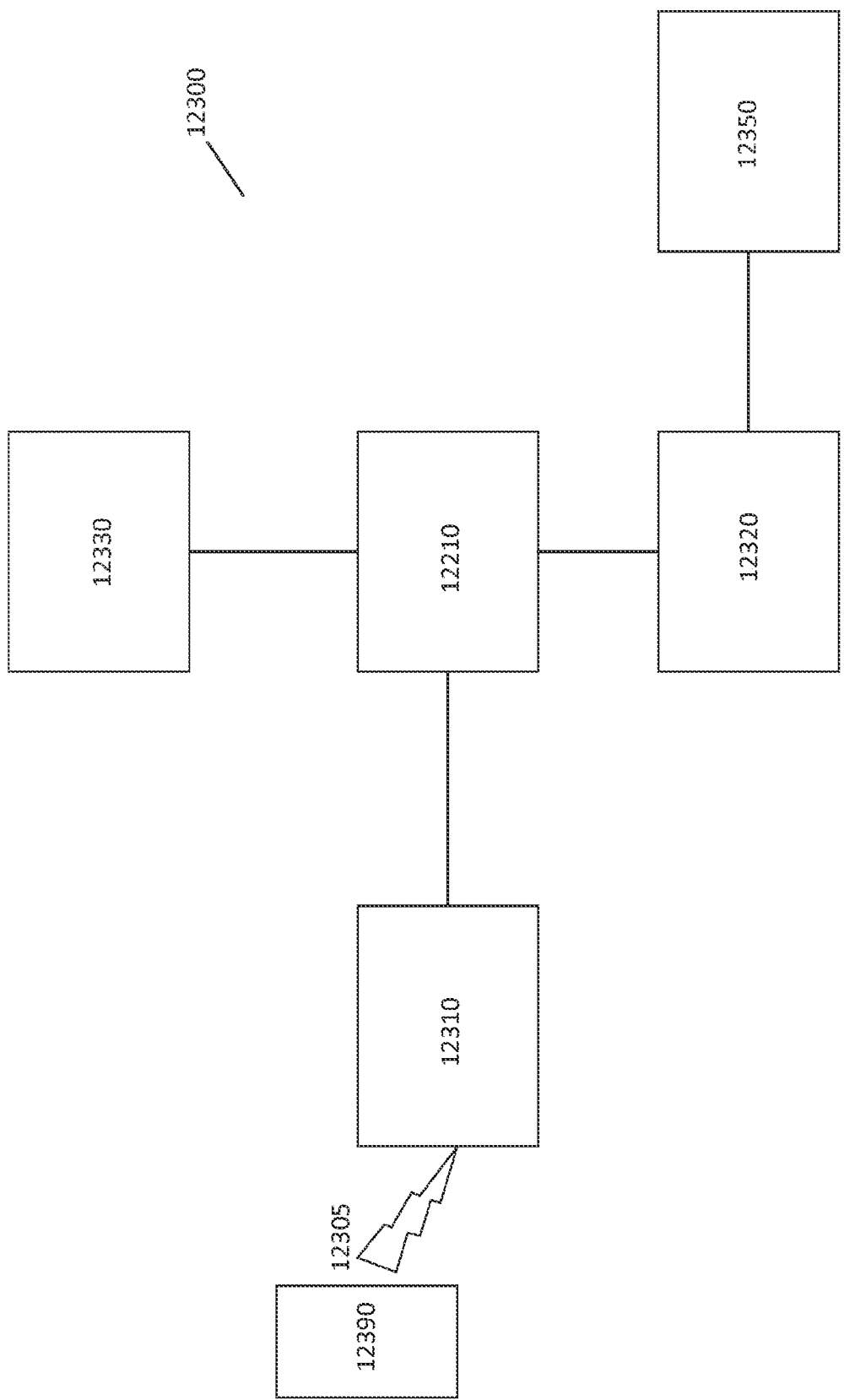
FIG. 69 shows a system according to an embodiment of the invention.

FIG. 69 illustrates a system 12300 according to an embodiment of the invention. The system 12300 comprises the control means 12200 described above and shown in FIG. 68.

The system 12300 comprises environment sensing means 12330 for determining information about an environment of the vehicle 12110. In particular, the environment sensing means 12330 is provided for determining a location of one or more features in a vicinity of the vehicle 12110. In at least some examples, a portion of the environment sensing means is associated with the one or more moveable projections 12182, such as one or more sensors or cameras mounted in or on a vehicle wing mirror. The environment sensing means 12330 is arranged to output an environment signal indicative of the determined features. The environment signal may be environment data which may be stored in the memory. The environment sensing means may comprise one or more sensing devices such as imaging devices, such as cameras, or other sensing devices such as LIDAR, radar, ultrasonic devices, sonar devices etc. Signals output by each of the sensing devices may be used to form a representation of the environment of the vehicle 12110 which is stored in the memory for use by other systems of the vehicle 12110.

Here, the environment sensing means 12330 is arranged to determine a location of features such as surface markings, which may be painted lines denoting a perimeter of a parking bay, for example, or objects such as walls, posts or other vehicles in relation to which the vehicle is required to manoeuvre. The control means is arranged to determine an absence of features, such as a separation between obstructive features, such as the adjacent features 12140, 12150 shown here, in dependence on the environment signal. Accordingly, the control means is arranged to determine a vacancy 12172 where no features, such as no obstructive features, are located. Where the vacancy 12172 is sufficiently great, the control means is arranged to determine a vehicle envelope suitable for receiving the vehicle 12110 in the defined manoeuvre completed position. The vehicle envelope comprises a target position suitable for receiving the vehicle 12110 in the defined manoeuvre completed position. As such, the vehicle envelope here comprises a target defined manoeuvre completed position. In at least this example, the vehicle envelope is determined in dependence on a one-dimensional property and/or measurement and/or estimation. In particular, here, the vehicle envelope is determined in dependence on the environment signal being indicative of a length, such as an unobstructed length between features 12140, 12150. The unobstructed length is sufficiently long for receiving the vehicle 12110 in the defined manoeuvre completed position, the length here being a separation between features 12140, 12150 that is greater than the vehicle length in the defined manoeuvre completed position. The manoeuvre may comprise, for example, parking to a parked position.

The control means 12200 of the system 12300 here comprises defined manoeuvre means. The control means is arranged to control the vehicle 12110 to perform at least one defined manoeuvre. The control means 12200 may comprise a defined manoeuvre controller for controlling one or more systems of the vehicle 12110 to perform one or more defined manoeuvres. The defined manoeuvre means may be associated with one or more actuators 12350 of the vehicle 12110. The one or more actuators 12350 are provided for effecting movement of the vehicle 12110. The actuators may comprise one or more of a power steering mechanism arranged to provide steering of wheels of the vehicle 12110 in dependence on signals received from the control means 12200. A second actuator may comprise a powered braking mechanism of the vehicle 12110 which is arranged to actuate brakes of the vehicle in dependence on signals received from the control means 12200. A third actuator comprises the powertrain of the vehicle. The control means 12200 is arranged to control the steering of the vehicle wheel 12180 relative to the feature 12125. A fourth actuator 12350 comprises one or more mechanisms for altering the position of the one or more moveable projections 12182.

The system 12300 shown here comprises a motive control means 12320. The motive control means 12320 may be a motive control unit. The motive control means 12320 is arranged to receive the manoeuvre signal output by the control means 12200. The motive control means 12320 is associated with one or more motive units of the vehicle 12110 which may form part of a powertrain (not shown) of the vehicle 12110. The motive units may comprise one or more of an internal combustion engine and one or more electric machines of the vehicle 12110. The powertrain is arranged to provide power, or torque, to cause movement in the longitudinal axis of the vehicle 12110 i.e. forward or backward movement of the vehicle 12100 in dependence on the manoeuvre signal received from the control means 12200. The motive control means 12320 is arranged to control the application of torque to one or more wheels of the vehicle 12110 to move the vehicle 12110 in the longitudinal axis of the vehicle i.e. to move the vehicle generally forwards or backwards. The torque may comprise driving torque i.e. applied in a direction of desired movement, such as forwards. The torque may also comprise braking torque i.e. applied to resist the driving torque. In at least some embodiments both driving torque and braking torque may be applied simultaneously in order to provide low-speed movement of the vehicle 12110. The braking torque may also be applied at least partly after the driving torque in order to effect accurate movement of the vehicle 12110. To achieve control of the steering, the control means 12200 may communicate with the motive control means 12320. Thus, the one or more actuators 12350 can control a direction and movement of the vehicle to perform the defined manoeuvre. The defined manoeuvre is performed in dependence on the environment signal provided by the environment sensing means 12330.

The one or more defined manoeuvres which may be performed by the vehicle 12110 under control of the control means 12200 may comprise a parking manoeuvre, such as shown in FIG. 71b wherein the vehicle 12110 is controlled to arrive at a parked position.

As shown here, the system 12300 comprises a receiver means 12310 for receiving a signal 12305. The signal 12305 may be wirelessly received from a mobile device 12390 associated with a person responsible for the vehicle 12110. The signal 12305 is indicative of a user request for vehicle movement of the vehicle 12110, as noted above. The receiver means 12310 is arranged to output the request signal to the input means 12230 of the control means 12200 as described above. The request signal may be output by the receiver means 12310 onto a communication bus of the vehicle 12110 which may communicably couple the components of the system 12300.

The receiver means 12310 may be in the form of a radio unit 12310. The radio unit 12310 may comprise a receiver for receiving radio signals 12305 from the mobile device 12390. In some embodiments, the radio unit 12310 may also comprise a transmitter, or may be a transceiver 12310 configured to receive radio signals 12305 transmitted from the mobile device 390 and transmit signals to the mobile device 12390. The radio unit 12103 and the mobile device 12390 may be arranged to provide a wireless local area network, via which two-way communication may take place between the radio unit 12103 and the mobile device 12390. For example, the radio unit 12103 may be arranged to communicate by WiFi® with the mobile device 12390. In alternative embodiments, other radio communication standards may be used for the communication. In one example, communication between the radio unit 12103 and the mobile device 12390 is provided via Bluetooth®, although other protocols or standards may be envisaged.

The mobile device 12390 may be an electronic key fob associated with the vehicle 12110, such as may be used to gain entry and to activate or power up the vehicle 12110. The mobile device 12390 may, in other embodiments, be an electronic device associated with the person responsible for the vehicle 12100 such as a mobile telephone, tablet, watch, wearable electronic device or other computing device associated with the person. The mobile device 12390 is capable of receiving a user input indicating the person's desire to move the vehicle 12110. The user input may be provided in the form of a button or key press, activation of a graphically displayed icon, a gesture or voice command. Other forms of user input may also be envisaged.

Figure 70:
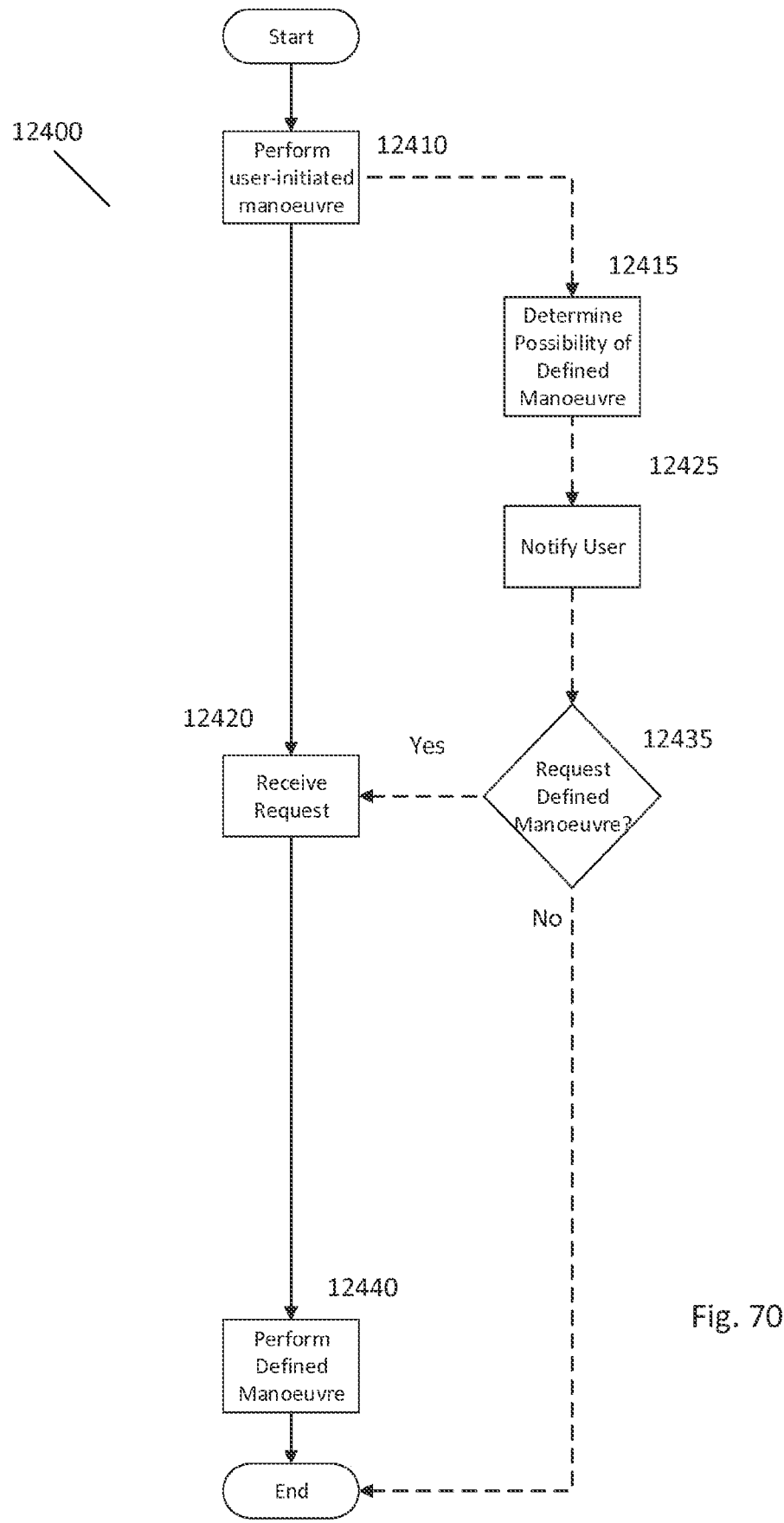
FIG. 70 shows a method according to an embodiment of the invention.

FIG. 70 illustrates a method 12400 according to an embodiment of the invention. The method 12400 is a method of controlling movement of the vehicle 12110. The method 12400 may be formed by the control means 12200 and system 12300 described above with reference to FIGS. 68 and 69. The method 12400 will be described with reference to FIGS. 71a and 71b as examples which correspond to the scenarios shown in FIGS. 67a and 67b respectively.

The method 12400 broadly comprises steps of performing 12405 a user-initiated manoeuvre, receiving 12410 the environment signal from the environment sensing means 12330 which is indicative of a feature 12125, 12140, 12150 in a vicinity of the vehicle 12110 and, in dependence thereon, determining 12415 a possibility of performing a defined manoeuvre. Thereafter, the user has the option to request the performance of the defined manoeuvre. Upon receipt 12420 of the user request, the control means 12220 controls the manoeuvre output means 12240 to move the vehicle 12110 to the completed position of the defined manoeuvre. In the example shown in FIG. 71*a*, following completion of the defined manoeuvre 12440, normal driving can be performed. For example, the user can perform manually-controlled driving to drive the vehicle 110 away from the scenario of FIG. 71*a* entirely.

Referring to FIG. 70, the illustrated embodiment of the method 12400 comprises a step of receiving 12410 the environment signal from the environment sensing means 12330. The control means 12200 determines 12415 whether the environment signal is indicative of one or more features 12125, 12140, 12150 in the vicinity of the vehicle 12110 corresponding to whether the vehicle 12110 can perform the defined manoeuvre. In at least some examples, the possibility of performance of the defined manoeuvre is notified 12425 to the user, explicitly alerting the user to the availability of control transfer. Here, the control means 12210 is arranged to control the notification output means to output the notification signal independently of a user request for the manoeuvre output means 12240 to be controlled by the control means 12210. In at least some examples, the controller 12200 is configured to automatically output the notification signal without requiring an activation of the control means 12210 by the vehicle user. In at least some scenarios, the user may otherwise be unaware of the possibility of the performance of a defined manoeuvre, such that allowing the notification signal to be output independently of the user request may allow the user to be offered the possibility of more or more useful defined manoeuvres (e.g. compared to only those expressly sought by the user in advance).

In FIG. 71*a* the vehicle 12110 is shown at the defined manoeuvre completed position outside the vacancy 12172, where the defined manoeuvre has been performed with the vehicle performing an unparking defined manoeuvre to exit the vacancy 12172 with multiple trajectory portions to perform the defined manoeuvre. The vehicle 12110 is shown in relation to the feature 12125 in a vicinity of the vehicle 12110. The feature 12125 is, in this example, an object which is a wall that is parallel to the longitudinal axis 12112 of the vacancy 12172. The object is not limited to being a wall 12125 and may be, for example, a bollard, fence, barrier, or other object at or adjacent the vacancy 12172, such as to form a boundary thereof. As shown in FIGS. 67*a* and 71*a*, another feature 12140, in the form of a stationary vehicle is located at an end of the vacancy 12172, to the rear of the vehicle 12110 as shown in FIG. 67*a*. As shown in FIGS. 67*a* and 71*a*, another stationary vehicle 12150 is located at an opposite end of the vacancy, in front of the vehicle 110 in the position as shown in FIG. 67*a*.

FIG. 71*a* shows the vehicle 12110 following an unparking defined manoeuvre from the position of FIG. 67*a*, the position of FIG. 67*a* shown in FIG. 71*a* in broken lines. The vehicle 12110 is shown as having moved in a rearwards direction, opposite to the forward longitudinal direction 12114, and also in the forward direction 12114, with controlled operation of steerable wheels 12180 to angle the vehicle 12110 to perform sequential trajectory parts of the unparking defined manoeuvre from the position of FIG. 67*a* to the defined manoeuvre completed position of FIG. 71*a*. Accordingly, the vehicle 12110 can be moved out of the vacancy 12172 of FIGS. 67*a* and 71*a*.

It will be appreciated that in at least some such scenarios, multiple trajectory parts may be required to iteratively transition the vehicle 12110 out of the vacancy 12172. It will be appreciated that although shown here in plan view, the scenarios depicted are three dimensional.

As can be seen in FIG. 71*a*, the vehicle 12110 in the defined manoeuvre completed position (on the right, outside the vacancy 12172 as shown in FIG. 71*a*) is positioned adjacent foremost stationary vehicle 12150, with a clearance therebetween. From the defined manoeuvre completed position of FIG. 71*a*, the vehicle 12110 may be driven normally, such as manually. It will be appreciated that the particular scenario of FIG. 71*a* may correspond to a scenario whereby the vehicle 12110 in the defined manoeuvre completed position is correctly positioned for driving off normally, such as with a direction or a flow of traffic. For example, the vehicle 12110 may be positioned on a road where vehicles drive on the left-hand side of the road (e.g. in the UK), such that the vehicle 12110 is not pointed into oncoming traffic in the particular scenario shown in FIG. 71*a*. From the defined manoeuvre completed position, a user may have or take control of the vehicle 12110, following completion of the defined manoeuvre.

FIG. 71*b* shows the vehicle 12110 following the parking defined manoeuvre from the position of FIG. 67*b*, the position of FIG. 67*b* shown in FIG. 71*b* in broken lines. In FIG. 71*b* the vehicle 12110 is shown at the defined manoeuvre completed position inside the vacancy 12172, where the defined manoeuvre would be performed with the vehicle performing a parking-in defined manoeuvre to enter the vacancy 12172. The vehicle 12110 is shown in relation to the feature 12125 in the vicinity of the vehicle 12110. It will be appreciated that in at least some such scenarios, multiple trajectory parts may be required to iteratively transition the vehicle 12110 to the defined manoeuvre completed position in the vacancy 12172. It will also be appreciated, that the defined manoeuvre performed may involve correcting or reversing at least some of the user-initiated manoeuvre. For example, performing the defined manoeuvre from the position of FIG. 67*b* to the position of FIG. 71*b* may include entirely removing the vehicle 12110 from the vacancy 12172 (e.g. to a defined manoeuvre intermediate position similar to the defined manoeuvre completed position of FIG. 71*a*) during the parking defined manoeuvre shown in FIG. 71*b*. Although shown in FIG. 67*b* as only partially in the designated parking space and vacancy 12172, it will also be appreciated that the vehicle 12110 may be fully positioned, or at least more fully positioned, in the designated parking space and vacancy 12172. For example, the user may position the vehicle 12110 in the vacancy 12172, with the defined manoeuvre effectively "tidying" the vehicle's 12110 final parked position (e.g. to the solid line position of FIG. 71*b*). In at least some examples, such tidying may be performed with the user out of the vehicle 110, such as retrospectively. Accordingly, the user may position the vehicle 12110 loosely or roughly in, partially in or near, the vacancy 12172—with the controller 12200 effectively finishing-off the parking manoeuvre as a defined manoeuvre, with the output means 12230 controlled by the control means 12210.

Accordingly, the user-initiated manoeuvres to the end positions of FIGS. 67*a* and 67*b* have been continued as defined manoeuvres to the defined manoeuvre completed positions of FIGS. 71*a* and 71*b* respectively.

In at least some examples, the user can request the defined manoeuvre performance by an explicit selection or by performing one or more predetermined actions, such as selected from one or more of: touching or putting a hand on a steering wheel; activating an accelerator control (e.g. pressing a pedal);

The controller 12200 may be arranged to notify and/or define a trajectory for the performance of the defined manoeuvre in dependence on the environment signal, such as the properties of the vacancy 12172 and/or the features 12125, 12140, 12150. For example, the controller 12200 may be arranged to notify and/or define the trajectory in dependence on the size of the vacancy 12172, the alignment or proximity of the adjacent objects 12140, 12150, or other parameters associated with the vacancy 12172. Additionally, or alternatively, the controller 12200 may be arranged to notify and/or define the trajectory in dependence on other parameters, such as one or more of: an ambient environmental condition (e.g. rain, temperature, lightness, darkness, time of day, day of week, etc); a terrain condition (e.g. road surface condition, off-road surface condition, gradient, etc); a location or locations of multiple vehicle occupants, such as the location of each vehicle occupant.

The control means 12200 may be arranged to allow for user adaptation. For example, the user may be able to at least partially override, program or adjust the control means 12200 for one or more of the following: a parameter of the defined manoeuvre; a scenario whereby the defined manoeuvre or at least notification thereof is suppressed; the available mode or modes; the one or more inputs for determination of the available modes; a selection means for selecting the mode. The control means 12200 may be arranged to be manually overridden, programmed or adjusted, such as to adjust the output of the manoeuvre and/or notification signal. Additionally, or alternatively, the control means 12200 may be arranged to automatically, or semi-automatically, override, program or adjust the output of the manoeuvre and/or notification signal, such as by learning from a user behaviour, such as a repeated user behaviour, associated with one or more of: an input pattern; a geographic location; a user identity (e.g. where the vehicle 12110 is used non-contemporaneously by multiple users). For example, the control means 12200 may be arranged to automatically select a default mode or parameter when the occupant 12195 is located at a particular location (e.g. relative to the vehicle 12110); or when the vehicle 12110 is positioned at a particular location, such as a home or garage where the user has previously performed a defined manoeuvre out of a known vacancy.

It will be appreciated that other defined manoeuvres than illustrated may be performed. For example, the defined manoeuvre may comprise an unparking manoeuvre from a perpendicular parking lot space (in contrast to the illustrated parallel, on-street unparking manoeuvre). It will be appreciated that the controller 12200 may be arranged to allow occupant movement between in and out of vehicle locations during the performance of the defined manoeuvre. For example, the controller 12200 may be arranged to allow interruption or pausing of the defined manoeuvre, such as to allow the occupant 12195 to move into or out of the vehicle 12110 whilst the vehicle 12110 is stationary. In at least some examples, the vehicle 12110 may have steerable rear wheels; or the vacancy may comprise a fishbone (diagonal) vacancy 12172 or a perpendicular vacancy (e.g. with the vehicle 12110 parked end on).

As a result of the method 12400 the vehicle may be more advantageously positioned or configured following performance of a defined manoeuvre. It will also be appreciated that embodiments of the present invention are not limited to being useful in association with a defined manoeuvre. It may be useful to notify the user of the possibility of the defined manoeuvre, even where the user may not request or wish performance of the defined manoeuvre. For example, notifying the user of such a possibility may alert the user to a possibility of performing a user-initiated manoeuvre along a trajectory similar to the indicated possible defined manoeuvre.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine-readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

It will be appreciated that the above 12 techniques may be used individually, or in combination, in order to provide improvements in manoeuvring and parking.

Various aspects and features of these 12 techniques are set out in the following numbered clauses. While these are set out separately, it will be understood that the clauses of multiple techniques may be combined.

First Technique

1. A controller comprising:
   input means for receiving an environment signal indicative of a location of one or more features in a vicinity of a vehicle;
   output means for outputting a manoeuvre signal to cause the vehicle to perform a defined manoeuvre; and
   control means arranged to control the output means, the control means being arranged to provide a mode for performing a portion of the defined manoeuvre, the mode being selectable from a plurality of modes including at least one mode corresponding to an occupant-in-vehicle mode and at least one mode corresponding to an occupant-out-of-vehicle mode, the mode being selectable in dependence on the environment signal being indicative of a vehicle envelope suitable for the mode.

2. The controller of clause 1 wherein the occupant-in-vehicle mode corresponds to the environment signal being indicative that the vehicle envelope is suitable for receiving the vehicle and opening a vehicle aperture member in a received vehicle position; and the occupant-out-of-vehicle mode corresponds to the environment signal being indicative that the vehicle envelope is suitable for receiving the vehicle but is not suitable for opening a vehicle aperture member in a received vehicle position.

3. The controller of clause 2, wherein the control means is arranged to allow selection between the occupant-in-vehicle mode and the occupant-out-of-vehicle mode when the environment signal is indicative that the vehicle envelope is suitable for receiving the vehicle and opening the vehicle aperture member in the received vehicle position.

4. The controller of clause 2 or 3, wherein the control means is arranged to disallow selection of the occupant-in-vehicle mode when the environment signal is indicative that the vehicle envelope is not suitable for opening the vehicle aperture member in the received vehicle position.

5. The controller of any of clauses 2 to 4, wherein the vehicle envelope comprises dimensions of a parking area and the received vehicle position is a parked position.

6. The controller of any preceding clause, comprising a second output means for outputting a mode signal indicative of a plurality of selectable modes, the mode for performing the defined manoeuvre being selectable from the plurality of selectable modes by a user in dependence on the mode signal.

7. The controller of any preceding clause, comprising a second input means for receiving a request signal indicative of a user request for selecting the mode when a plurality of modes are selectable.

8. The controller of any preceding clause, wherein the control means is arranged to provide no selectable mode when the environment signal is indicative that the vehicle envelope is unsuitable for performing the defined manoeuvre.

9. The controller of clause 8, wherein the control means is arranged to prevent the output of a manoeuvre signal to cause the vehicle to perform the defined manoeuvre when the environment signal is indicative that the vehicle envelope is unsuitable for receiving the vehicle.

10. The controller of clause of clause 8 or 9, when dependent on clause 6, wherein the second output means is arranged to provide a mode signal indicative of no mode being selectable, corresponding to the vehicle envelope being unsuitable for receiving the vehicle.

11. The controller of any preceding clause, wherein the control means is arranged for the selectable modes to be variable during the performance of the defined manoeuvre.

12. The controller of any preceding clause, wherein the defined manoeuvre is a parking manoeuvre.

13. A system comprising:
the controller of any preceding clause, arranged to receive the environment signal and to output the manoeuvre signal; and
environment sensing means for determining the location of one or more features in the vicinity of the vehicle and outputting the environment signal indicative thereof.

14. The system of clause 13 comprising actuator means for receiving the manoeuvre signal to cause the vehicle to perform the defined manoeuvre.

15. The system of clause 13 or 14, comprising receiver means for receiving a signal indicative of a user request for vehicle movement and outputting a request signal in dependence thereon.

16. The system of any of clauses 13 to 15, wherein the controller is arranged to control the provision of modes to the output means for performing the defined manoeuvre in dependence upon a presence of an occupant in the vehicle.

17. A method of controlling movement of a vehicle to perform a defined manoeuvre, the method comprising:
receiving an environment signal indicative of a location of one or more features in a vicinity of the vehicle;
providing at least one mode for performing the defined manoeuvre in dependence upon the environment signal being indicative of a vehicle envelope suitable for the mode, the mode being selectable from a plurality of modes including at least one mode corresponding to an occupant-in-vehicle mode and at least one mode corresponding to an occupant-out-of-vehicle mode; and
outputting a manoeuvre signal to cause the vehicle to perform at least a portion of the defined manoeuvre in a selected mode.

18. The method of clause 17, comprising categorizing the vehicle envelope, the categories comprising at least: suitable for receiving the vehicle and opening a vehicle aperture member in a received vehicle position; and suitable for receiving the vehicle but not suitable for opening a vehicle aperture member in a received vehicle position.

19. The method of clause 18, wherein the occupant-in-vehicle mode corresponds to the category of suitable for receiving the vehicle and opening a vehicle aperture member in a received vehicle position; and the occupant-out-of-vehicle mode corresponds to the category of suitable for receiving the vehicle but not suitable for opening a vehicle aperture member in a received vehicle position.

20. The method of any of clauses 17 to 19, comprising categorizing the vehicle envelope as one or more of: suitable for all occupants in the vehicle; suitable for at least one occupant in the vehicle; suitable for no occupants in the vehicle.

21. The method of any of clauses 17 to 20, wherein the at least a portion of the defined manoeuvre comprises one or more of: initiation of the defined manoeuvre; completion of the defined manoeuvre; and the entirety of the defined manoeuvre.

22. The method of any of clauses 17 to 21, comprising offering selectability of the mode to a user.

23. The method of any of clauses 17 to 22, comprising automatically selecting a default mode.

24. A vehicle comprising a controller according to any of clauses 1 to 12, a system according to any of clauses 13 to 16 or arranged to perform a method according to any of clauses 17 to 23.

25. Computer software which, when executed by a processing means, is arranged to perform a method according to any of clauses 17 to 23, optionally where stored on a computer readable non-transitory medium.

Second Technique

1. A controller comprising:
environment input means for receiving an environment signal indicative of a location of at least one feature in a vicinity of a vehicle; control means arranged to:

determine the orientation of a defined manoeuvre completed position of the vehicle in dependence on the environment signal; and output means for outputting a possible defined manoeuvre completed position signal in dependence on the determined orientation.

2. The controller of clause 1, wherein the controller comprises a notification output means for outputting a notification signal indicative of the possible defined manoeuvre completed position signal.

3. The controller of clause 1 or 2, wherein the control means is arranged to determine the orientation of the defined manoeuvre completed position in dependence on the environment signal being indicative of an orientation of the at least one feature in the vicinity of the vehicle.

4. The controller of clause 3, wherein the control means is arranged to determine the orientation of the defined manoeuvre completed position to be aligned relative to the at least one feature in the vicinity of the vehicle.

5. The controller of clause 4, wherein the control means is arranged to determine the orientation of the defined manoeuvre completed position to be parallel to the at least one feature in the vicinity of the vehicle.

6. The controller of clause 4, wherein the control means is arranged to determine the orientation of the defined manoeuvre completed position to be perpendicular to the at least one feature in the vicinity of the vehicle.

7. The controller of any of clauses 3 to 6, wherein the orientation of the at least one feature in the vicinity of the vehicle comprises the orientation of at least one other vehicle in the vicinity of the vehicle.

8. The controller of any preceding clause, wherein the control means is arranged to determine the orientations of a plurality of possible defined manoeuvre completed positions of the vehicle in dependence on the environment signal.

9. The controller of clause 8, wherein the control means is arranged to notify a vehicle user of the orientations of the plurality of possible defined manoeuvre completed positions.

10. The controller of any preceding clause comprising output means for outputting a manoeuvre signal to cause the vehicle to perform a defined manoeuvre to the defined manoeuvre completed position; wherein the control means is arranged to control the output means to output the manoeuvre signal.

11. The controller of any preceding clause, comprising request input means for receiving a request signal indicative of a wired or wirelessly received signal indicative of a user request for vehicle movement.

12. The controller of any preceding clause, wherein the control means is arranged to determine the orientation of the defined manoeuvre completed position in dependence on a location of the vehicle.

13. The controller of any preceding clause, comprising memory means for storing data therein, the control means being arranged to determine the orientation of the defined manoeuvre completed position in dependence on the data.

14. A system comprising:
the controller of any preceding clause, arranged to output the possible defined manoeuvre completed position signal; and
notification output means for notifying the vehicle user of the possible defined manoeuvre completed position.

15. The system of clause 14, comprising environment sensing means for determining the location of the at least one feature in the vicinity of the vehicle and for outputting the environment signal.

16. The system of either of clauses 14 or 15, comprising receiver means for wirelessly receiving a signal from a mobile device indicative of a user request and outputting a request signal in dependence thereon.

17. The system of any of clauses 14 to 16, wherein the notification output means is arranged to output a notification signal for the visual and/or audio notification indicative of the possible defined manoeuvre completed position.

18. A method of determining an orientation of a defined manoeuvre completed position of a vehicle, the method comprising:
receiving an environment signal indicative of a location of at least one feature in a vicinity of the vehicle;
in dependence on the environment signal, determining with a control means the orientation of the defined manoeuvre completed position of the vehicle; and
outputting a possible defined manoeuvre completed position signal in dependence on the determined orientation.

19. The method of clause 18, comprising outputting a notification signal indicative of the possible defined manoeuvre completed position signal.

20. The method of clause 18 or 19, comprising determining with the control means the orientation of the defined manoeuvre completed position in dependence on the environment signal being indicative of an orientation of the at least one feature in the vicinity of the vehicle.

21. The method of any of clauses 18 to 20, comprising determining the orientation of the defined manoeuvre completed position to be aligned relative to the at least one feature in the vicinity of the vehicle.

22. The method of clause 21, wherein the at least one feature in the vicinity of the vehicle comprises at least one other vehicle in the vicinity of the vehicle.

23. The method of any of clauses 18 to 22, comprising determining the orientations of a plurality of possible defined manoeuvre completed positions of the vehicle in dependence on the environment signal; and notifying a vehicle user of the orientations of the plurality of possible defined manoeuvre completed positions.

24. A vehicle comprising a controller according to any of clauses 1 to 14, a system according to any of clauses 15 to 17 or arranged to perform a method according to any of clauses 18 to 23.

25. Computer software which, when executed by a processing means, is arranged to perform a method according to any of clauses 18 to 23, optionally where stored on a computer readable non-transitory medium.

Third Technique

1. A controller comprising:
input means for receiving an environment signal indicative of a location of one or more features in a vicinity of a vehicle;
output means for outputting a manoeuvre signal to cause the vehicle to perform a defined manoeuvre to a completed position; and
control means arranged to control the output means in dependence on the environment signal to cause a vehicle wheel in the completed position to be angularly offset with respect to a feature in the vicinity of the vehicle.

2. The controller of clause 1, wherein the one or more features comprises a kerb and the control means is arranged to control the output means to cause the vehicle wheel in the completed position to be angularly offset towards the kerb.

3. The controller of clause 1 or 2, wherein the control means is arranged to control the output means to cause the vehicle wheel in the completed position to be angularly offset with respect to the feature in the vicinity of the vehicle at a predetermined offset angle.

4. The controller of any preceding clause, wherein the control means is arranged to control the output means to cause the vehicle to have a cramped wheel configuration upon completion of the defined manoeuvre.

5. The controller of any preceding clauses wherein the control means is arranged to control the output means to cause the vehicle wheel in the completed position to be angularly offset with respect to the feature in the vicinity of the vehicle in dependence upon an inclination of the vehicle.

6. The controller of any preceding clause, wherein the controller comprises a second input means for receiving a request signal indicative of a received signal indicative of a user request.

7. The controller of any preceding clause, wherein the defined manoeuvre is a parking manoeuvre.

8. A system, comprising:
the controller of any preceding clause, arranged to receive the environment signal and to output the manoeuvre signal;
environment sensing means for determining the location of one or more features in the vicinity of the vehicle and outputting the environment signal indicative thereof; and
actuator means for receiving the manoeuvre signal to cause the vehicle to perform the defined manoeuvre to the completed position with the vehicle wheel in the completed position angularly offset with respect to the feature in the vicinity of the vehicle.

9. The system of clause 8, wherein the controller is arranged to control the output means to cause a steering wheel to be rotationally offset with respect to a neutral position of the steering wheel, indicative to a user that the vehicle wheel is angularly offset.

10. The system of clause 8 or 9, comprising:
receiver means for receiving a signal indicative of a user request for vehicle movement and outputting a request signal in dependence thereon.

11. The system of any of clauses 7 to 10, wherein the controller is arranged to control the output means in dependence upon a location of the vehicle to selectively cause the vehicle wheel in the completed position to be angularly offset with respect to the feature in the vicinity of the vehicle.

12. A method of controlling movement of a vehicle to perform a defined manoeuvre, the method comprising:
receiving an environment signal indicative of a location of one or more features in a vicinity of the vehicle; and
controlling an output means in dependence on the environment signal such that a vehicle wheel is caused to be angularly offset with respect to a feature in the vicinity of the vehicle in a completed position of the defined manoeuvre.

13. The method of clause 12, wherein the one or more features comprises a kerb and the method comprises angularly offsetting the wheel towards the kerb in the completed position of the defined manoeuvre.

14. The method of clause 12 or 13, comprising receiving a signal from a mobile device indicative of a user request to perform the defined manoeuvre.

15. The method of any of clauses 12 to 14, wherein the method comprises determining the location of the one or more features with an environment sensing means.

16. A vehicle comprising a controller according to any of clauses 1 to 7, a system according to any of clauses 8 to 11 or arranged to perform a method according to any of clauses 12 to 15.

17. Computer software which, when executed by a processing means, is arranged to perform a method according to any of clauses 12 to 15.

18. The computer software of clause 17 stored on a computer readable non-transitory medium.

Fourth Technique

1. A controller comprising:
input means for receiving an ambient condition signal indicative of an ambient condition in a vicinity of a vehicle;
output means for outputting a manoeuvre signal to cause the vehicle to perform a defined manoeuvre; and
control means arranged to control the output means to cause the vehicle to perform at least a portion of the defined manoeuvre in dependence on the ambient condition signal.

2. The controller of clause 1, wherein the control means is arranged to control the output means to cause the vehicle to perform at least a portion of the defined manoeuvre in accordance with a vehicle movement control profile determined in dependence on the ambient condition signal.

3. The controller of clause 2, wherein the vehicle movement control profile comprises a speed parameter.

4. The controller of clause 2 or 3, wherein the control means is arranged to select the vehicle movement control profile in dependence on a categorisation of the ambient condition.

5. The controller of any of clauses 2 to 4, wherein the speed parameter is indicative of an acceleration of the vehicle, and/or wherein the speed parameter is indicative of a jerk of the vehicle, and/or wherein the speed parameter comprises a maximum speed parameter.

6. The controller of clause 5, wherein, when the speed parameter comprises a maximum speed parameter, the maximum speed parameter of a vehicle movement control profile corresponding to a first ambient condition is less than the maximum speed parameter of a vehicle movement control profile corresponding to a second ambient condition.

7. The controller of any of clauses 2 to 6, wherein the movement control profile is dependent upon a terrain in a vicinity of the vehicle.

8. The controller of any preceding clause, wherein the controller comprises a second input means for receiving a request signal indicative of a received signal indicative of a user request.

9. The controller of any preceding clause, wherein the defined manoeuvre is a parking manoeuvre.

10. A system, comprising:
the controller of any preceding clause arranged to receive the ambient condition signal and to output the manoeuvre signal; and
actuator means for receiving the manoeuvre signal to cause the vehicle to perform the defined manoeuvre in dependence on the ambient condition signal.

11. The system of clause 10, comprising:
ambient condition sensing means for determining the one or more ambient conditions in the vicinity of the vehicle and outputting the ambient condition signal indicative thereof.

12. The system of clause 10 or 11, comprising:
environment sensing means for determining a location of one or more features in the vicinity of the vehicle and outputting an environment signal indicative thereof.

13. The system of any of clauses 10 to 12, wherein the control means is arranged to control the output means to cause the vehicle to perform at least a portion of the defined manoeuvre in accordance with a vehicle movement control profile determined in dependence on the ambient condition signal.

14. The system of clause 13, when dependent on clause 12, wherein the controller is arranged to select the vehicle movement control profile in dependence on the one or more features.

15. The system of either of clauses 13 or 14, wherein the controller is arranged to select the vehicle movement control profile in dependence on a location of the vehicle.

16. The system of any of clauses 13 to 15, wherein the controller is arranged to select the vehicle movement control profile for performing the defined manoeuvre in dependence on a drive mode of the vehicle.

17. The system of any of clauses 13 to 16, wherein the controller is arranged to select the vehicle movement control profile for performing the defined manoeuvre in dependence on a presence of an occupant in the vehicle.

18. The system of any of clauses 10 to 17, comprising: receiver means for receiving a signal indicative of a user request for vehicle movement and outputting a request signal in dependence thereon.

19. The system of any of clauses 10 to 18, wherein the controller is arranged to receive a terrain signal indicative of at least one terrain in a vicinity of the vehicle; and the controller is arranged to select the vehicle movement control profile for performing the defined manoeuvre in dependence upon the terrain signal.

20. A method of controlling movement of a vehicle to perform a defined manoeuvre, the method comprising:
  receiving an ambient condition signal indicative of an ambient condition in a vicinity of the vehicle; and
  controlling an output means in dependence on the ambient condition signal such that at least a portion of the defined manoeuvre is performed in dependence on the ambient condition in the vicinity of the vehicle.

21. The method of clause 20, wherein the output means is controlled in dependence on the ambient condition signal such that at least a portion of the defined manoeuvre is performed in accordance with a vehicle movement control profile dependent on the ambient condition in the vicinity of the vehicle.

22. The method of clause 21, comprising selecting the vehicle movement control profile in dependence on a drive mode of the vehicle.

23. The method of either of clauses 21 or 22, comprising selecting the vehicle movement control profile in dependence on a presence of a user in the vehicle.

24. A vehicle comprising a controller according to any of clauses 1 to 9, a system according to any of clauses 10 to 19 or arranged to perform a method according to any of clauses 20 to 23.

25. Computer software which, when executed by a processing means, is arranged to perform a method according to any of clauses 20 to 23, optionally where stored on a computer readable non-transitory medium.

Fifth Technique

1. A controller comprising:
  input means for receiving an environment signal indicative of a location of one or more features in a vicinity of a vehicle;
  output means for outputting a manoeuvre signal to cause the vehicle to perform a defined manoeuvre; and
  control means arranged to control the output means to cause the vehicle to perform the defined manoeuvre, the control means being arranged to control the output means to alter a position of a moveable projection of the vehicle during the defined manoeuvre in dependence on the environment signal.

2. The controller of clause 1, wherein the input means is arranged for receiving the environment signal from an environment sensing means associated with the moveable projection of the vehicle.

3. The controller of clause 1 or 2, wherein the controller comprises a memory means for storing data therein, the memory means being arranged to store data received via the input means prior to altering the position of the moveable projection of the vehicle.

4. The controller of clause 3, wherein the control means is arranged to control the output means in dependence upon the data stored in the memory means.

5. The controller of clause 4, wherein the control means is arranged to control the output means to cause the moveable projection of the vehicle mirror to be altered during the defined manoeuvre in dependence upon the data stored in the memory means.

6. The controller of any preceding clause, wherein the defined manoeuvre is a parking manoeuvre.

7. The controller of clause 6, wherein the control means is arranged to control the output means to reconfigure the vehicle mirror during a parking-in defined manoeuvre from an expanded position of the moveable projection of the vehicle to a collapsed position of the moveable projection of the vehicle.

8. The controller of clause 6 or 7, wherein the control means is arranged to control the output means to reconfigure the moveable projection of the vehicle during an unparking defined manoeuvre from a collapsed position of the moveable projection of the vehicle to an expanded position of the moveable projection of the vehicle.

9. The controller of any preceding clause, wherein the control means is arranged to control the output means to cause the position of the moveable projection of the vehicle to be altered during the defined manoeuvre in dependence on the environment signal being indicative of a feature in a location of the vehicle proximal to a projected vehicle trajectory.

10. The controller of any preceding clause, wherein the controller comprises a second input means for receiving a request signal indicative of a wirelessly received signal indicative of a user request.

11. A system comprising:
  the controller of any preceding clause, arranged to receive the environment signal and to output the manoeuvre signal;
  environment sensing means for determining the location of one or more features in the vicinity of the vehicle and outputting the environment signal indicative thereof.

12. The system of clause 11 comprising actuator means for receiving the manoeuvre signal to cause the vehicle to perform the defined manoeuvre.

13. The system of clause 11 or 12, comprising receiver means for receiving a signal from a user indicative of a user request for vehicle movement and outputting a request signal in dependence thereon.

14. The system of any of clauses 11 to 13, wherein the controller is arranged to control the output means for performing the defined manoeuvre in dependence upon a presence of an occupant in the vehicle.

15. A method of controlling movement of a vehicle to perform a defined manoeuvre, the method comprising:
receiving an environment signal indicative of a location of one or more features in a vicinity of the vehicle; and
controlling an output means in dependence on the environment signal such that a moveable projection of the vehicle is caused to be positioned during the defined manoeuvre in dependence on the environment signal.

16. The method of clause 15, comprising altering a position of the moveable projection of the vehicle with respect to a feature in the vicinity of the vehicle.

17. The method of either of clauses 15 or 16, wherein the method comprises determining the location of the one or more features with an environment sensing means and outputting the environment signal from the environment sensing means.

18. The method of clause 17, wherein the environment sensing means is associated with the moveable projection of the vehicle.

19. The method of clause 17 or 18, comprising storing data received from the environment sensing means prior to a reconfiguration of the moveable projection of the vehicle.

20. The method of clause 19, comprising controlling the output means in dependence on the stored data.

21. The method of clause 20, comprising controlling the output means in dependence on the stored data to perform the defined manoeuvre in dependence upon the stored data.

22. The method of clause 20 or 21, comprising controlling the output means in dependence on the stored data to configure the moveable projection of the vehicle during the defined manoeuvre in dependence upon the stored data.

23. The method of any of clauses 15 to 22, comprising reconfiguring the moveable projection of the vehicle between an expanded position and a collapsed position during the defined manoeuvre.

24. A vehicle comprising a controller according to any of clauses 1 to 10, a system according to any of clauses 11 to 14 or arranged to perform a method according to any of clauses 15 to 23.

25 Computer software which, when executed by a processing means, is arranged to perform a method according to any of clauses 15 to 23, optionally where stored on a computer readable non-transitory medium.

Sixth Technique

1. A controller comprising:
input means for receiving a terrain signal indicative of a terrain in a vicinity of a vehicle;
output means for outputting a manoeuvre signal to cause the vehicle to perform a defined manoeuvre; and
control means arranged to control the output means in dependence on the terrain signal.

2. The controller of clause 1, wherein the control means is arranged to cause the vehicle to perform at least a portion of the defined manoeuvre in accordance with a vehicle movement control profile determined in dependence on the terrain signal.

3. The controller of clause 2, wherein the vehicle movement control profile comprises a speed parameter, and the control means is arranged to select the vehicle movement control profile corresponding to a categorisation of the terrain.

4. The controller of clause 3, wherein the speed parameter is indicative of an acceleration of the vehicle.

5. The controller of either of clauses 3 or 4, wherein the speed parameter is indicative of a jerk of the vehicle.

6. The controller of any of clauses 3 to 5, wherein the speed parameter comprises a maximum speed parameter.

7. The controller of clause 6, wherein the maximum speed parameter of a vehicle movement control profile corresponding to an off-road terrain is less than the maximum speed parameter of a vehicle movement control profile corresponding to an on-road terrain.

8. The controller of any of clauses 2 to 7, wherein the movement control profile is dependent upon at least one ambient condition in a vicinity of the vehicle.

9. The controller of any preceding clause, wherein the controller comprises a second input means for receiving a request signal indicative of a received signal indicative of a user request.

10. The controller of any preceding clause, wherein the defined manoeuvre is a parking manoeuvre.

11. A system, comprising:
the controller of any preceding clause arranged to receive the terrain signal and to output the manoeuvre signal; and
actuator means for receiving the manoeuvre signal to cause the vehicle to perform the defined manoeuvre in dependence on the terrain signal.

12. The system of clause 11, comprising:
terrain sensing means for determining the terrain in the vicinity of the vehicle and outputting the terrain signal indicative thereof.

13. The system of clause 11 or 12, comprising:
environment sensing means for determining a location of one or more features in the vicinity of the vehicle and outputting an environment signal indicative thereof.

14. The system of any of clauses 11 to 13, wherein the control means is arranged to control the output means to cause the vehicle to perform at least a portion of the defined manoeuvre in accordance with a vehicle movement control profile determined in dependence on the terrain signal.

15. The system of clause 14, when dependent on clause 13, wherein the controller is arranged to select a vehicle movement profile in dependence on the one or more features.

16. The system of either of clauses 14 or 15, wherein the controller is arranged to select the vehicle movement control profile in dependence upon a location of the vehicle.

17. The system of any of clauses 14 to 16, wherein the controller is arranged to select the vehicle movement control profile for performing the defined manoeuvre in dependence upon a drive mode of the vehicle.

18. The system of any of clauses 14 to 17, wherein the controller is arranged to select the vehicle movement control profile for performing the defined manoeuvre in dependence upon a presence of an occupant in the vehicle.

19. The system of any of clauses 14 to 18, wherein the controller is arranged to receive an ambient condition signal indicative of at least one ambient condition in a vicinity of the vehicle; and controller is arranged to select the vehicle movement control profile for performing the defined manoeuvre in dependence upon the ambient condition signal.

20. The system of any of clauses 11 to 19, comprising:
receiver means for receiving a signal indicative of a user request for vehicle movement and outputting a request signal in dependence thereon.

21. A method of controlling movement of a vehicle to perform a defined manoeuvre, the method comprising:
receiving a terrain signal indicative of a terrain in a vicinity of the vehicle; and controlling an output means in dependence on the terrain signal such that at least a portion of the defined manoeuvre is performed in dependence on the terrain in the vicinity of the vehicle.

22. The method of clause 21, wherein the output means is controlled in dependence on the terrain signal such that at least a portion of the defined manoeuvre is performed in accordance with a vehicle movement control profile dependent on the terrain in the vicinity of the vehicle.

23. The method of clause 22, comprising selecting the vehicle movement control profile in dependence upon a vehicle drive mode and/or in dependence on a presence of an occupant in the vehicle and/or determining an ambient condition in the vicinity of the vehicle and selecting the vehicle movement control profile in dependence on the ambient condition.

24. A vehicle comprising a controller according to any of clauses 1 to 10, a system according to any of clauses 11 to 20 or arranged to perform a method according to any of clauses 21 to 23.

25. Computer software which, when executed by a processing means, is arranged to perform a method according to any of clauses 21 to 23, optionally where stored on a computer readable non-transitory medium.

Seventh Technique

1. A controller comprising:
   input means for receiving an environment signal indicative of a location of one or more features in a vicinity of a vehicle;
   output means for outputting a manoeuvre signal to cause the vehicle to perform a defined manoeuvre to a defined manoeuvre completed position; and
   control means arranged to control the output means to cause the vehicle to perform the defined manoeuvre, the control means being arranged to determine a planned trajectory to perform the defined manoeuvre within a number of trajectory parts to the defined manoeuvre completed position within a defined manoeuvre completed position tolerance range relative to a feature in the vicinity of the vehicle, wherein the control means is arranged to determine the defined manoeuvre completed position tolerance range in dependence on the environment signal.

2. The controller of clause 1, wherein the control means is arranged to determine the number of trajectory parts in dependence on the defined manoeuvre completed position tolerance range.

3. The controller of any preceding clause, wherein the control means is arranged to inversely relate the number of trajectory parts to the defined manoeuvre completed position tolerance range such that the defined manoeuvre is limited to a smaller number of trajectory parts when the defined manoeuvre completed position tolerance range is larger and the defined manoeuvre is limited to a larger number of trajectory parts when the defined manoeuvre completed position tolerance range is smaller.

4. The controller of any preceding clause, wherein the control means is arranged to determine both the defined manoeuvre completed position tolerance range and the number of trajectory parts in dependence on the environment signal being indicative of a vehicle envelope parameter of a vehicle envelope for receiving the vehicle.

5. The controller of clause 4, wherein the control means is arranged to provide a larger defined manoeuvre completed position tolerance range for a vehicle envelope with a larger vehicle envelope parameter.

6. The controller of clause 4 or 5, wherein the control means is arranged to provide a smaller number of trajectory parts for a vehicle envelope with an larger vehicle envelope parameter.

7. The controller of any preceding clause, wherein the control means is arranged to determine at least one of the defined manoeuvre completed position tolerance range and the number of trajectory parts in dependence on a location of a vehicle occupant.

8. The controller of any preceding clause, wherein the control means is arranged to determine at least one of the defined manoeuvre completed position tolerance range and the number of trajectory parts in dependence on a mode for performing the defined manoeuvre.

9. The controller of any preceding clause, wherein the number of number of trajectory parts within which the defined manoeuvre is performed is a maximum number of trajectory parts.

10. The controller of any preceding clause, wherein the planned trajectory is from a defined manoeuvre start position to the defined manoeuvre completed position; and the number of trajectory parts is a total number of trajectory parts therebetween.

11. The controller of any preceding clause, wherein the defined manoeuvre completed position tolerance range comprises at least one of an angular range and a distance range relative to the feature in the vicinity of the vehicle.

12. The controller of any preceding clause, wherein the control means is arranged to determine each sequential trajectory part being in an opposite vehicle longitudinal direction relative to a preceding trajectory part.

13. The controller of any preceding clause, comprising an input means for receiving a request signal indicative of a received signal indicative of a user request for vehicle movement.

14. The controller of any preceding clause, wherein the defined manoeuvre is a parking manoeuvre.

15. A system comprising:
   the controller of any preceding clause, arranged to receive the environment signal and to output the manoeuvre signal;
   environment sensing means arranged to determine the location of the one or more features in the vicinity of the vehicle; and
   actuator means for receiving the manoeuvre signal to cause the vehicle to perform the defined manoeuvre.

16. The system of clause 15, when dependent on clause 13, comprising receiver means for receiving the signal indicative of the user request for vehicle movement and outputting the request signal in dependence thereon.

17. The system of either of clauses 15 or 16, comprising user input means for receiving user input for configuring the control means to determine at least one of the defined manoeuvre completed position tolerance range and the number of trajectory parts.

18. The system of any of clauses 15 to 17, comprising location input means for receiving location input for configuring the control means to determine at least one of the defined manoeuvre completed position tolerance range and the number of trajectory parts in dependence on a location parameter.

19. A method of controlling movement of a vehicle to perform a defined manoeuvre to a defined manoeuvre completed position, the method comprising:
   receiving an environment signal indicative of a location of one or more features in a vicinity of the vehicle;

determining a defined manoeuvre completed position tolerance range in dependence on the environment signal;

determining a planned trajectory to perform the defined manoeuvre within a number of trajectory parts to the defined manoeuvre completed position within the defined manoeuvre completed position tolerance range relative to a feature in the vicinity of the vehicle; and outputting a manoeuvre signal to cause the vehicle to perform the defined manoeuvre.

20. The method of clause 19 comprising determining the number of trajectory parts in dependence on the defined manoeuvre completed position tolerance range.

21. The method of clause 19 or 20, comprising inversely relating the number of trajectory parts to the defined manoeuvre completed position tolerance range such that the defined manoeuvre is performed in a smaller number of trajectory parts when the defined manoeuvre completed position tolerance range is larger and the defined manoeuvre is limited to a larger number of trajectory parts when the defined manoeuvre completed position tolerance range is smaller.

22. The method of any of clauses 19 to 21, comprising determining both the defined manoeuvre completed position tolerance range and the number of trajectory parts in dependence on the environment signal being indicative that a vehicle envelope parameter of a vehicle envelope for receiving the vehicle is above a threshold.

23. The method of any of clauses 19 to 22, comprising providing a larger defined manoeuvre completed position tolerance range for a vehicle envelope with a larger vehicle envelope parameter.

24. A vehicle comprising a controller according to any of clauses 1 to 14, a system according to any of clauses 15 to 18 or arranged to perform a method according to any of clauses 19 to 22.

25. Computer software which, when executed by a processing means, is arranged to perform a method according to any of clauses 19 to 22, optionally where stored on a computer readable non-transitory medium.

Eighth Technique

1. A controller comprising:
output means for outputting a manoeuvre signal to cause a vehicle to perform a defined manoeuvre; and
control means arranged to control the output means, the control means being arranged to provide a mode for performing at least a portion of the defined manoeuvre, the mode being selectable from a plurality of modes including at least one mode corresponding to an occupant-in-vehicle mode and at least one mode corresponding to an occupant-out-of-vehicle mode, the control means being arranged to vary the mode during the defined manoeuvre.

2. The controller of clause 1, comprising an input means for receiving a request signal indicative of a received signal indicative of a user request for vehicle movement.

3. The controller of clause 2, wherein the input means is for receiving a request signal indicative of a mode selection.

4. The controller of any preceding clause, wherein the control means is arranged for the mode to be selectable in dependence on a location of a vehicle occupant.

5. The controller of clause 4, wherein the control means is arranged to control the mode in dependence on the vehicle occupant location transitioning between an in vehicle location and an out of vehicle location.

6. The controller of any preceding clause, comprising an environment input means for receiving an environment signal indicative of a location of one or more features in a vicinity of the vehicle, wherein the control means is arranged for the mode to be selectable in dependence upon the environment signal being indicative of a vehicle envelope suitable for the mode.

7. The controller of any preceding clause, wherein the defined manoeuvre is a parking manoeuvre.

8. A system comprising:
the controller of any preceding clause, arranged to output the manoeuvre signal; and
actuator means for receiving the manoeuvre signal to cause the vehicle to perform the defined manoeuvre.

9. The system of clause 8, comprising receiver means for receiving a signal indicative of a user request for vehicle movement and outputting a request signal in dependence thereon.

10. The system of either of clauses 8 or 9, wherein the controller is arranged to control the provision of modes in dependence on a location of a vehicle occupant.

11. The system of any of clauses 8 to 10, comprising environment sensing means for determining the location of one or more features in the vicinity of the vehicle.

12. A method of controlling movement of a vehicle to perform a defined manoeuvre, the method comprising:
providing a mode for performing at least a portion of the defined manoeuvre, the mode being selectable from a plurality of modes including at least one mode corresponding to an occupant-in-vehicle mode and at least one mode corresponding to an occupant-out-of-vehicle mode;
outputting a manoeuvre signal to cause the vehicle to perform at least a portion of the defined manoeuvre in a selected mode; and
varying the mode during the performance of the defined manoeuvre.

13. The method of clause 12, comprising receiving a signal indicative of a user request for vehicle movement and outputting a request signal in dependence thereon.

14. The method of clause 12 or 13, comprising a user selecting the mode.

15. The method of any of clauses 12 to 14, comprising automatically selecting a default mode.

16. The method of clause 15, comprising automatically selecting the default mode in dependence on the presence of an occupant in the vehicle.

17. The method of any of clauses 12 to 15, comprising receiving an environment signal indicative of a location of one or more features in a vicinity of the vehicle, and providing the selectable mode in dependence on a feature in the vicinity of the vehicle.

18. The method of any of clauses 12 to 17, wherein the at least a portion of the defined manoeuvre comprises one or more of: initiation of the defined manoeuvre; completion of the defined manoeuvre; and the entirety of the defined manoeuvre.

19. The method of any of clauses 12 to 18, comprising offering selectability of the mode to a user.

20. A vehicle comprising a controller according to any of clauses 1 to 7, a system according to any of clauses 8 to 11 or arranged to perform a method according to any of clauses 12 to 19.

21. Computer software which, when executed by a processing means, is arranged to perform a method according to any of clauses 12 to 19.

22. The computer software of clause 21 stored on a computer readable non-transitory medium.

Ninth Technique

1. A controller comprising:
   input means for receiving an input signal;
   control means arranged to determine a defined manoeuvre opportunity for a performance of at least a portion of a defined manoeuvre by a vehicle;
   notification output means for outputting a notification signal; the control means being arranged to control the notification output means to output the notification signal indicative of the determination by the control means of the defined manoeuvre opportunity;
   the control means being arranged to control the notification output means to automatically notify a vehicle user independently of a user request for determination by the control means of the defined manoeuvre opportunity; wherein the control means is arranged to control the notification output means to notify the vehicle user of the defined manoeuvre opportunity in dependence on the input signal being indicative of a vehicle parameter,
   manoeuvre output means for outputting a manoeuvre signal to cause the vehicle to perform the defined manoeuvre; and
   request input means for receiving a request signal indicative of a user request for the performance of at least the portion of the defined manoeuvre, the manoeuvre output means being controlled by the control means to cause the vehicle to perform the defined manoeuvre in dependence on the request signal.

2. The controller of clause 1, wherein the vehicle parameter is a non-speed parameter and is indicative of at least one of: a status of the vehicle; and a position of the vehicle.

3. The controller of clause 1 or 2, wherein the control means is arranged to control the notification means to output the notification signal indicative of the defined manoeuvre opportunity without requiring a user activation of the controller to determine the defined manoeuvre opportunity.

4. The controller of any preceding clause, wherein the control means is arranged to control the notification means to output the notification signal indicative of the determination of the defined manoeuvre opportunity in dependence on the input signal from the input means, wherein the controller is arranged to receive the input signal from at least one of a plurality of input sources.

5. The controller of any preceding clause, wherein the control means is arranged to control the notification means to output the notification signal indicative of the determination of the defined manoeuvre opportunity, in dependence on the input signal, wherein the input signal comprises at least one of:
   an environment signal indicative of a location of at least one feature in a vicinity of the vehicle;
   a motion signal indicative of a motion of the vehicle;
   a steering signal indicative of a steering input;
   an event signal indicative of a vehicle event; and
   a location signal indicative of a vehicle location.

6. The controller of any preceding clause, wherein the defined manoeuvre is a parking manoeuvre.

7. The controller of any preceding clause, wherein the control means is arranged to control the notification means to output the notification signal in dependence on a determination by the control means of a user-initiated manoeuvre.

8. The controller of clause 7, wherein the control means is arranged to transfer control from the user to the control means for a continuance of the performance of the user-initiated manoeuvre as a defined manoeuvre.

9. The controller of any preceding clause, wherein the control means is arranged to determine the opportunity in dependence on a determination of a planned trajectory to perform the defined manoeuvre to a defined manoeuvre completed position.

10. The controller of any preceding clause, wherein the control means is arranged to determine a plurality of opportunities for performing at least a portion of a defined manoeuvre, the control means being arranged to control the notification means to output the notification signal to the user of the determination of the plurality of opportunities.

11. The controller of any preceding clause, comprising memory means for storing data therein, the control means being arranged to control the notification means to output the notification signal indicative of the opportunity in dependence on the data.

12. The controller of any preceding clause, comprising user input means for receiving a request signal indicative of a wired or wirelessly received signal indicative of a user request for vehicle movement.

13. A system comprising:
    the controller of any preceding clause, arranged to output the manoeuvre signal; and
    actuator means for receiving the manoeuvre signal to cause the vehicle to perform the defined manoeuvre.

14. The system of clause 13, comprising environment sensing means for determining the location of at least one feature in the vicinity of the vehicle.

15. The system of clause 14, wherein the environment sensing means is automatically activatable independently of the vehicle speed parameter.

16. The system of either of clauses 14 or 15, wherein the environment sensing means is automatically activatable in dependence on the vehicle speed parameter.

17. A method of controlling movement of a vehicle to perform a defined manoeuvre, the method comprising:
    receiving an input signal, the input signal being indicative of a vehicle parameter,
    determining with a control means a defined manoeuvre opportunity for a performance of at least a portion of a defined manoeuvre by a vehicle;
    automatically notifying a vehicle user of the determination by the control means of the defined manoeuvre opportunity for the performance of the defined manoeuvre, the notification of the vehicle user of the opportunity being in dependence on receipt of the input signal being indicative of a vehicle parameter;
    receiving a request signal indicative of a user request for the performance of at least the portion of the defined manoeuvre with a manoeuvre output means controlled by the control means;
    outputting a manoeuvre signal to cause the vehicle to perform the defined manoeuvre with the control means controlling the manoeuvre output means.

18. The method of clause 17, wherein the vehicle parameter is a non-speed parameter and is indicative of at least one of: a status of the vehicle; and a position of the vehicle.

19. The method of clause 17 or 18, comprising controlling the notification means to output the notification signal indicative of the opportunity for the performance of the portion of the defined manoeuvre without requiring a user activation of the control means to seek determination of the opportunity.

20. The method of any of clauses 17 to 19, comprising notifying the user of the determination of the opportunity, in dependence on receipt of the input signal and the input signal comprises at least one of:
    an environment signal indicative of a location of at least one feature in a vicinity of the vehicle;

a motion signal indicative of a motion of the vehicle;
a steering signal indicative of a user steering input;
an event signal indicative of a vehicle event; and
a location signal indicative of a vehicle location.

21. The method of any of clauses 18 to 20, wherein the defined manoeuvre is a parking manoeuvre.

22. The method of any of clauses 18 to 21, comprising determining a user-initiated manoeuvre and notifying the user of the opportunity in dependence on the determination of the user-initiated manoeuvre.

23. The method of any of clauses 18 to 22, comprising receiving an environment signal indicative of a location of at least one feature in the vicinity of the vehicle;
   detecting a vacancy in dependence on the environment signal, the vacancy comprising a vehicle envelope suitable for receiving the vehicle in a defined manoeuvre completed position; and
   determining the defined manoeuvre opportunity in dependence on the detection of the vacancy.

24. A vehicle comprising a controller according to any of clauses 1 to 12, a system according to any of clauses 13 to 16 or arranged to perform a method according to any of clauses 17 to 23.

25. Computer software which, when executed by a processing means, is arranged to perform a method according to any of clauses 17 to 24, optionally where stored on a computer readable non-transitory medium.

Tenth Technique

A controller, comprising:
   environment input means for receiving an environment signal indicative of a location of at least one feature in a vicinity of a vehicle;
   control means arranged to determine a vacancy in dependence on the environment signal; the control means being arranged to define within the vacancy at least one defined manoeuvre completed position for the vehicle;
   user input means for receiving a request signal indicative of a user request;
   output means for outputting a manoeuvre signal to cause the vehicle to perform a defined manoeuvre to the defined manoeuvre completed position; wherein the control means is arranged to control the output means to selectively offset the defined manoeuvre completed position within the vacancy.

2. The controller of clause 1, wherein the control means is arranged to selectively offset the defined manoeuvre completed position in dependence on the request signal.

3. The controller of clause 1 or 2, wherein the control means is arranged to selectively offset the defined manoeuvre completed position in dependence on a feature indicated by the environment signal.

4. The controller of clause 3, wherein the control means is arranged to selectively offset the defined manoeuvre completed position in dependence on a proximity to the vehicle of the feature indicated by the environment signal.

5. The controller of clause 4, wherein the control means is arranged to selectively offset the defined manoeuvre completed position towards the feature indicated by the environment signal.

6. The controller of any preceding clause, wherein the control means is arranged to define at least two vehicle envelopes within the vacancy, each vehicle envelope comprising a discrete defined manoeuvre completed position that is offset within the vacancy.

7. The controller of clause 6, wherein the two vehicle envelopes are non-overlapping and extend in respective longitudinal directions adjacent and parallel each other.

8. The controller of any preceding clause, wherein the control means is arranged to selectively offset the defined manoeuvre completed position in dependence on a presence of a vehicle occupant.

9. The controller of any preceding clause, comprising memory means for storing data therein, the control means being arranged to selectively offset the defined manoeuvre completed position in dependence on the data.

10. The controller of any preceding clause, wherein the control means is arranged to adapt the defined manoeuvre completed position in dependence on the environment signal being indicative of a change in at least one feature in the vicinity of the vehicle.

11. The controller of any preceding clause, wherein the defined manoeuvre is a parking manoeuvre.

12. The controller of any preceding clause, comprising notification output means for outputting a notification signal for notifying a user; the control means being arranged to control the notification output means to notify the user of the determination by the control means of at least one selectable offset defined manoeuvre completed position.

13. The controller of any preceding clause, wherein the request signal is indicative of a received signal indicative of the user request.

14. The controller of any preceding clause, wherein the control means is arranged to selectively offset the defined manoeuvre completed position in dependence on a mode of performance of at least a portion of the defined manoeuvre.

15. The controller of any preceding clause, wherein the control means is arranged to vary a magnitude of the offset.

16. A system comprising:
   the controller of any preceding clause, arranged to output the manoeuvre signal; and
   actuator means for receiving the manoeuvre signal to cause the vehicle to perform the defined manoeuvre.

17. The system of clause 16, comprising environment sensing means for determining the location of the at least one feature in the vicinity of the vehicle.

18. The system of either of clauses 16 or 17, comprising receiver means for receiving a signal indicative of the user request and outputting the request signal in dependence thereon.

19. A method of controlling movement of a vehicle to perform a defined manoeuvre, the method comprising:
   receiving an environment signal indicative of a location of at least one feature in a vicinity of a vehicle;
   determining a vacancy in dependence on the environment signal;
   defining within the vacancy at least one defined manoeuvre completed position for the vehicle;
   selectively offsetting the defined manoeuvre completed position within the vacancy; and
   outputting a manoeuvre signal to cause the vehicle to perform the defined manoeuvre to the defined manoeuvre completed position.

20. The method of clause 19, comprising receiving a request signal indicative of a user request and selectively offsetting the defined manoeuvre completed position in dependence on the request signal.

21. The method of clause 19 or 20, comprising selectively offsetting the defined manoeuvre completed position in dependence on a feature indicated by the environment signal.

22. The method of any of clauses 19 to 21, comprising notifying a user of the determination of at least one selectable offset defined manoeuvre completed position.

23. A vehicle comprising a controller according to any of clauses 1 to 15, a system according to any of clauses 16 to 18 or arranged to perform a method according to any of clauses 19 to 22.

24. Computer software which, when executed by a processing means, is arranged to perform a method according to any of clauses 19 to 22.

25. The computer software of clause 24 stored on a computer readable non-transitory medium.

Eleventh Technique

1. A controller comprising:
   input means for receiving a user control request signal indicative of a user request for control;
   output means for outputting a manoeuvre signal to cause a vehicle to perform a defined manoeuvre to a defined manoeuvre completed position; and
   control means arranged to control the output means to cause the vehicle to perform the defined manoeuvre,
   wherein the control means is arranged to determine a transition phase of the defined manoeuvre during which control is transferable to the user upon receipt of the user control request signal, to allow the vehicle to transition from the defined manoeuvre to a user-controlled post-manoeuvre vehicle movement.

2. The controller of clause 1, wherein the transition phase is defined between a transition position and the defined manoeuvre completed position of the defined manoeuvre, with the controller being arranged to allow transfer of control to the user at any point of the transition phase between the transition position and the defined manoeuvre completed position.

3. The controller of any preceding clause, comprising a notification output means for outputting a notification signal for notifying the user of commencement of the transition phase.

4. The controller of any preceding clause wherein the control means is arranged to provide a phased transfer to user control.

5. The controller of any preceding clause, wherein the control means is arranged to determine the transition phase such that no change in a lateral direction of movement of the vehicle is required during the transition phase to complete the defined manoeuvre to the defined manoeuvre completed position.

6. The controller of any preceding clause, comprising input means for receiving an environment signal indicative of a location of one or more features in a vicinity of a vehicle; and wherein the control means is arranged to determine the transition phase to correspond to a portion of the defined manoeuvre after a feature in the vicinity of the vehicle has been cleared.

7. The controller of any preceding clauses, wherein the control means is arranged to be over-ridden at any point of the defined manoeuvre including outside the transition phase.

8. The controller of any preceding clause, wherein the control means is arranged to allow control transfer to the user during the transition phase without interrupting the defined manoeuvre.

9. The controller of any preceding clause, wherein the control means is arranged to allow transfer to the user of a control of an output signal to a motive control means during at least a motive control portion of the transition phase.

10. The controller of any preceding clause, wherein the control means is arranged to allow transfer to the user of a control of an output signal to a steering control means during at least a steering control portion of the transition phase.

11. The controller of any preceding clause, comprising input means for receiving a request signal indicative of a user request for vehicle movement.

12. The controller of any preceding clause wherein in an absence of the user input during the transition phase the control means is arranged to control the output means to control the vehicle to perform the defined manoeuvre to the defined manoeuvre completed position for subsequent transfer of control to the user after completion of the defined manoeuvre.

13. A system, comprising:
    the controller of any preceding clause, arranged to output the manoeuvre signal; and
    actuator means for receiving the manoeuvre signal to cause the vehicle to perform the defined manoeuvre.

14. The system of clause 13, comprising user input means for receiving the user request for control transfer.

15. The system of any of clauses 13 to 14, comprising a notification means for notifying the user of commencement of the transition phase.

16. The system of any of clauses 13 to 15, comprising:
    receiver means for receiving a signal indicative of a user request for vehicle movement and outputting a request signal in dependence thereon.

17. The system of any of clauses 13 to 15, comprising environment sensing means for determining the location of one or more features in the vicinity of the vehicle and outputting the environment signal indicative thereof.

18. A method of controlling movement of a vehicle to perform a defined manoeuvre, the method comprising:
    controlling an output means with a control means to cause the vehicle to perform the defined manoeuvre;
    determining a transition phase of the defined manoeuvre during which control is transferable to a user upon receipt of a user control request signal;
    transferring control to the user in dependence upon receipt of the user control request signal being during the transition phase, to allow the vehicle to transition from the defined manoeuvre to a user-controlled post-manoeuvre vehicle movement.

19. The method of clause 18, comprising allowing the vehicle to transition to user control prior to completion of the defined manoeuvre.

20. The method of clause 18 or 19, comprising receiving an environment signal indicative of a location of one or more features in a vicinity of the vehicle;
    clearing a feature in the vicinity of the vehicle during a pre-transition phase of the defined manoeuvre; and
    commencing the transition phase after clearing the feature in the vicinity of the vehicle.

21. The method of clause 20, comprising determining the location of the one or more features with an environment sensing means.

22. The method of any of clauses 18 to 21, comprising commencing the transition phase when the defined manoeuvre can be completed with no changes in a longitudinal direction of movement of the vehicle.

23. The method of any of clauses 18 to 22, comprising receiving a signal from a mobile device indicative of a user request to perform the defined manoeuvre.

24. A vehicle comprising a controller according to any of clauses 1 to 12, a system according to any of clauses 13 to 17 or arranged to perform a method according to any of clauses 18 to 23.

25. Computer software which, when executed by a processing means, is arranged to perform a method according to any of clauses 18 to 24, optionally where stored on a computer readable non-transitory medium.

Twelfth Technique

1. A controller comprising:
  input means for receiving an input signal;
  manoeuvre output means for outputting a manoeuvre signal to cause a vehicle to perform a defined manoeuvre;
  control means arranged to control the manoeuvre output means;
  notification output means for outputting a notification signal for notifying a user; and
  request input means for receiving a request signal indicative of a user request for a transfer of control from the user to the control means for a continuance of a user-initiated manoeuvre as a defined manoeuvre; the control means being arranged to control the manoeuvre output means to perform the defined manoeuvre from a user-initiated manoeuvre end position in dependence on the request signal.

2. The controller of clause 1, wherein the control means is arranged to detect performance of the user-initiated manoeuvre, in dependence on the input signal; and the control means is arranged to control the notification output means to notify the user of the detection by the control means of the user-initiated manoeuvre.

3. The controller of clause 2, wherein the control means is arranged to control the notification output means to automatically output the notification signal on detection by the control means of the user-initiated manoeuvre and to offer the user continuance as a defined manoeuvre.

4. The controller of clause 2 or 3, wherein the control means is arranged to control the notification output means to output the notification signal independently of a user request for the manoeuvre output means to be controlled by the control means.

5. The controller of any preceding clause, wherein the control means is arranged to control the notification output means in dependence on the input signal received prior to the user-initiated manoeuvre to the user-initiated manoeuvre end position.

6. The controller of any preceding clause, wherein the control means is configurable to suppress the notification output means from notifying the vehicle user of the detection by the control means of the user-initiated manoeuvre.

7. The controller of any preceding clause, wherein the control means is arranged to control the manoeuvre output means to cause the vehicle to follow a planned trajectory from the user-initiated manoeuvre end position to a defined manoeuvre completed position.

8. The controller of clause 7, wherein the planned trajectory comprises at least a partial correction of the user-initiated manoeuvre performed prior to the user request.

9. The controller of any preceding clause, wherein the defined manoeuvre is a parking manoeuvre.

10. The controller of any preceding clause, comprising memory means for storing data therein, the memory means being arranged to store data received via the input means.

11. The controller of clause 10, wherein the stored data is indicative of a previously performed defined manoeuvre; and the control means is arranged to control the manoeuvre output means to cause the vehicle to selectively perform a repetition of at least a portion of the previously performed defined manoeuvre.

12. The controller of clause 10 or 11, wherein the stored data is indicative of a previously performed defined manoeuvre; and the control means is arranged to control the manoeuvre output means to cause the vehicle to perform a reversal of at least a portion of the previously performed defined manoeuvre.

13. The controller of any of clauses 10 to 12, wherein the stored data is indicative of a previously performed user-initiated manoeuvre; and the control means is arranged to control the notification output means to notify the user in dependence on the previously-performed user-initiated manoeuvre having been followed by a defined manoeuvre.

14. The controller of any preceding clause, wherein the input means is arranged to receive a plurality of input signals from a plurality of input sources, the plurality of input signals being selected from at least:
  an environment signal indicative of a feature in a vicinity of the vehicle;
  a motion signal indicative of a motion of the vehicle;
  a steering signal indicative of a user steering;
  an event signal indicative of a vehicle event; and
  a location signal indicative of a geographical location.

15. A system, comprising:
  the controller of any preceding clause, arranged to output the manoeuvre signal; and
  actuator means for receiving the manoeuvre signal to cause the vehicle to perform the defined manoeuvre.

16. The system of clause 15, comprising environment sensing means for determining the location of one or more features in the vicinity of the vehicle.

17. The system of either of clauses 15 or 16, comprising receiver means for:
  receiving a user signal indicative of the user request for continuance of the user-initiated manoeuvre as the defined manoeuvre with the manoeuvre output means controlled by the control means; and
  for outputting the request signal in dependence on receipt of the user signal.

18. The system of clause 17, wherein the receiver means is for wirelessly receiving the user signal from a mobile device.

19. A method of controlling movement of a vehicle to perform a defined manoeuvre, the method comprising:
  performing a user-initiated manoeuvre to a user-initiated manoeuvre end position;
  receiving a request signal indicative of a user request to transfer control from a user to a control means for a continuance of the user-initiated manoeuvre as a defined manoeuvre;
  controlling with the control means a manoeuvre output means to output a manoeuvre signal to cause the vehicle to perform the defined manoeuvre from the user-initiated manoeuvre end position.

20. The method of clause 19 comprising receiving an input signal; and outputting a notification signal for notifying a user.

21. The method of clause 20, comprising, in dependence on the input signal, detecting with the control means the user-initiated manoeuvre, and notifying the user of the detection by the control means of the user-initiated manoeuvre; and offering transfer of control to the control means for the continuance of the user-initiated manoeuvre as the defined manoeuvre.

22. The method of any of clauses 19 to 21, comprising allowing the vehicle to revert to user control prior to completion of the defined manoeuvre to a defined manoeuvre completed position.

23. The method of any of clauses 19 to 22, comprising determining a location of one or more features in a vicinity of the vehicle with an environment sensing means.

24. The method of any of clauses 19 to 23, comprising receiving a signal from a mobile device indicative of a user request to perform the defined manoeuvre.

25. A vehicle comprising a controller according to any of clauses 1 to 14, a system according to any of clauses 15 to 18 or arranged to perform a method according to any of clauses 19 to 24.

26. Computer software which, when executed by a processing means, is arranged to perform a method according to any of clauses 19 to 24, optionally where stored on a computer readable non-transitory medium.

The invention claimed is:

1. A controller comprising:
an input configured to receive an environment signal indicative of a location of at least one feature in a vicinity of a vehicle;
at least one processing device arranged to:
determine the orientation of a defined manoeuvre completed position of the vehicle in dependence on the environment signal; and
an output configured to output a possible defined manoeuvre completed position signal in dependence on the determined orientation;
wherein the possible defined manoeuvre completed position signal is determined by learning from a repeated user behaviour, wherein the
repeated user behaviour comprises at least one of:
an input pattern;
a geographic location; and
a user identity.

2. The controller of claim 1, wherein the controller is configured to output a notification signal indicative of the possible defined manoeuvre completed position signal.

3. The controller of claim 1, wherein the at least one processing device is arranged to determine the orientation of the defined manoeuvre completed position in dependence on the environment signal being indicative of an orientation of the at least one feature in the vicinity of the vehicle.

4. The controller of claim 3, wherein the at least one processing device is arranged to determine the orientation of the defined manoeuvre completed position to be aligned relative to the at least one feature in the vicinity of the vehicle.

5. The controller of claim 4, wherein the at least one processing device is arranged to determine the orientation of the defined manoeuvre completed position to be parallel to the at least one feature in the vicinity of the vehicle.

6. The controller of claim 4, wherein the at least one processing device is arranged to determine the orientation of the defined manoeuvre completed position to be perpendicular to the at least one feature in the vicinity of the vehicle.

7. The controller of claim 3, wherein the orientation of the at least one feature in the vicinity of the vehicle comprises the orientation of at least one other vehicle in the vicinity of the vehicle.

8. The controller of claim 1, wherein the at least one processing device is arranged to determine the orientations of a plurality of possible defined manoeuvre completed positions of the vehicle in dependence on the environment signal.

9. The controller of claim 8, wherein the at least one processing device is arranged to notify a vehicle user of the orientations of the plurality of possible defined manoeuvre completed positions.

10. The controller of claim 1, wherein the output is configured to output a manoeuvre signal to cause the vehicle to perform a defined manoeuvre to the defined manoeuvre completed position; wherein the at least one processing device is arranged to control the output to output the manoeuvre signal.

11. The controller of claim 1, wherein the input is configured to receive a request signal indicative of a wired or wirelessly received signal indicative of a user request for vehicle movement.

12. The controller of claim 1, wherein the at least one processing device is arranged to determine the orientation of the defined manoeuvre completed position in dependence on a location of the vehicle.

13. The controller of claim 1, comprising one or more memory devices for storing data therein, the at least one processing device being arranged to determine the orientation of the defined manoeuvre completed position in dependence on the data.

14. The controller of claim 1 comprised in a vehicle.

15. A system comprising:
the controller of claim 1, arranged to output the possible defined manoeuvre completed position signal; and
a notification output configured to notify the vehicle user of the possible defined manoeuvre completed position.

16. The system of claim 15, comprising one or more environmental sensing devices for determining the location of the at least one feature in the vicinity of the vehicle and for outputting the environment signal.

17. The system of claim 15, comprising a receiver for wirelessly receiving a signal from a mobile device indicative of a user request and outputting a request signal in dependence thereon.

18. The system of claim 15, wherein the notification output is arranged to output a notification signal for the visual and/or audio notification indicative of the possible defined manoeuvre completed position.

19. A method of determining an orientation of a defined manoeuvre completed position of a vehicle, the method comprising:
receiving an environment signal indicative of a location of at least one feature in a vicinity of the vehicle;
in dependence on the environment signal, determining with at least one processing device the orientation of the defined manoeuvre completed position of the vehicle; and
outputting a possible defined manoeuvre completed position signal in dependence on the determined orientation.

20. A non-transitory, computer-readable storage medium storing instructions thereon that, when executed by one or more electronic processors, causes the one or more electronic processors to carry out the method of claim 19.

* * * * *